US012571511B2

(12) United States Patent
Oleske et al.

(10) Patent No.: US 12,571,511 B2
(45) Date of Patent: Mar. 10, 2026

(54) INTEGRATED CEILING AND LIGHT SYSTEM

(71) Applicant: ARMSTRONG WORLD INDUSTRIES, INC., Lancaster, PA (US)

(72) Inventors: Peter J. Oleske, Lancaster, PA (US); Brian L. Springer, Lancaster, PA (US); Anthony J. Jaskierski, Akron, PA (US); Todd M. Bergman, Lititz, PA (US); Keith A. Koger, Lancaster, PA (US); Christopher D. Gaydos, Lititz, PA (US); Craig W. Desantis, Lititz, PA (US); Jere W. Myers, Washington Boro, PA (US); Jonathan P. Van Dore, Lititz, PA (US); G. Douglas Vernau, Mountville, PA (US); Kenneth P. Kehrer, Lewes, DE (US); Paul A. Hough, Lititz, PA (US); Ravindra Deshpande, Lancaster, PA (US)

(73) Assignee: AWI Licensing LLC, Wilmington, DE (US)

( * ) Notice: Subject to any disclaimer, the term of this patent is extended or adjusted under 35 U.S.C. 154(b) by 309 days.

(21) Appl. No.: 18/236,876

(22) Filed: Aug. 22, 2023

(65) Prior Publication Data

US 2023/0392762 A1 Dec. 7, 2023

Related U.S. Application Data

(60) Continuation of application No. 17/672,194, filed on Feb. 15, 2022, now abandoned, which is a (Continued)

(51) Int. Cl.

| | |
|---|---|
| ***F21S 8/04*** | (2006.01) |
| ***E04B 9/00*** | (2006.01) |

(Continued)

(52) U.S. Cl.

CPC ................ *F21S 8/04* (2013.01); *E04B 9/006* (2013.01); *E04B 9/04* (2013.01); *E04B 9/0421* (2013.01);

(Continued)

(58) Field of Classification Search

CPC ..... F21S 8/04; F21S 8/026; F21S 8/06; F21V 7/0008; F21V 23/001; F21V 33/006; F21V 21/048; E04B 9/366

See application file for complete search history.

(56) References Cited

U.S. PATENT DOCUMENTS

| | | | |
|---|---|---|---|
| 2,870,883 | A | 1/1959 | Deaton |
| 2,892,077 | A | 6/1959 | Rosenstein |

(Continued)

FOREIGN PATENT DOCUMENTS

| | | |
|---|---|---|
| CN | 2806608 | 8/2006 |
| CN | 201187715 | 1/2009 |

(Continued)

OTHER PUBLICATIONS

Stephen Shankland, "Why OLED Lighting Will Soon Shine On You," C/Net Magazine, www.cnet.com/news/why-oled-lighting-will-soon-shine-on-you. Dec. 2, 2014. US.

(Continued)

*Primary Examiner* — Adriana Figueroa
(74) *Attorney, Agent, or Firm* — Patrick Sheldrake

(57) ABSTRACT

An integrated ceiling and light system that incorporates a light module into a ceiling tile. The system may include an acoustic ceiling tile and a light module magnetically coupled to the acoustic ceiling tile.

9 Claims, 56 Drawing Sheets

Related U.S. Application Data continuation of application No. 16/898,644, filed on Jun. 11, 2020, now Pat. No. 11,293,608, which is a continuation of application No. 15/960,652, filed on Apr. 24, 2018, now Pat. No. 10,683,977, which is a division of application No. 14/972,813, filed on Dec. 17, 2015, now Pat. No. 9,951,916.

(60) Provisional application No. 62/093,699, filed on Dec. 18, 2014, provisional application No. 62/093,707, filed on Dec. 18, 2014, provisional application No. 62/093,676, filed on Dec. 18, 2014, provisional application No. 62/093,685, filed on Dec. 18, 2014, provisional application No. 62/093,693, filed on Dec. 18, 2014, provisional application No. 62/093,716, filed on Dec. 18, 2014.

(51) Int. Cl.

| | |
|---|---|
| ***E04B 9/04*** | (2006.01) |
| ***E04B 9/24*** | (2006.01) |
| ***E04B 9/28*** | (2006.01) |
| ***F21V 21/04*** | (2006.01) |
| *E04B 9/32* | (2006.01) |
| *E04B 9/36* | (2006.01) |
| *F21S 8/02* | (2006.01) |
| *F21S 8/06* | (2006.01) |
| *F21V 7/00* | (2006.01) |
| *F21V 23/00* | (2015.01) |
| *F21V 33/00* | (2006.01) |

(52) U.S. Cl.

CPC ............ *E04B 9/0464* (2013.01); *E04B 9/241* (2013.01); *E04B 9/28* (2013.01); *F21V 21/04* (2013.01); *F21V 21/047* (2013.01); *E04B 9/003* (2013.01); *E04B 9/045* (2013.01); *E04B 9/0471* (2013.01); *E04B 9/32* (2013.01); *E04B 9/366* (2013.01); *F21S 8/026* (2013.01); *F21S 8/06* (2013.01); *F21V 7/0008* (2013.01); *F21V 23/001* (2013.01); *F21V 33/006* (2013.01)

(56) References Cited

U.S. PATENT DOCUMENTS

| | | | | |
|---|---|---|---|---|
| 3,006,019 | A | 10/1961 | Deaton | |
| 3,018,082 | A | 1/1962 | Berger | |
| 3,085,152 | A | 4/1963 | Lindheim | |
| 3,088,025 | A | 4/1963 | Deaton | |
| 3,330,952 | A | 7/1967 | Wince | |
| 3,473,280 | A | 10/1969 | Stahlhut | |
| 3,710,520 | A | 1/1973 | Federowicz | |
| 3,774,024 | A | 11/1973 | Deaton | |
| 4,003,306 | A | 1/1977 | Garrick | |
| 4,073,230 | A | 2/1978 | Akerson | |
| 4,109,305 | A | 8/1978 | Claussen | |
| 4,137,678 | A | 2/1979 | Varlonga | |
| 4,377,059 | A | 3/1983 | Kuhr | |
| D322,142 | S | 12/1991 | Grismondi | |
| 5,241,799 | A | 9/1993 | Jahn | |
| 5,417,025 | A | 5/1995 | Nute | |
| 5,507,125 | A | 4/1996 | McClure | |
| 6,241,368 | B1 | 6/2001 | Depino | |
| 6,260,325 | B1 | 7/2001 | Wendt | |
| 6,397,531 | B1 | 6/2002 | Martin | |
| 6,540,373 | B2 | 4/2003 | Bailey | |
| 7,205,717 | B2 | 4/2007 | Cok | |
| 7,303,305 | B2 | 12/2007 | Kennedy | |
| 7,547,112 | B2 | 6/2009 | Kim | |
| 7,645,052 | B2 | 1/2010 | Villard | |
| 8,061,865 | B2 | 11/2011 | Piepgras | |
| 8,146,316 | B2 | 4/2012 | Boss | |
| D658,785 | S | 5/2012 | Koennecke | |
| 8,287,146 | B2 * | 10/2012 | Hysky | E04B 9/366 362/147 |
| 8,314,336 | B2 | 11/2012 | Liang | |
| 8,342,718 | B2 * | 1/2013 | Kikoski | F21V 5/00 362/311.06 |
| 8,485,700 | B2 | 7/2013 | Ngai | |
| 8,575,641 | B2 | 11/2013 | Zimmerman | |
| 8,944,637 | B2 | 2/2015 | Spiro | |
| 9,038,326 | B2 | 5/2015 | Bergman | |
| 9,038,344 | B2 | 5/2015 | Mayer | |
| 9,057,499 | B2 | 6/2015 | Livesay | |
| 9,062,854 | B2 | 6/2015 | Livesay | |
| 9,194,124 | B2 | 11/2015 | Johnson | |
| 9,255,676 | B2 | 2/2016 | Hoog | |
| 9,410,680 | B2 | 8/2016 | Ng | |
| 9,792,891 | B2 * | 10/2017 | Swinkels | F21V 7/28 |
| 9,851,094 | B2 | 12/2017 | Gommans | |
| 10,121,950 | B2 | 11/2018 | Livesay | |
| 10,125,931 | B2 | 11/2018 | Livesay | |
| 10,227,776 | B2 | 3/2019 | Mayer | |
| 2002/0141181 | A1 | 10/2002 | Bailey | |
| 2003/0085642 | A1 | 5/2003 | Pelka | |
| 2003/0172569 | A1 | 9/2003 | Wickwire | |
| 2003/0182894 | A1 | 10/2003 | Galsgaard | |
| 2004/0216412 | A1 | 11/2004 | Burnette | |
| 2006/0012977 | A1 | 1/2006 | Joseph | |
| 2007/0000201 | A1 * | 1/2007 | Kennedy | F21S 2/00 52/506.06 |
| 2007/0274081 | A1 | 11/2007 | Engel | |
| 2008/0266843 | A1 | 10/2008 | Villard | |
| 2009/0290349 | A1 | 11/2009 | Chu | |
| 2010/0229475 | A1 | 9/2010 | Myers | |
| 2010/0284185 | A1 | 11/2010 | Ngai | |
| 2011/0013390 | A1 | 1/2011 | Biebel | |
| 2011/0103043 | A1 | 5/2011 | Ago | |
| 2011/0116276 | A1 | 5/2011 | Okamura | |
| 2011/0299290 | A1 | 12/2011 | Mandy | |
| 2012/0257394 | A1 | 10/2012 | Kikoski | |
| 2012/0300437 | A1 | 11/2012 | Lu | |
| 2012/0317915 | A1 | 12/2012 | Koennecke | |
| 2013/0107502 | A1 | 5/2013 | Leadford | |
| 2013/0206946 | A1 | 8/2013 | Pirner | |
| 2013/0286667 | A1 | 10/2013 | Sampsell | |
| 2013/0308303 | A1 | 11/2013 | Greenholt | |
| 2014/0036503 | A1 | 2/2014 | Olsen | |
| 2014/0042467 | A1 | 2/2014 | Livesay | |
| 2014/0061707 | A1 | 3/2014 | Livesay | |
| 2014/0157689 | A1 | 6/2014 | Bergman | |
| 2014/0185293 | A1 | 7/2014 | Ayotte | |
| 2014/0198490 | A1 | 7/2014 | Halseth | |
| 2014/0225132 | A1 | 8/2014 | Livesay | |
| 2014/0226317 | A1 | 8/2014 | Livesay | |
| 2014/0283479 | A1 | 9/2014 | Stone | |
| 2014/0367703 | A1 | 12/2014 | Livesay | |
| 2014/0369030 | A1 | 12/2014 | Livesay | |
| 2015/0138779 | A1 | 5/2015 | Livesay | |
| 2015/0167940 | A1 | 6/2015 | Ng | |
| 2015/0225948 | A1 | 8/2015 | Behling | |
| 2015/0300583 | A1 | 10/2015 | McCanless et al. | |

FOREIGN PATENT DOCUMENTS

| | | |
|---|---|---|
| CN | 202787796 | 3/2013 |
| CN | 202915207 | 5/2013 |
| CN | 102161454 | 6/2014 |
| CN | 203927620 U | 11/2014 |
| DE | 19507333 | 9/1996 |
| EP | 499044 | 11/1995 |
| GB | 1210499 | 10/1970 |
| GB | 2200151 | 12/1990 |
| JP | 2011171146 | 9/2011 |
| JP | 2012043760 | 3/2012 |

(56) References Cited

FOREIGN PATENT DOCUMENTS

| | | |
|---|---|---|
| WO | 2012087408 | 6/2012 |
| WO | 2015066703 | 8/2015 |

OTHER PUBLICATIONS

Spectral Blade AcousticBaffle GfaG Product Specification data, 4 pages, Brochure. Dec. 2013.

Spectral Blade by RIDI Lighting Ltd. How Blade improves the thermal properties of your building. Brochure. http://spectral-lighting.co.uk/blade/indes.html Dec. 8, 2014.

* cited by examiner

INTEGRATED CEILING AND LIGHT SYSTEM

CROSS-REFERENCE TO RELATED APPLICATIONS

This application is a continuation application of U.S. patent application Ser. No. 17/672,194, filed on Feb. 15, 2022, which in turn is a continuation application of U.S. patent application Ser. No. 16/898,644, filed on Jun. 11, 2020, which in turn is a continuation of U.S. patent application Ser. No. 15/960,652, filed on Apr. 24, 2018, which in turn is a divisional application of U.S. patent application Ser. No. 14/972,813 filed on Dec. 17, 2015, which in turn claims priority to U.S. Provisional Patent Application Ser. No. 62/093,676, filed Dec. 18, 2014, U.S. Provisional Patent Application Ser. No. 62/093,685, filed Dec. 18, 2014, U.S. Provisional Patent Application Ser. No. 62/093,693, filed Dec. 18, 2014, U.S. Provisional Patent Application Ser. No. 62/093,699, filed Dec. 18, 2014, U.S. Provisional Patent Application Ser. No. 62/093,707, filed Dec. 18, 2014, and U.S. Provisional Patent Application Ser. No. 62/093,716, filed Dec. 18, 2014, each of which is incorporated herein by reference in its entirety.

FIELD

The present disclosure relates generally to integrated ceiling and light systems, such as suspended ceilings that include light modules, and more specifically to ceiling panels having light modules coupled thereto.

BACKGROUND

Installing lighting in rooms, industrial spaces, suspended ceilings, and walls has been problematic due the weight of the light sources and the need to penetrate the barriers creating these enclosed illuminated spaces. This is mainly due to the fact that heat sinks or cooling means are required to be appended to the light sources to prevent overheating. The use of appended heat sinks results in heavy light source fixtures, which limits the options for mounting the light source fixtures particularly when the light source fixture is intended to be mounted to a ceiling structure. There are now light sources in existence that are designed in such a manner that they do not require traditional heavy heat sinks to prevent overheating. Thus, more versatility in the mounting of light sources in a room, and specifically to a ceiling tile in a suspended ceiling system, is now possible. The need exists for lightweight lighting fixtures for suspended ceilings and for integrated ceiling and light systems that enable field installation by end users, simple light fixture relocation and replacement, and that present an aesthetically pleasing and monolithic and uniform appearance.

SUMMARY

The present application may be directed, in one aspect, to an integrated ceiling and light system that incorporates a light module into a ceiling tile or vertical panel. The light module may have a weight per unit exposed surface area that is less than a weight per unit exposed surface area of the ceiling tile. The system may include a mounting structure coupled to the ceiling tile such that a greater force is required to detach the mounting structure from the ceiling tile than the force required to couple the light module to the ceiling tile. The ceiling tile may be configured for rear mounting of the light module. The ceiling tile may have a nesting cavity that receives the light module. The light module may be coupled directly to an edge of a vertical panel and emit light directly into an interior space or emit light for reflection off of the vertical panel.

In one aspect, the invention may be an integrated ceiling and light system comprising: a ceiling tile having an exposed surface; a light module coupled directly to the ceiling tile and having an exposed surface; and wherein a weight per unit exposed surface area of the light module is equal to or less than a weight per unit exposed surface area of the ceiling tile.

In another aspect, the invention may be an integrated ceiling and light system comprising: a ceiling tile having a first weight per unit volume; a light module having a second weight per unit volume coupled directly to the ceiling tile; and wherein the first weight per unit volume is greater than the second weight per unit volume, thereby preventing the ceiling tile from sagging when the light module is coupled thereto.

In yet another aspect, the invention may be an integrated ceiling and light system comprising: a ceiling tile having a front surface and an opposite rear surface, a portion of the ceiling tile removed to form a recess in the front surface of the ceiling tile; a light module coupled directly to the ceiling tile and disposed within the recess of the ceiling tile; and wherein the light module has a weight that is equal to or less than three times a weight of the removed portion of the ceiling tile.

In a further aspect, the invention may be an integrated ceiling and light system comprising: a vertical panel suspended from a support structure, the vertical panel having a bottom edge that faces an interior space, a top edge opposite the bottom edge, first and second side edges extending between the top and bottom edges, a front surface, and a rear surface opposite the front surface; and a light module mounted directly to one of the edges of the vertical panel.

In a still further aspect, the invention may be an integrated ceiling and light system comprising: a ceiling tile having a front surface and an opposing rear surface, a passageway extending through the ceiling tile from the front surface to the rear surface; a first coupling element operably coupled to the ceiling tile, a portion of the first coupling element positioned within the passageway; a light module comprising a main body and a second coupling element; and wherein the light module is detachably coupled to the ceiling tile by cooperative mating between the first and second coupling elements.

In another aspect, the invention may be an integrated ceiling and light system comprising: a ceiling tile having a front surface and an opposing rear surface, a passageway having an axis extending through the ceiling tile from the front surface to the rear surface; a mounting structure detachably coupled to the ceiling tile such that a first axial force is required to separate the mounting structure from the ceiling tile; and a light module detachably coupled to the mounting structure, wherein a second axial force is required to couple the light module to the mounting structure, the second axial force being less than the first axial force.

In yet another aspect, the invention may be an integrated ceiling and light system comprising: a ceiling tile comprising a front surface and an opposing rear surface, a cavity having a floor formed into the front surface of the ceiling tile, a passageway having an axis extending from an opening in the floor of the cavity to an opening in the rear surface of the ceiling tile; a mounting structure coupled to the ceiling tile, at least a portion of the mounting structure positioned within the passageway, the portion of the mounting structure comprising a first coupling element; and a light module having a front surface and an opposing rear surface, a second coupling element extending from the rear surface of the light module; and wherein the first and second coupling elements cooperate to detachably couple the light module to the mounting structure.

In still another aspect, the invention may be an integrated ceiling and light system comprising: a ceiling tile formed of a compressible material and comprising a front surface and an opposing rear surface, a cavity having a floor formed into the front surface; at least one passageway extending along an axis from the floor of the cavity to the rear surface of the ceiling tile, the passageway having a first width; a light module comprising a front surface and a rear surface, at least one coupling element extending from the rear surface of the light module, the coupling element having a second width that is greater than the first width; wherein the light module is coupled to the ceiling tile by inserting the coupling element of the light module into the passageway of the ceiling tile, the ceiling tile compressing away from the axis of the passageway to enable the coupling element of the light module to fit within the passageway of the ceiling tile and applying a decompression force onto the coupling element to secure the light module to the ceiling tile.

In another aspect, the invention may be an integrated ceiling and light system comprising: a ceiling tile formed of a compressible material and having a front surface and an opposing rear surface, a cavity having a floor formed into the front surface, and at least one passageway extending along an axis from the floor of the cavity to the rear surface of the ceiling tile; a mounting structure detachably coupled to the rear surface of the ceiling tile, the mounting structure comprising a mounting socket that is aligned with the passageway of the ceiling tile, the mounting socket including a first coupling feature; a light module detachably coupled to the ceiling tile, the light module comprising a front surface, a rear surface, and a coupling element having a second coupling feature extending from the rear surface; and wherein the light module is coupled to the ceiling tile by inserting the coupling element of the light module into the passageway of the ceiling tile so that the first coupling feature of the mounting socket of the mounting structure cooperatively mates with the second coupling feature of the coupling element of the light module.

In a further aspect, the invention may be an integrated ceiling and light system comprising: a ceiling tile having a front surface and an opposite rear surface, a recess having a floor formed into the front surface of the ceiling tile, the floor of the recess having a first non-planar topography; a light module having a front surface and an opposite rear surface, the rear surface of the light module having a second non-planar topography that corresponds with the first non-planar topography of the floor of the recess of the ceiling tile.

In a yet further aspect, the invention may be an integrated ceiling and light system comprising: a ceiling tile having a front surface and an opposing rear surface, a passageway extending through the ceiling tile from a front opening in the front surface to a rear opening in the rear surface, and a ledge extending into the passageway and being recessed relative to the rear surface of the ceiling tile; and a light module positioned in the passageway, a portion of the light module resting atop the ledge to retain the light module in the passageway.

In another aspect, the invention may be an integrated ceiling and light system comprising: a grid support system suspended from an overhead support structure, the grid support system comprising at least one grid support element; a first ceiling tile and a second ceiling tile at least partially supported by the grid support element in an adjacent manner with a first edge of the first ceiling tile facing a second edge of the second ceiling tile; a nesting cavity formed into the first and second ceiling tiles and having a substantially closed perimeter formed entirely by the first and second ceiling tiles; a light module disposed within the nesting cavity and coupled to the first and second ceiling tiles.

In a further aspect, the invention may be an integrated ceiling and light system comprising: a grid support system suspended from an overhead support structure, the grid support system comprising at least one grid support element; a ceiling tile at least partially supported by the grid support element, the ceiling tile having a front surface, an opposing rear surface, and a perimetric edge extending between the front and rear surfaces, the ceiling tile having a concealed grid profile formed into the perimetric edge that conceals the grid support element; a nesting cavity formed into the front surface of the ceiling tile and extending to the perimetric edge, the nesting cavity being open at the perimetric edge; and a light module at least partially disposed within the nesting cavity and coupled to the ceiling tile.

In a still further aspect, the invention may be an integrated ceiling and light system comprising: a ceiling tile comprising a front surface and an opposing rear surface, a nesting region formed into the front surface of the ceiling tile and bounded on at least one side by a sidewall having a first edge profile; a light module disposed within the nesting region of the ceiling tile, a first edge of the light module having a second edge profile; and wherein the first edge profile and the second edge profile have corresponding shapes such that the first edge of the light module mates with the sidewall bounding the nesting region of the ceiling tile to couple the light module to the ceiling tile.

In a yet further aspect, the invention may be an integrated ceiling and light system comprising: a ceiling tile comprising a front surface and an opposing rear surface, an opening extending through the ceiling tile from the front surface to the rear surface; a light module comprising a first edge having a groove configured to receive the ceiling tile therein and a second edge having a spring-actuated protuberance extending therefrom; and wherein the light module is positioned within the opening and coupled to the ceiling tile such that a portion of the ceiling tile is inserted into the groove of the first edge of the light profile and the spring-actuated protuberance abuts against the rear surface of the ceiling tile.

In a still further aspect, the invention may be an integrated ceiling and light system comprising: a ceiling tile comprising a front surface, a rear surface, and an opening extending through the ceiling tile from the front surface to the rear surface; one or more resilient clips mounted to the rear surface of the ceiling tile, each of the resilient clips having a resilient portion that extends into the opening; and a light module disposed within the opening and coupled to the ceiling tile via engagement between the light module and the one or more resilient clips.

In an even further aspect, the invention may be an integrated ceiling and light system comprising: a ceiling tile having a front surface, a rear surface, and a perimetric edge extending between the front and rear surfaces and having a first edge, a second edge, a third edge opposite the first edge, and a fourth edge opposite the second edge; an elongated nesting channel formed into the front surface of the ceiling tile and extending from the first edge of the ceiling tile to the third edge of the ceiling tile, the elongated nesting channel defined by a floor that is recessed relative to the front surface of the ceiling tile and a first sidewall and a second sidewall that extend from the first edge of the ceiling tile to the second edge of the ceiling tile; a light module positioned within the elongated nesting channel and coupled to the ceiling tile via interaction between opposing edges of the light module and the first and second sidewalls of the elongated nesting channel.

In yet another aspect, the invention may be an integrated ceiling and light system comprising: a ceiling tile having a front surface, a rear surface, and a perimetric edge extending between the front and rear surfaces; a first electrical conductor operably coupled to a power source and to a first contact member that is embedded within the ceiling panel; a second electrical conductor operably coupled to the power source and to a second contact member that is embedded within the ceiling panel; and a light module having first and second electrical contacts, the light module mounted to the ceiling tile so that the first electrical contact of the light module is electrically coupled to the first contact member and the second electrical contact of the light module is electrically coupled to the second contact member.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, in which.

DETAILED DESCRIPTION

Figure 1:
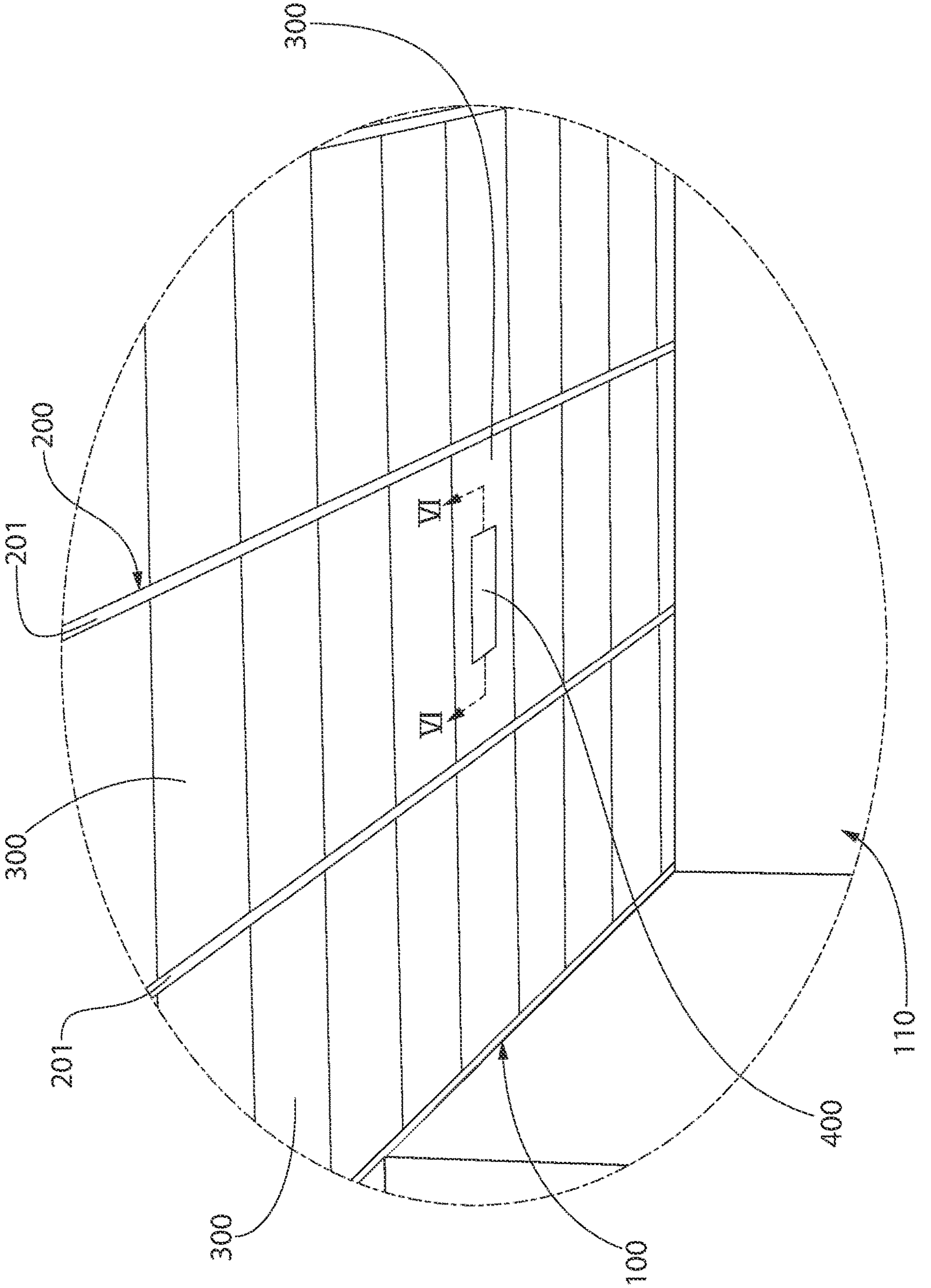
FIG. 1 is a partial view of an interior space illustrating an integrated ceiling and light system in accordance with an embodiment of the present invention.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as “lower,” “upper,” “horizontal,” “vertical,” “above,” “below,” “up,” “down,” “top,” and “bottom” as well as derivatives thereof (e.g., “horizontally,” “downwardly,” “upwardly,” etc.) should be construed to refer to the orientation as then described or as shown in the drawing under discussion. These relative terms are for convenience of description only and do not require that the apparatus be constructed or operated in a particular orientation unless explicitly indicated as such. Terms such as “attached,” “affixed,” “connected,” “coupled,” “interconnected,” and similar refer to a relationship wherein structures are secured or attached to one another either directly or indirectly through intervening structures, as well as both movable or rigid attachments or relationships, unless expressly described otherwise. The term “LED” (light emitting diode) as used herein refers to an LED light source in general, including a conventional LED as well other solid state light sources including high brightness LEDs (HBLEDs), organic LEDs (OLEDs) electroluminescent elements (EL), directly illuminating LEDs, indirectly illuminating LEDs, or the like. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

The present invention is directed, in one aspect, to an integrated ceiling and light system that includes a light module mounted directly to a ceiling tile that may be used in a suspended ceiling or drop ceiling system. Suspended ceiling systems may include a grid support system hung from an overhead structure which includes an array of orthogonally intersecting longitudinal and lateral grid support members arranged in a fairly uniform pattern and at fairly uniform intervals. The grid support members define a plurality of grid openings within which individual ceiling tiles are positioned, each of the individual ceiling tiles being retained in position by one or more of the grid support members. Mechanical and electrical utilities such as wiring and plumbing may be conveniently routed in a hidden manner in the cavity or plenum formed above the grid supports and ceiling tiles, thereby making suspended ceilings a practical and popular ceiling option for residential, commercial, and industrial building spaces.

Figure 2:
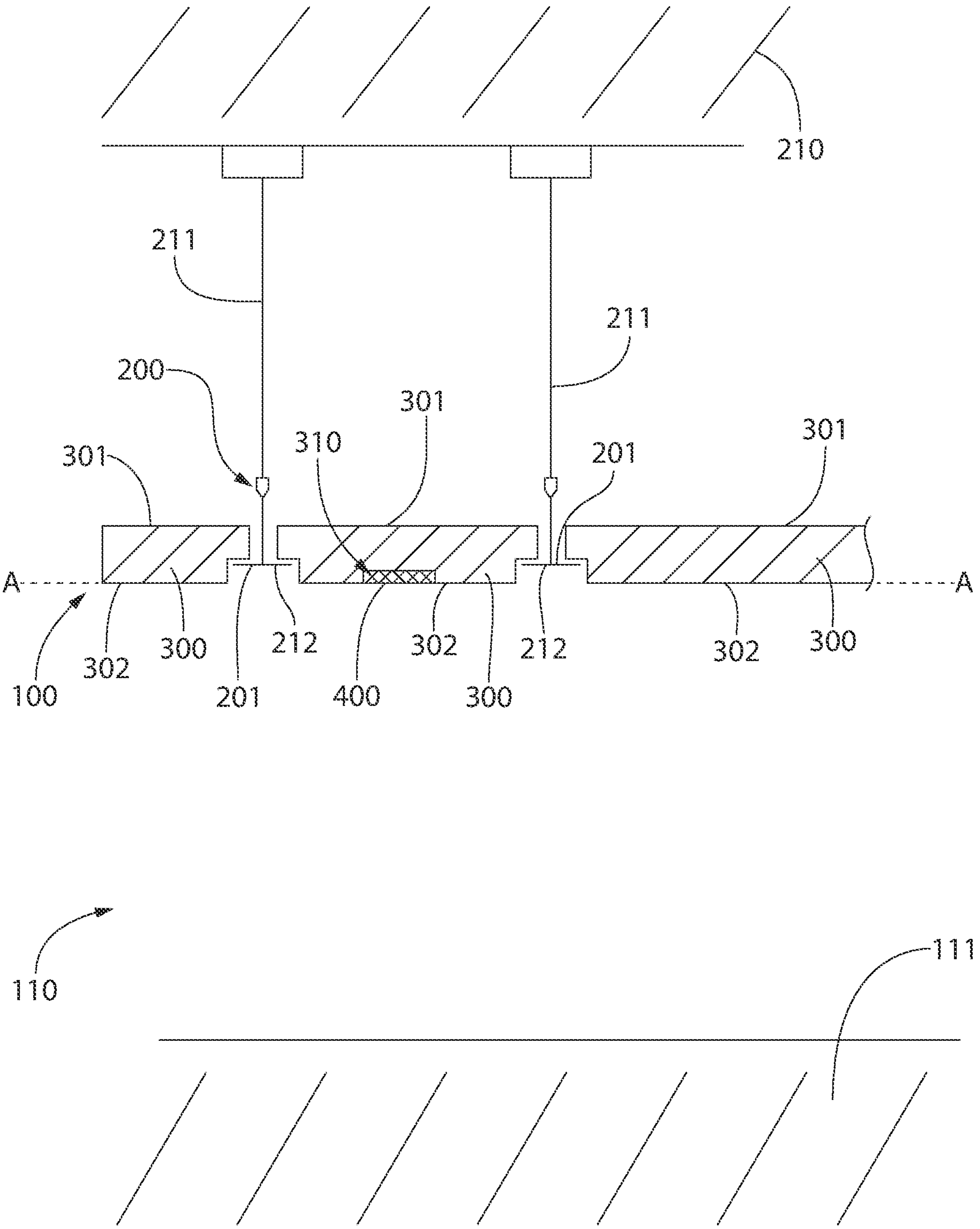
FIG. 2 is a schematic cross-sectional view of the interior space having the ceiling and light system of FIG. 1.

Referring to FIGS. 1 and 2 concurrently, a ceiling system (also referred to herein as an integrated ceiling and light system) 100 is generally depicted forming a ceiling for an interior room or space 110 that is defined between an overhead building support structure 210 and a floor 111. The ceiling system 100 includes an overhead grid support system

200 that is configured for mounting in a suspended manner from an overhead building support structure 210 via appropriate hanger elements 211, which may include, for example without limitation, fasteners, hangers, wires, cables, rods, struts, etc. In the exemplified embodiment the grid support system 200 includes a plurality of grid support elements 201 that are arranged parallel to one another. In certain embodiments, the grid support system 200 may include both longitudinal grid support elements and lateral grid support elements that intersect one another. The use of grid support systems 200 of these types is generally well known for forming a suspended ceiling in a commercial building (or any other building or space as may be desired). The grid support elements 201 may have an inverted T shape such that the grid support elements 201 have a flange 212 that is configured to permit a ceiling tile 300 to rest thereon.

Specifically, the spaces between the grid support elements 201 form openings within which the ceiling tiles 300 can be positioned. Only a few of the ceiling tiles 300 are labeled in the drawings to avoid clutter. The ceiling tiles 300 have a front surface 302 that faces the floor 111 and a rear surface 301 that faces the overhead building support structure 210. Thus, in certain embodiments the front surfaces 302 of the ceiling tiles 300 may be considered the exposed surface of the ceiling tiles 300 because the front surfaces 302 of the ceiling tiles 300 are exposed to the interior space 110 and visible to a person standing in the interior space 110. The rear surfaces 301 of the ceiling tiles 300 are the non-exposed surfaces of the ceiling tiles 300 because the rear surfaces 301 of the ceiling tiles 300 are hidden from view to a person standing in the interior space 110. The front surfaces 302 of the ceiling tiles 300 may be aligned along a plane A-A that is parallel to the floor 111 of the interior space 110.

As noted above, the ceiling tiles 300 are supported by the flanges 212 of the grid support elements 201 to suspend the ceiling tiles 300 within the interior space 110 at a location between the floor 111 of the interior space 110 and the overhead building support structure 210 of the interior space 110. In that regard, the ceiling tiles 300 may have a groove, cutout, recess, or the like that permits the ceiling tiles 300 to properly engage and rest upon the flanges 212 of the grid support elements 201, although this is not required in all embodiments. The ceiling tiles 300 close the openings to provide a desired aesthetic. Specifically, wiring and other mechanical structures may be located in the space created between the ceiling tiles 300 and the overhead building support structure 210. The ceiling tiles 300 hide the wiring and mechanical structures from view. However, the ceiling tiles 300 can be readily removed from the grid support elements 201 to enable a person to gain access into the space between the ceiling tiles 300 and the overhead building support structure 210 for maintenance or the like.

The ceiling tiles 300 referred to in the present disclosure may be any type of ceiling tile that is conventionally used in drop or suspended ceiling applications. Examples of the materials that can be used to produce the ceiling tiles include mineral fiber, fiberglass, jute fiber, polymers, cellulosic fiber, combinations thereof, or the like. Furthermore, the ceiling tiles 300 may be formed of (or have a core formed of) a fibrous mat, such as those formed from synthetic fibers, such as mineral wool, fiberglass, polymer fibers (e.g., nylon, polyester or polyolefin fibers) or metal fibers. Vegetable or cellulosic fibers such as flax, hemp, kenaf, straw, waste paper, and wood fiber can also be used to produce the ceiling tiles 300 or portions thereof. Of these, particularly suitable for the present invention are mineral wool, cellulosic fiber and mixtures thereof.

Fillers such as kaolin clay, calcium carbonate, talc, mica, Wollastonite, or inorganic flame retardant fillers may also be used. Typically, a binder is used to hold the materials to form a ceiling tile. Particularly suitable binders for the present invention include starch, latex, polymeric bicomponent fiber, and mixtures thereof. Suitable bicomponent fibers typically have a sheath-core configuration with the outer sheath polymer having a melting point lower than the melting point of the core polymer. In a preferred embodiment, the polymers for the sheath-core fiber can be selected from polyester, polyolefin (e.g., polyethylene or polypropylene).

The ceiling tiles 300 may also be treated with fire retardant materials as is well understood in the art of making ceiling tiles. Furthermore, the ceiling tiles 300 may comprise a core formed of one of the above-noted materials and a scrim or scrim layer that comprises or forms a front surface of the ceiling tiles 300. The scrim or scrim layer may be formed of cloth, fiberglass, vinyl, or the like and may be used for aesthetic, thermal, reflective, or acoustic purposes. Unless specifically described herein as being a particular material, it should be appreciated that the ceiling tiles 300 can be formed of any of these materials or of any other material currently used for ceiling tiles in drop ceilings. Furthermore, unless stated otherwise it should be understood that where necessary the ceiling tiles 300 may be prefabricated with pockets/cavities and holes therein, or such pockets/cavities and holes may be formed after fabrication for retrofitting one of the light modules 400 thereto in the manners described herein.

Still referring to FIGS. 1 and 2, a light module 400 is illustrated coupled to one of the ceiling tiles 300. In the exemplified embodiment, the light module 400 is centrally coupled to the ceiling tile 300 so that a perimeter of the light module 400 is spaced from each of the edges of the ceiling tile 300. However, the invention is not to be limited in this regard in all embodiments. Although in the exemplified embodiment only one light module 400 is illustrated coupled to one of the ceiling tiles 300, the invention is not to be so limited in all embodiments. Rather, as many light modules 400 as desired can be coupled to the various ceiling tiles 300 (every ceiling tile 300 may include one or more associated light modules 400, every other ceiling tile 300 may include one or more associated light modules 400, or the like). In certain embodiments the material that is used to form the ceiling tiles 300 may be capable of being embossed to create a cavity or embossed region within which the light modules 400 can be mounted as described herein below.

As best shown in FIG. 2, the light module 400 may be disposed within a recess 310 that is formed into the front surface 302 of the ceiling tiles 300. The light module 400 may include a front surface 412 and an opposite rear surface 414. In the exemplified embodiment, the light module is disposed within the recess 310 so that the rear surface 414 of the light module 400 is in contact with a floor of the recess 310 and the front surface 412 of the light module 400 is flush with the front surface 302 of the ceiling tile 300 to which it is coupled. As described throughout this document, the light module 400 may be directly coupled to or mounted on the ceiling tile 300 using many different techniques.

The light module 400 is, in certain embodiments, a low profile light emitting diode (LED) type light device that can be coupled directly to the ceiling tiles 300. The term "low profile" as used herein with reference to the light module 400 means that the light module 400 has an overall thickness, measured from the front surface 412 (i.e., the light emitting surface) of the light module 400 to the rear surface of the light module 400 that is less than 3 inches in some embodiments, less than 2 inches in other embodiments, and less than 1 inch in still other embodiments. In other embodiments, the term “low profile” is defined in terms of a thickness of the light module 400 relative to a thickness of the ceiling tile 300 to which the light module 400 is coupled or positioned near. Specifically, in certain embodiments a low profile light module is one that has a thickness that is less than or equal to a thickness of the ceiling tile (measured from the front surface 302 to the rear surface 301 of the ceiling tile 300). This permits the flush mounting of the light module 400 as mentioned above.

Coupling light emitting diode type light devices to ceiling tiles has been attempted previously, but the techniques and methodologies used to accomplish such coupling of the light devices to ceiling tiles have so far proved inadequate. In certain embodiments the light module 400 is an LED type light device in which the light and heat generated by the LED are emitted through the same (i.e., a common) surface of the light module 400. In the exemplified embodiment, this common surface of the light module 400 is the front surface 412 of the light module. Thus, when the light module 400 is coupled to the ceiling tile 300, the light and heat is emitted from the light module 400 into the interior space 110. In certain embodiments having a common light and heat emitting surface permits the light module 400 to be coupled to the ceiling tiles 300 in ways that were not previously attainable. The disclosure set forth herein is directed to improved techniques for coupling low profile LED type light devices to ceiling tiles that are used in drop ceiling systems. Although LED type light devices are predominately used in the description herein, the light source may be any solid state light source such as one comprising high brightness LEDs (HBLEDs), organic LEDs (OLEDs) electroluminescent elements (EL), or the like. The invention is not to be limited to a specific type of light module unless claimed as such.

In an exemplified embodiment, an OLED light-emitting device has a substrate on which OLED light-emitting elements are positioned. Specifically, such an OLED light-emitting device may include one or more light-emitting organic layers, a first electrode or multiple first electrodes separated by insulators, and a second electrode positioned away from the substrate. The one or more light-emitting organic layers may be an organic compound that emits light in response to an electric current, and may be situated between the first and second electrodes. A cover may be affixed to the substrate to seal the OLED materials from the environment. A thermally conductive material, such as thermally conductive silicone material or alumina, may be located in thermal contact with the second electrode of the light-emitting elements and the encapsulating cover. The cover, the second electrode, and the thermally conductive material may be transparent or translucent to allow the light generated by the OLED materials (i.e., light-emitting organic layers) to be transmitted therethrough.

Figure 3:
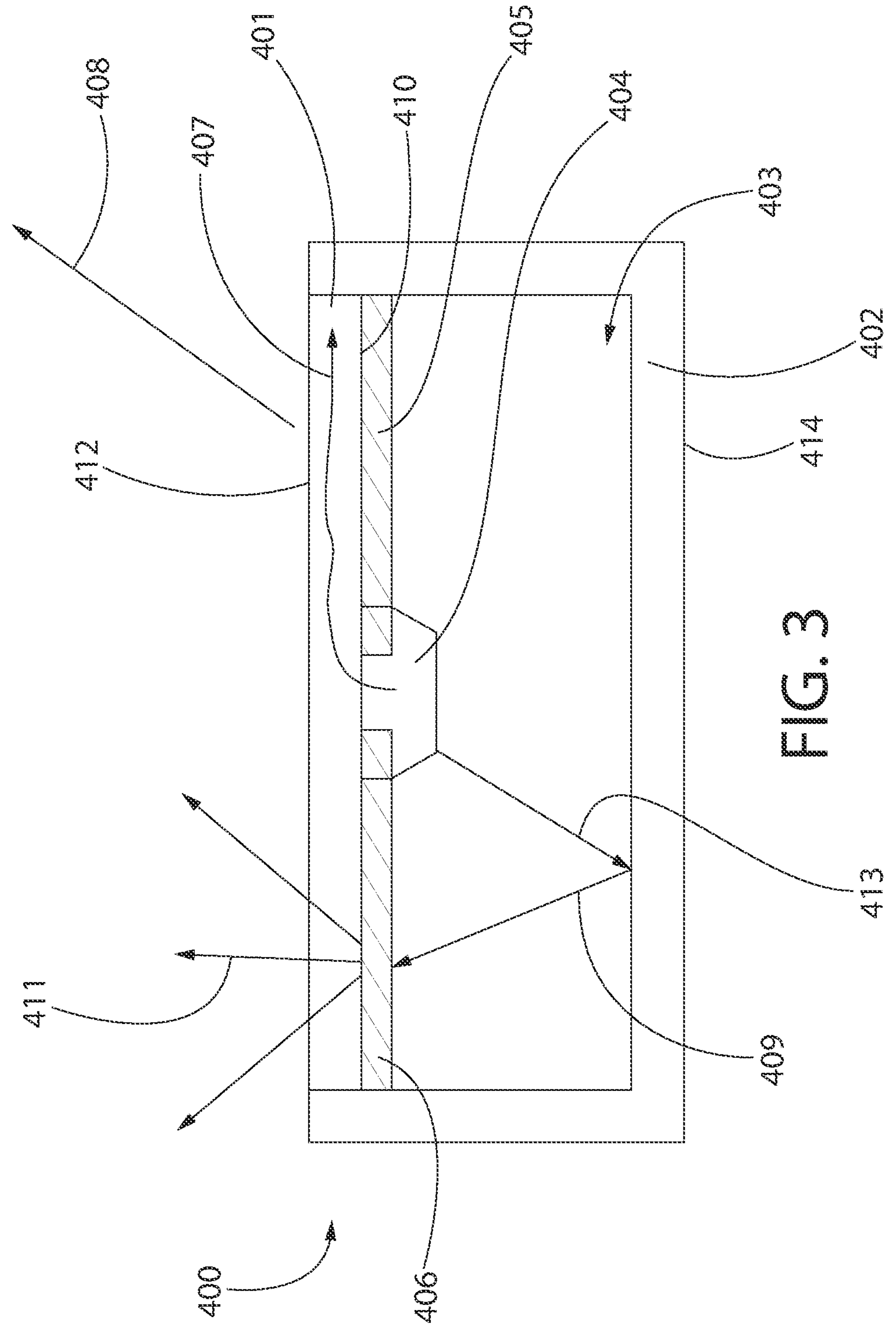
FIG. 3 is a schematic side view of a light module of the ceiling and light system of FIG. 1.

Referring to FIG. 3, the details of one exemplary embodiment of the light module 400 will be described in accordance with one embodiment of the present invention. Although the light module 400 illustrated in FIG. 3 is used throughout this disclosure, it should be appreciated that the light module 400 described herein is just one exemplary light module that can be used/coupled to the ceiling tiles 300 in accordance with the teachings described herein. Thus, the light modules 400 described throughout this disclosure may be the light modules 400 of FIG. 3, or another light module that operates in a different manner including the exemplary OLED light module described herein above or others. The details of the light module 400 provided herein are intended as an example only and are not intended to be limiting of the present disclosure in all embodiments. Specifically, the light module 400 of FIG. 3 is an example of an indirect LED light module, but the light module may instead be a direct LED light module, an OLED light module, an HBLED light module, or the like in any of the embodiments described herein.

In the exemplified embodiment, the light module 400 is an indirectly illuminating light source in which the emitted light and the emitted heat pass through the same side or surface of the light module 400. Thus, the light emitting surface of the light module 400 also functions as the cooling or heat emitting surface of the light module 400. Thus, the light and heat generated by the light module 400 both pass through the same surface of the light module 400, and preferably the surface of the light module 400 that is adjacent to the interior room or space (i.e. the front surface 412 of the light module 400). As noted above, any type of low profile LED type light device may be used in place of the light module 400 in alternative embodiments. In certain embodiments it may be desirable that the low profile LED type light device has a common light and heat emitting surface such that the light and heat are emitted from the same surface of the light device. Suitable low profile LED light devices that emit both light and heat through a common surface are known in the art. For example, U.S. Pat. No. 7,205,717 and International Patent Application No. WO/2015/066703, each of which is incorporated herein by reference, teach some suitable LED devices.

In the embodiment of FIG. 3, the light module 400 comprises a light transmitting thermally conductive element 401 and a reflector 402 which collectively forms a light recycling cavity 403. At least one light emitting diode (LED) 404 (such as an LED die) is mounted to the translucent thermally conductive element 401 along with interconnects 405, 406. Specifically, the LED 404 is preferably mounted in thermal contact with the light transmitting thermally conductive element 401 so that the LED 404 can be cooled by the light transmitting thermally conductive element 401. The LED 404 may contain an LED mounted to a substrate with a phosphor or wavelength conversion element covering the LED. A preferred LED for use in this light source is one with a small ceramic (alumina) substrate that is surface mountable, although the invention is not to be so limited in all embodiments.

The light transmitting thermally conductive element 401 may be translucent, transparent, or the like to enable light generated by the LED 404 to pass therethrough. As noted above, the light module 400 comprises the front surface 412 (which is also the light and heat emitting surface of the light module 400) and the opposite rear surface 414. When coupled to the ceiling tile 300, the front surface 412 of the light module 400 faces the interior space that the light module 400 is intended to illuminate. To effectively enable the light transmitting thermally conductive element 401 to both allow light to pass therethrough and to cool the LED, the light transmitting thermally conductive element 401 may be formed of, for example without limitation, alumina, TPA, or single crystal sapphire (all of which are $Al_2O_3$ with different crystal structures), although other materials that are both light transmissive and thermally conductive can be used. The light transmitting thermally conductive element 401 can be used to completely or partially eliminate the need for any additional heatsinking means by efficiently transferring and spreading out the heat generated in the LED 404 over an area sufficiently large enough such that convective and radiative means can be used to cool the device. In other words, the surface emitting light also convectively and radiatively cools the device. The thermally conductive luminescent element can also provide for the efficient wavelength conversion of at least a portion of the radiation emitted by the LEDs.

The at least one LED 404 generates heat which is transferred by thermal conduction to the light transmitting thermally conductive element 401 and spread out as depicted by heat ray 407 over an area greater than the area of the at least one LED 404. The heat is then transferred to the surrounding ambient via convective and/or radiative ray 408. The light emitted by the LED package 404 is depicted by ray 413. The light is emitted from the at least one LED 404, reflected off the reflector 402 one or more times as a reflected ray 409, and impinges on the light transmitting thermally conductive element 401. The light is then either reflected off an interior surface 410 of the light transmitting thermally conductive element 401 back into the light recycling cavity 403 for further reflection off of the reflector 402, or the light becomes a transmitted ray 411 which exits the recycling cavity 403 from the front surface 412 of light transmitting thermally conductive element 401.

As readily ascertainable from viewing FIG. 3, the transmitted ray 411 and the heat ray 407 travel substantially in the same direction and are both emitted from the front surface 412 of the light transmitting thermally conductive element 401. Although not required, in some embodiments the light rays 409 emitted by the LED 404 may experience a large number of reflections before exiting the recycling light cavity 403. This creates a more uniform brightness distribution on the front surface 412 of the light transmitting thermally conductive element 401. In general, materials which exhibit less than 20% in line transmission are preferred as the light transmitting thermally conductive element 401 to generate high uniformity, such as alumina.

Thus, in accordance with an embodiment of the present invention the light module 400 does not require the use of a separate heatsink for cooling. Rather, the light and the heat that are generated by the light module 400 are both emitted through the same side/surface of the light module 400. Although FIG. 3 depicts an embodiment in which the light is made to reflect off of the reflector 402 before exiting the light module 400 (i.e., indirect), the invention is not to be so limited. In other embodiments the light may be transmitted/emitted directly out of the cavity without first reflecting (i.e., direct). Furthermore, in certain embodiments openings or the like may be formed in the light transmitting thermally conductive element 401 to facilitate the transmittance of light therethrough.

Thus, as described above the light modules 400 used in accordance with the present invention comprise LEDs or other semiconductor elements (OLEDs, HBLEDs, other electroluminescent elements, etc.) mounted onto or within a light transmitting thermally conductive element such that the light emitting and cooling surfaces are substantially the same surface. The common light and heat emitting surface eliminates the need for additional heatsinking means, thereby reducing the weight of the light module 400 and the costs of manufacturing the light module 400 and the other structures needed to support the light module 400 (e.g. supporting grid and ceiling tiles). The heat and the light generated in the light modules 400 is dissipated through the light emitting surface (i.e., through the light transmitting thermally conductive element 401) into the illuminated space of the installation (i.e., into the room or space 110 of FIGS. 1 and 2). Thus, the light modules 400 are particularly well suited for suspended ceiling applications where the majority of the heat generated by the light modules 400 is dissipated into the occupant or office side of the suspended ceiling installation.

The light weight of the light modules 400 enable lighter weight and lower cost suspension grids compared to that which must be used with conventional troffers. Because the light and heat emitting surfaces are substantially the same, the light modules 400 can be mounted and integrated into a wide range of barrier elements and or surfaces including those which may be considered combustible such as painted surfaces, wood, wallpapered surfaces and ceiling tiles. In some embodiments the light modules 400 are constructed of non-flammable materials. The barriers may or may not contain separate barrier elements like ceiling tiles, panels, floor tiles or other construction materials. The term barrier as used in this disclosure refers to panels, partitions, ceilings, floors, walls, and the like.

Figure 4A:
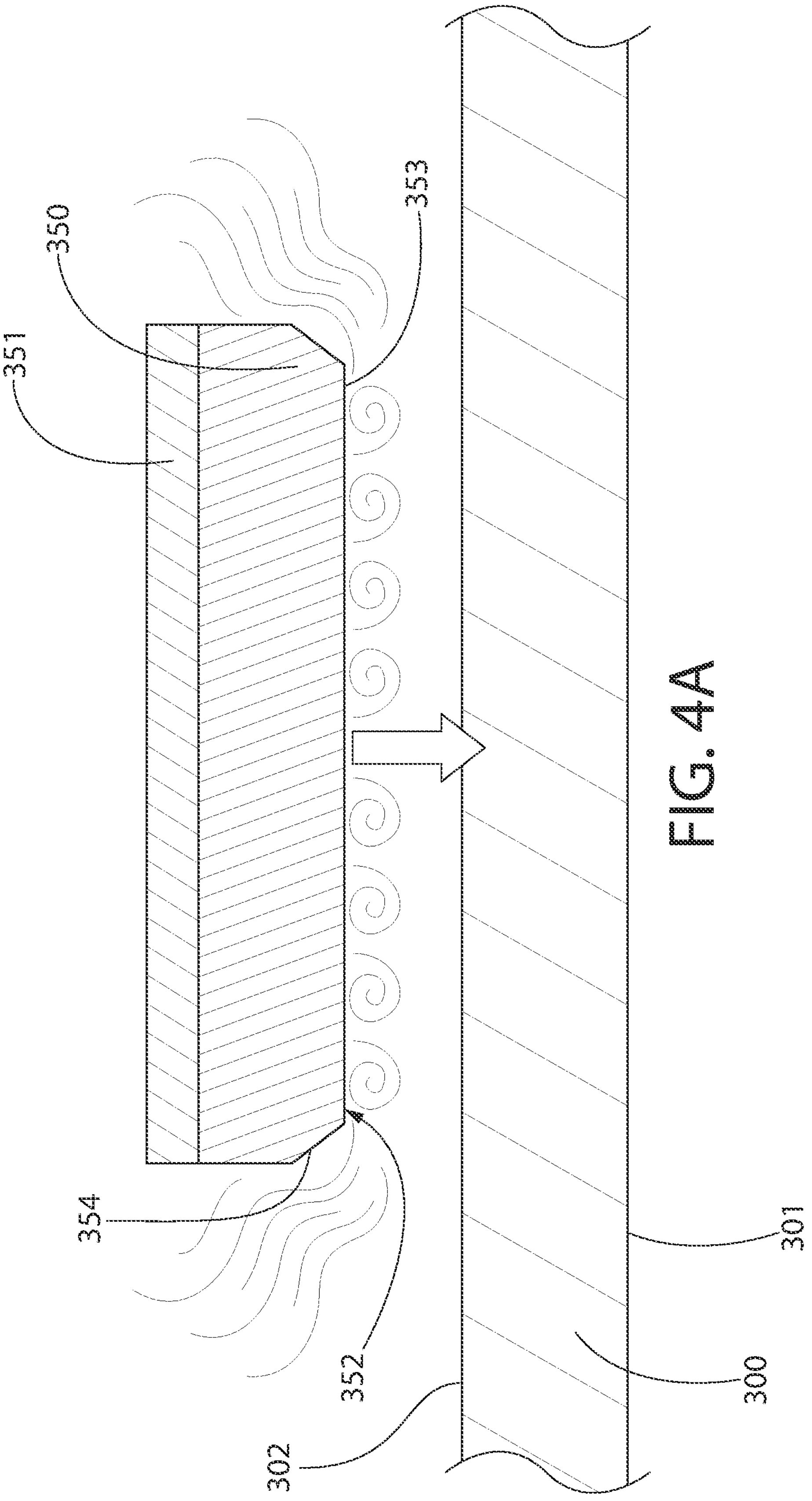
FIGS. 4A-4C are schematic views illustrating a process of embossing a ceiling tile in accordance with an embodiment of the present invention.
Figure 4B:
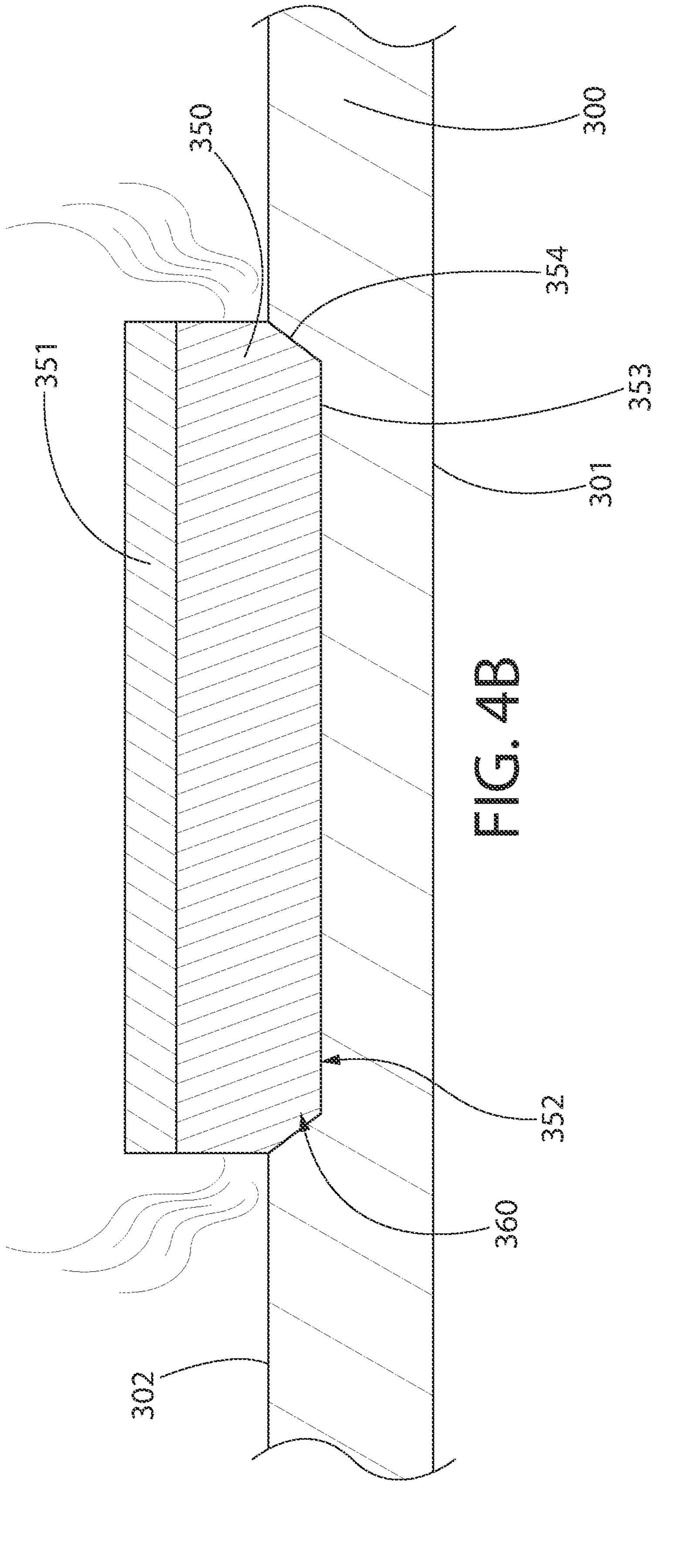
Figure 4C:
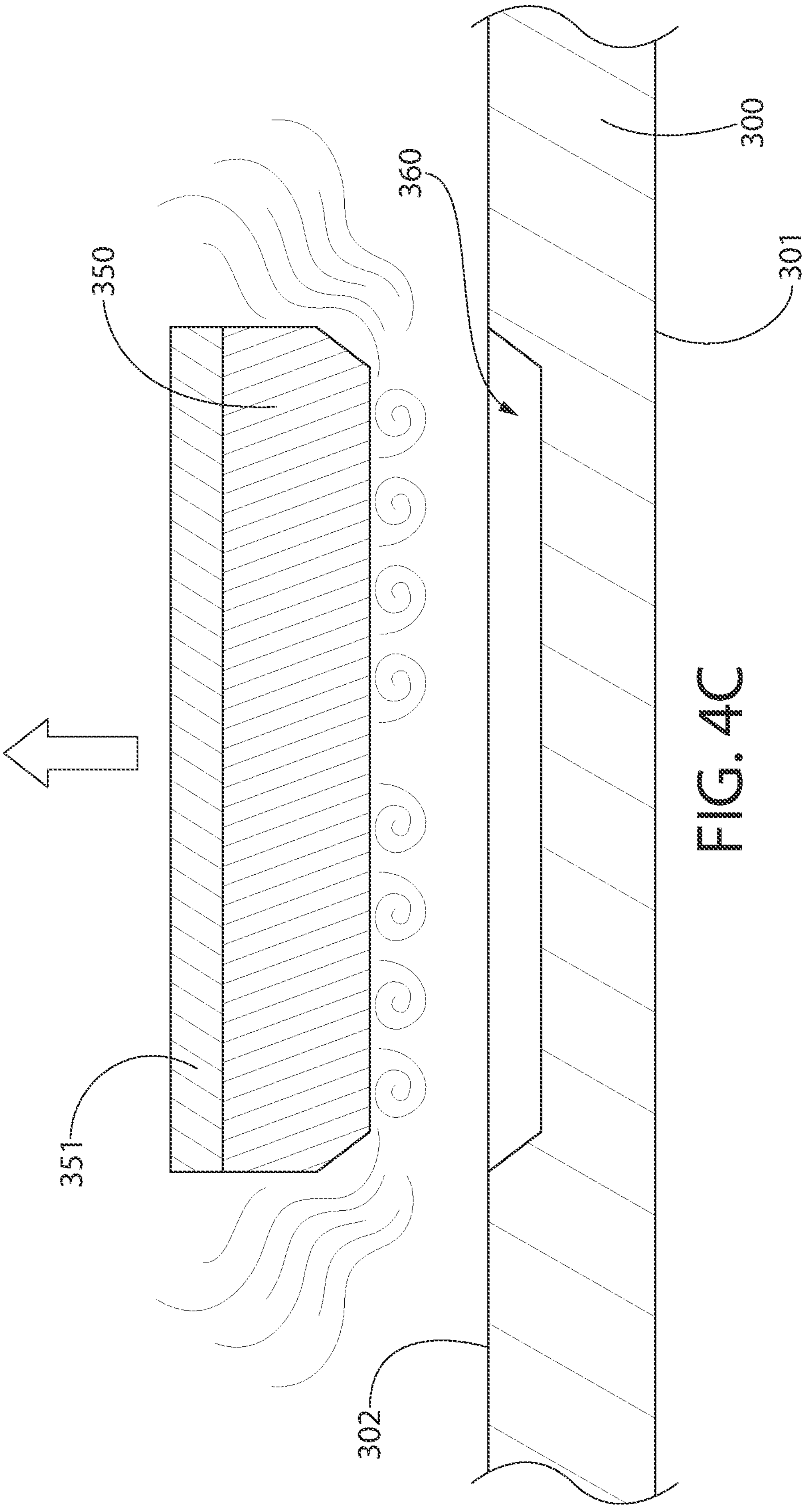

In one embodiment of the present invention, the light module 400 may be mounted within an embossed region of one of the ceiling tiles 300. Such an embossed region may be a sunken or indented region of the ceiling tile 300 that provides a cavity within which the light module 400 can be disposed while enabling the front surface of the light module 400 to be flush with the front surface of the ceiling tile 300. FIGS. 4A-4C illustrate one manner in which an embossed region may be formed into the ceiling tile 300.

Referring first to FIG. 4A, one of the ceiling tiles 300 is illustrated in a horizontal position. In certain embodiments the ceiling tile 300 may be positioned on a table, platen, floor, or other horizontal working surface to support the ceiling tile 300 in this horizontal position. Specifically, the rear surface 301 of the ceiling tile 300 may be positioned on the horizontal working surface so that the front surface 302 of the ceiling tile 300 is exposed and accessible so that it may be embossed. The front and rear surfaces 301, 302 of the ceiling tile 300 may be interchangeable in some embodiments (at least prior to the embossing or recess being formed therein). Due to the ceiling tile 300 being positioned on the horizontal working surface, the ceiling tile 300 will remain static even when pressure is applied against the front surface 302 of the ceiling tile 300.

In the exemplified embodiment, an embossing die (or plate) 350 is provided in order to form an embossed region in the ceiling tile 300. The embossing die 350 may be formed of any material that is thermally conductive so that heat can be transmitted through the embossing die 350 for application to the ceiling tile 300. In the exemplified embodiment, a heating element 351 is coupled directly to the embossing die 350. The heating element 351 may include one or more foil type heaters or the like so that the heating element 351 can generate heat. The heating element 351 may be operably coupled to a power source, such as the AC power of a wall socket or the like, or the heating element 351 may comprise its own power source, such as internal batteries, in order to power the heating element 351. When powered, the heating element 351 generates heat. Due to the direct coupling between the heating element 351 and the embossing die 350, the heat generated by the heating element 351 is transferred to the embossing die 350 so that the embossing die 350 is heated and can be used to form an embossed region into the front surface 302 of the ceiling tile 300. The lines and squiggly features positioned adjacent to the contact surface 352 of the embossing die 350 in FIGS. 4A-4C is intended to illustrate the heat and/or steam that emanates from the embossing die 350.

The embossing die 350 may be heated by the heating element 351 to any desired temperature, such as temperatures above 212° F. (100° C.), temperatures above 300° F. (149° C.), temperatures above 400° F. (204° C.), temperatures above 500° F. (260° C.), or the like. In a preferred embodiment, the embossing die 350 is operated at a temperature between 550° F. (288° C.) and 800° F. (427° C.). The exact temperature that the embossing die 350 is heated to is not to be limiting of the present invention unless specifically specified as such. Rather, the exact temperature that the embossing die 350 is heated to can be selected to ensure proper embossing of the ceiling tile 300 and may be dependent on the material of the ceiling tile 300, the pressure applied by the embossing die 350 onto the ceiling tile 300 during embossing, and the like.

Although the exemplified embodiment illustrates the heating element 351 being a type of electric heater, the invention is not to be so limited in all embodiments. In certain other embodiments the embossing die 350 may comprise a plurality of passageways therethrough. The embossing die 350 may be operably coupled to a steam generating device, so that steam generated by the steam generating device is transmitted through the passageways of the embossing die 350. The steam can then be applied to the front surface 302 of the ceiling tile 300 by contacting the embossing die 350 to the front surface 302 of the ceiling tile 300. In such an embodiment, the embossing die 350 need not be formed of a thermally conductive material, but can be formed of any desired material (including rubber (including rigid rubbers with Shore A hardness values above 70 or that register on the Shore D hardness scale), plastic, wood, or the like). Any other technique for transmitting steam onto the ceiling tile 300 for the purpose of forming an embossed region on the front surface 302 of the ceiling tile 300 may be used in accordance with the present invention.

The embossing die 350 may be coupled to a punch press (not illustrated) in order to translate the embossing die 350 between a first non-use state in which the embossing die 350 is spaced apart from the front surface 302 of the ceiling tile 300 (see FIG. 4A) and a second use state in which the embossing die 350 is in contact with the front surface 302 of the ceiling tile 300 (see FIG. 4B). Such a punch press may include springs or other resilient elements, a mechanical punch, an electric punch, or any other device capable of translating the embossing die 350 between the first non-use state and the second use state.

In the exemplified embodiment, the embossing die 350 has a contact surface 352 comprising a horizontal portion 353 and a beveled portion 354. The embossing die 350 may be square or rectangular in shape, and the beveled portion 354 may substantially surround the horizontal portion 353. Of course, the invention is not to be limited by the embossing die 350 being square or rectangular in all embodiments, and the embossing die 350 may take on any polygonal shape or may be circular in other embodiments. Thus, the embossing die 350 may be used to form an embossed region (i.e., a recess or cavity) of any desired shape into the front surface 302 of the ceiling tile 300. It may be preferable, as will be appreciated from the description of FIGS. 6 and 7 below, that the size and shape of the contact surface 352 of the embossing die 350 and hence also of the embossed region formed by the embossing die 350 is the same as the size and shape of the light module 400 to facilitate insertion of the light module 400 into the embossed region and a tight fit. The beveled portion 354 of the contact surface 352 of the embossing die 350 may be preferable to prevent cracking of the ceiling tile 300, to facilitate release of the embossing die 350 from the ceiling tile 300 when transitioning from the use state to the non-use state, and to ensure a proper coupling between the light module 400 and the ceiling tile 300, but is not required in all embodiments.

Referring to FIG. 4B, the embossing die 350 is illustrated pressed against and embedded into the front surface 302 of the ceiling tile 300. Specifically, in FIG. 4B the embossing die 350 has translated from the non-use state (FIG. 4A) into the use state so that the embossing die 350 is being used to create an embossed region (also referred to herein as a recess, cavity, nesting region, nesting cavity, or the like) 360 in the front surface 302 of the ceiling tile 300. Specifically, during use the embossing die 350 is heated as described herein above to a desired temperature. In certain embodiments the front surface 302 of the ceiling tile 300 may be sprayed or coated with a liquid, such as water or a water-based paint, so that when the embossing die 350 is translated into contact with or embedded into the front surface 302 of the ceiling tile 300, steam is generated. In such embodiment the combination of the liquid, the heat, and the pressure of the embossing die 350 against the ceiling tile 300 results in the formation of the embossed region 360 in the front surface 302 of the ceiling tile 300. Specifically, the combination of heat and pressure causes the moisture that was sprayed onto the front surface 302 of the ceiling tile 300 to turn to steam, penetrate the front surface 302 of the ceiling tile 300, and soften the material in the front surface 302 of the ceiling tile 300 so that it can be embossed by the embossing die 350 without damaging the ceiling tile 300. As noted above, the beveled portion 354 of the contact surface 352 of the embossing die 350 prevents the embossing die 350 from cracking the ceiling tile 300, although the embossing die 350 need not include the beveled portion 354 in all embodiments.

As noted above, in certain embodiments it may be preferable that the size and shape of the contact surface 352 of the embossing die 350 be substantially the same as the size and shape of the light module 400 that is to be coupled to the ceiling tile 300. Furthermore, it may be preferable that the embossing die 350 be embedded into the front surface 302 of the ceiling tile 300 a depth equal to a thickness of the light module 400 that is to be coupled to the ceiling tile 300. Thus, the embossed region 360 formed into the front surface 302 of the ceiling tile 300 may be the same size and shape as the light module 400. As a result, when the light module 400 is positioned within the embossed region 360, the front surface 412 of the light module 400 will be flush with the front surface 302 of the ceiling tile 300 (rather than recessed therein or protruding therefrom). Thus, the light module 400 will blend into the ceiling tile 300 so as not to draw a person's attention to the light module 400. Of course, the invention is not to be so limited in all embodiments and the front surface 412 of the light module 400 may be recessed relative to the front surface 302 of the ceiling tile 300 or it may protrude beyond the front surface 302 of the ceiling tile 300 in other embodiments.

As noted above, the combination of the heat transmitted to the embossing die 350 by the heating element 351, a liquid sprayed onto the front surface 302 of the ceiling tile 300, and the pressure applied onto the front surface 302 of the ceiling tile 300 by the embossing die 350 will result in the formation of the embossed region 360. The embossing die 350 may be held into position against the front surface 302 of the ceiling tile 300 for a desired period of time, and then the embossing die 350 will be translated back into the non-use position, as illustrated in FIG. 4C. After the embossing die 350 is translated from the use position of FIG. 4B into the non-use position of FIG. 4C, the embossed region 360 is formed in the front surface 302 of the ceiling tile 300.

Figure 5A:
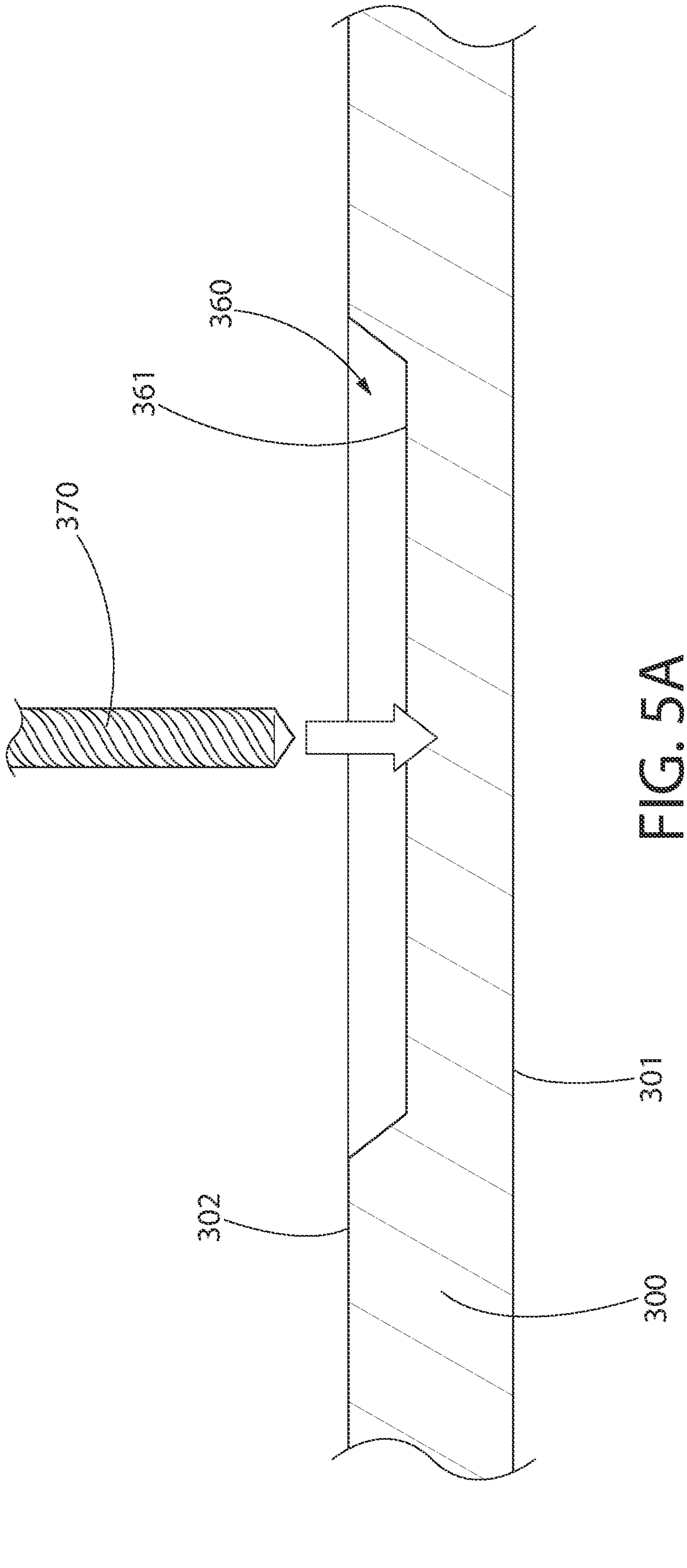
FIGS. 5A-5C are schematic views illustrating a process of drilling a hole in the embossed ceiling tile of FIG. 4C.
Figure 5B:
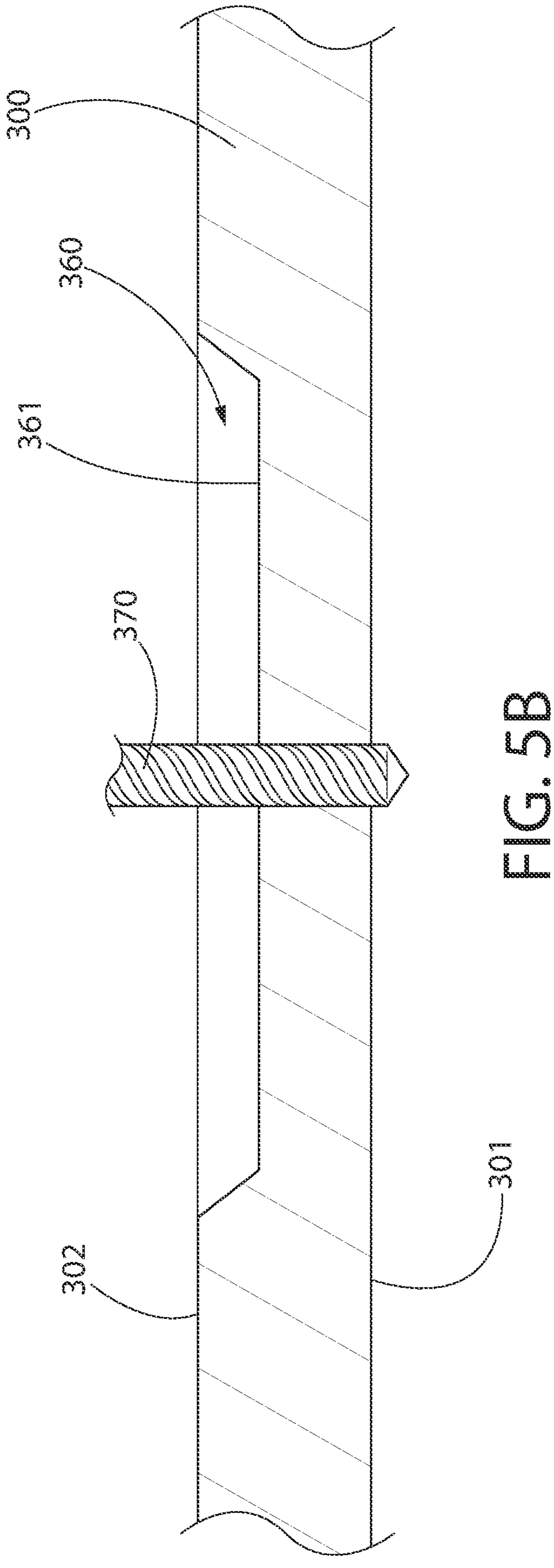
Figure 5C:
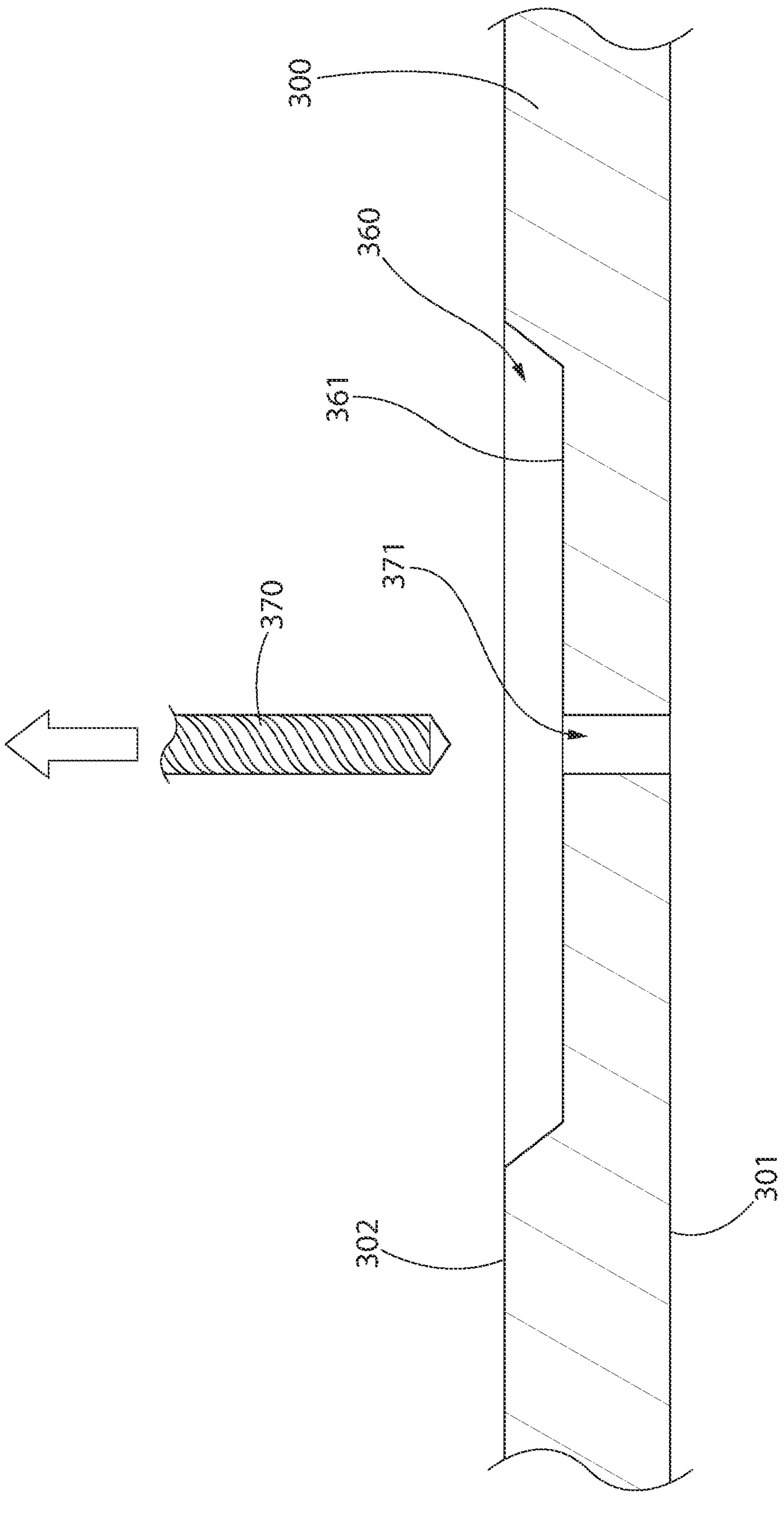

After the embossed region 360 is formed into the front surface 302 of the ceiling tile 300, a hole can be drilled or otherwise formed into the ceiling tile 300 so that wires or other electrical conductors can extend through the ceiling tile 300 from a power source to the light module 400. In this regard, FIGS. 5A-5C illustrate the use of a drill 370 to form a hole 371 in the ceiling tile 300. In the exemplified embodiment, the hole 371 is formed into the ceiling tile 300 within the embossed region 360. Thus, the hole 371 extends from the rear surface 301 of the ceiling tile 300 to a floor 361 of the embossed region 360. The hole 371 can be positioned in other locations on the ceiling tile 300 as desired, but to conceal the wires or other electrical conductors forming the hole 371 within the embossed region 360 is preferred. Furthermore, in some embodiments the hole 371 may be altogether omitted and electrical power can be supplied to the light module 400 in other manners, such as electrically coupling the light module 400 to an electrified grid, providing the light module 400 with an internal power source, providing electrical contacts on the floor 361 or sidewalls of the embossed region 360 that become electrically coupled to electrical contacts of the light module 400 when the light module 400 is positioned within the embossed region 360, or the like.

Figure 6:
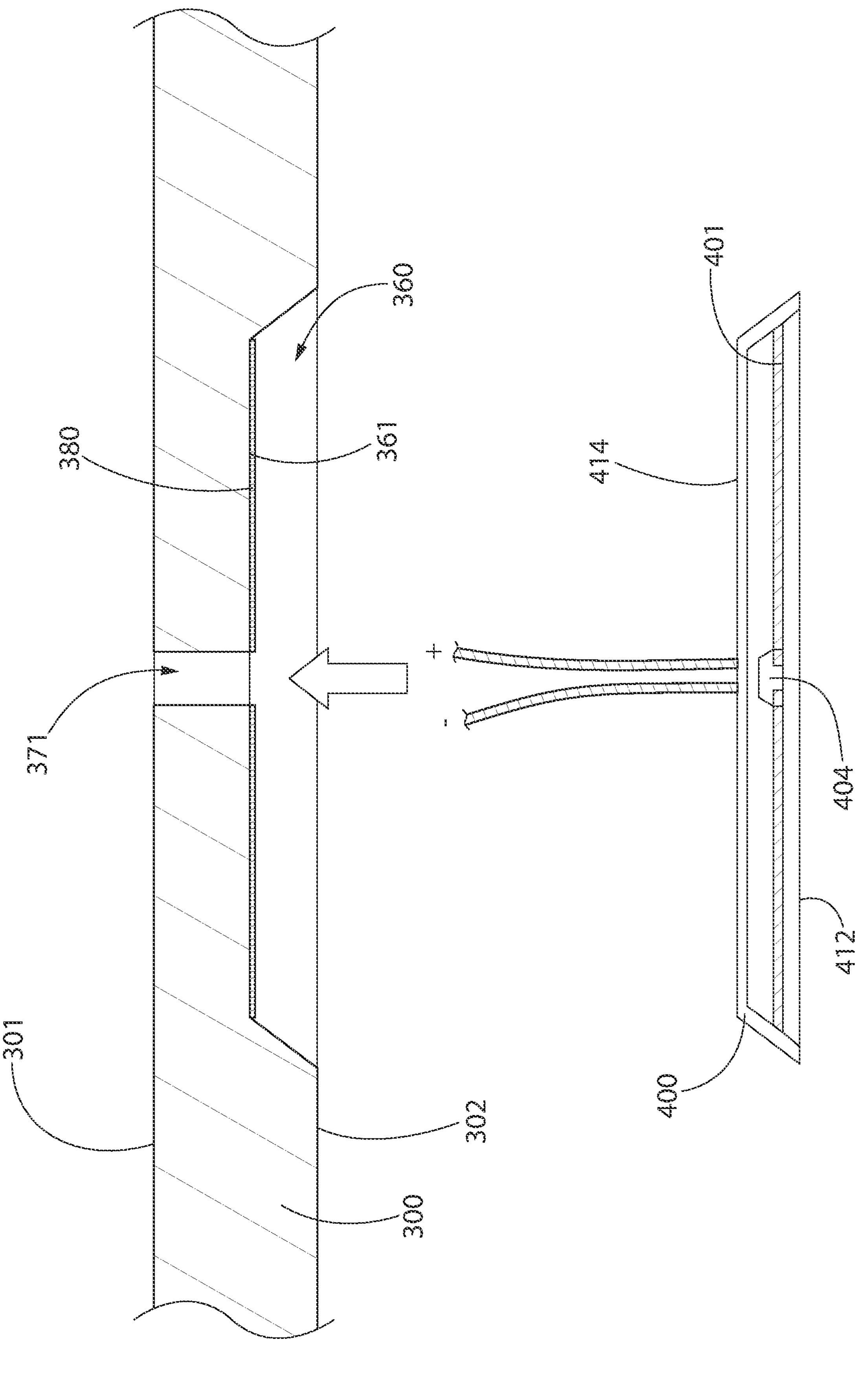
FIG. 6 is a schematic view of the light module of FIG. 3 in preparation for insertion into the embossed region of the embossed ceiling tile of FIG. 4C.

Referring to FIG. 6, one of the light modules 400 is illustrated aligned with one of the ceiling tiles 300 in preparation for coupling the light module 400 to the ceiling tile 300. Although the light module 400 being coupled to the ceiling tile 300 in the illustrated embodiment is the light module 400 of FIG. 3, it should be readily appreciated that any LED light device (LED, HBLED, OLED, electroluminescence, etc.) can be used as the light module as described above. In certain embodiments the light module 400 is a low profile LED light device having a common light and heat emitting surface as described above.

After the embossed region 360 is formed into the front surface 302 of the ceiling tile 300, the light module 400 may be inserted into the embossed region 360 of the ceiling tile 300 for coupling the light module 400 to the ceiling tile 300. In the exemplified embodiment, the floor 361 of the embossed region 360 is coated with an adhesive substance 380, such as glue, to facilitate the adherence/coupling of the light module 400 to the ceiling tile 300. Although an adhesive substance 380 such as glue is illustrated in the exemplified embodiment to achieve the coupling of the light module 400 to the ceiling tile 300, the invention is not to be so limited. In other embodiments corresponding hook-and-loop type fasteners may be positioned on the rear surface 414 of the light module 400 and the floor 361 of the embossed region 360 to couple the light module 400 to the ceiling tile 300. In other embodiments, the light module 400 can be coupled to the ceiling tile 300 using corresponding magnets, fasteners, clips, screws, bolts, nails, interference fit, tight fit, lock-and-key, protrusion and corresponding recess, or the like. Thus, the exact manner in which the light module 400 is coupled to the ceiling tile 300 within the embossed region 360 is not to be limiting of the present invention in all embodiments.

Figure 7:
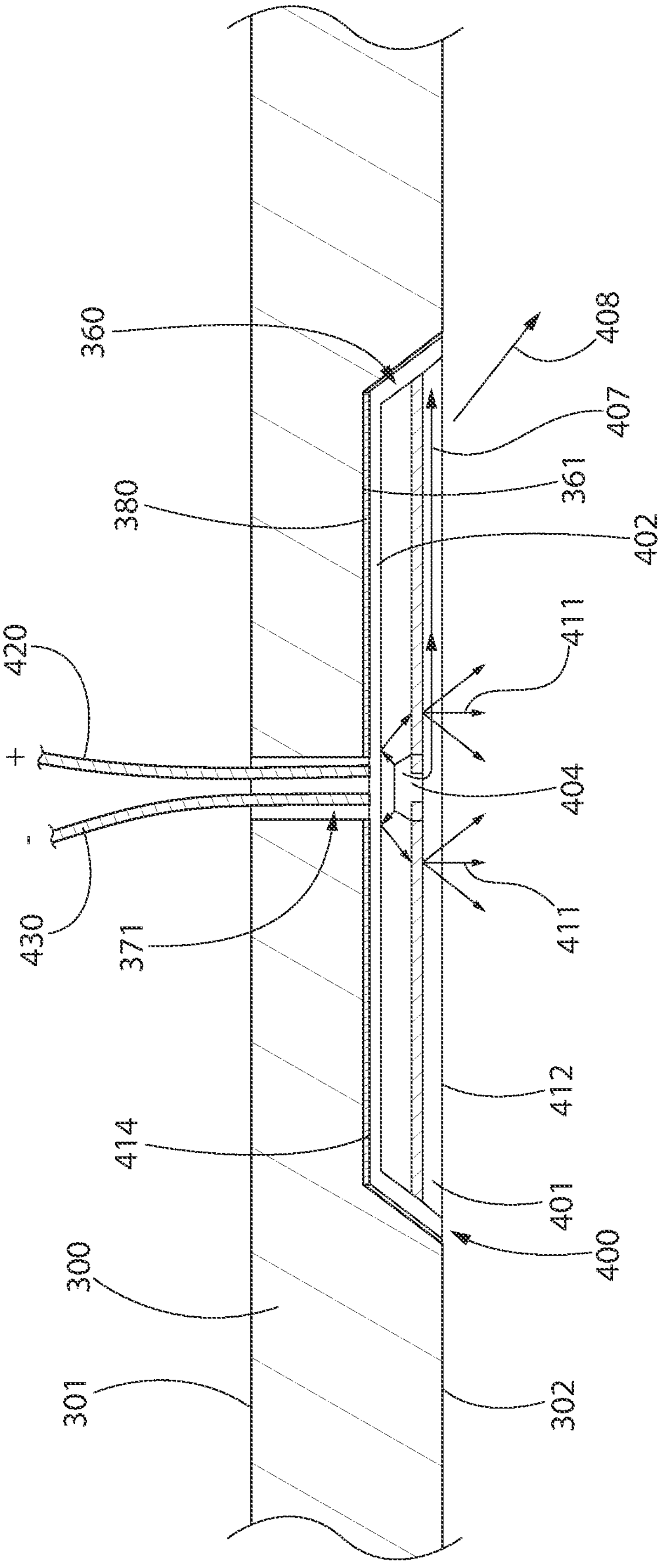
FIG. 7 is a cross-sectional view taken along line VI-VI of FIG. 1.

Referring now to FIG. 7, the light module 400 is illustrated disposed within the embossed region 360 of the ceiling tile 300. When so positioned, the rear surface 414 of the light module 400 is adjacent to and in contact with the floor 361 of the embossed region 360 (or the layer of adhesive material 380 or other coupling material/device coating the floor 361 of the embossed region 360). Furthermore, in the exemplified embodiment the front surface 412 (i.e., the light and heat emitting surface) of the light module 400 is flush with the front surface 302 of the ceiling tile 300. In certain embodiments, the front surface 412 of the light module 400 is completely flush with the front surface 302 of the ceiling tile 300 so that the light module 400 will blend in with the ceiling tile 300 and will not be readily discernible to a person viewing the ceiling tile 300. To enhance the blending in of the light module 400 to the ceiling tile 300, the front surface 412 of the light module 400 may be textured, colored, patterned, or the like to match the texture, color, and/or pattern of the front surface 302 of the ceiling tile 300.

Although the light module 400 is flushly mounted to the ceiling tile 300 in the exemplified embodiment, the invention is not to be so limited in all embodiments. In some embodiments the light module 400 may protrude beyond the front surface 302 of the ceiling tile 300 or may be recessed within the front surface 302 of the ceiling tile 300. Whether the light module 400 is mounted flush or not can be modified by modifying the depth of the embossed region 360 or modifying the thickness of the light module 400 (measured between the front and rear surfaces 412, 414 of the light module 400).

The front surface 302 of the ceiling tile 300 and the front surface 412 of the light module 400 are the portions of the ceiling tile 300 and the light module 400 that face into the interior space or room 110 when the ceiling tile 300 is assembled onto the grid support system 200. Thus, the front surface 302 of the ceiling tile 300 and the front surface 412 of the light module 400 are the surfaces that are visible to a person who is standing in the interior space or room. Stated another way, the front surface 302 of the ceiling tile 300 is an exposed surface and the front surface 412 of the light module 400 is an exposed surface.

In the exemplified embodiment, the light module 400 comprises a positive electric wire 420 and a negative electric wire 430. When the light module 400 is positioned within the embossed region 360 of the ceiling tile 300, the positive and negative electric wires 420, 430 extend through the hole 370 in the ceiling tile 300 for operable coupling to a power source. In certain embodiments, the grid support elements 201 of the ceiling system 100 may be electrified so that the positive and negative electric wires 420, 430 may be coupled to conductors of the grid support elements 201 to provide power to the light module 400. Thus, the ceiling tile 300 may rest upon a support flange of the grid support elements 201, and the wires 420, 430 may simultaneously be coupled to conductors of the grid support elements 201. In other embodiments, the positive and negative electric wires 420, 430 may be otherwise coupled to a power source in any manner desired. The hole 371 in the ceiling tile 300 provides access to the wires 420, 430 so that they can be properly coupled to a power source to power the light module 400. In still other embodiments the light module 400 may include its own internal power source, such as batteries or the like.

Using the techniques described herein, the light module 400 can be flush-mounted within an embossed region or cavity 360 of a ceiling tile 300. The ceiling tile 300 can then be coupled to the grid support system 200 in a conventional manner, and power can be provided to the light module 400. If it is desired or necessary to replace the light module 400, the ceiling tile 300 with the light module 400 coupled thereto can be removed from the grid support system 200 and replaced with another ceiling tile 300 having a light module 400 coupled thereto. Alternatively, the light module 400 can be removed from the ceiling tile 300 and a replacement light module 400 can be coupled to the ceiling tile 300. Thus, the light modules 400 can be readily swapped out just by replacing the ceiling tile 300 due to the light module 400 being pre-coupled to the ceiling tile 300 (during manufacture or at any other desired time) as described herein.

The ceiling tiles 300 can be formed from any material that has conventionally been used to form ceiling tiles that are used in suspension or drop ceilings. Thus, the present invention is able to use currently existing ceiling tiles 300 and retrofit them with one or more of the light modules 400. However, in certain embodiments, the material that is used to form the ceiling tiles 300 should be capable of being embossed to create a cavity or embossed region within which the light modules 400 can be mounted as described herein. Examples of the materials that can be used in the ceiling tiles 300 include, for example without limitation, fiberglass, mineral fiber, fibrous flexible mats, or the like. Furthermore, the ceiling tiles 300 may comprise a core formed of one of the above-noted materials and a scrim or scrim layer that comprises or forms the front surface 302 of the ceiling tiles 300. The scrim or scrim layer may be formed of cloth, fiberglass, vinyl, or the like.

In certain embodiments, the light module 200 may have a weight per unit volume, density per volume, or effective density that is equal to or less than the weight per unit volume, density per volume, or effective density of the ceiling tile 300 to which it is coupled. In certain embodiments the ceiling tile 300 may have a first weight per unit volume and the light module 400 may have a second weight per unit volume 300 such that the first weight per unit volume is greater than the second weight per unit volume. This may be preferable in certain embodiments to ensure that the ceiling tile 300 does not sag when it is coupled to the grid support system 200. Specifically, the weight of the light module 400 and/or the material, thickness, weight, rigidity, and stiffness of the ceiling tile 300 may be properly selected to ensure that the ceiling tile 300 remains horizontally oriented without sag when the ceiling tile 300 with the light module 400 coupled thereto is supported by grid support members of the ceiling system.

Figure 8:
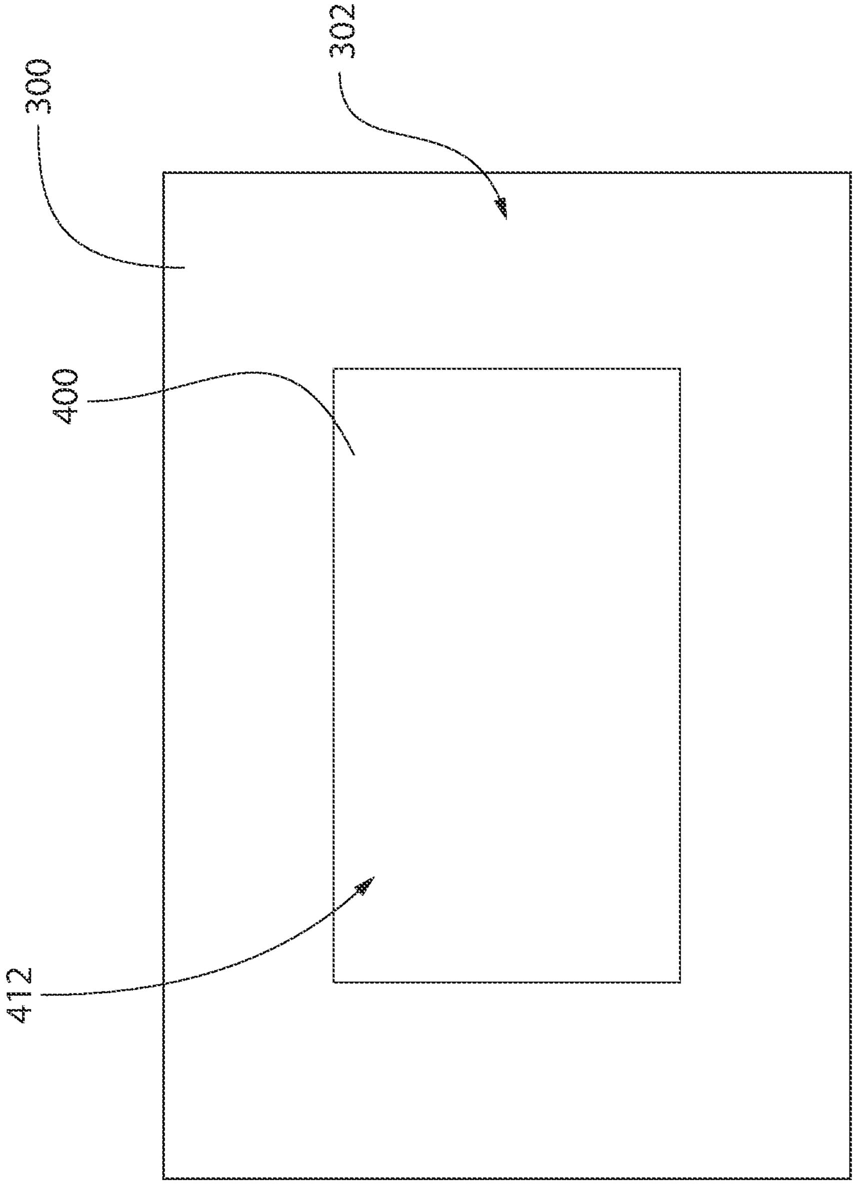
FIG. 8 is a front view of a ceiling tile with a light module coupled thereto.

Referring to FIG. 8, a front view of the ceiling tile 300 having the light module 400 coupled thereto is illustrated. Specifically, FIG. 8 illustrates the front surface (or exposed surface) 302 of the ceiling tile 300 and the front surface (or exposed surface) 412 of the light module 400. The light module 400 has a weight and the ceiling tile 300 has a weight. Furthermore, the front surface 412 of the light module 400 forms an exposed surface of the light module and it has a surface area. The front surface 302 of the ceiling tile 300, more specifically the portion of the front surface 302 of the ceiling tile 300 that is not covered or otherwise taken up by the light module 400, forms an exposed surface of the ceiling tile 300 and it has a surface area. The light module 400 has a weight per unit exposed surface area and the ceiling tile 300 has a weight per unit exposed surface area. In certain embodiments, the weight per unit exposed surface area of the light module 400 is less than the weight per unit exposed surface area of the ceiling tile 300. In some embodiments the weight per unit exposed surface area of the light module 400 may be equal to or less than the weight per unit exposed surface area of the ceiling tile 300. In other embodiments, the weight per unit exposed surface area of the light module 400 may be equal to or slightly greater than the weight per unit exposed surface area of the ceiling tile 300, but in such embodiments the weight per unit exposed surface areas of the light module 400 and the ceiling tile 300 must be selected to ensure sag prevention as discussed herein. In some embodiments a ratio of the weight per unit exposed surface area of the light module 400 to the weight per unit exposed surface area of the ceiling tile 300 may be between 0.3:1 and 1:1, and more specifically between 0.5:1 and 1:1, and still more specifically between 0.7:1 and 1:1.

For example, the light module 400 may have a weight of 1 lb and the exposed surface area of the light module 400 may be 1 $ft^2$. The ceiling tile 300 may have a weight of 4 lbs and the exposed surface area of the ceiling tile 300 may be 3 $ft^2$. In such an embodiment, the weight per unit exposed surface area of the light module 400 is 1 lb/1 $ft^2$ and the weight per unit exposed surface area of the ceiling tile 300 is 4 lbs/3 $ft^2$. Thus, in this example, the weight per unit exposed surface area of the light module 400 is less than the weight per unit exposed surface area of the ceiling tile 300. Of course, the exact weights and surface areas provided herein are purely for example and are not intended to be limiting. Rather, in certain embodiments the invention merely requires that the weight per unit exposed surface area of the light module 400 and the weight per unit exposed surface area of the ceiling tile 300 be selected to ensure that the ceiling tile 300 with the light module 400 coupled thereto does not sag over time.

In certain embodiments, a portion of the ceiling tile 300 may be removed in order to form a recess (rather than forming it via embossing as described herein above). In certain embodiments, the portion of the ceiling tile 300 that is removed will have a weight. Furthermore, the light module 400 may be coupled to the ceiling tile 300 within the recess formed by removing a portion of the ceiling tile 300. The light module 400 will also have a weight. In certain embodiments, the weight of the light module 400 may be equal to or less than three times the weight of the portion of the ceiling tile 300 that was removed to form the recess. In other embodiments, the weight of the light module 400 may be equal to or less than two times the weight of the portion of the ceiling tile 300 that was removed to form the recess. In still other embodiments, the weight of the light module 400 may be equal to or less than the weight of the portion of the ceiling tile 300 that was removed to form the recess. This will further increase the likelihood that the ceiling tile 300 will not sag over time with the light module 400 coupled to the ceiling tile 300.

In some embodiments, the weight of the light module 400 may simply be less than the weight of the ceiling tile 300 to which the light module 400 is coupled. In other embodiments, the weight of the light module 400 and the weight of the ceiling tile 300 may be selected to ensure that the ceiling tile 300 does not sag when the light module 400 is coupled thereto.

Referring to FIGS. 9-12C, an integrated ceiling and light system 1100 will be described in accordance with another embodiment of the present invention. In addition to supporting ceiling tiles, grid support systems such as the grid support system 200 shown in FIGS. 1 and 2 may be used to support vertical panels, also known in the art and referred to sporadically herein as vertical baffles. Whereas ceiling tiles have major surfaces (exposed front and hidden rear surfaces) that are parallel to the floor of the interior space, vertical panels have major surfaces (front and rear surfaces, both of which are exposed) that are oriented perpendicular or otherwise non-parallel or oblique relative to the floor of the interior space. Such vertical panels may be used to optimize room acoustics, such as for sound absorption and/or sound muffling. Vertical panels do not hide from view mechanics and wires positioned between the vertical panels and the support structure from which the vertical panels are suspended, but they are good for acoustic absorption and create an aesthetic that may be desirable depending on its use and location of installation. In addition to their standard use for sound or acoustic absorption, vertical panels may also be used for room illumination/lighting by coupling a light module, such as the light module 400 illustrated in FIG. 3, to the vertical panels. The light module is denoted using the reference numeral 1200 in FIGS. 9-12C, but it should be appreciated that the description above with regard to the light module 400 is fully and equally applicable to the details of the light module 1200.

Figure 9:
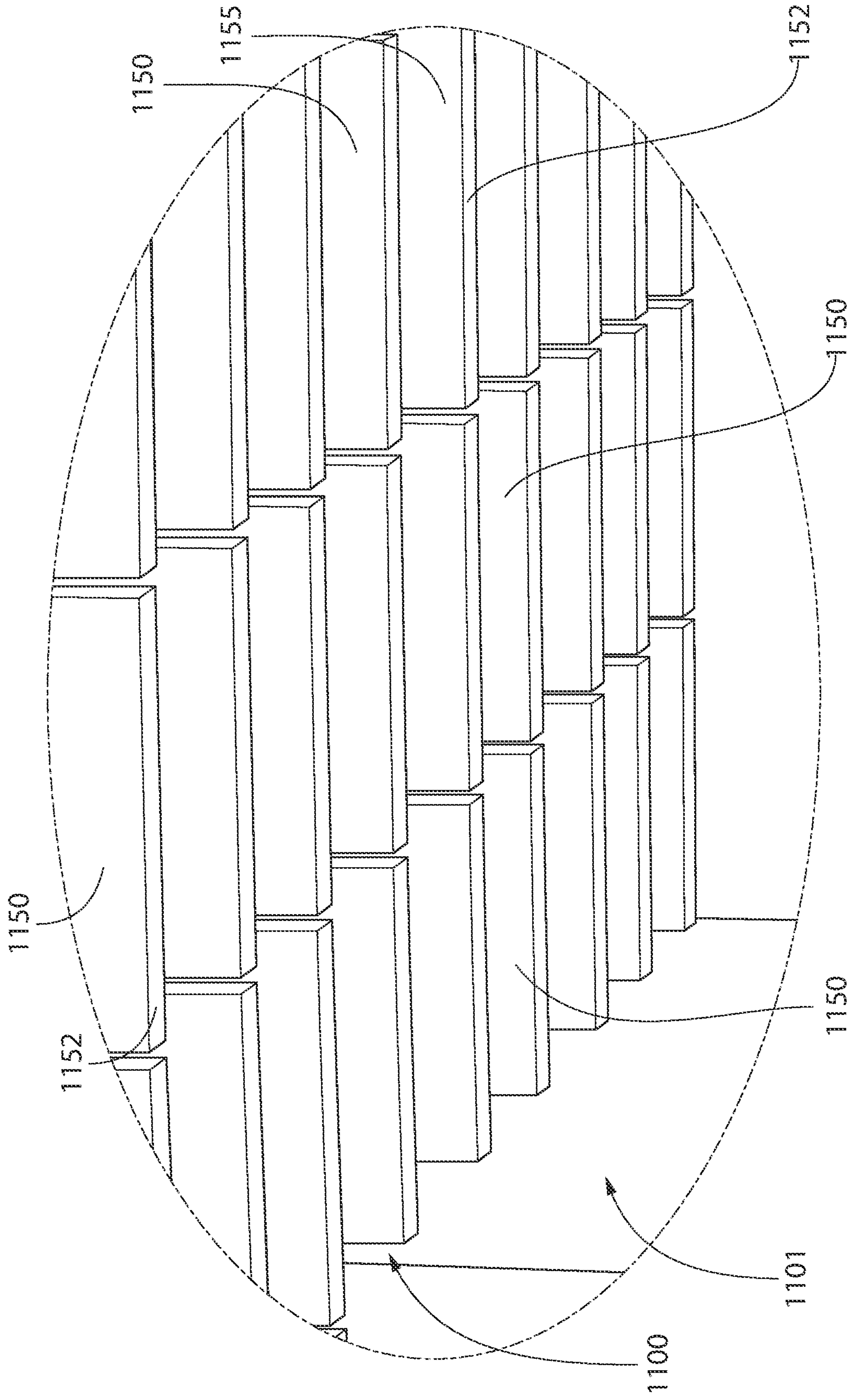
FIG. 9 is a partial view of an interior space illustrating an integrated ceiling and light system in accordance with another embodiment of the present invention.
Figure 10:
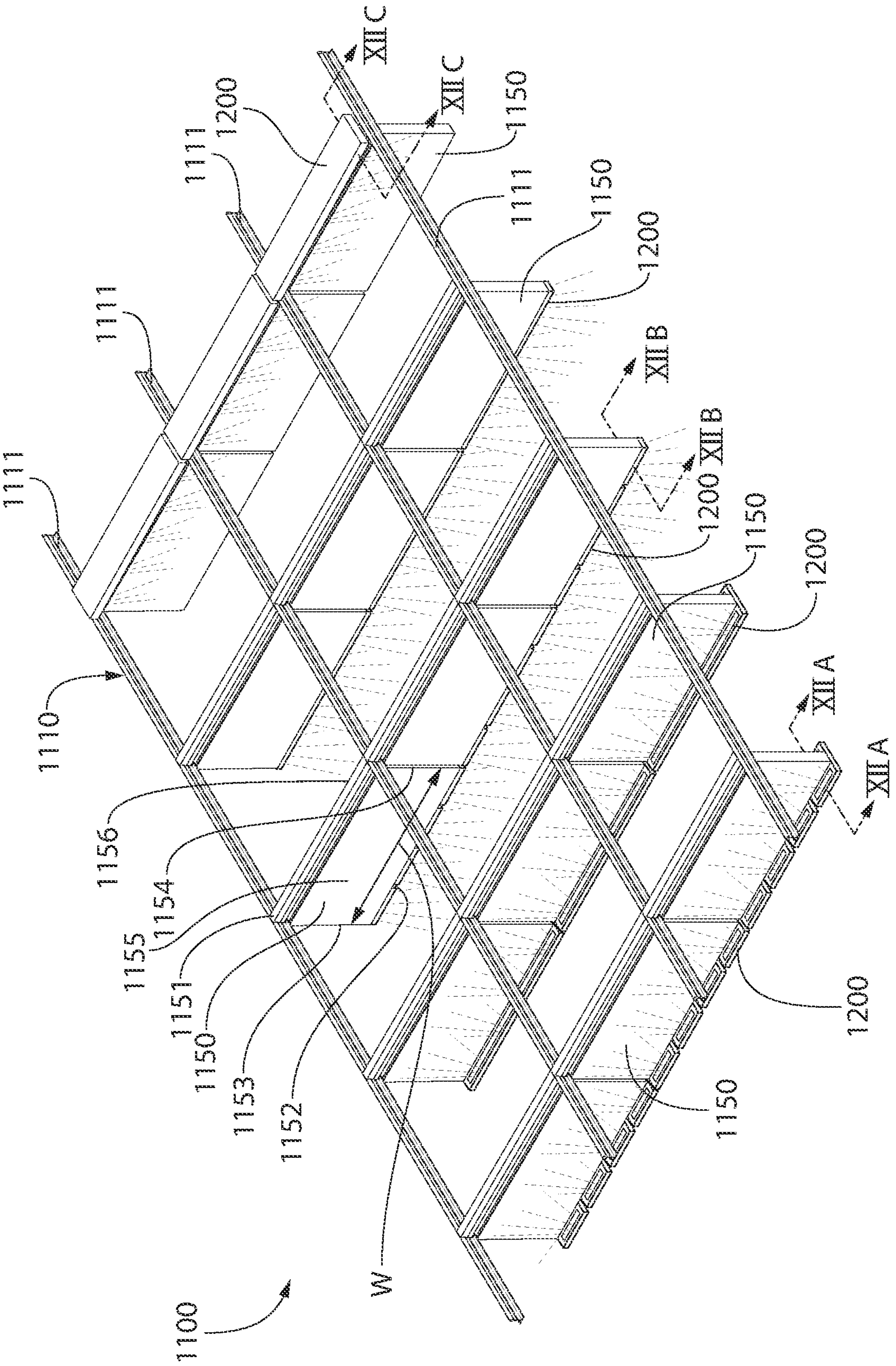
FIG. 10 is an overhead perspective view of the ceiling system of FIG. 9 illustrating vertical panels coupled to grid support elements and light modules coupled to the vertical panels.

Referring to FIGS. 9 and 10 concurrently, an integrated ceiling and light system 1100 is generally depicted. FIG. 9 illustrates the integrated ceiling and light system 1100 forming a ceiling for an interior room or space 11101 from the vantage point of looking up at the ceiling system from below. FIG. 10 illustrates the integrated ceiling and light system 1100 by itself from the vantage point of looking down at the integrated ceiling and light system 1100 from above. The integrated ceiling and light system 1100 includes an overhead grid support system 1110 that is configured for mounting in a suspended manner from an overhead building support structure via appropriate hanger elements, such as for example without limitation fasteners, hangers, wires, cables, rods, struts, etc. This is similar to the manner in which the overhead grid system 200 is mounted as described herein with reference to FIGS. 1 and 2. In the exemplified embodiment the grid support system 1110 includes a plurality of grid support members 1111 that are arranged parallel to one another. In certain embodiments, the grid support system 1110 may include both longitudinal grid support elements and lateral grid support elements that intersect one another. The use of grid support systems 1110 of these types is generally well known for forming a suspended ceiling in a commercial building (or any other building or space as may be desired).

In certain embodiments, ceiling tiles may not be coupled to the grid support members 1111. Specifically, in the exemplified embodiment the integrated ceiling and light system 1100 comprises a plurality of vertical panels 1150 mounted on or coupled to the grid support members 1111. Although in the exemplified embodiment the vertical panels 1150 are used in lieu of ceiling tiles, in other embodiments both vertical panels 1150 and ceiling tiles (such as the ceiling tiles 300 described above) may be used together within the same integrated ceiling and light system 1100. The vertical panels 1150 hang vertically downwardly from the grid support members 1111 for acoustic management and to form a desired aesthetic. The grid support members 1111 may be made from any suitable metallic or non-metallic materials structured to support the dead weight or load of vertical panels 1150 without undue deflection. In some preferred but non-limiting embodiments, the grid support members 1111 may be made of metal including aluminum, titanium, steel, or the like.

Furthermore, in alternate embodiments not illustrated, the vertical panels 1150 may be coupled directly to the building support structure via appropriate hanging elements (i.e., wires, hangers, cables, rods, struts, etc.) without the use of grid support members 1111. Thus, the vertical panels 1150 may be directly suspended vertically from the building support structure (such as the building support structure 210 illustrated in FIG. 2) with the grid support members 1111 being omitted. In this regard and as will be appreciated from the description below, the invention described herein is directed to the use of the light module 1200 with the vertical panels 1150 to illuminate a room or interior space.

In the exemplified embodiment, each vertical panel 1150 has a generally flat tile or panel-like body including a top edge 1151, a bottom edge 1152, opposing lateral side edges (also referred to herein as first and second side edges) 1153, 1154, and opposing front and rear surfaces (also referred to herein as first and second surfaces or major surfaces) 1155, 1156. In some embodiments the front and rear surfaces 1155, 1156 may be perpendicular, oblique, or otherwise non-parallel relative to the floor of the interior space in which the vertical panel 1150 is installed. Thus, the bottom and top edges 1151, 1152 of the vertical panel 1150 may be parallel to the floor of the interior space in some embodiments. Each vertical panel 1150 defines a width W measured between the lateral sides 1153, 1154, a height H measured between the top and bottom edges 1151, 1152, and a thickness T measured between the front and rear surfaces 1155, 1156. In one embodiment, the lateral sides 1153, 1154 may have straight edges in front/rear profile and form substantially parallel side surfaces extending vertically.

The front and rear surfaces 1155, 1156 may each define substantially flat regular surfaces in side profile. In other possible shapes that may be provided, the front and rear surfaces 1155, 1156 may have irregular surfaces including various undulating patterns, designs, textures, perforations, ridges/valleys, wavy raised features, contoured, convex, or concave profiles, or other configurations for aesthetic and/or acoustic (e.g. sound reflection or dampening) purposes. Accordingly, the front and rear surfaces 1155, 1156 are not limited to any particular surface profile in all embodiments. The front and any rear surfaces 1155, 1156 of the vertical panels 1150 may be substantially parallel to each other in some embodiments. In other possible embodiments, the front and rear surfaces 1155, 1156 may be angled or slanted in relation to each other to form baffles or panels having sloping surfaces. The invention is therefore not limited to any of the foregoing constructions unless a specific construction is claimed.

The vertical panels 1150 may be formed of any suitable material, including the materials described above for use in forming the ceiling tiles 300. Specifically, the materials that may be used to form the vertical panels 1150 includes, without limitation, mineral fiber, fiberglass, jute fiber, metals, polymers, wood, or the like. Furthermore, the vertical panels 1150 may be formed of (or have a core formed of) a fibrous mat, such as those formed from synthetic fibers, such as mineral wool, fiberglass, polymer fibers (e.g., nylon fibers) or metal fibers. Vegetable fibers such as flax, hemp, kenaf, straw, waste paper, and wood fiber can also be used to produce the vertical panels 1150 or portions thereof. Fillers such as kaolin clay, calcium carbonate, talc, mica, Wollastonite, or inorganic flame retardant fillers may also be used. The vertical panels 1150 may also be treated with fire retardant materials as is well understood in the art of making panels of this type. The vertical panels 1150 may also include a core layer and an optional scrim layer for aesthetic, thermal, reflective, or acoustic purposes. Unless specifically described herein as being a particular material, it should be appreciated that the vertical panels 1150 can be formed of any of these materials or of any other material currently used for ceiling tiles in drop ceilings. The vertical panels 1150 may also include any desired color, such as white, red, black, green, or the like, as desired to achieve a particular aesthetic. Each vertical panel 1150 may also include various combinations of different materials of construction and various combinations of different colors.

When the grid support elements 1111 are used to support the vertical panels 1150, the vertical panels 1150 may be capable of being coupled to the grid support elements 1111 in any desired manner. In the exemplified embodiment, the vertical panels 1150 comprise mounting grooves that engage adjacent parallel extending grid support elements 1111 so that the vertical panels 1150 hang from the grid support elements 1111. One specific embodiment of such vertical panels is described in United States Patent Application Publication No. 2014/01157689, which is hereby incorporated herein by reference in its entirety, although the invention is not to be limited to the embodiments disclosed therein. Mounting grooves, when used for mounting the vertical panels 1150 to the grid support elements 111, may be formed into the vertical panels 1150 by any suitable fabrication method, including for example without limitation routing, cutting, molding, or others. However, other techniques for removably (or even non-removably if so desired) coupling the vertical panels 1150 to the grid support elements 1111 can be used. Thus, the present invention is not intended to be limited by the manner of coupling the vertical panels 1150 to the grid support elements 1111 or the manner of supporting the vertical panels from the overhead building support generally. Thus, the vertical panels 1150 may be coupled to the grid support elements 1111 or directly to the overhead building support structure in other manners as described herein and as would be appreciated by persons skilled in this art.

Referring to FIGS. 10 and 11A-11C, one or more of the light modules 1200 is illustrated coupled to each of the vertical panels 1150. As noted above, the structural and functional details of the light module 1200 will not be described herein for brevity, it being understood that the description of the light module 400 illustrated in FIG. 3 is applicable. Similar numbering will be used to describe the light module 1200 as the light module 400 except that the 1200 series of numbers will be used instead of the 400 series of numbers. It should be appreciated that the description of the features of the light module 400 is applicable to the similarly numbered feature of the light module 1200.

Although one or more of the light modules 1200 is coupled to each of the vertical panels 1150 in the figures, the invention is not to be so limited and some of the vertical panels 1150 in the integrated ceiling and light system 1100 may have one or more of the light modules 1200 coupled thereto while others of the vertical panels 1150 in the integrated ceiling and light system 1100 may not have a light module coupled thereto. FIGS. 10 and 11A-11C illustrate three different techniques/positions for mounting or coupling the light modules 1200 to the vertical panels 1150. Specifically, in FIG. 11A and the first two rows of vertical panels 1150 (counting the rows from the left to the right) in FIG. 10, the light module 1200 is coupled to the bottom edge 1152 of the vertical panel 1150 and emits light upwardly towards/at the front and rear surfaces 1155, 1156 of the vertical panel 1150. In FIG. 11B and the third and fourth rows of vertical panels (counting the rows from the left to the right) in FIG. 10, the light module 1200 is coupled to the bottom edge 1152 of the vertical panel 1150 and emits light downwardly towards the interior space and away from the vertical panel 1150 to which it is attached. Finally, in FIG. 11C and the fifth row of vertical panels (counting the rows from the left to the right) in FIG. 10, the light module 1200 is coupled to the top edge 1151 of the vertical panel 1150 and emits light downwardly at the front and rear surfaces 1155, 1156 of the vertical panel 1150 and into the interior space.

Figure 11C:
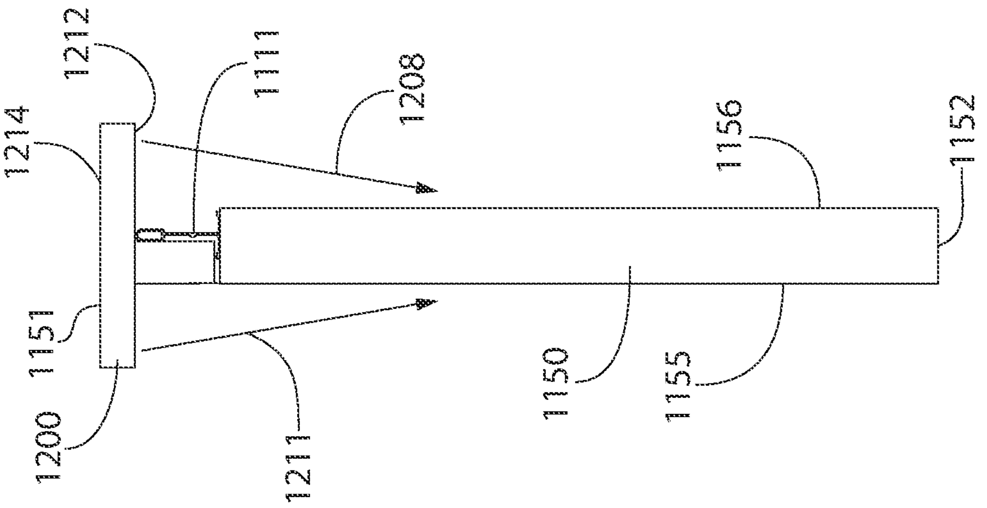
FIG. 11C is a side view of a vertical panel with a light module coupled thereto in accordance with a third embodiment of the present invention.
Figure 11B:
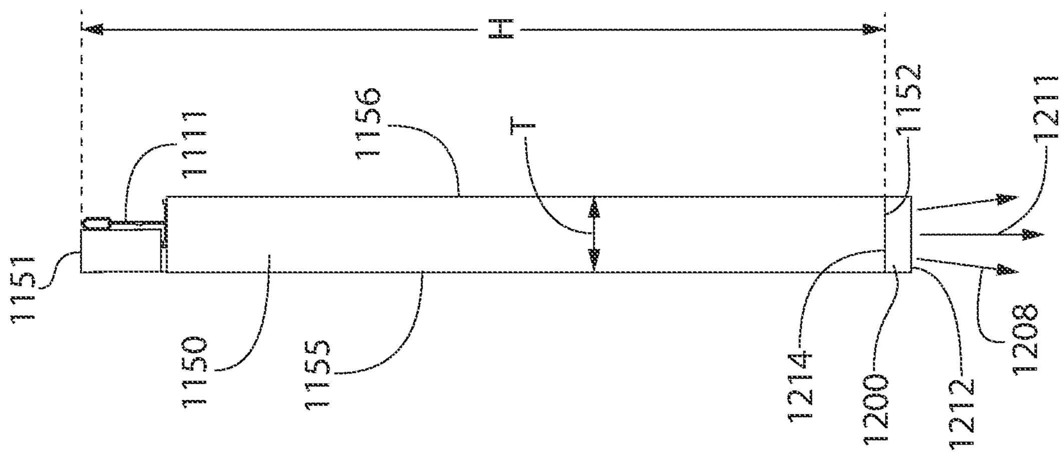
FIG. 11B is a side view of a vertical panel with a light module coupled thereto in accordance with a second embodiment of the present invention.
Figure 11A:
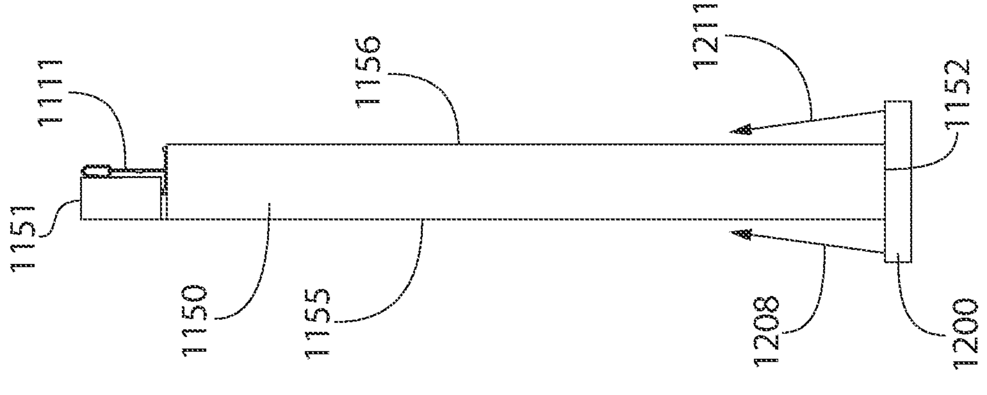
FIG. 11A is a side view of a vertical panel with a light module coupled thereto in accordance with a first embodiment of the present invention.
Figure 12C:
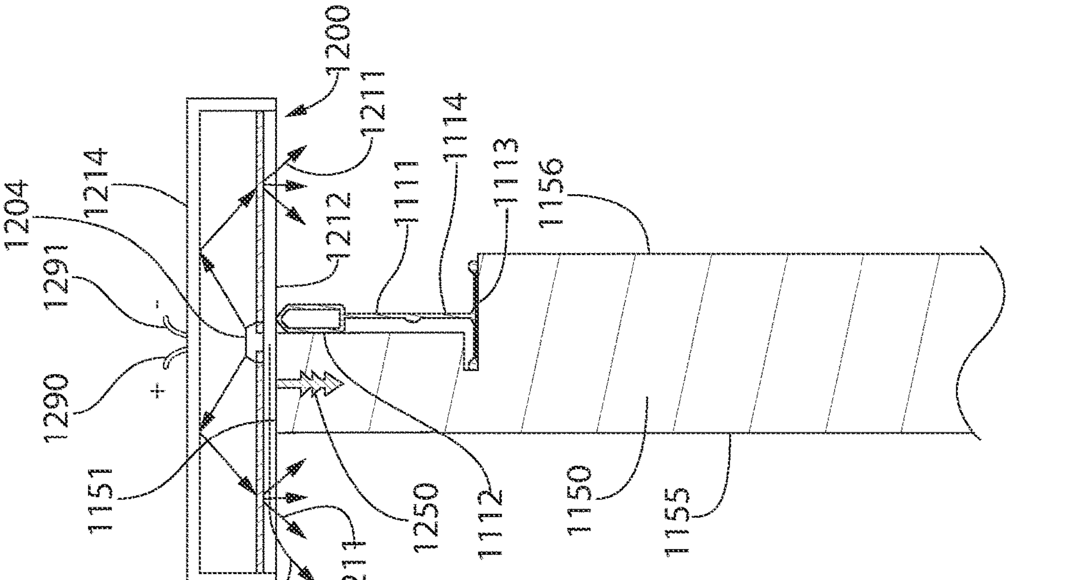
FIG. 12C is a cross-sectional view taken along line XIIC-XIIC of FIG. 10.
Figure 12B:
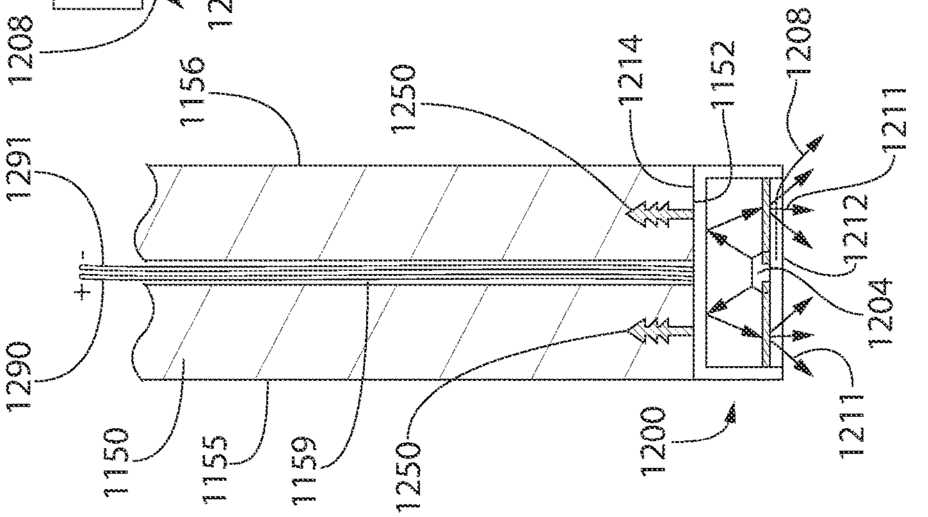
FIG. 12B is a cross-sectional view taken along line XIIB-XIIB of FIG. 10.
Figure 12A:
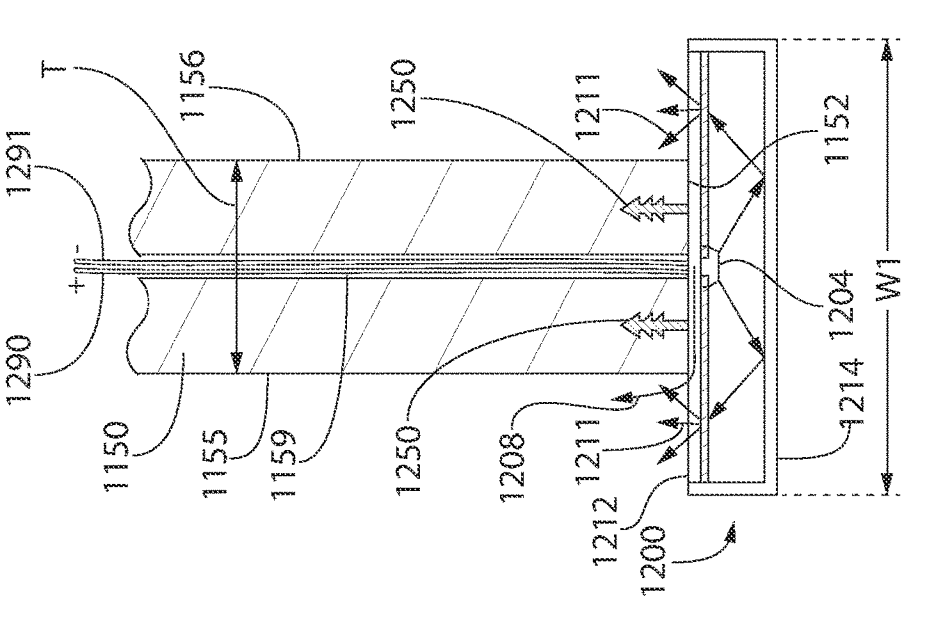
FIG. 12A is a cross-sectional view taken along line XIIA-XIIA of FIG. 10.

Referring first to FIGS. 11A and 12A concurrently, the embodiment wherein the light module 1200 is coupled to the bottom edge 1152 of the vertical panel 1150 and emits light upwardly towards the vertical panel 1150 will be described. As discussed above, the light module 1200 may be one that is identical to the light module 400 of FIG. 3. Alternatively, the light module 1200 may be another type of light source or fixture, such as low profile LED light modules, LED light modules with common light and heat emitting/dissipating surfaces, directly illuminating LED light modules, indirectly illuminating LED light modules, HBLED light modules, OLED light modules, electroluminescent elements, or the like may be used as the light module in accordance with the disclosure set forth herein.

In the exemplified embodiment, the light module 1200 is coupled to the vertical panel 1150 at or adjacent to the bottom edge or surface 1152 of the vertical panel 1150. In the exemplified embodiment, the light module 1200 is coupled to the vertical panel 1150 via a coupling element 1250, such as barbed pins that are fixed to the light modules 1200 and extend from the front surface 1212 of the light modules 1200. In that regard, in the exemplified embodiment the vertical panel 1150 is a solid and unhollowed structure such as an acoustic panel that provides a material for the barbed pins 1250 to penetrate into to couple the light modules 1200 to the vertical panel 1150. The barbed pins 1250 are inserted into the vertical panel 1150 through the bottom edge 1152 of the vertical panel 1150, thereby coupling the light module 1200 directly to the vertical panel 1150. Once the light module 1200 is coupled to the vertical panel 1150 via the barbed pins 1250, the barbed pins 1250 prevent or make it difficult to detach the light module 1200 from the vertical panel 1150. Of course, in some embodiments the light module 1200 may be readily detached from the vertical panel 1150 for replacement or rearrangement as desired.

Although the coupling element 1250 is described herein as being a barbed pin, the invention is not to be so limited in all embodiments and other devices or techniques may be used. For example without limitation, the light modules 1200 can be coupled to the vertical panels 1150 via magnets, hook-and-loop fasteners, adhesion, threaded fasteners, interference fit, protrusion/detent, tab/groove, clamp, or the like in other embodiments. Thus, the invention is not to be limited by the manner in which the light modules 1200 are coupled to the vertical panels 1150 in all embodiments. In certain embodiments the light modules 1200 may be fixedly coupled to the vertical panels 1150 (such as in the exemplified embodiment utilizing the barbed pins 1250). In other embodiments the light modules 1200 may be removably coupled to the vertical panels 1150 (such as by a threaded coupling or the like) to enable replaceability and interchangeability of the light modules 1200 without requiring removal or replacement of the vertical panels 1150. In either case, the light modules 1200 are coupled directly to the vertical panels 1150.

In the embodiment of FIGS. 11A and 12A, the light module 1200 is coupled to the bottom edge 1152 of the vertical panel 1150 such that a portion of the front surface 1212 of the light module 1200 is adjacent to and in contact with the bottom edge 1152 of the vertical panel 1150. In this embodiment, the vertical panel 1150 has a thickness T measured between the front and rear surfaces 1155, 1156 and the light module 1200 has a width W1, the width W1 being greater than the thickness T. The width W1 of the light module 1200 should be greater than the thickness T of the vertical panel 1150 so that the light module 1200 protrudes out beyond the front and/or rear surfaces 1155, 1156 of the vertical panel 1150 due to the front surface 1212 of the light module 1200 being in contact with the vertical panel 1150.

Thus, in this embodiment portions of the light module 1200 extend beyond the front and/or rear surfaces 1155, 1156 of the vertical panel 1150 to enable light emitted from the light module 1200 to be transmitted and visible to illuminate the interior space. In the exemplified embodiment the light module 1200 extends beyond both the front and rear surfaces 1155, 1156 of the vertical panel 1150, but in other embodiments the light module 1200 may only extend beyond one of the front and rear surfaces 1155, 1156 of the vertical panel 1150 while being flush with or recessed relative to the other one of the front and rear surfaces 1155, 1156 of the vertical panel 1150. In certain embodiments not exemplified herein, the light module 1200 may be positioned within a recess or channel that is formed into the bottom edge 1152 of the vertical panel 1150 (similar to the recesses, cavities, and nesting regions discussed in other parts of this document).

Because the front surface 1212 of the light module 1200, which is the light and heat emitting surface of the light module 1200, is positioned adjacent to the bottom surface 1152 of the vertical panel 1150, in this embodiment the light and heat emitted from the light module 1200 is transmitted upwardly towards (and potentially into contact with) the front and rear surfaces 1155, 1156 of the vertical panel 1150. This is exemplified with light ray 1211 and heat ray 1208 emitting from the LED 1204 and upwardly from the front surface 1212 of the light module 1200 towards the vertical panel 1150.

In certain embodiments, emitting the light upwardly from the light module 1200 towards the front and rear surfaces 1155, 1156 of the vertical panels 1150 may be sufficient to illuminate an interior space. Furthermore, the vertical panels 1150 may be formed with different textures, patterns, or the like to create different visual effects with the light as the light contacts/reflects off of the vertical panels 1150. Furthermore, in certain embodiments the vertical panels 1150 may comprise a reflective material. Specifically, the front and/or rear surfaces 1155, 1156 of the vertical panels 1150 may comprise the reflective material so that the light emitted from the light source 1200 reflects off of the vertical panels 1150 to illuminate the interior space.

The vertical panels 1150 may comprise any material suitable for implementation in a drop ceiling or as otherwise described herein and may be chosen, at least in part, based on: (1) durability (e.g., resistance to warping/damage from water, smoke, heat, etc.); (2) dimensions (e.g., weight, size, etc.); (3) surface patterning; (4) aesthetics; (5) satisfaction of seismic and fire safety codes/standards; (6) acoustic insulation qualities; and/or (7) cost (e.g., or replacement, repair, etc.). The reflectivity of the vertical panel 1150 may be achieved by any number of suitable means, including, but not limited to: (1) impregnating, embedding, or otherwise integrating one or more reflective materials into at least a portion (e.g., the front and/or rear surfaces 1155, 1156) of the vertical panel 1150; (2) disposing a layer or film of one or more reflective materials on at least a portion (e.g., the front and/or rear surfaces 1155, 1156) of the vertical panel 1150; and/or (3) forming the vertical panel 1150, in part or in whole, from one or more reflective materials. A number of factors may be considered in choosing a suitable reflective material, such as its ability to reflect the wavelength(s) of interest (e.g., visible, ultraviolet, infrared, etc.) of the light provided by the light module 1200 and/or to evenly distribute incident light in a manner suitable for a given application. Thus, and in accordance with an embodiment, the vertical panels 1150 may implement or be coated with a material that largely reflects visible light, such as, but not limited to: (1) barium sulfate ($BaSO_4$); (2) metalized polyethylene terephthalate (PET); (3) aluminum oxide ($Al_2O_3$); (4) titanium dioxide ($TiO_2$); (5) calcium carbonate ($CaCO_3$); and/or (6) other reflective pigments and dyes. In some cases, one or more such materials may be included, for example, in paint or a similar substance which may be applied to a surface of the vertical panel 1150. In accordance with an embodiment, the vertical panel 1150 may be configured to have an optical efficiency, for example, in the range of about 65-98% (e.g., greater than or equal to about 95%, greater than or equal to about 90%, greater than or equal to about 85%, greater than or equal to about 80%, etc.).

In the exemplified embodiment, positive and negative electric wires 1290, 1291 are coupled to the light module 1200 to provide power thereto. Specifically, the electric wires 1290, 1291 extend from the front surface 1212 of the light module 1200 through a passageway 1159 formed into the vertical panel 1150 for connection to a power source (not shown). The passageway 1159 extends from the bottom edge 1152 of the vertical panel 1150 and may extend to the top edge 1151, one of the side edges 1153, 1154, or even to one of the front and rear surfaces 1155, 1156 of the vertical panel 1150. However, in the preferred embodiment the passageway 1159 extends from the bottom edge 1152 to the top edge 1151 of the vertical panel 1150. The electric wires 1290, 1291 are hidden from view by being disposed within the passageway 1159 extending through the vertical panel 1150 as they extend from the light module 1200 to the power source.

In certain embodiments the electric wires 1290, 1291 of the light module 1200 may be coupled to conductive strips on the grid support elements 1111. Specifically, conductive strips having electrical polarity due to electrical coupling to a power source may be fixed to the grid support elements 111, and the electrical wires 1290, 1291 may be coupled to the light module 1200 and to the conductive strips. In other embodiments the electric wires 1290, 1291 may be coupled directly to an AC bus line or other AC power source. The invention is not to be limited by the technique used for powering the light module 1200 in all embodiments. Thus, in still other embodiments the electric wires 1290, 1291 may be omitted and the light module 1200 may be powered via an internal power source, such as batteries or the like, or through other means as desired.

As can be seen in FIG. 10 (first two rows starting on the left), a single light module 1200 may be coupled to the vertical panel 1150 along the entire width of the vertical panel 1150 (the second row) or multiple light modules 1200 may be coupled to the vertical panel 1150 along the width of the vertical panel 1150 (the first row). Furthermore, in other embodiments one or more of the light modules 1200 may be coupled to each vertical panel 1150 but not extend along the entire width of the vertical panel 1150. Thus, there are many variations that are possible and within the scope of the present invention as would be readily appreciated by persons of ordinary skill in the art. Furthermore, although in the exemplified embodiment the light module 1200 is coupled to the bottom edge 1152 of the vertical panel 1150, the invention is not to be so limited in all embodiments. In other embodiments the light module 1200 may be coupled to at least one of the front and/or rear surfaces 1155, 1156 of the vertical panel 1150. The light module 1200 may be coupled to the vertical panel 1150 so that the front surface 1212 of the light module 1200 faces the front and/or rear surface 1155, 1156 of the vertical panel 1150 in a spaced apart manner so that light emitted from the light module 1200 is reflected off of the vertical panel 1150 as described herein above. The light module 1200 may also be coupled to the vertical panel 1150 with the rear surface 1214 of the light module 1200 facing the front and/or rear surface 1155, 1156 of the vertical panel 1150 to emit light from the light module 1200 into an interior space.

Referring now to FIGS. 11B and 12B concurrently, a second embodiment of one of the vertical panels 1150 with one of the light modules 1200 coupled thereto will be described. In this embodiment, the light module 1200 is coupled to the bottom edge 1152 of the vertical panel similar to that which was described above with regard to FIGS. 11A and 12A. However, in this embodiment the connection element 1250 extends from the rear surface 1214 of the light module 1200, and it is the rear surface 1214 of the light module 1200 that is adjacent to and/or in contact with the bottom edge 1152 of the vertical panel 1150. The connection element 1250 may be any of the connection elements described above including barbed pins as exemplified in FIG. 12B.

In this embodiment, because the rear surface 1214 of the light module 1200 is adjacent to and/or in contact with the bottom edge 1152 of the vertical panel 1150 and the front surface 1212 (i.e., the light and heat emitting surface) of the light module 1200 faces the interior space or room in which the vertical panels 1150 are hanging, the light and heat emitted from the light module 1200 are transmitted from the front surface 1212 of the light module 1200 as heat and light rays 1208, 1211. The heat and light rays 1208, 1211 in this embodiment do not reflect off of the vertical panel 1150, but rather are transmitted directly into the interior space or room being illuminated.

In the exemplified embodiment, the width of the light module 1200 may be substantially the same as the thickness of the vertical panel 1150 such that the edges of the light module 1200 are flush with the front and rear surfaces 1155, 1156 of the vertical panel 1150. The light module 1200 may also be flush with one or both of the side edges 153, 154 as best shown in FIG. 10. However, the invention is not to be so limited in all embodiments and the width of the light module 1200 may be greater or less than the thickness of the vertical panel 1150 in other embodiments depending on the amount of light and the aesthetic desired. Furthermore, in the exemplified embodiment the rear surface 1214 of the light module 1200 is in contact with the bottom edge 1152 of the vertical panel 1150. However, the invention is not to be so limited and in other embodiments the light module 1200 may be disposed within a cavity formed into the bottom edge 1152 of the vertical panel 1150 so that the front surface 1212 of the light module 1200 is flush with the bottom edge/surface 1152 of the vertical panel 1150. In still other embodiments the light module 1200 may be disposed within a cavity formed into the bottom edge 1152 of the vertical panel 1150 so that the front surface 1212 of the light module 1200 is recessed relative to the bottom edge/surface 1152 of the vertical panel 1150. The light module 1200 may also be coupled to the bottom edge 1152 of the vertical panel 1150 in a spaced apart manner so that the rear surface 1214 of the light module 1200 is spaced/hanging from the bottom edge 1152 of the vertical panel 1150. Alternatively, the light module 1200 may be coupled to at least one of the front and/or rear surfaces 1155, 1156 of the vertical panel 1150 or to one of the side edges 1153, 1154 of the vertical panel 1150 rather than the bottom edge 1152 of the vertical panel 1150. When coupled to the front and/or rear surfaces 1155, 1156 or to the side edges 1153, 1154, the light module 1200 may be coupled so the rear surface 1214 of the light module 1200 is in contact with the front and/or rear surface 1155, 1156 or to the side edge 1153, 1154, the light module 1200 may be disposed within a cavity to be flush or recessed relative to the front and/or rear surface 1155, 1156 or to the side edges 1153, 1154 of the vertical panel 1150 as described above, or the light module 1200 may be coupled to the front and/or rear surface 1155, 1156 or to the side edges 1153, 1154 of the vertical panel 1150 in a spaced apart manner.

Referring now to FIGS. 11C and 12C concurrently, a third embodiment of one of the vertical panels 1150 with one of the light modules 1200 coupled thereto will be described. In this embodiment, the light module 1200 is coupled to the vertical panel 1150 at or adjacent to the top edge 1151 of the vertical panel 1150. More specifically, in this embodiment the connection element 1250 (which may be barbed pins or any other feature noted herein above) extend from the front (light and heat emitting) surface 1212 of the light module 1200, and the front surface 1212 of the light module 1200 is adjacent to and/or in contact with to the top edge 1151 of the vertical panel 1150. In the exemplified embodiment the light module 1200 is coupled to the vertical panel 1150 by inserting the barbed pin or other connection feature 1250 into the top surface 1151 of the vertical panel 1150 until the front surface 1212 of the light module 1200 contacts the top edge 1151 of the vertical panel 1150.

Furthermore, in still other embodiments the light module 1200 may be coupled directly to the grid support member 1111 that supports the vertical panel 1150. Specifically, the grid support member 1111 may comprise a top portion (i.e., bulb portion) 112, a flange 113, and an arm 1114 extending between the top portion 112 and the flange 113. The vertical panel 1150 has a groove or slot for receiving the flange 113 of the grid support member 111, which thereby supports the vertical panel 1150. The light module 1200 in this embodiment may include a clip or other fastening device for coupling the light module directly to the grid support member 1111. Specifically, in one embodiment a clip may extend from the front surface 1212 of the light module 1200 for coupling the light module 1200 to the top portion 112 of the grid support member 1111. Other techniques for coupling the light module 1200 to the grid support member 1111 are also contemplated as would be appreciated by persons in the art.

As noted above, in the embodiment of FIGS. 11C and 12C the front surface 1212 (i.e., the light emitting surface) of the light module 1200 is adjacent to and/or in contact with the top edge 1151 of the vertical panel 1150. However, the light module 1200 has a width that is greater than a thickness of the vertical panel 1150 such that the light module 1200 protrudes or extends beyond one or both of the front and rear surfaces 1155, 1156 of the vertical panel 1500. Thus, the light 1208 and the heat 1211 transmitted from the front surface 1212 of the light module 1200 will transmit downwardly from the front surface 1212 of the light module 1200 and into the interior space. Some of the light rays 1208 may be transmitted into contact with the front and/or rear surfaces 1155, 1156 of the vertical panel 1150. Thus, in certain embodiments it may be desirable to form the vertical panel 1150 so that it comprises a reflective material as described herein above. Others of the light rays 1208 may transmit directly into the interior space, or may reflect off of another one of the vertical panels 1150 that is not the vertical panel 1150 to which it is coupled. This cross-flow of the light may enhance the aesthetics in the interior space and create a desirable illumination effect.

In the embodiments described above, the light module 1200 is not positioned within an interior of the vertical panel 1150 to emit light through the vertical panel 1150. Specifically, the vertical panels 1150 are not hollow, but are solid structures and there is no fully enclosed interior space or cavity within which the light modules 1200 can be disposed or positioned. Rather, the light module 1200 in each embodiment is coupled directly to an exterior surface or edge of the vertical panel 1150. As a result, in certain embodiments there is surface contact between a surface of the light module 1200 and one of the exterior surfaces or edges of the vertical panel 1150. The light module 1200 then either directly emits light into the interior space, or emits light in a direction towards the vertical panel 1150 so that the light reflects off of the exterior surface(s) of the vertical panel 1150 to illuminate an interior space.

Figure 13:
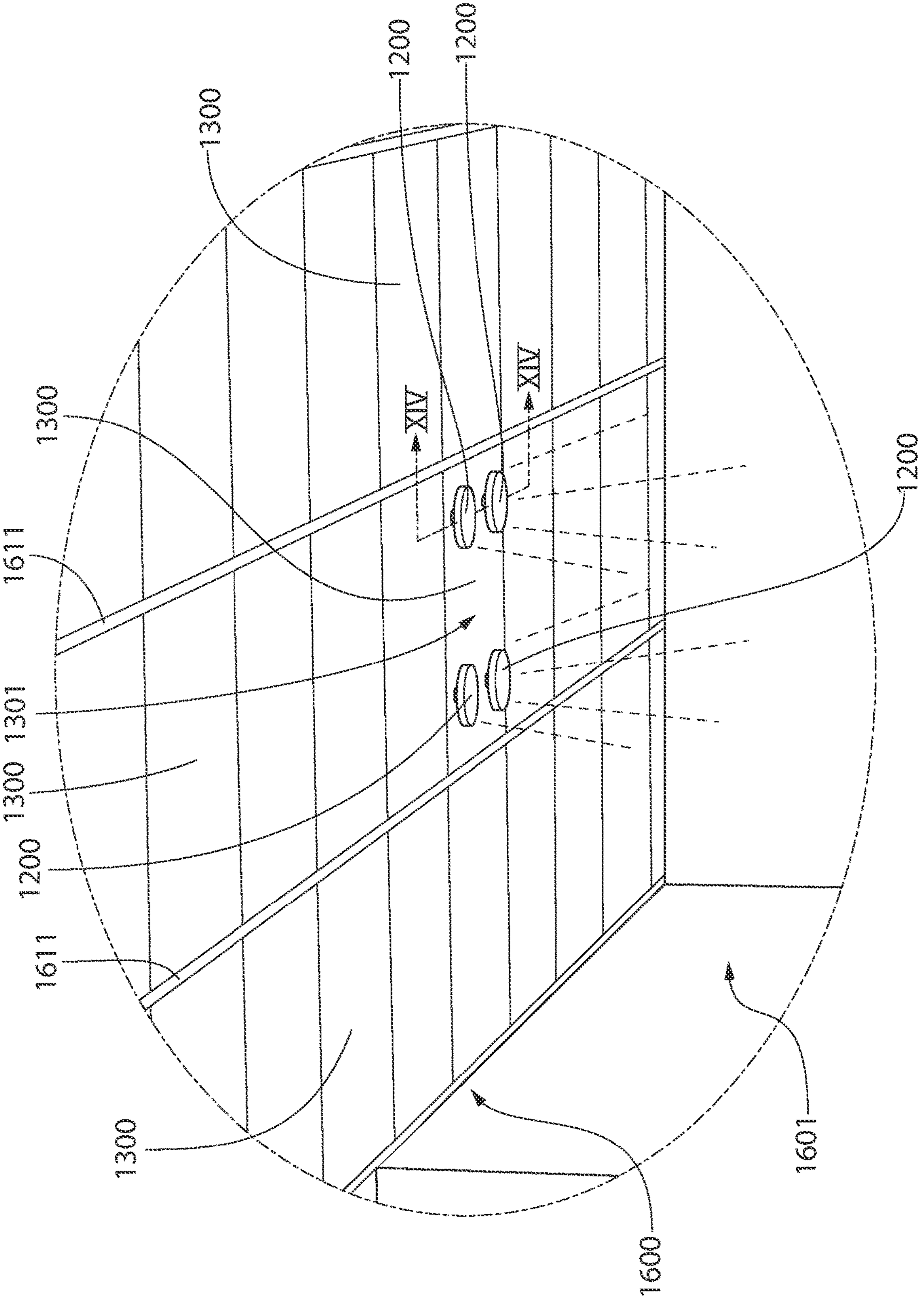
FIG. 13 is a partial view of an interior space illustrating an integrated ceiling and light system in accordance with yet another embodiment of the present invention.
Figure 14:
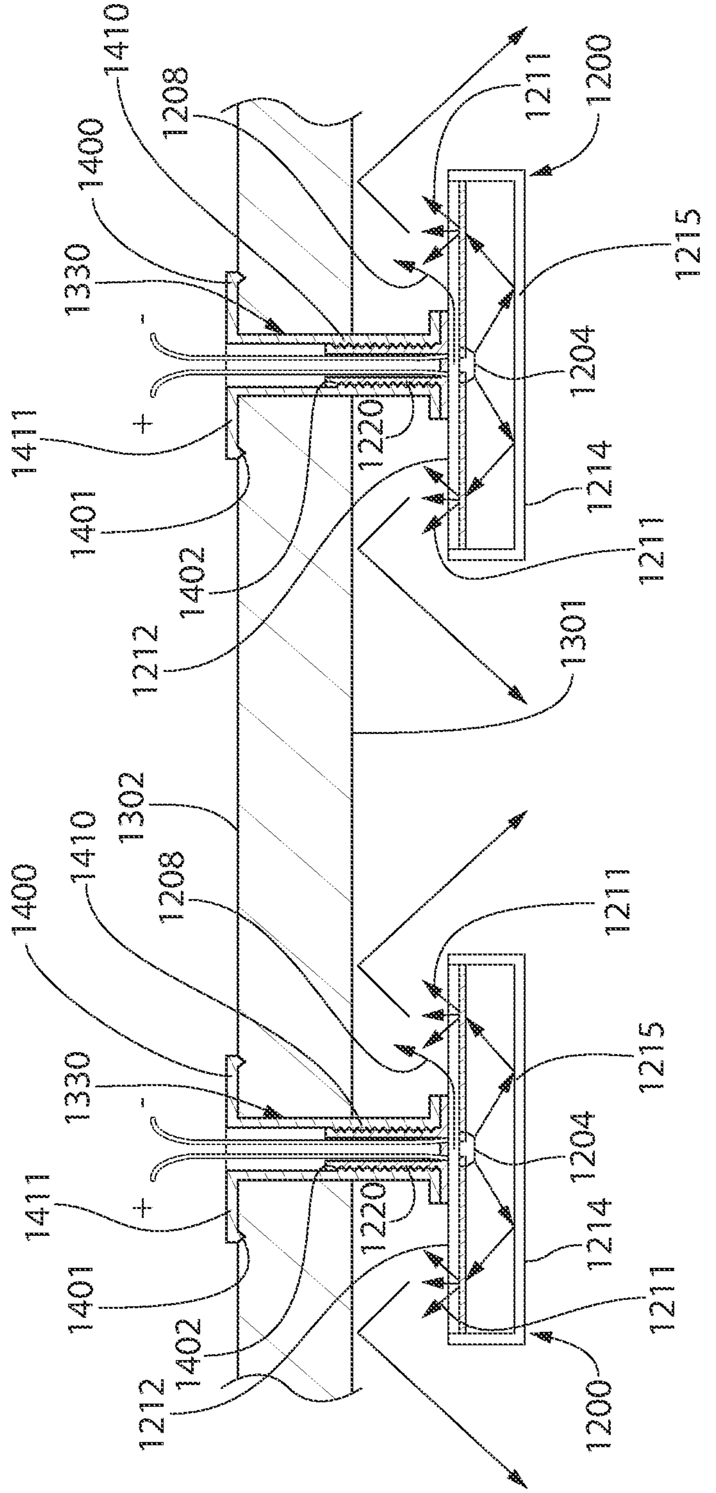
FIG. 14 is a cross-sectional view taken along line XIV-XIV of FIG. 13.

Referring now to FIGS. 13 and 14, an integrated light and ceiling system 1600 is illustrated in accordance with another embodiment of the present invention. The integrated light and ceiling system 1600 comprises or more of the light modules 1200 coupled to a ceiling tile 1300. Referring first to FIG. 13, the integrated light and ceiling system 1600 is illustrated forming a ceiling for an interior room or space 1601. The ceiling system 1600 forms a suspended ceiling and comprises an overhead grid support system 1610 that is configured for mounting in a suspended manner from an overhead building support structure via appropriate hanger elements, such as for example without limitation fasteners, hangers, wires, cables, rods, struts, etc. In the exemplified embodiment the grid support system 1610 includes a plurality of grid support members 1611 that are arranged parallel to one another. In certain embodiments, the grid support system 1610 may include both longitudinal grid support elements and lateral grid support elements that intersect one another. The use of grid support systems 1610 of these types is generally well known for forming a suspended ceiling in a commercial building (or any other building or space as may be desired) and has been described above in more detail that is applicable to the disclosure that follows.

The spaces between the grid support members 1611 form openings within which ceiling tiles 1300 can be positioned. In such embodiments, the ceiling tiles 1300 may close the openings to provide a desired aesthetic such that wiring and other mechanical structures may be located between the ceiling tiles 1300 and the overhead building support structure. Specifically, the ceiling tiles 1300 are coupled to or otherwise engaged with one or more of the grid support members 1611 so that the ceiling tiles 1300 are supported by the grid support members 1611 to form a drop ceiling. The ceiling tiles 1300 hide the wiring and mechanical structures from view. However, such ceiling tiles 1300 can be readily removed from the grid support members 1611 to enable a person to gain access into the space between the ceiling tiles 1300 and the overhead building support structure for maintenance or the like.

The ceiling tiles 1300 comprise a front surface 1301 that forms an exposed surface in the interior space 601. In the exemplified embodiment, a plurality of the light modules 1200 are coupled to the front surface 1301 of one of the ceiling tiles 1300. Specifically, in the exemplified embodiment four of the light modules 1200 are coupled to the front surface 1301 of one of the ceiling tiles 1300. Of course, the invention is not to be so limited in all embodiments and a single one of the light modules 1200, two of the light modules 1200, three of the light modules 1200, or more than four of the light modules 1200 may be coupled to one or more of the ceiling tiles 1300 in other embodiments in order to achieve a desired illumination of the interior space 1601. As can be seen in FIG. 13, each of the light modules 1200 is coupled to the ceiling tile 1300 so as to be spaced apart from the front surface 1301 of the ceiling tile 1300.

Referring now to FIG. 14, the details of the coupling between the light modules 1200 and the ceiling tiles 1300 will be described. The ceiling tile 1300 comprises a passageway 1330 extending through the ceiling tile 1300 from the front surface 1301 to the rear surface 1302. The passageway 1330 terminates in openings in each of the front and rear surfaces 1301, 1302 of the ceiling tile 1300. Furthermore, in the exemplified embodiment a first coupling element 1400 is coupled to the ceiling tile 1300. Although only two of the coupling elements 1400 are illustrated, there will be one of the first coupling elements 1400 on the ceiling tile 1300 for each of the light modules 1200 desired to be coupled to the ceiling tile 1300. Thus, if there are four light modules 1200 as in FIG. 13, there will be four of the first connectors 1400.

The first coupling element 1400 comprises a first portion 1410 positioned within the passageway 1330 and a second portion 1411 positioned adjacent to the rear surface 1302 of the ceiling tile 1300. In the exemplified embodiment, the first portion 1410 of the first coupling element 1400 extends through the passageway 1330 and protrudes from/beyond the front surface 1301 of the ceiling tile 1300. Of course, the invention is not to be so limited in all embodiments and the first portion 1410 of the first coupling element 1400 may be flush with or recessed relative to the front surface 1301 of the ceiling tile 1300 in other embodiments.

The first portion 1410 of the first coupling element 1400 comprises a threaded inner surface or a threaded outer surface 1402. In the exemplified embodiment, it is the inner surface of the first portion 1410 of the first coupling element 1400 that is threaded. Furthermore, the second portion 1411 of the first coupling element 1400 is a flange portion that is in contact with the rear surface 1302 of the ceiling tile 1300 when the first portion 1410 of the first coupling element 1400 is positioned within the passageway 1330. In the exemplified embodiment, the second portion 1411 of the first coupling element 1400 comprises teeth or protrusions 1401 that dig into the rear surface 1302 of the ceiling tile 1300 to fixedly secure the first coupling element 1400 to the ceiling tile 1300.

As discussed herein above, the light module 1200 comprises the front surface 1212 and the opposing rear surface 1213. Furthermore, the light module 1200 comprises a main body or housing 1215 that contains the LED 1204 and other electronics of the light module 1200 and a second coupling element 1220 extending from the main body 1215. The second coupling element 1220 comprises a threaded inner or outer surface, and in the exemplified embodiment the second coupling element 1220 has a threaded outer surface.

The light module 1200 is detachably coupled to the ceiling tile 1300 by cooperative mating between the first and second coupling elements 1330, 1220. Specifically, the threaded outer surface of the second coupling element 1220 are configured to engage and made with the threaded inner surface 1402 of the first coupling element 1330. Thus, the first coupling element 1400 is fixed to the ceiling tile 1300 via the flange 1411 and teeth 1401 and enables the light module 1200 to be repeatedly coupled to and detached from the ceiling tile 1300 by threading the second coupling element 1220 of the light module 1200 to the threaded inner surface 1402 of the first coupling element 1400. The threaded coupling described herein may be desirable in certain embodiments to facilitate replacement and interchangeability of the light module 1200 as needed without requiring removal of the ceiling tile 1300 from the ceiling system 1600.

In this embodiment, the light module 1200 is coupled to the first coupling element 1400 (and to the ceiling tile 1300) so that the front surface 1212 (which is the light and heat emitting surface) of the light module 1200 is facing or adjacent to the front surface 1301 of the ceiling tile 1300. However, the front surface 1212 of the light module 1200 is spaced apart from the front surface 1301 of the ceiling tile 1300. Thus, light emitted from the light module 1200 is transmitted towards the front surface 1301 of the ceiling tile 1300. In that regard, the ceiling tile 1300 may comprise or be formed of a reflective material at least on its front surface 1301 so that the light emitted by the light module 1200 will reflect off of the front surface 1301 of the ceiling tile 1300 to illuminate the interior space. Any of the reflective materials described above can be used to achieve this purpose. The ceiling tile 1300 need not comprise a reflective material in all embodiments and in certain embodiments emitting light from the light module 1200 upwardly towards the ceiling tile 1300 is sufficient to illuminate a room.

Furthermore, it should be appreciated that the light module 1200 can be coupled to the ceiling tile 1300 so that the rear surface 1214 of the light module 1200 faces the ceiling tile 1300 and the front surface 1212 of the light module 1200 faces the interior space. In such embodiments the light and heat emitted from the light module 1200 will be transmitted directly downwardly into the interior space rather than towards the ceiling tile 1300. Any of the coupling techniques described herein can be used regardless of the facing direction of the front surface 1212 of the light module 1200. Finally, in the exemplified embodiment electric wires are illustrated coupled to the light module 1200 for supplying power thereto. The electric wires extend through the passageway 1410 for coupling to a power source. Any of the electrical connection techniques described herein above (connecting wires to conductive strips, connecting wires to power source, including power supply internally within light module, etc.) can be used in this embodiment.

Furthermore, although in the exemplified embodiment the light modules 1200 are coupled to the ceiling tile 1300 in a spaced apart manner, this is not required in all embodiments in which direct lighting (as opposed to indirect lighting in which the light is directed towards the ceiling tile 1300) is used. When direct lighting (the front surface 1212 of the light module 1200 faces the interior space 601) is used, the light module 1200 may be coupled to the ceiling tile 1300 so that the front surface 1212 of the light module 1200 is flush with the front surface 1301 of the ceiling tile 1300. Alternatively, the light module 1200 may be recessed relative to the front surface 1301 of the ceiling tile 1300. Still further, the light module 1200 may be coupled to the ceiling tile 1300 so that the rear surface 1214 of the light module 1200 is in surface contact with the front surface 1301 of the ceiling tile 1300 rather than being spaced therefrom. Thus, various permutations and variations are possible within the scope of the present disclosure.

Figure 15:
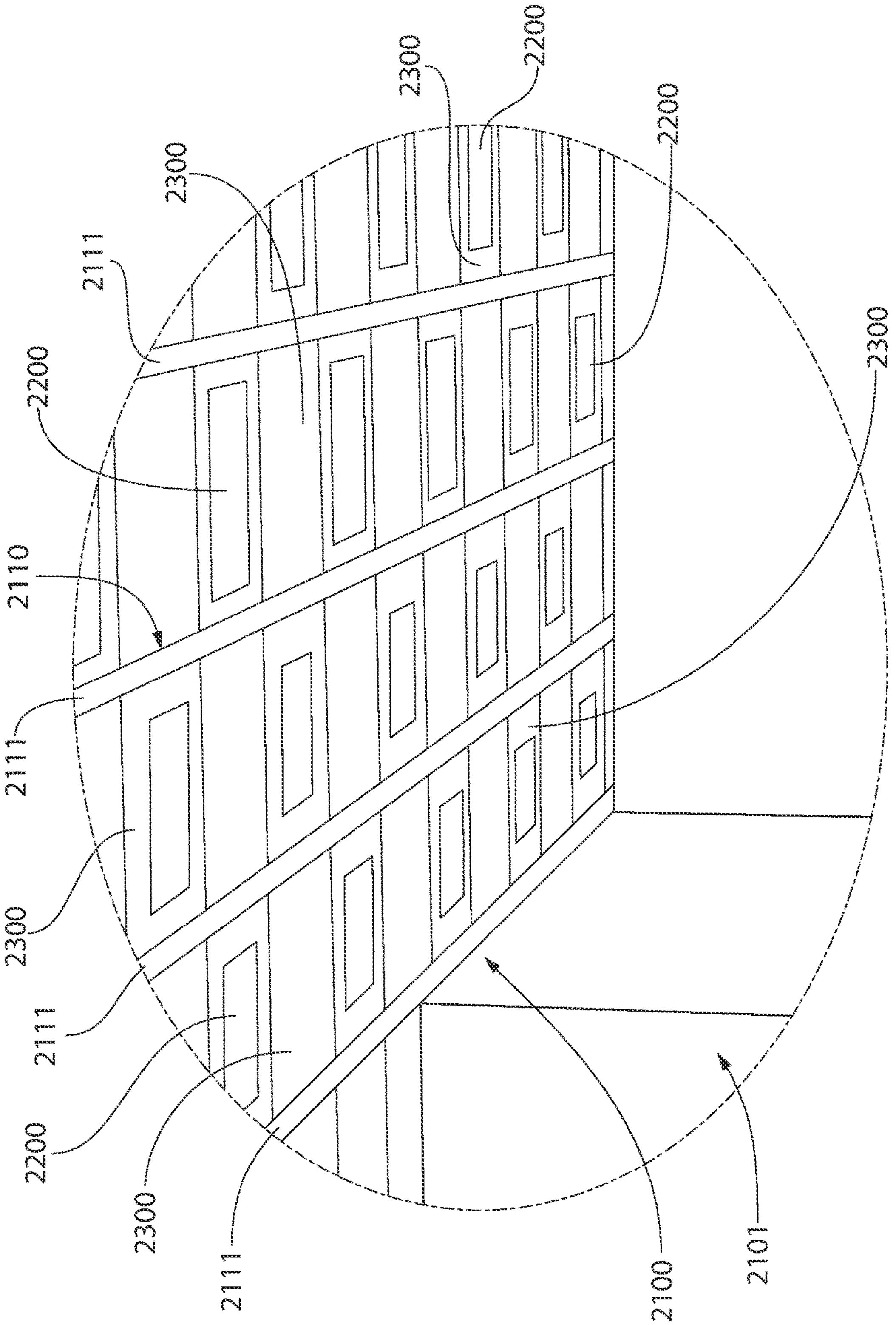
FIG. 15 is a partial view of an interior space illustrating an integrated ceiling and light system in accordance with still another embodiment of the present invention.

Referring to FIG. 15, an integrated ceiling and light system 2100 is generally depicted forming a ceiling for an interior room or space 2101. The integrated ceiling and light system 2100 includes an overhead grid support system 2110 that is configured for mounting in a suspended manner from an overhead building support structure via appropriate hanger elements, such as for example without limitation fasteners, hangers, wires, cables, rods, struts, etc. In the exemplified embodiment the grid support system 2110 includes a plurality of grid support members 2111 that are arranged parallel to one another. In certain embodiments, the grid support system 2110 may include both longitudinal grid support elements and lateral grid support elements that intersect one another. The use of grid support systems 2110 of these types is generally well known for forming a suspended ceiling in a commercial building (or any other building or space as may be desired) and has been described herein above.

The spaces between the grid support members 2111 form openings within which ceiling tiles 2300 can be positioned. Only a few of the ceiling tiles 2300 are labeled in the drawings to avoid clutter. The ceiling tiles 2300 close the openings to provide a desired aesthetic. Specifically, wiring and other mechanical structures may be located between the ceiling tiles 2300 and the overhead building support structure. The ceiling tiles 2300 hide the wiring and mechanical structures from view. However, the ceiling tiles 2300 can be readily removed from the grid support members 2111 to enable a person to gain access into the space between the ceiling tiles 2300 and the overhead building support structure for maintenance or the like.

Still referring to FIG. 15, a light module 2200 is illustrated coupled to one of the ceiling tiles 2300. The description and details of the light module 400 provided above with regard to FIG. 3 is applicable to the light module 2200 described below with reference to FIGS. 15-29B and thus will not be described again in the interest of brevity. Thus, the light module is denoted using the reference numeral 2200 in FIGS. 15-29B, but it should be appreciated that the description of the light module 400 above with reference to FIG. 3 is fully and equally applicable to the details of the light module 2200, including the specific structural details provided for the light module 400 and the possible alternatives and variations. In the exemplified embodiment, one of the light modules 2200 is illustrated coupled to every other one of the ceiling tiles 2300. However, the invention is not to be so limited in all embodiments. Rather, as many light modules 2200 as desired can be coupled to the various ceiling tiles 2300 (every ceiling tile 2300 may include one or more associated light modules 2200, every other ceiling tile 2300 may include one or more associated light modules 2200, or the like).

The ceiling tiles 2300 referred to in the present disclosure may be any type of ceiling tile that is conventionally used in drop ceiling applications. The specific possible materials for the ceiling tile 2300 and other structural details are the same as that which is provided above with regard to the ceiling tile 300 and thus will not be repeated herein in the interest of brevity. Thus, the ceiling tile 2300 may be any type of ceiling tile described above with reference to the ceiling tile 300. The ceiling tile 2300 may be square or rectangular as depicted in the exemplified embodiments, although the invention is not to be so limited in all embodiments and other shapes are possible to accomplish a desired ceiling aesthetic or for acoustic reasons.

Figure 16A:
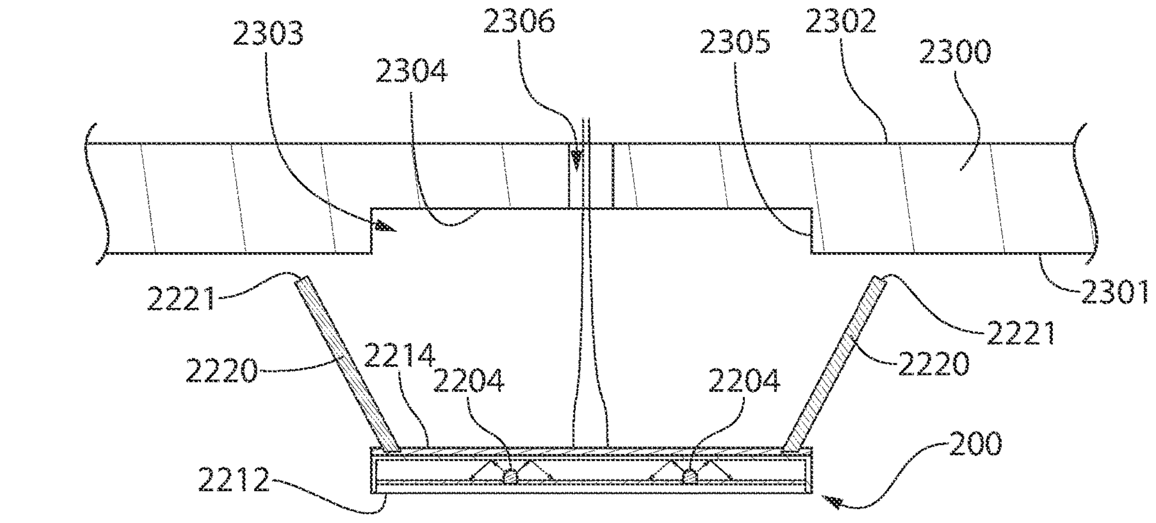
FIGS. 16A-16C are schematic views illustrating a process of coupling the light module to the ceiling tile in accordance with an embodiment of the present invention.
Figure 16B:
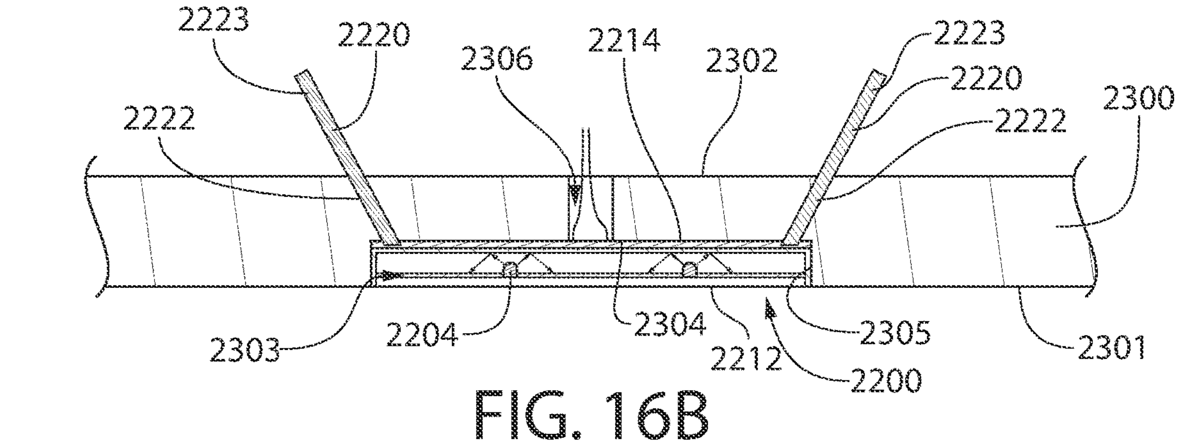
Figure 16C:
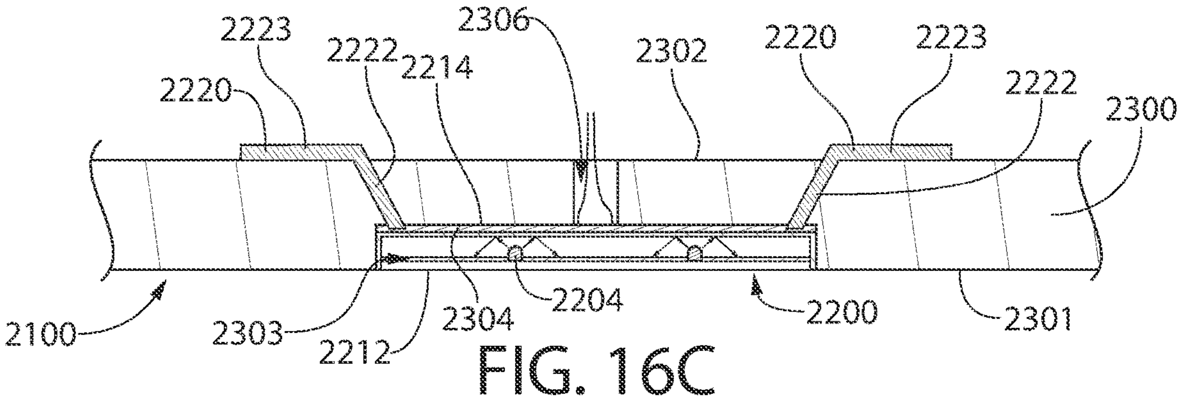

Referring to FIGS. 16A-16C, the process of coupling one of the light modules 2200 to one of the ceiling tiles 2300 and the resulting structure (i.e., integrated ceiling tile and lighting apparatus 2100) is illustrated in accordance with an embodiment of the present disclosure. The ceiling tile 2300 comprises a front surface 2301 that faces the interior space 2101 and an opposite rear surface 2302. Thus, the front surface 2301 of the ceiling tile 2300 may be referred to as an exposed surface of the ceiling tile 2300. The ceiling tile 2300 also comprises a pocket, recess, or cavity 2303 that is formed into the front surface 2301. In some embodiments, the cavity 2303 may be routed (i.e., formed with a router) or otherwise formed into the ceiling tile 2300 during manufacture/fabrication of the ceiling tile 2300. In other embodiments, the ceiling tile 2300 may be made from a mold in which the cavity 2303 is pre-formed in the mold. In still other embodiments, the cavity 2303 can be formed using other techniques either during fabrication of the ceiling tile 2300 or after by an end user.

The cavity 2303 can take on any shape, but preferably has a shape that corresponds with the shape of the light module 2200 which is to be disposed within the cavity 2303 as described below. Thus, the cavity may be circular/round, square, rectangular, or any other regular or irregular polygonal shape. In certain embodiments the cavity 2303 does not extend to an edge of the ceiling tile 2300 and thus the cavity 2303 is defined by a floor 2304 and a sidewall 2305 that bounds the entire circumference/periphery of the cavity 2303. Of course, the invention is not to be so limited in all embodiments and in certain other embodiments the cavity 2303 may extend to one or more edges of the ceiling tile 2300 such that the sidewall only partially surrounds/bounds the cavity 2303.

In addition to the cavity 2303, the ceiling tile 2300 may comprise an opening 2306 that extends from the rear surface 2302 of the ceiling tile 2300 to the floor 2304 of the cavity 2303 of the ceiling tile 2300. The opening 2306, when included, forms a passageway for electrical contacts, such as wires, of the light module 2200 to pass through for coupling with a power source (such as an AC power source located within the plenum between the ceiling tile 2300 and the overhead building support structure). In the exemplified embodiment wires are electrically coupled to the light module 2200 and power the light module when the wires are electrically coupled to a power source. The power source may be an AC power supply, an electrified grid support element that supports the ceiling tile 2300, or the like. Alternatively, the wires may be omitted and the light module 2200 may be powered by an internal power source such as batteries or the like.

The light module 2200 comprises a front surface 2212 (which may be a common light and heat emitting surface), an opposing rear surface 2214, an LED 2204 (or two LEDs 2204 as illustrated, or more than two LEDs 2204 in other embodiments), and the other components described above with reference to FIG. 3. Features of the light module 2200 may not be described herein but may be similarly numbered to the features of the light module 400 except that the 2200-series of numbers will be used instead of the 400-series of numbers.

The light module 2200 comprises a coupling element that facilities coupling the light module 2200 to the ceiling tile 2300. In this embodiment, the coupling element of the light module 2200 is first and second tab members 2220 extending from the rear surface 2214 of the light module 2200. In the exemplified embodiment, the first and second tab members 2220 extend from the rear surface 2214 of the light module 2200 at an oblique, and more specifically an obtuse angle relative to the rear surface 2214 of the light module 2200 such that the distance between the first and second tab members 2220 increases with distance from the rear surface 2214 of the light module 2200. Of course, other angles of extension of the first and second tab members 2200 are possible, one example of which will be described below with reference to FIGS. 17A-17C.

The first and second tab members 2220 may be formed of a metal, such as steel, copper, aluminum or the like. In certain embodiments the first and second tab members 2220 should be sufficiently bendable such that the metal can be bent to lock or otherwise fix the light module 2200 to the ceiling tile 2300. A person skilled in the art would be capable of selecting a proper gauge or thickness of the first and second tab members 2220 to achieve the necessary bending described herein while permitting the first and second tab members 2220 sufficient rigidity to pierce the ceiling tile 2300 during installation as described herein below and to couple the light module 2200 to the ceiling tile 2300. Alternatively, the first and second tab members 2220 may include a hinge to facilitate the necessary bending. The tab members 2220 are not limited to being formed of metal but can be formed of any other material so long as the functionality described herein below can be achieved. In the exemplified embodiment, each of the first and second tab members 2220 terminates in a distal end 2221 that is a flat and dull edge. However, the invention is not to be so limited in all embodiments and the distal ends 2221 of the tab members 2220 may be pointed or otherwise sharp edges to facilitate the coupling of the light module 2200 to the ceiling tile 2300 as described herein below.

When it is desired to couple the light module 2200 to the ceiling tile 2300, which may be done during fabrication at a factory or on location by an installer or other end-user, the light module 2200 is positioned into alignment with the cavity 2303 of the ceiling tile 2300. The light module 2200 is then translated towards the front surface 2301 of the ceiling tile 2300 until the distal ends 2221 of the tab members 2220 contact and pierce the front surface 2301 of the ceiling tile 2300. Forming the tab members 2220 out of a rigid material such as metal and with pointed distal ends 2221 enables the tab members 2220 to readily pierce the front surface 2301 of the ceiling tile 2300. The light module 2200 continues to be translated until the distal ends 2221 of the tab members 2220 pierce through and protrude beyond the rear surface 2302 of the ceiling tile 2300. In this position, in the exemplified embodiment the rear surface 2214 of the light module 2200 is in surface contact with the floor 2304 of the cavity 2303 and the front surface 2212 of the light module 2200 is flush with the front surface 2301 of the ceiling tile 2300. However, the invention is not to be so limited and in other embodiments the rear surface 2214 of the light module 2200 may be spaced from the floor 2304 of the cavity 2303 and/or the front surface 2212 of the light module 2200 may protrude beyond the front surface 2301 of the ceiling tile 2300 or may be recessed relative to the front surface 2301 of the ceiling tile 2300. When the light module 2200 is positioned within the cavity 2303 of the ceiling tile 2300, the electrical wires preferably extend through the opening 2306 for electrical coupling to a power source. Alternatively, the tab members 2220 can be electrically isolated from each other but electrically connected to the LEDs 2204 so that the tab members can serve as electrical contacts for powering the LED 2204 as well as serve as securing means, as further described below.

With the light module 2200 positioned within the cavity 2303 of the ceiling tile 2300, a first portion 2222 of the first and second tab members 2220 is positioned within the ceiling tile 2300 and a second portion 2223 of the first and second tab members 2220 protrudes from the rear surface 2302 of the ceiling tile 2300. After the light module 2200 is properly positioned in the desired location within the cavity 2303 of the ceiling tile 2300, the first and second tab members 2220 are bent by pressing the second portions 2223 of the first and second tab members 2220 downwardly towards the rear surface 2302 of the ceiling tile 2300. Proper torque will be achieved due to the first portions 2222 of the first and second tab members 2220 being trapped within the ceiling tile 2300 upon the application of a force to the second portions 2223 of the first and second tab members 2220. The second portions 2223 of the first and second tab members 2220 will be pressed downwardly preferably until they contact the rear surface 2302 of the ceiling tile 2300. As shown in FIG. 16C, bending the first and second tab members 2220 as described will result in securing the light module 2200 to the ceiling tile 2300 within the cavity 2303. It should be appreciated that although the use of a cavity for flush mounting the light module 2202 is described herein and may be desirable in certain embodiments to achieve a specific aesthetic, in certain other embodiments the coupling technique described with reference to FIGS. 16A-16C can be achieved without the cavity but instead with the rear surface 2214 of the light module 2200 positioned adjacent to or in contact with the front surface 2301 of the ceiling tile 2300.

Figure 17A:
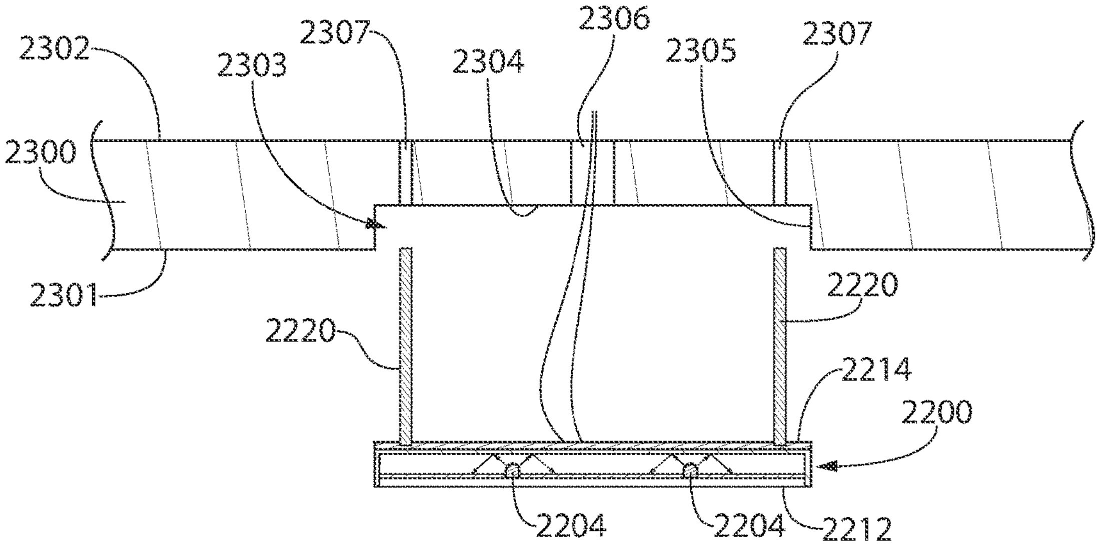
FIGS. 17A-17C are schematic views illustrating a process of coupling the light module to the ceiling tile in accordance with an embodiment of the present invention.
Figure 17B:
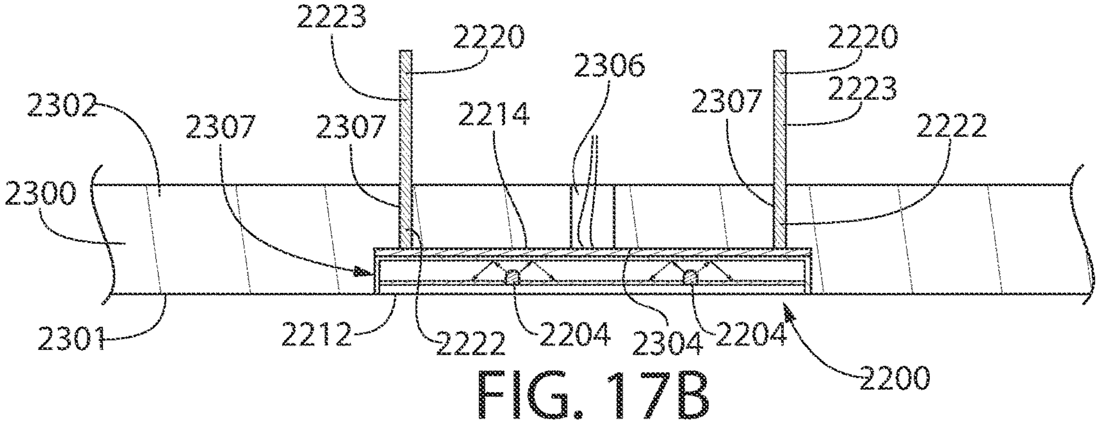
Figure 17C:
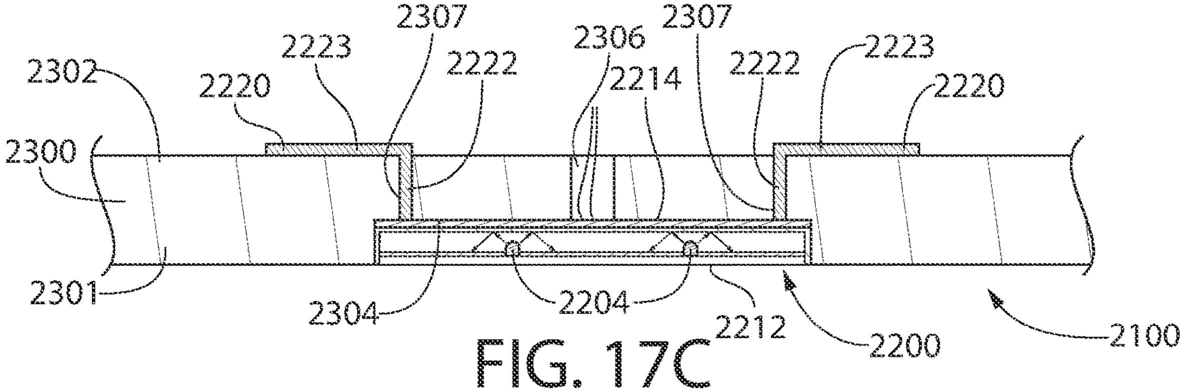

Referring now to FIGS. 17A-17C, the process of coupling one of the light modules 2200 to one of the ceiling tiles 2300 and the resulting structure (i.e., integrated ceiling tile and lighting apparatus 2100) is illustrated in accordance with another embodiment of the present disclosure. The process and structure exemplified in FIGS. 17A-17C is similar to the process and structure exemplified in FIGS. 16A-16C and described above except for the differences described herein below. Thus, the description of FIGS. 16A-16C is applicable and may assist in providing an adequate understanding of FIGS. 17A-17C.

In FIGS. 17A-17C, in addition to the cavity 2303 and the opening 2306, the ceiling tile 2300 comprises passageways or slots 2307 for receiving the first and second tab members 2220. Specifically, the ceiling tile 2300 comprises first and second slots 2307 that extend through the ceiling tile 2300 from the rear surface 2302 of the ceiling tile 2300 to the floor 2304 of the cavity 2303. The other difference in the embodiment of FIGS. 17A-17C relative to the embodiment of FIGS. 16A-16C is that the first and second tab members 2220 extend from the rear surface 2214 of the light module 2200 so as to be perpendicular to the rear surface 2214 of the light module 2200 (rather than at an obtuse angle).

As the light module 2200 is inserted into the cavity 2303 of the ceiling tile 2300, the first and second tab members 2220 will enter into the first and second slots 2307, and thus the first and second tab members 2220 need not pierce the ceiling tile 2300. Thus, the inclusion of the slots 2307 enables the ceiling tile 2300 to be made out of more rigid materials, such as metal, that would not be piercable by the first and second tab members 2220. The light module 2200 is inserted into the cavity 2303 and the first and second tab members 2220 are bent/folded in the same manner as described above in order to secure the light module 2200 to the ceiling tile 2300 within the cavity 2303.

Figure 18A:
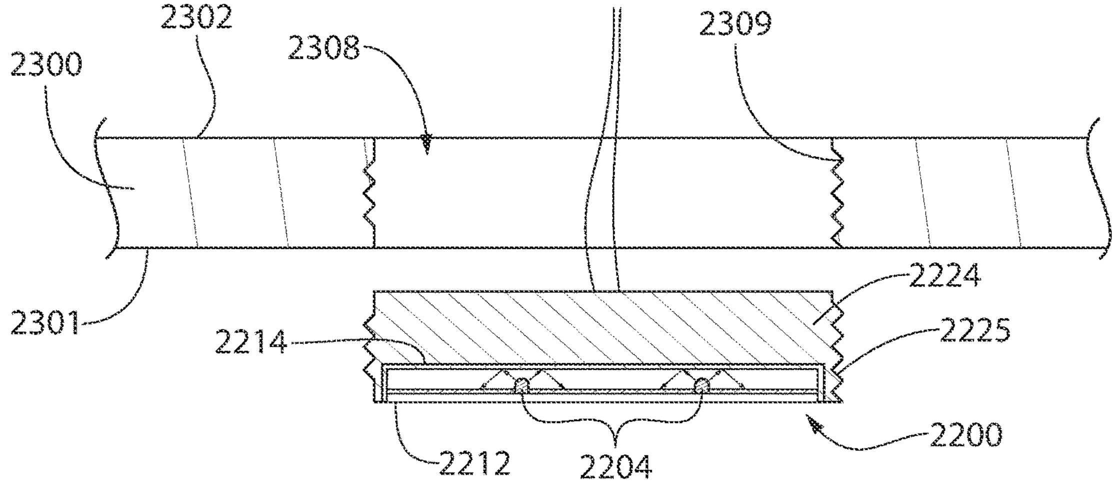
FIGS. 18A-18B are schematic views illustrating a process of coupling the light module to the ceiling tile in accordance with an embodiment of the present invention.
Figure 18B:
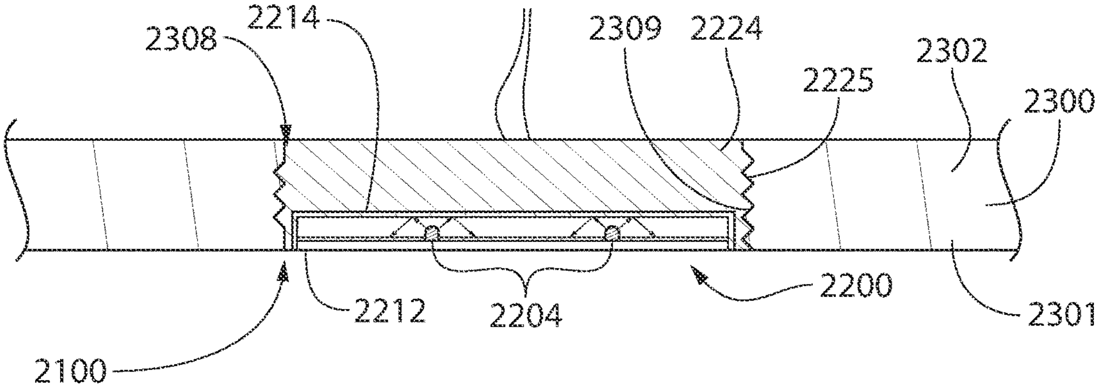

Referring now to FIGS. 18A-18B, the process of coupling one of the light modules 2200 to one of the ceiling tiles 2300 and the resulting structure (i.e., integrated ceiling tile and lighting apparatus 2100) is illustrated in accordance with an embodiment of the present disclosure. The general structure and concepts of the light module 2200 and of the ceiling tile 2300 are the same as that which has been described above, and thus features in FIGS. 18A-18B that are similar or identical to features in the previously described figures will be similarly numbered. If similar features are not described in detail with regard to FIGS. 18A-18B, it should be appreciated that the description set forth above is applicable. Furthermore, it should be appreciated that various combinations of the features described with reference to FIGS. 16A-18B are within the scope of the present disclosure.

In this embodiment, the light module 2200 is coupled to the ceiling tile 2300 via a threaded attachment. In that regard, the ceiling tile 2300 comprises a passageway or through-hole 2308 extending through the ceiling tile 2300 from the front surface 2301 to the rear surface 2302. Of course, the invention is not to be so limited in all embodiments and in certain other embodiments the through-hole 2308 may instead be a cavity with a floor, so long as the functionality described herein below is achieved. In the exemplified embodiment, the through-hole 2308 is defined or bounded by a sidewall 2309 that comprises threads that facilitate the threated attachment between the ceiling tile 2300 and the light module 2200.

The light module 2200 comprises the front surface 2212, the rear surface 2214, and the other components and structures described above. Furthermore, in this embodiment the light module 2200 is affixed to or comprises a housing 2224 comprising a threaded outer surface 2225. In the exemplified embodiment the light module 2200 is positioned within a recess of the housing 2224, but the light module 2200 may be coupled to the bottom surface of the housing 2224 in other embodiments. The light module 2200 is detachably coupled to the ceiling tile 2300 by screwing the light module 2200 into the through-hole 2308 such that the threads of the sidewall 2309 and the housing 2224 mate with one another. In the exemplified embodiment the front surface 2212 of the light module 2200 is flush with the front surface 2301 of the ceiling tile 2300 when the light module 2200 is coupled to the ceiling tile 2300, but the invention is not to be so limited in all embodiments. In other embodiments the front surface 2212 of the light module 2200 may protrude from or be recessed relative to the front surface 2301 of the ceiling tile 2300.

Furthermore, it should be appreciated that in this embodiment the light module 2200 (or the housing 2224) is round or circular to enable the light module 2200 to be screwed to the ceiling tile 2300. Moreover, the exemplified embodiment illustrates electrical wires coupled to the light module 2200 for powering the light module 2200 when the electrical wires are also coupled to an electrical power source. This can be achieved via direct coupling of the electric wires to an AC power supply, coupling of the electric wires to an electrified grid support element, or any other many described herein above. Furthermore, the light module 2200 may include an internal power source such as batteries in lieu of the electrical wires in other embodiments.

Figure 19A:
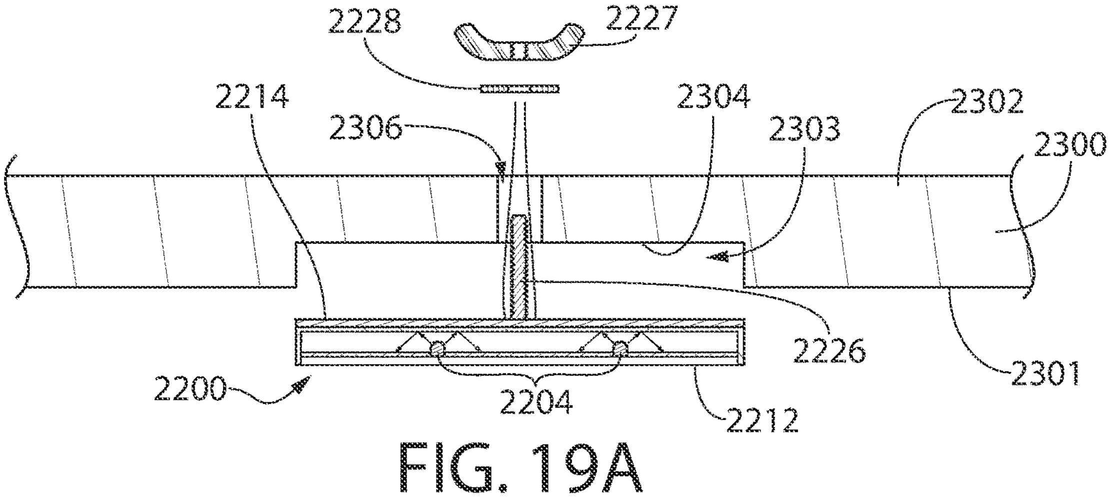
FIGS. 19A-19C are schematic views illustrating a process of coupling the light module to the ceiling tile in accordance with an embodiment of the present invention.
Figure 19B:
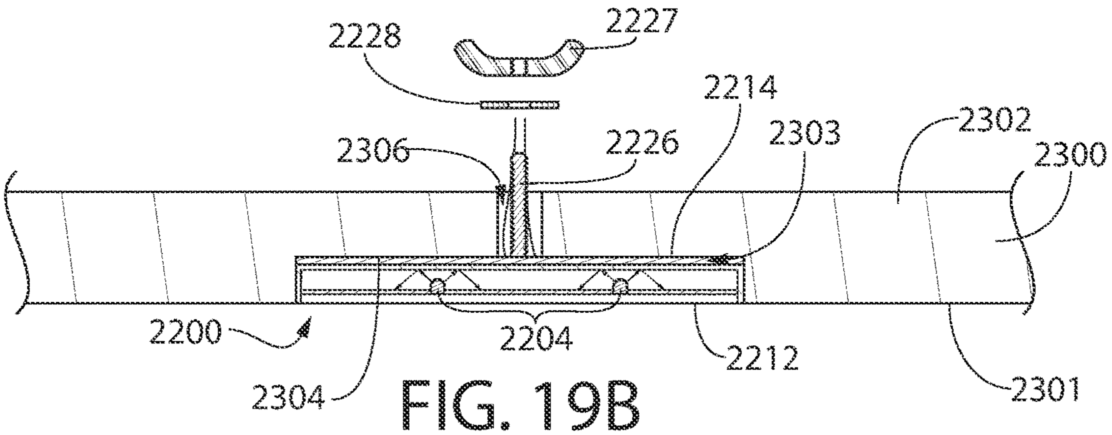
Figure 19C:
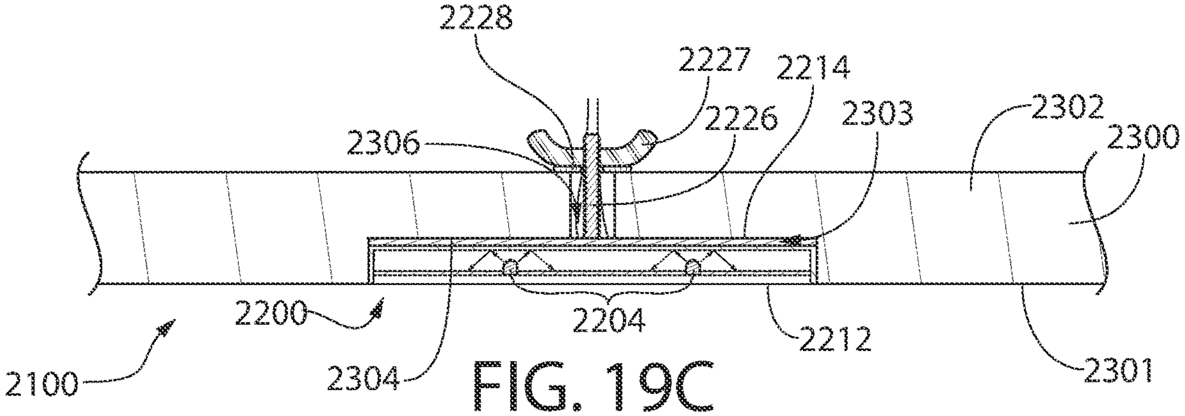

Referring now to FIGS. 19A-19C, the process of coupling one of the light modules 2200 to one of the ceiling tiles 2300 and the resulting structure (i.e., integrated ceiling tile and lighting apparatus 2100) is illustrated in accordance with an embodiment of the present disclosure. The general structure and concepts of the light module 2200 and of the ceiling tile 2300 are the same as that which has been described above, and thus features in FIGS. 19A-19C that are similar or identical to features in the previously described figures will be similarly numbered. If similar features are not described in detail with regard to FIGS. 19A-19C, it should be appreciated that the description set forth above is applicable. Furthermore, it should be appreciated that various combinations of the features described with reference to FIGS. 16A-19C are within the scope of the present disclosure.

In this embodiment, the ceiling tile 2300 comprises a cavity 2303 and a through-hole 2306 that are very similar if not identical to the same components of the embodiment of FIGS. 16A-16C. Furthermore, in the exemplified embodiment the light module 2200 comprises a threaded rod 2226 extending from its rear surface 2214. During installation of the light module 2200 into the ceiling tile 2300, the light module 2200 is aligned with the cavity 2303 and the threaded rod 2226 is aligned with the through-hole 2306. The light module 2200 is inserted into the cavity 2303 until the rear surface 2214 of the light module 2200 contacts a floor 2304 of the cavity 2303 and the threaded rod 2226 passes into and through the through-hole 2306. Once so inserted, the front surface 2212 of the light module 2200 may be flush with the front surface 2301 of the ceiling tile 2300 (or not in other embodiments as described herein above).

The threaded rod 2226 has a sufficient length so that when the light module 2200 is disposed within the cavity 2303, a portion of the threated rod 2226 protrudes beyond the rear surface 2302 of the ceiling tile 2300. In this embodiment a wing nut 2227 (although any other type of nut can be used, such as for example without limitation a hex nut, jam nut, cap nut, acorn nut, flange nut, tee nut, square nut, or the like) and a washer 2228 are provided for securing the light module 2200 to the ceiling tile 2300 (although the washer can be omitted in other embodiments). Thus, with the threaded rod 2226 protruding from the rear surface 2302 of the ceiling tile 2300, the washer 2228 and the wing nut 2227 may be twisted or screwed onto the threaded rod 2226 to securely couple the light module 2200 to the ceiling tile 2300.

Figure 20A:
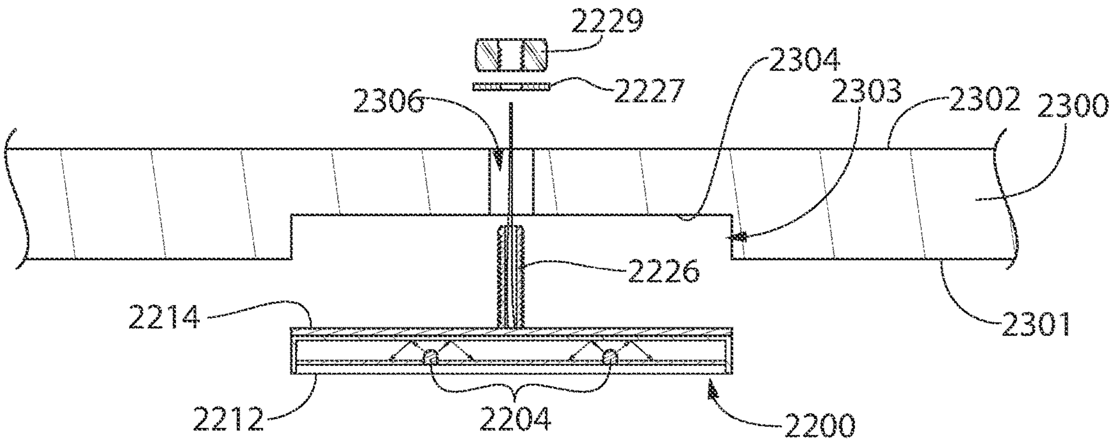
FIGS. 20A-20C are schematic views illustrating a process of coupling the light module to the ceiling tile in accordance with an embodiment of the present invention.
Figure 20B:
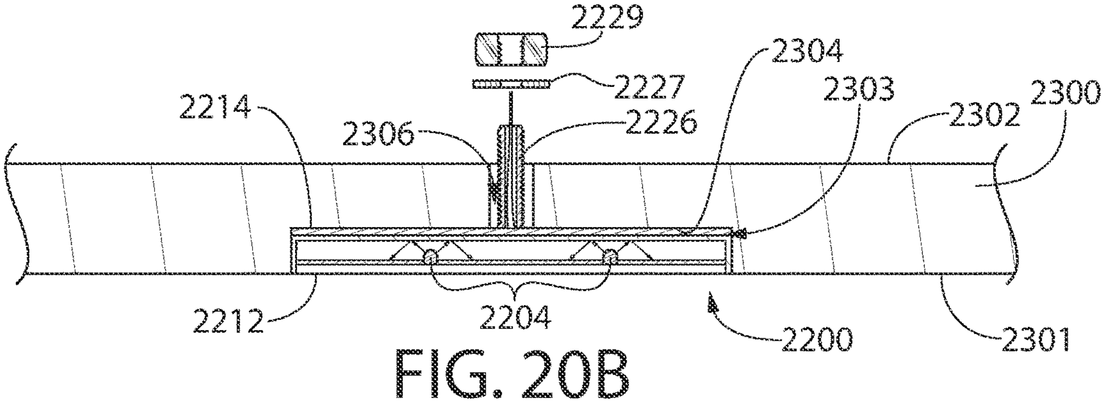
Figure 20C:
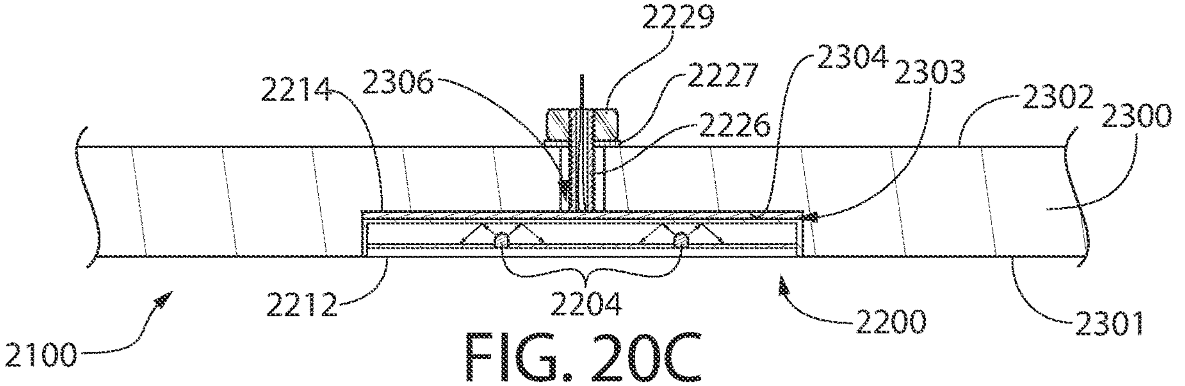

Referring now to FIGS. 20A-20C, the process of coupling one of the light modules 2200 to one of the ceiling tiles 2300 and the resulting structure (i.e., integrated ceiling tile and lighting apparatus 2100) is illustrated in accordance with an embodiment of the present disclosure. The general structure and concepts of the light module 2200 and of the ceiling tile 2300 are the same as that which has been described above, and thus features in FIGS. 20-20C that are similar or identical to features in the previously described figures will be similarly numbered. If similar features are not described in detail with regard to FIGS. 20A-20C, it should be appreciated that the description set forth above is applicable. Furthermore, it should be appreciated that various combinations of the features described with reference to FIGS. 16A-20C are within the scope of the present disclosure.

The embodiment of FIGS. 20A-20C is similar to the embodiment of FIGS. 19A-19C with the following modifications. First, in FIGS. 20A-20C the threaded rod 2226 is hollow so that a passageway extends through the threaded rod 2226. In this embodiment, electrical wires extend from the rear surface 2214 of the light module 2200 and through the hollow interior of the threaded rod 2226 for connection with a power source. Furthermore, in this embodiment the wing nut 2227 has been replaced with a hex nut 2229. The remainder of the description of FIGS. 19A-19C is applicable to the embodiment of FIGS. 20A-20C and will not be repeated herein in the interest of brevity.

Figure 21A:
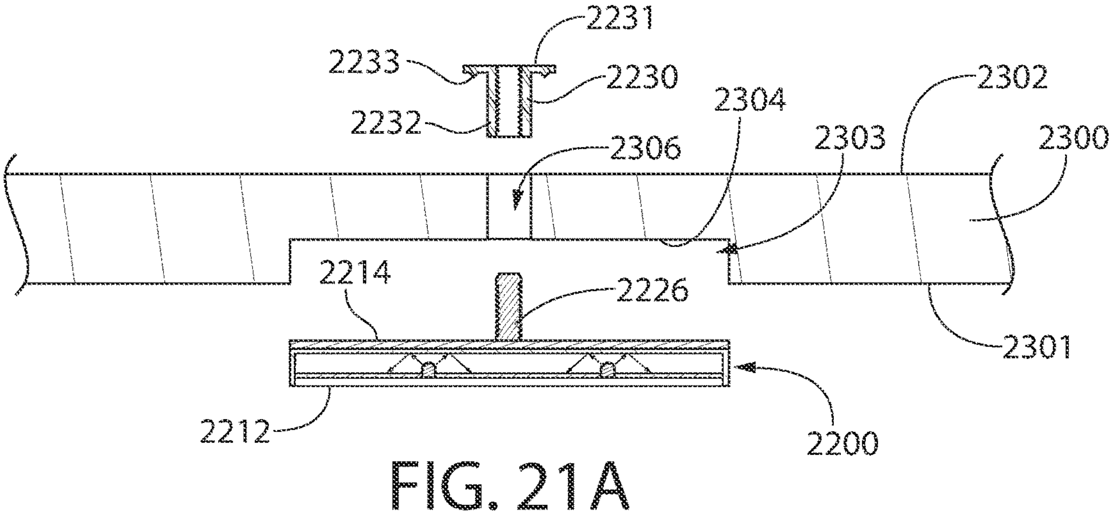
FIGS. 21A-21C are schematic views illustrating a process of coupling the light module to the ceiling tile in accordance with an embodiment of the present invention.
Figure 21B:
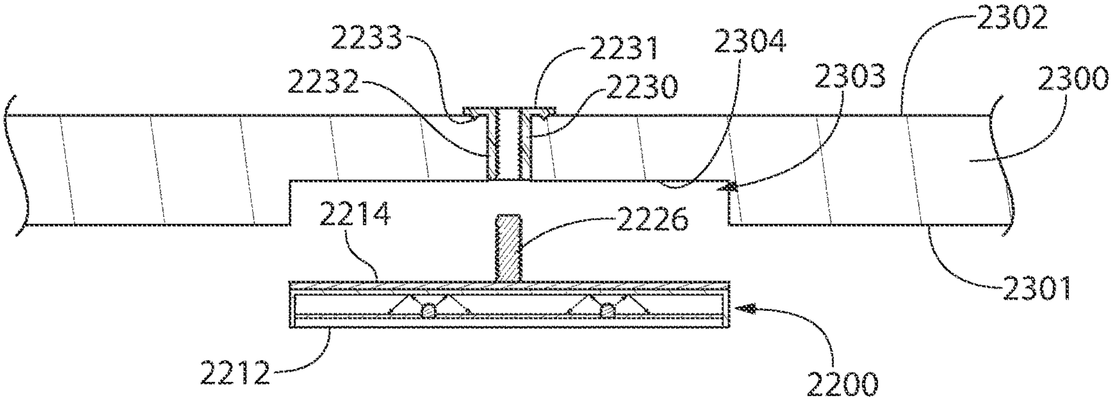
Figure 21C:
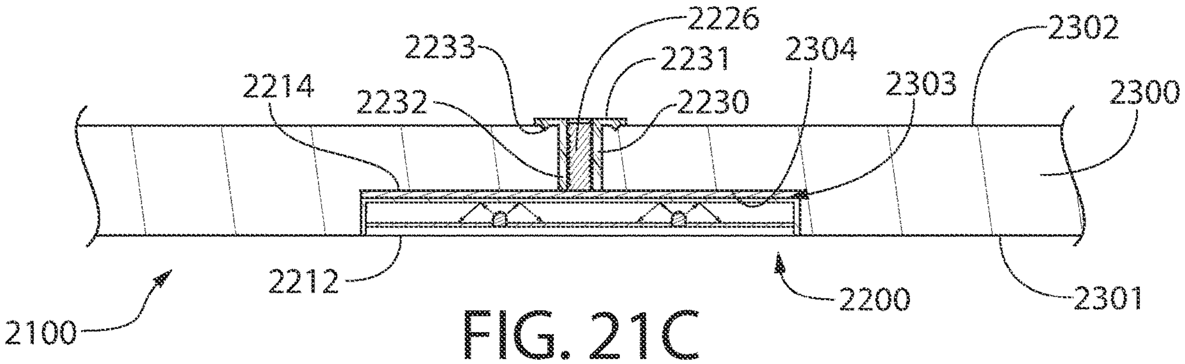

Referring now to FIGS. 21A-21C, the process of coupling one of the light modules 2200 to one of the ceiling tiles 2300 and the resulting structure (i.e., integrated ceiling tile and lighting apparatus 2100) is illustrated in accordance with an embodiment of the present disclosure. The general structure and concepts of the light module 2200 and of the ceiling tile 2300 are the same as that which has been described above, and thus features in FIGS. 21A-21C that are similar or identical to features in the previously described figures will be similarly numbered. If similar features are not described in detail with regard to FIGS. 21A-21C, it should be appreciated that the description set forth above is applicable. Furthermore, it should be appreciated that various combinations of the features described with reference to FIGS. 16A-21C are within the scope of the present disclosure.

The embodiment of FIGS. 21A-21C is similar to the embodiment of FIGS. 19A-19C with the following modifications. Specifically, the ceiling tile 2300 comprises a cavity 2303 and a through-hole 2306 and the light module 2200 comprises a threaded rod 2226. However, in this embodiment the wing nut has been replaced with a connector element 230. The connector element 2230 comprises a first connection feature 2231 for coupling the connector element 2230 to the ceiling tile 2300 and a second connection feature 2232 for coupling the connector element 2230 to the threaded rod 2226 of the light module 2200. In the exemplified embodiment the first connection feature 2231 forms a flange that extends horizontally from the second connection feature 2232. Furthermore, the first connection feature 2231 comprises a plurality of teeth 2233. The teeth 2233 can be any type of protuberance, barb, extension, tab, or the like that is configured to penetrate into the ceiling tile 2300 for coupling the connector element 2230 to the ceiling tile 2300. The second connection feature 2232 comprises threads that facilitate coupling of the connector element 2230 to the threaded rod 2226.

The first step in the installation process in this embodiment is to couple the connector element 2230 to the ceiling tile 2300. This is accomplished by inserting the second connection feature 2232 into the through-hole 2306 from the rear surface 2302 of the ceiling tile 2300 until the teeth 2232 of the first connection feature 2231 engage and penetrate the rear surface 2302 of the ceiling tile 2300. The second connection feature 2232 preferably has an outer diameter that is equal to or less than the diameter of the through-hole 2306 so that the threaded connector 2230 can be inserted into the through-hole. Once the teeth 2232 penetrate the rear surface 2302 of the ceiling tile 2300, the connector element 2230 is coupled to the ceiling tile 2300 and can not be separated therefrom without sufficient force being applied to overcome the engagement between the teeth 2232 and the ceiling tile 2300. Any number of teeth 2232 can be used, the more teeth 2232 used the greater the force required to separate the connector element 2230 from the ceiling tile 2300 once the two are coupled together as described herein above. Although teeth 2232 are used in the exemplary embodiment, in other embodiments the connector element 2230 may be coupled to the rear surface 2302 of the ceiling tile 2300 using adhesives, hook-and-loop fasteners, or the like.

After the connector element 2230 is coupled to the ceiling tile 2300, the light module 2200 is coupled to the second connection feature 2232 of the connector element 2230 by engaging the threads of the threaded rod 2226 with the threads of the second connection feature 232. In the exemplified embodiment the light module 2200 is screwed onto the connector element 2230 with a rotating motion. Of course, the invention is not to be so limited and techniques other than threaded engagement can be used to couple the light module 2200 to the connector element 2230 (and hence also to the ceiling tile 2300) in other embodiments. Specifically, different types of connectors may be coupled to the ceiling tile 2300 with a similar first connection feature 2231 as described herein, but with different second connection features that engage with different types of connection features of the light module 2200. For example, the light module 2200 may have an indent or tab instead of the threaded rod 2226 and the second connection feature 2232 may be a corresponding indent or tab for coupling the light module 2200 to the connector 2230. Corresponding magnets, hook-and-loop fasteners, interference fit, or the like can also be used to couple the light module 2200 to the connector element 2230 (i.e., to the second connection feature 2232). Thus, modifications to this embodiment are possible and within the scope of the present disclosure.

Figure 22A:
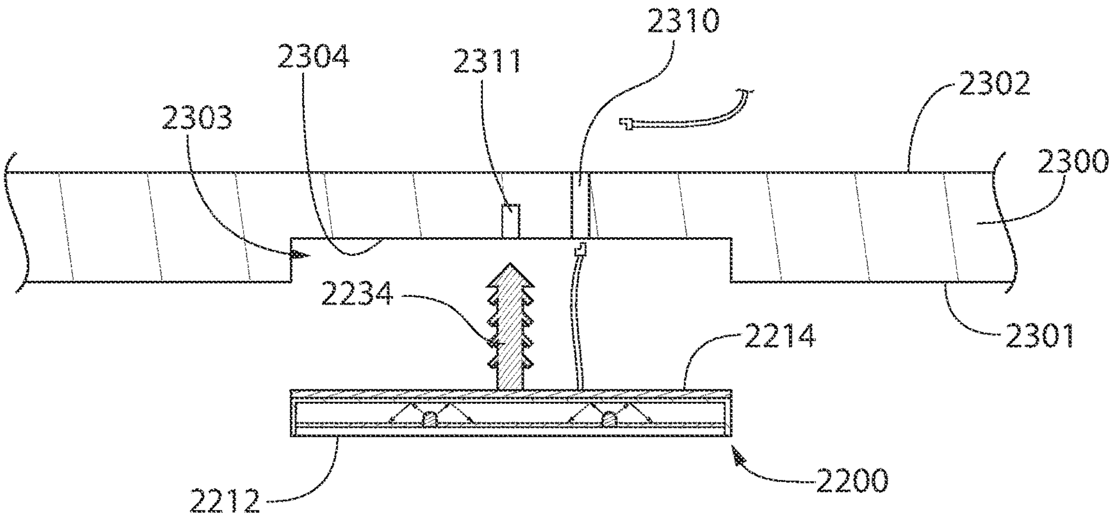
FIGS. 22A-22B are schematic views illustrating a process of coupling the light module to the ceiling tile in accordance with an embodiment of the present invention.
Figure 22B:
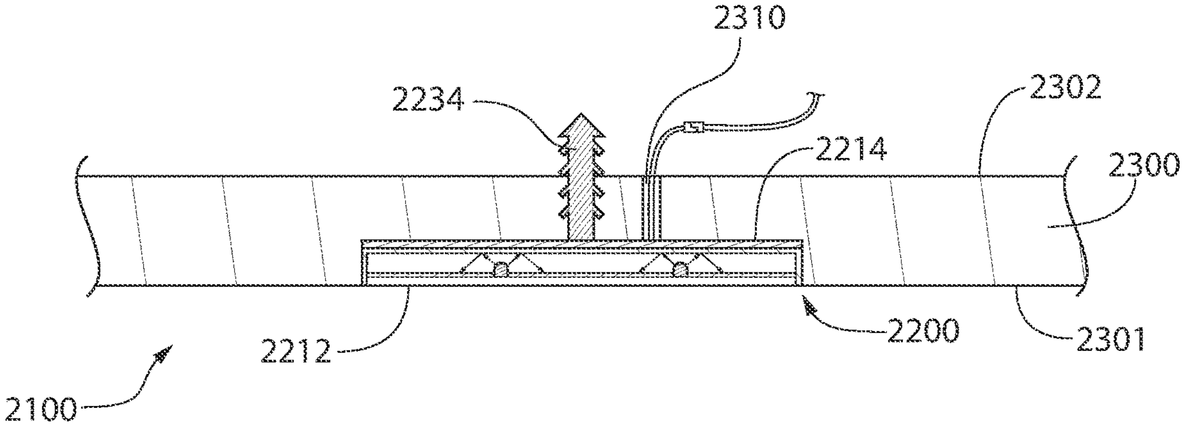

Referring now to FIGS. 22A-22B, the process of coupling one of the light modules 2200 to one of the ceiling tiles 2300 and the resulting structure (i.e., integrated ceiling tile and lighting apparatus 2100) is illustrated in accordance with an embodiment of the present disclosure. The general structure and concepts of the light module 2200 and of the ceiling tile 2300 are the same as that which has been described above, and thus features in FIGS. 22A-22B that are similar or identical to features in the previously described figures will be similarly numbered. If similar features are not described in detail with regard to FIGS. 22A-22B, it should be appreciated that the description set forth above is applicable. Furthermore, it should be appreciated that various combinations of the features described with reference to FIGS. 16A-22B are within the scope of the present disclosure.

In FIGS. 22A and 22B, the ceiling tile 2300 comprises a cavity 2303, a through-hole 2310 extending from a rear surface 2302 of the ceiling tile 2300 to a floor 2304 of the cavity 2303, and a centering hole 2311 extending from the floor 2304 of the cavity 2303 towards the rear surface 2302 of the ceiling tile 2300. In the exemplified embodiment the centering hole 2311 does not extend through the entire thickness of the ceiling tile 2300, although in other embodiments the centering hole 2311 could extend through to the rear surface 2302 of the ceiling tile 2300. In the exemplified embodiment the centering hole 2311 provides a visual location for a user to couple the light module 2200 to the ceiling tile 2300. In certain embodiments the centering hole 2311 may be replaced by a visual marking or indicia on the ceiling tile 2300. The through-hole 2310 is configured to receive electrical wires for providing power to the light module 2200 and may be omitted in some embodiments.

In this embodiment, the light module 2200 comprises a barbed pin 2234 extending from the rear surface 2214 of the light module 2200. Of course the barbed pin 2234 may be replaced by any of the other coupling elements described throughout this document in alternative embodiments. When it is desired to install the light module 2200 by coupling the light module 2200 to the ceiling tile 2300, the barbed pin 2234 is aligned with the centering hole 2311 and pressed into the centering hole 2311 until the barbed pin 2234 forms a hole through the ceiling tile 2300. Thus, in embodiments in which the centering hole 2311 does not extend through the entire thickness of the ceiling tile 2300, the barbed pin 2234 will be sufficiently rigid to create such a hole. Once the barbed pin 2234 is inserted through the ceiling tile 2300 as illustrated in FIG. 22B, the light module 2200 can not easily be separated from the ceiling tile 2300 due to the structure of the barbed pin 2234 (i.e., the barbs of the barbed pin 2234 retain the light module 2200 in position within the cavity 2303 by penetrating through the material of the ceiling tile 2300).

In the exemplified embodiment, a wire extends from and is coupled to the light module 2200. The wire extends through the through-hole 2310 and is connected to another wire that is coupled to a power supply. The wire may alternatively extend through a passageway formed into the barbed pin 2234 such that the through-hole 2310 may be omitted. The wire of the light module 2200 may be coupled to the other wire via a quick disconnect technique or otherwise. Of course, other techniques for supplying power to the light module 2200 are possible within the scope of this disclosure as set forth herein above and as would be understood by those skilled in this art.

Figure 23A:
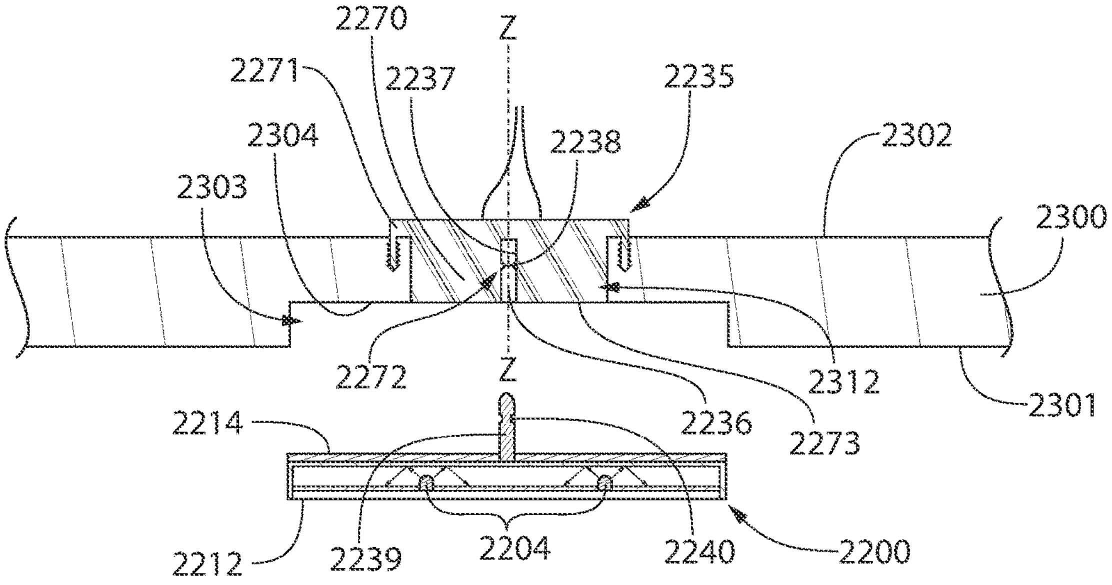
FIGS. 23A-23B are schematic views illustrating a process of coupling the light module to the ceiling tile in accordance with an embodiment of the present invention.
Figure 23B:
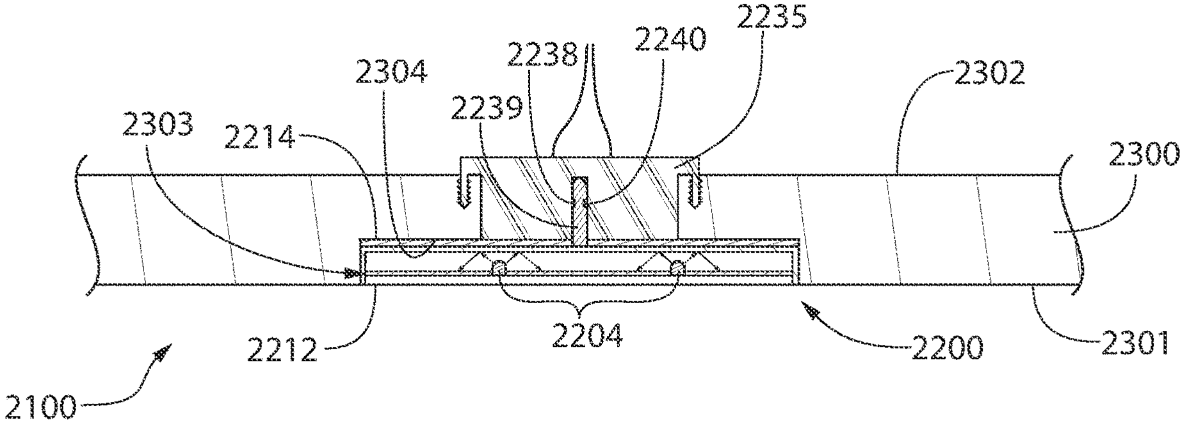

Referring now to FIGS. 23A-23B, the process of coupling one of the light modules 2200 to one of the ceiling tiles 2300 and the resulting structure (i.e., integrated ceiling tile and lighting apparatus 2100) is illustrated in accordance with an embodiment of the present disclosure. The general structure and concepts of the light module 2200 and of the ceiling tile 2300 are the same as that which has been described above, and thus features in FIGS. 23A-23B that are similar or identical to features in the previously described figures will be similarly numbered. If similar features are not described in detail with regard to FIGS. 23A-23B, it should be appreciated that the description set forth above is applicable. Furthermore, it should be appreciated that various combinations of the features described with reference to FIGS. 16A-23B are within the scope of the present disclosure.

In this embodiment, the ceiling tile 2300 comprises the front surface 2301, the rear surface 2302, the cavity 2303 having the floor 2304, and a through-hole or passageway 2312 extending about an axis Z-Z from the floor 2304 of the cavity 2303 to the rear surface 2302 of the ceiling tile 2300. Furthermore, in this embodiment a mounting structure 2235 that is a separate component from both the ceiling tile 2300 and from the light module 2200 is used for coupling the light module 2200 to the ceiling tile 2300. The mounting structure 2235 is detachably coupled to the ceiling tile 2300 such that a first axial force in a direction away from the rear surface 2302 of the ceiling tile 2300 is required to separate the mounting structure 2235 from the ceiling tile 2300. In the exemplified embodiment, a bottom surface 2273 of the mounting structure 2235 is flush with the floor 2304 of the cavity 2303 of the ceiling tile 2300, although the invention is not to be so limited in all embodiments. The cavity 2303 may be omitted as has been discussed with the previous embodiments.

In the exemplified embodiment, the mounting structure 2235 comprises a first portion 2270 that is coupled to the rear surface 2302 of the ceiling tile 2300 and a second portion 2371 that is positioned within the passageway 2312 of the ceiling tile 2300. The first portion 2270 of the mounting structure 2235 comprises a flange that rests or abuts against the rear surface 2302 of the ceiling tile 2300 and one or more teeth, barbs, or the like that penetrate into the rear surface 2302 of the ceiling tile 2300 to detachably couple the mounting structure 2235 to the ceiling tile 2300. The first axial force noted above is required to separate the mounting structure 2235 from the ceiling tile 2300 once it is detachably coupled thereto. Thus, when the mounting structure 2235 is properly positioned and coupled to the ceiling tile 2300, the flange of the first portion 2270 of the mounting structure 2235 is adjacent the rear surface 2302 of the ceiling tile 2300 and the second portion 2371 of the mounting structure 2231 is positioned within the passageway 2312.

The mounting structure 2235, and more specifically the second portion 2270 of the mounting structure 2235, comprises a coupling feature 2272. Furthermore, the light module 2200 comprises a front surface 2212 and a rear surface 2214. The light module 2200 comprises a coupling element 2239 extending from the rear surface 2214. In the exemplified embodiment, the coupling element 2239 comprises a rounded distal end. The light module 2200 can be detachably coupled to the second portion 2371 of the mounting structure 2231 via cooperative mating between the coupling feature 2272 of the mounting structure 2235 and the coupling element 2239 of the light module 2200 to indirectly couple the light module 2200 to the ceiling tile 2300.

More specifically, in the exemplified embodiment the coupling element 2239 of the light module 2200 is a protrusion that extends from the rear surface 2214 of the light module 2200. The coupling element 2239 comprises a coupling feature 2240, which in the exemplified embodiment is an annular groove formed into the coupling element 2239. Of course, the invention is not to be so limited in all embodiments and the coupling feature 2240 may be a protuberance instead of a groove in other embodiments. The coupling feature 2272 of the mounting structure 2235 comprises a connection socket 2236 having an inner surface 2237 with a protuberance 2238 extending therefrom. Of course, the invention is not to be so limited and the protuberance 2238 may be replaced with a groove in other embodiments so long as the protuberance/groove 2238 can cooperatively mate with the protuberance/groove 2240 of the coupling element 2239 of the light module 2200.

The light module 2200 is coupled to the mounting structure 2235 by inserting the coupling element/protrusion 2239 into the connection socket 2236 of the mounting structure 223. As the coupling element 2239 is inserted into the connection socket 2236, the distal end of the coupling element 2239 will pass the protuberance 2238 of the connection socket 2236 until the protuberance 2238 snap-fits into the groove 2238. Thus, when the light module 2200 is coupled to the mounting structure 2235, the protuberance 2238 extending from the inner surface 2237 of the second portion 2270 of the mounting structure 2235 enters into the groove (acting as the coupling feature 2240) of the coupling element 2239 of the light module 2200. Of course, as noted above the groove/protuberances can be swapped so that the groove is associated with the mounting structure 2235 and the protuberance is associated with the light module 220. Furthermore, other alternative techniques for coupling the light module 2200 to the mounting structure 2235, including those described with reference to other embodiments in this document and others not described herein, may be used. The engagement between the protuberance(s) 2238 of the mounting structure 2235 and the groove 2240 of the coupling element 2239 of the light module 2200 facilitate the coupling between the light module 2200 and the mounting structure 2235 and also the coupling of the light module 2200 to the ceiling tile 2300.

In the exemplified embodiment, the light module 2200 is coupled to the mounting structure 2235 by translating the light module 2200 towards the front surface 2301 of the ceiling tile 2300 until the protuberance of the light module 2200 enters into the socket 2236 of the mounting structure 2235. Thus, the light module 2200 is translated in the direction of the axis Z-Z. A second axial force is required to adequately couple the light module 2200 to the mounting structure 2235. Specifically, the second axial force is the amount of force required to facilitate the cooperative mating between the coupling elements 2238, 2239 of the light module 2200 and the mounting structure 2235. The second axial force may be less than the first axial force so that as the light module 2200 is engaging the mounting structure 2235, less force is required to couple the light module 2200 to the mounting structure 2235 than the force that would be required to separate the mounting structure 2235 from the ceiling tile 2300. This ensures that the mounting structure 2235 remains coupled to the ceiling tile 2300 during the coupling of the light module 2200 to the mounting structure 2235. The light module 2200 may be repetitively or repeatedly coupled to and decoupled from the mounting structure 2235 to permit replacement of the light module 2200 as desired or needed while the mounting structure 2235 remains coupled to the ceiling tile 2300.

In the exemplified embodiment, when the light module 2200 is coupled to the ceiling tile 2300, the front surface 2212 of the light module 2200 is flush with the front surface 2301 of the ceiling tile 2300. However, as described above the invention is not to be so limited and the light module 2214 may protrude from or be recessed relative to the front surface 2301 of the ceiling tile 2300 in other embodiments. Furthermore, in the exemplified embodiment wires extend from the mounting structure 2235 to a power supply for powering the mounting structure 2235. In that regard, the coupling element 2239 may be electrically conductive so that upon coupling the light module 2200 to the connector 2235, the light module 2200 will be electrically powered. Of course, the invention is not to be so limited in all embodiments and any of the techniques for powering the light module 2200 described herein above can be used in this embodiment. Furthermore, although in the exemplified embodiment a separate mounting structure 2235 is used for coupling the light module 2200, the mounting structure 2235 may be omitted and the ceiling tile 2300 may comprise the connection socket 2236 and protuberances 2238 for mating with the coupling element 2239 of the light module 2200 directly in some embodiments.

In certain embodiments the integrated ceiling and light system 2100 comprises the ceiling tile 2300, the mounting structure 2235 detachably coupled to the ceiling tile 2300, and the light module 2200 detachably coupled to the mounting structure 2235. In certain embodiments a first axial force is required to separate the mounting structure 2235 from the ceiling tile 2300 and a second axial force is required to couple the light module 2200 to the mounting structure 2235, the second axial force being less than the first axial force. This may be the case regardless of the exact structure of the mounting structure 2235 and the light module 2200 and the specific manner in which these two components are coupled together. The description of FIGS. 23A and 23B is merely one exemplary embodiment that utilizes this concept, but variations are possible and within the scope of the present disclosure.

Figure 24A:
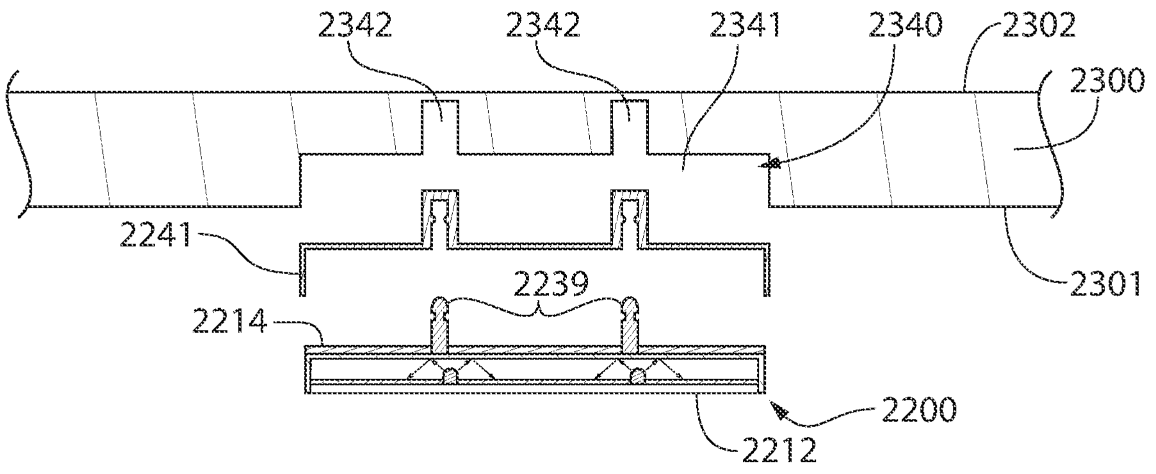
FIGS. 24A-24C are schematic views illustrating a process of coupling the light module to the ceiling tile in accordance with an embodiment of the present invention.
Figure 24B:
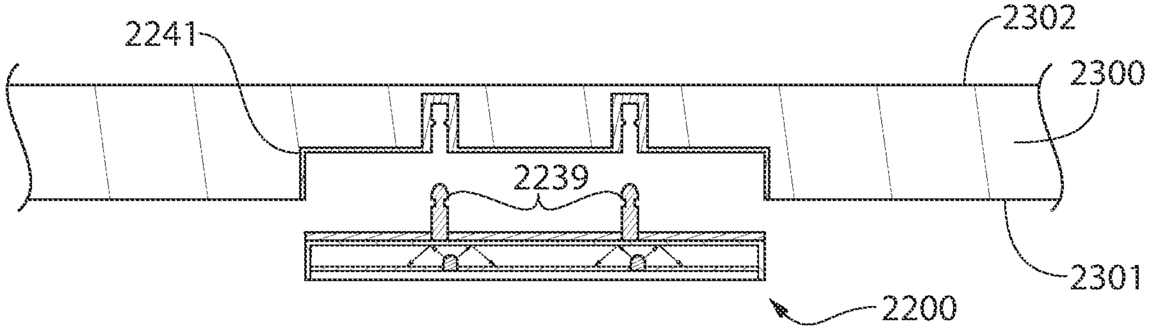
Figure 24C:
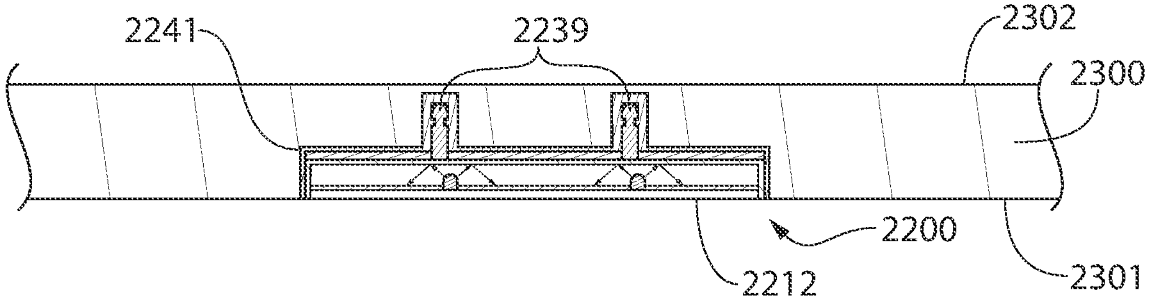

Referring now to FIGS. 24A-24C, the process of coupling one of the light modules 2200 to one of the ceiling tiles 2300 and the resulting structure (i.e., integrated ceiling tile and lighting apparatus 2100) is illustrated in accordance with an embodiment of the present disclosure. The general structure and concepts of the light module 2200 and of the ceiling tile 2300 are the same as that which has been described above with regard to FIGS. 23A and 23B, and thus features in FIGS. 24A-24C that are similar or identical to features in the previously described figures will be similarly numbered. If similar features are not described in detail with regard to FIGS. 24A-24C, it should be appreciated that the description set forth above is applicable. Furthermore, it should be appreciated that various combinations of the features described with reference to FIGS. 16A-24C are within the scope of the present disclosure.

In FIGS. 24A-24C, the ceiling tile 2300 comprises a cavity 2340 that has a different configuration than the previously described cavities 2303. Specifically, the cavity 2340 comprises a main portion 2341 for receiving the light module 2200 and a socket portion 2342 for receiving coupling element(s) 2239 of the light module 2200 (the coupling elements(s) 2239 of FIGS. 24A-24C being identical in structure to the coupling element 2239 of FIGS. 23A-23B described above, although the invention is not to be particularly limited thereby in all embodiments). Furthermore, in the exemplified embodiment a separate mounting structure 2241 is provided for insertion into the cavity 2340 to facilitate coupling of the light module 2200 to the ceiling tile 2300.

During use, the mounting structure 2241 is first coupled to the ceiling tile 2300 using any of the techniques described herein (adhesive, tight fit, interference fit, fasteners, or the like), and then the light module 2200 is coupled to the mounting structure 2241 (and also to the ceiling tile 2300) in the same manner as was described above with reference to FIGS. 23A-23B. Specifically, the light module 2200 comprises one or more coupling elements 2239 that are received within sockets of the mounting structure 2241, and a tab/indent mating between the coupling elements 2239 and the sockets achieves the coupling of the light module 2200 to the mounting structure 2241 and to the ceiling tile 2300.

Figure 25A:
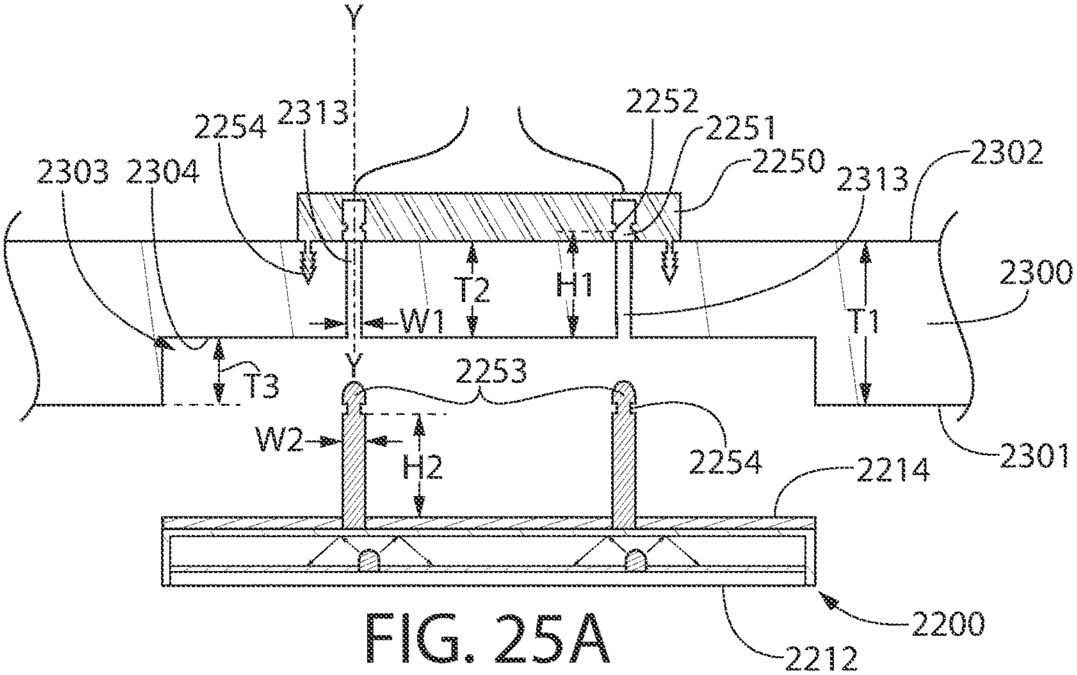
FIGS. 25A-25C are schematic views illustrating a process of coupling the light module to the ceiling tile in accordance with an embodiment of the present invention.
Figure 25B:
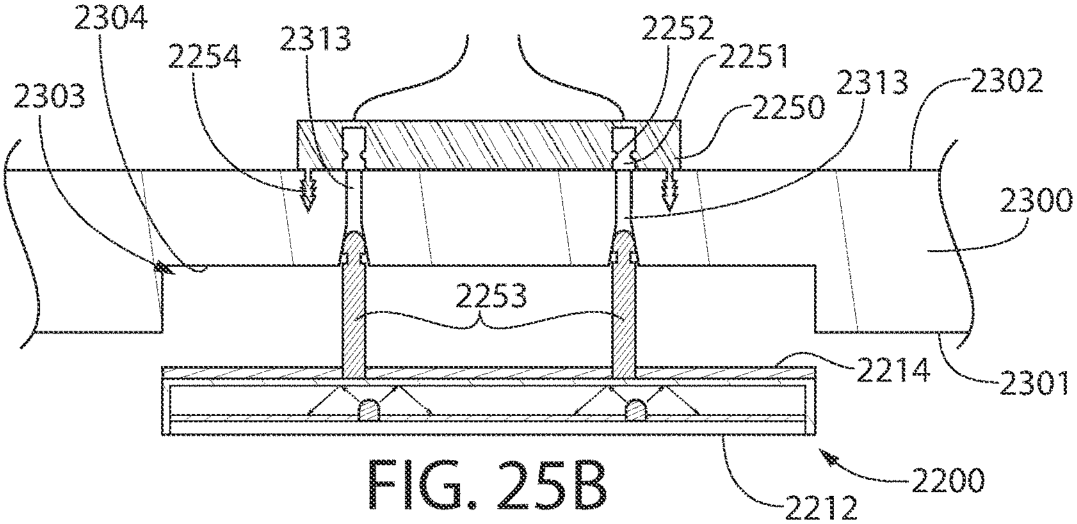
Figure 25C:
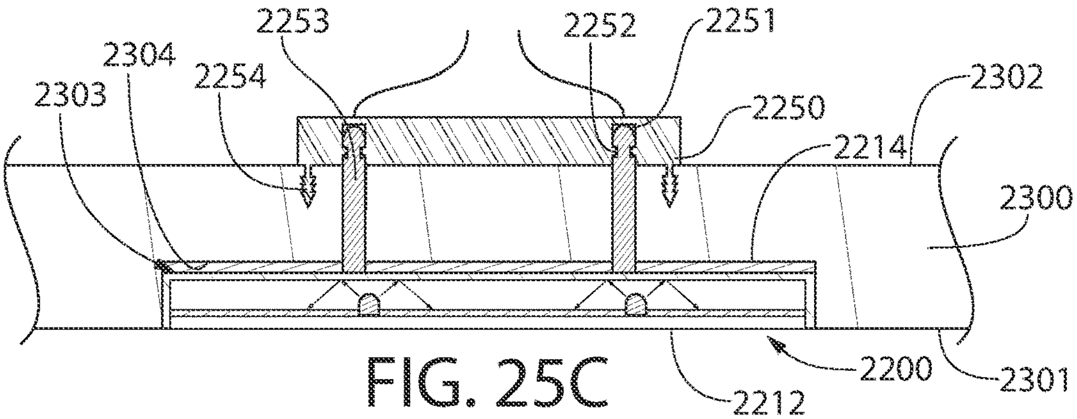

Referring now to FIGS. 25A-25C, the process of coupling one of the light modules 2200 to one of the ceiling tiles 2300 and the resulting structure (i.e., integrated ceiling tile and lighting apparatus 2100) is illustrated in accordance with an embodiment of the present disclosure. The general structure and concepts of the light module 2200 and of the ceiling tile 2300 are the same as that which has been described above, and thus features in FIGS. 25A-25C that are similar or identical to features in the previously described figures will be similarly numbered. If similar features are not described in detail with regard to FIGS. 25A-25C, it should be appreciated that the description set forth above is applicable. Furthermore, it should be appreciated that various combinations of the features described with reference to FIGS. 16A-25C are within the scope of the present disclosure.

In this embodiment, the ceiling tile 2300 comprises a front surface 2301, a rear surface 2303, a cavity 2303 having a floor 2304, and one or more passageways 2313 extending through the ceiling tile 2300 along an axis Y-Y from the rear surface 2303 to the floor 2304 of the cavity 2303. A mounting structure 2250 comprising mounting sockets 2251 is coupled to the rear surface 2302 of the ceiling tile 2300. More specifically, the mounting structure 2250 in the exemplified embodiment comprises barbed pins that penetrate the rear surface 2302 of the ceiling tile 2300 to couple the mounting structure 2250 to the ceiling tile 2300. However, the invention is not to be so limited and other techniques, including any of the techniques described herein and any others, can be used to couple the mounting structure 2250 to the ceiling tile 2300. The mounting structure 2250 is coupled to the rear surface 2302 of the ceiling tile 2300 so that the mounting sockets 2251 of the mounting structure 2250 are aligned with the passageways 2313 in the ceiling tile 2301.

The mounting sockets 2251 comprise a first coupling feature 2252, which in the exemplified embodiment is a protuberance (which may be an annular protuberance) extending outwardly from a sidewall of the mounting socket 2251 for facilitating the coupling the light module 2200 thereto. The light module 2200 comprises the front surface 2212 and the opposing rear surface 2214 and a coupling element 2253 extending from the rear surface 2214. The coupling element 2253 may comprise a rounded distal end and a coupling feature 2254, which in the exemplified embodiment is an indented portion or groove that mates with the first coupling feature 2252 of the receiving sockets 2251 to couple the light module 2200 to the mounting structure 2250. Although described herein with the protuberance on the mounting structure 2250 and the groove on the light module 2200 coupling element 2253, the invention is not to be so limited and the protuberance may be associated with the light module 2200 and the groove may associated with the mounting structure 2250. Regardless, the coupling element 2253 and coupling feature 2254 of the light module 2200 cooperatively mate with the mounting socket 2251 and the coupling element 2252 of the mounting structure 2250 to detachably couple the light module 2200 directly to the mounting structure 2250 and indirectly to the ceiling tile 2200.

In this embodiment, the ceiling tile 2300 is comprised of or formed from a compressible material, such as a rubber material, a foam material, or other elastic-type material. The ceiling tile 2300 in this embodiment may be formed of any material that permits the ceiling tile 2300 to have some degree of compressibility such that when the material is compressed is responds with a decompression force. Thus, as can be seen in FIG. 25B, the coupling element 2253 of the light module 2200 may have a width W2 that is greater than a diameter or width W1 of the passageways 2313 so that during insertion of the coupling element 2253 into the passageways 2313, the ceiling tile 2300 compresses to create sufficient space for the coupling element 2253. As the coupling element 2253 are fully inserted into the passageways 2313, the indents of the coupling element 2253 and the protuberances 2252 of the mounting structure 2250 will snap-fit together to retain the light module 2200 in place. Furthermore, because the passageways 2313 have a smaller diameter than the width of the coupling element 2253, the ceiling tile 2300 will squeeze/compress against the coupling element 2253, which will prevent rattling and selective movement of the light module 2200 during seismic activity.

Stated another way, due to the difference in the widths W1, W2 of the passageway 2313 and the coupling element 2253 of the light module 2200, as the coupling element 2253 is inserted into the passageway 2313, the material of the ceiling tile 2300 compresses away from the axis Y-Y of the passageway 2313 to enable the coupling element 2253 of the light module 2250 to fit within the passageway 2313 of the ceiling tile 2300. The material of the ceiling tile 2300 then applies a decompression force in a direction towards the axis Y-Y of the passageway 2313 onto the coupling element 2253 to secure the light module 2200 to the ceiling tile 2300. In certain embodiments as has been described above, when the light module 2200 is coupled to the ceiling tile 2300, the rear surface 2214 of the light module 2200 is in surface contact with the floor 2304 of the cavity 2303 and the front surface 2212 of the light module 2200 is flush with the front surface 2301 of the ceiling tile 2300, although this is not required in all embodiments. In certain embodiments the front surface 2212 of the light module 2200 may be a common light and heat emitting surface of the light module 2200.

In one embodiment, the ceiling tile 2300 may have a first thickness T1 measured from the front surface 2301 to the rear surface 2302, a second thickness T2 measured from the floor 2304 of the cavity 2303 to the rear surface 2302 of the ceiling tile 2300, and the cavity 2303 may comprise a third thickness T3 measured from the front surface 2301 of the ceiling tile 2300 to the floor 2304 of the cavity 2303. A first height H1 may be measured from the floor 2304 of the cavity 2303 to the coupling feature 2252 of the mounting socket 2251. Furthermore, the light module 2200 may have a fourth thickness T4 measured from the front surface 2212 to the rear surface 2214 and a second height H2 measured from the rear surface 2214 of the light module 2200 to the coupling feature 2254 of the coupling element 2253.

In one embodiment, the fourth thickness T4 may be greater than the third thickness T3 such that the thickness of the light module 2200 is greater than the thickness of the cavity 2303. Furthermore, the first height H1 may be greater than the second height H2. However, during insertion of the light module 2200 into the cavity 2303 and due to the compressibility of the ceiling tile 2300, the ceiling tile 2300 will compress upwardly until the protuberances 2252 are mated with the grooves 2254 of the coupling elements 2253. In this embodiment, a portion of the ceiling tile 2300 located between the floor 2304 of the cavity 2303 and the rear surface 2302 of the ceiling tile 2300 is compressed between the rear surface 2214 of the light module 2200 and a bottom surface of the mounting structure 2250 that is in contact with the rear surface 2302 of the ceiling tile 2300. Due to the compression of the ceiling tile 2300 and the difference between H1 and H2, the light module 2200 will sit within the cavity 2303 so that the front surface 2212 of the light module 2214 is flush with the front surface 2301 of the ceiling tile 2300. Furthermore, this will create a snug fit between the ceiling tile 2300 and the light module 2200 to prevent movement and rattling during seismic activity or the like.

Figure 26A:
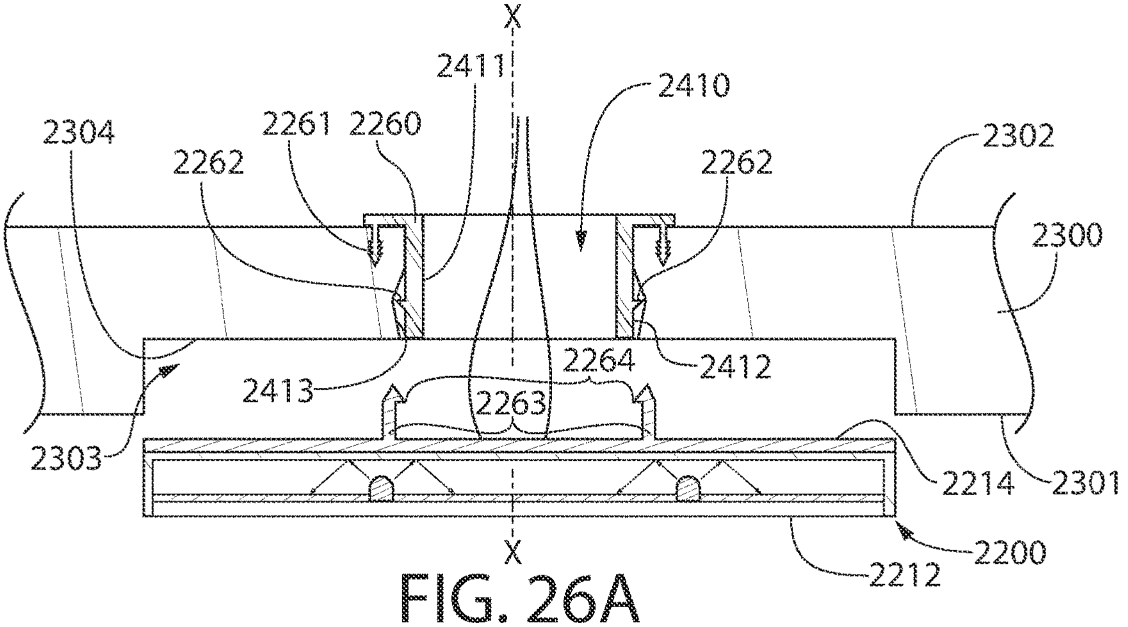
FIGS. 26A-26C are schematic views illustrating a process of coupling the light module to the ceiling tile in accordance with an embodiment of the present invention.
Figure 26B:
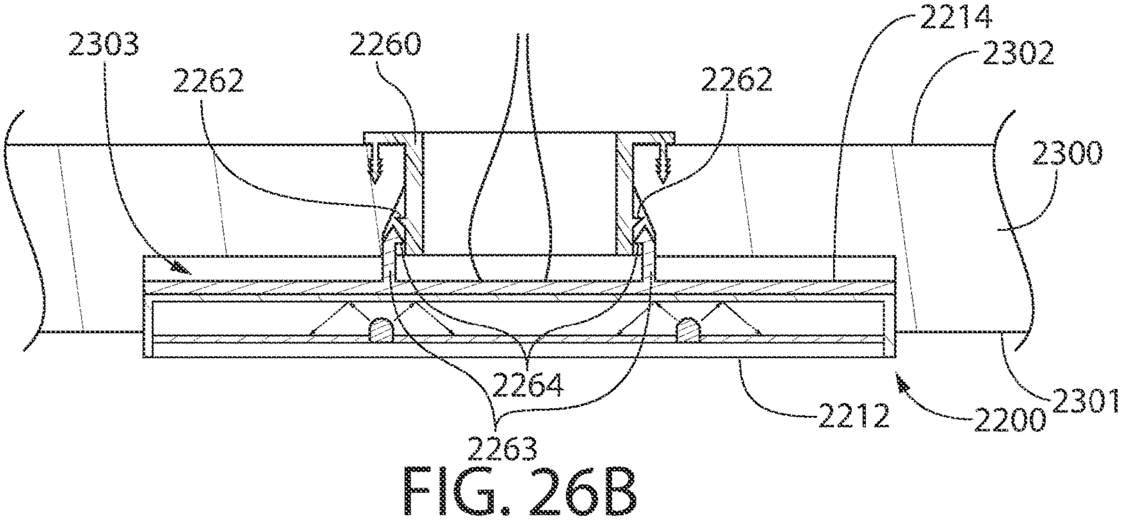
Figure 26C:
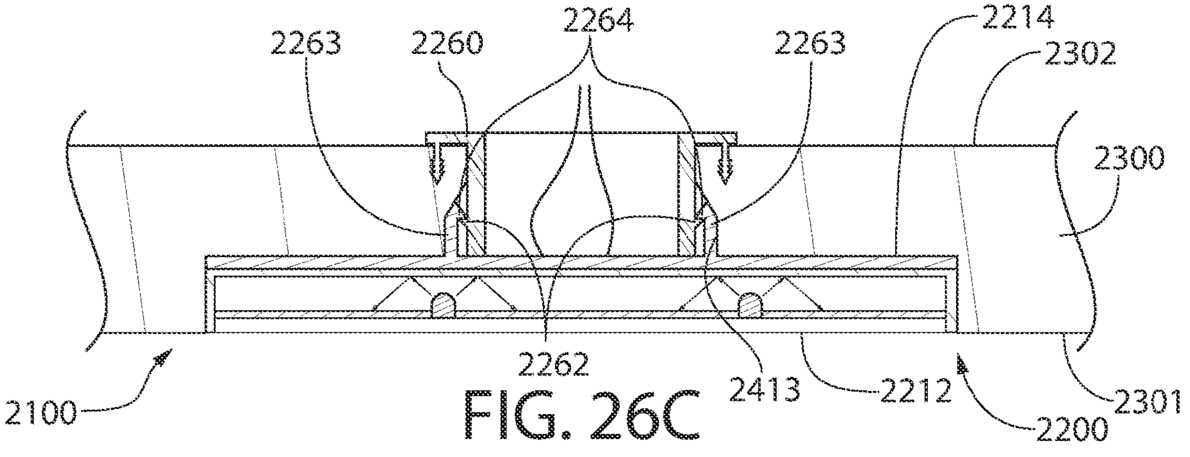

Referring now to FIGS. 26A-26C, the process of coupling one of the light modules 2200 to one of the ceiling tiles 2300 and the resulting structure (i.e., integrated ceiling tile and lighting apparatus 2100) is illustrated in accordance with an embodiment of the present disclosure. The general structure and concepts of the light module 2200 and of the ceiling tile 2300 are the same as that which has been described above, and thus features in FIGS. 26A-26C that are similar or identical to features in the previously described figures will be similarly numbered. If similar features are not described in detail with regard to FIGS. 26A-26C, it should be appreciated that the description set forth above is applicable. Furthermore, it should be appreciated that various combinations of the features described with reference to FIGS. 16A-26C are within the scope of the present disclosure.

The embodiment of FIGS. 26A-26C is similar to that described above with regard to FIGS. 25A-25C except for the mating connection features. Specifically, in this embodiment the ceiling tile 2300 is also formed of a compressible material. The ceiling tile 2300 comprises a front surface 2301 a rear surface 2302, and a cavity 2303 having a floor 2304 formed into the front surface 2303. Furthermore, a passageway 2410 extends along an axis X-X from the floor 2304 of the cavity 2303 to the rear surface 2302 of the ceiling tile 2300. Furthermore, a mounting structure 2260 is adhered/coupled to the rear surface 2302 of the ceiling tile 2300 using barbed pins 2261 or otherwise as described herein above. Specifically, the mounting structure 2260 is coupled to the ceiling tile 2300 so that at least a portion of the mounting structure 2260 is positioned within the passageway 2410.

In this embodiment, the portion of the mounting structure 2260 that is positioned within the passageway 2410 comprises a first coupling element 2262. The light module 2200 comprises a second coupling element 2263. The first and second coupling elements 2262, 2263 cooperate to detachably couple the light module 2200 to the mounting structure 2260 and to the ceiling tile 2300.

More specifically, the first coupling element 2262 in this embodiment is a tang. Thus, the portion of the mounting structure 2260 that is positioned within the passageway 2410 comprises an inner surface 2411 that faces the axis X-X of the passageway 2410 and an outer surface 2412 facing away from the axis X-X of the passageway 2410. In this embodiment, the tang or tangs of the first coupling element 2262 protrude from the outer surface 2412 of the portion of the mounting structure 2260 that is positioned within the passageway 2410. The tangs of the first coupling element 2262 face a sidewall 2413 of the ceiling tile 2300 that forms a boundary or that surrounds the passageway 2410.

Furthermore, the light module 2200 comprises a front surface 2212 and an opposite rear surface 2214 as has been described herein above. The second coupling element 2263 of the light module 2200 extends from the rear surface 2214 of the light module 2200. In the exemplified embodiment, the second coupling element 2263 comprises one or more tangs 2264 that snap-fit engage the one or more tangs 2262 of the first coupling element to detachably couple the light module to the mounting structure 2260.

In certain embodiments, the ceiling tile 2300 in the embodiment of FIGS. 26A-26C may be formed of a compressible material. Thus, in such embodiment as the second coupling element 2263 of the light module 2200 is inserted into the passageway 2410 for coupling to the mounting structure 2260, the ceiling tile 2300 compresses outwardly to make room for the second coupling element 2263. Specifically, the sidewall 2413 of the ceiling tile 2300 the defines the passageway 2410 may compress away from the axis X-X during coupling of the light module 2200 to the mounting structure 2260. After the light module 2200 is adequately inserted into the passageway 2410 and coupled to the mounting structure 2260, the sidewall 2413 of the ceiling tile 2300 may apply a decompression force onto the first and second coupling elements 2262, 2263 of the mounting structure 2260 and the light module 2200 to securely couple them together. The decompression force may prevent rattling and other movement during seismic activities or the like.

In this embodiment, when the light module 2200 is coupled to the mounting structure 2260, the second coupling element 2263 of the light module 2200 is positioned between the outer surface 2412 of the mounting structure 2260 and the sidewall 2413 of the ceiling tile 2300 that defines or bounds the passageway 2410.

Figure 27:
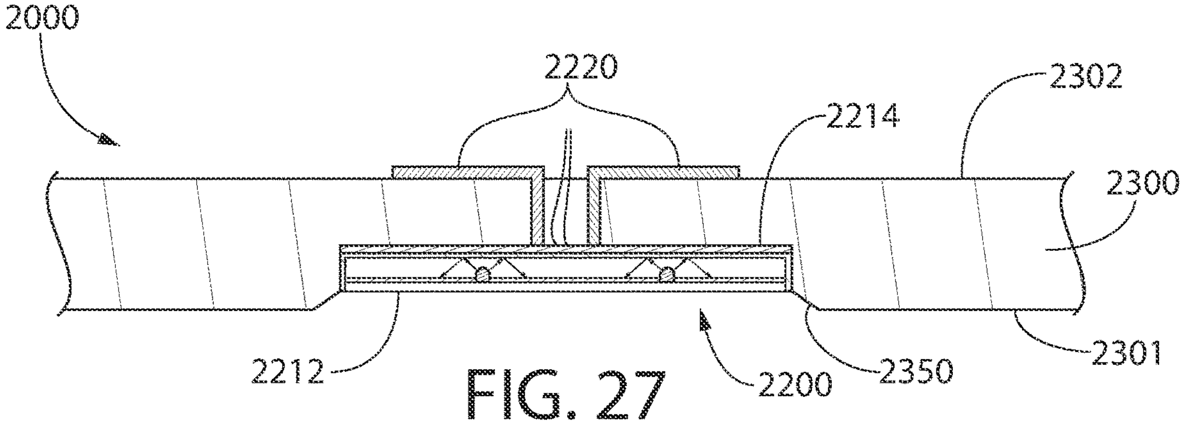
FIG. 27 is a schematic view illustrating the light module coupled to a ceiling tile with a beveled edge.

Referring to FIG. 27, an integrated ceiling tile and lighting apparatus 2000 is illustrated comprising one of the ceiling tiles 2300 and one of the light modules 2200. In this embodiment the light module 2200 is identical to that which was described above with reference to FIGS. 17A-17C. Thus, the light module 2200 is coupled to the ceiling tile 2300 using tabs 2220. However, this embodiment is not intended to be limited in regard to the manner in which the light module 2200 is coupled to the ceiling tile 2300, and thus any of the techniques described herein above for coupling the light module 2200 to the ceiling tile 2300 can be applied to this embodiment.

The feature of this embodiment that is different from the previous embodiments is that the ceiling tile 2300 comprises a beveled or chamfered edge 2350 that extends from the front surface 2212 of the installed light module 2200 to the front surface 2301 of the ceiling tile 2300. Thus, in this embodiment the light module 2200 is entirely recessed within the ceiling tile 2300 rather than being flush with the front surface 2301 of the ceiling tile 2300.

Figure 28A:
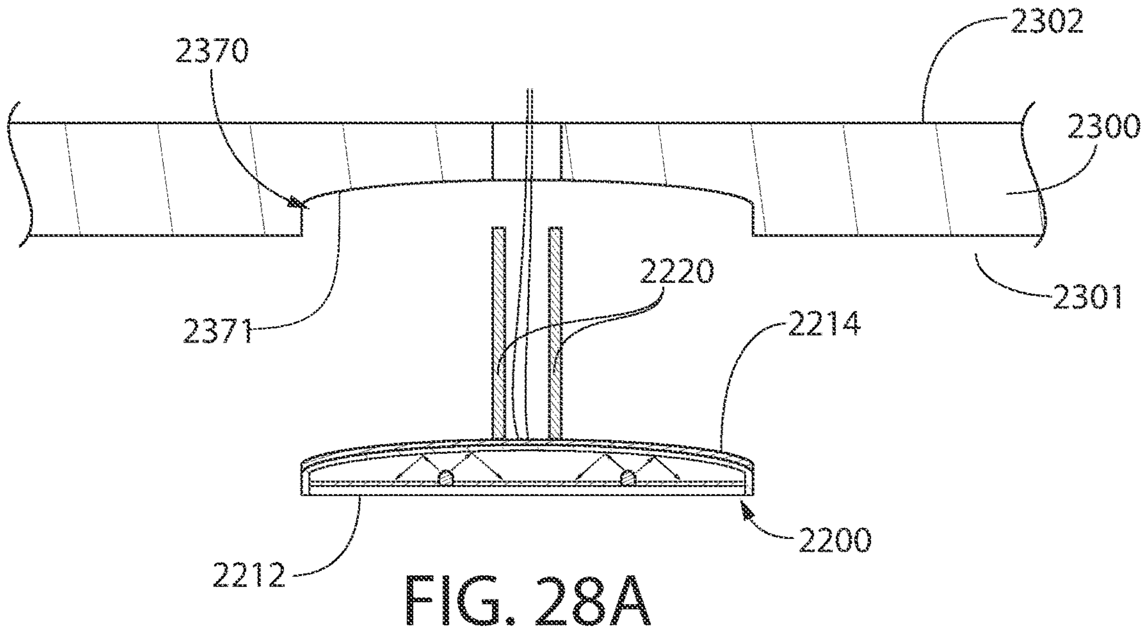
FIGS. 28A-28B are schematic views illustrating a process of coupling the light module to the ceiling tile in accordance with an embodiment of the present invention.
Figure 28B:
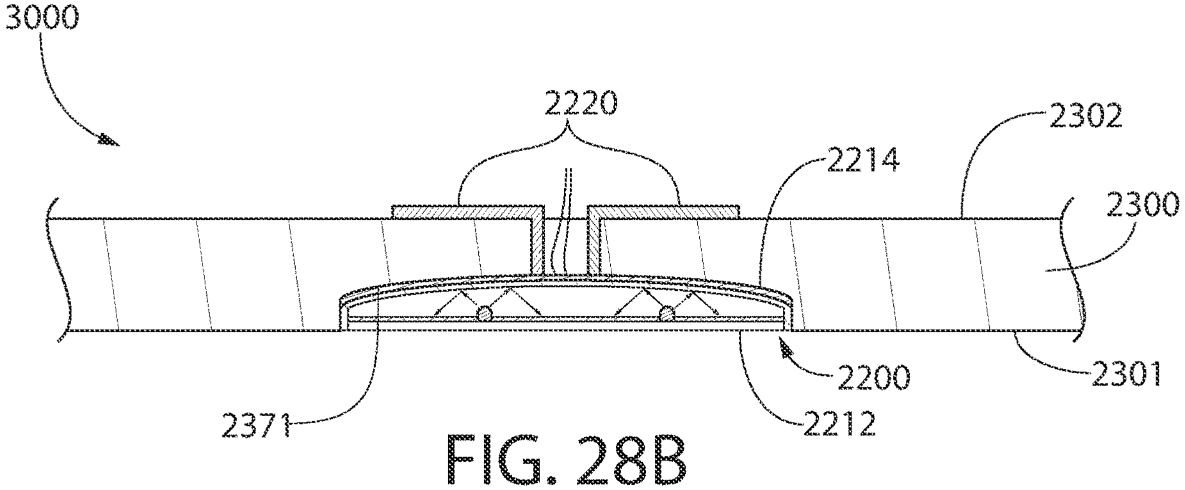

Referring to FIGS. 28A-28B, another embodiment of an integrated ceiling and light system 3000 is illustrated in which a light module 2200 is coupled to a ceiling tile 2300 to form an integrated ceiling tile and lighting apparatus 2100. Again, the light module 2200 is illustrated using the connectors 2220 (of FIGS. 17A-17C) for securing the light module 2200 to the ceiling tile 2300, but any of the techniques described herein can be used for securing the light module 2200 to the ceiling tile 2300.

The ceiling tile 2300 comprises a front surface 2301 and an opposing rear surface 2302. Furthermore, the ceiling tile

2300 comprises a recess or cavity 2370 formed therein. The cavity 2370 has a floor 2371 having a first non-planar topography. In the exemplified embodiment, the floor 2371 is arcuate or concave in shape. Furthermore, the light module 2200 comprises a front surface 2212 and an opposing rear surface 2214. In this embodiment the rear surface 2214 of the light module 2200 has a second non-planar topography. Specifically, the rear surface 2214 of the light module 2200 is an arcuate or convex surface that has the same radius of curvature as the floor 2371 of the cavity 2370. Although the floor 2371 of the cavity 2370 is concave and the rear surface 2214 of the light module 2200 is convex in the exemplified embodiment, the invention is not to be so limited in all embodiments and the opposite may also be possible and is within the scope of this disclosure.

Regardless of the exact topography (convex, concave, or the like), the second non-planar topography of the rear surface 2214 of the light module 2200 corresponds with the first non-planar topography of the floor 2371 of the cavity 2370. Thus, when the light module 2200 is inserted into the cavity 2370, the rear surface 2214 of the light module 2200 can be in surface contact with the floor 2371 of the cavity 2370 due to the corresponding shapes/topographies of the rear surface 2214 of the light module 2200 and the floor 2371 of the cavity 2370.

In the exemplified embodiment, when the light module 2200 is disposed within the cavity 2370, the rear surface 2214 of the light module 2200 is in surface contact with the floor 2371 of the cavity 2370 and the front surface 2212 of the light module 2200 is flush with the front surface 2301 of the ceiling tile 2300. Of course, the invention is not to be so limited in all embodiments and the front surface 2212 of the light module 2200 may be recessed relative to the front surface 2301 of the ceiling tile 2300 or may protrude beyond the front surface 2301 of the ceiling tile 2300 in alternative embodiments. Regardless, the corresponding shapes of the rear surface 2214 of the light module 2200 and the floor 2371 of the cavity 2370 permit those surfaces to be in surface contact so that the light module 2200 can be fully installed into the cavity 2370. The light module 2300 may be coupled to the ceiling tile 2300 using any of the techniques described herein or other techniques not described herein in various embodiments.

Figure 29A:
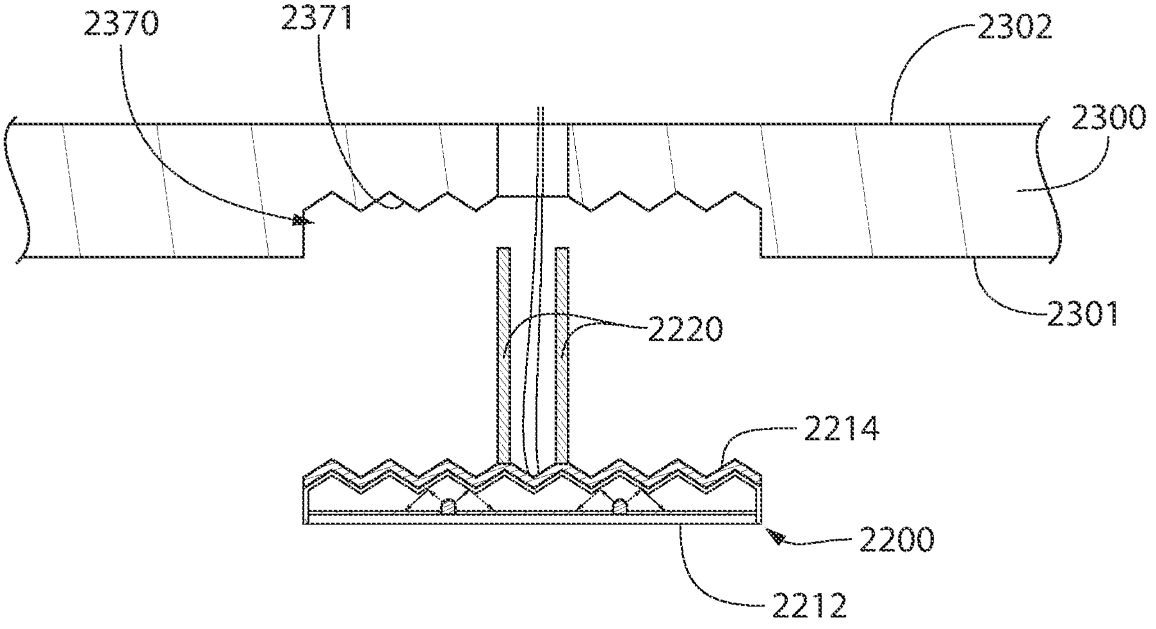
FIGS. 29A-29B are schematic views illustrating a process of coupling the light module to the ceiling tile in accordance with an embodiment of the present invention.
Figure 29B:
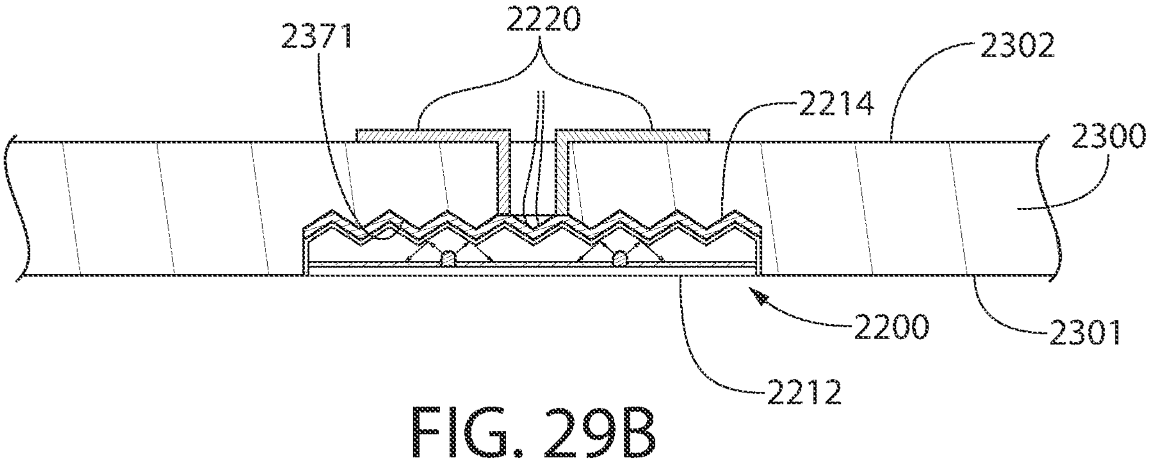

FIGS. 29A and 29B are similar to FIGS. 28A and 28B except for the shape of the floor 2371 of the cavity 2370 and the shape of the rear surface 2214 of the light module 2200. Specifically, in FIGS. 29A-29B the floor 2371 of the cavity 2370 has a complex, jagged topography and the rear surface 2214 of the light module 2200 has a corresponding complex, jagged topography. Thus, when the light module 2200 is coupled to the ceiling tile 2300, the complex jagged topographies of the floor 2371 of the cavity 2370 and the rear surface 2214 of the light module 2200 mate/correspond with one another so that the rear surface 2214 of the light module 2200 is in surface contact with the floor 2371 of the cavity 2370. FIGS. 29A-29B exemplify that the floor of the cavity and the rear surface of the light module need not be flat and planar in all embodiments, but can be rounded, arcuate, jagged, or otherwise complex. The complex topographies can be uniform, non-uniform, continuous, non-continuous or the like and are not to be limited to the specific topographies illustrated in FIGS. 28A-29B. The complex topographies can be any shape so long as the light module and the floor of the cavity have corresponding shapes to permit coupling of the light module to the ceiling tile. In certain embodiments the topographies of the rear surface 2214 of the light module 2200 and the floor 2371 of the cavity 2370 are non-planar and correspond with one another.

The description of FIGS. 15-29B above describes many different embodiments in which a light module is coupled to a ceiling tile. Some of the teachings described above with reference to FIGS. 15-29B may be combined such that a certain teaching that is described above with regard to one embodiment but not another embodiment may be applicable to that other embodiment. For example, any of the teachings above with regard to powering the light module may be applied to any of the different embodiments even if some powering methods are not specifically described with regard to all of the different embodiments. Thus, combinations of the teachings set forth herein are within the scope of the present disclosure.

Figure 30:
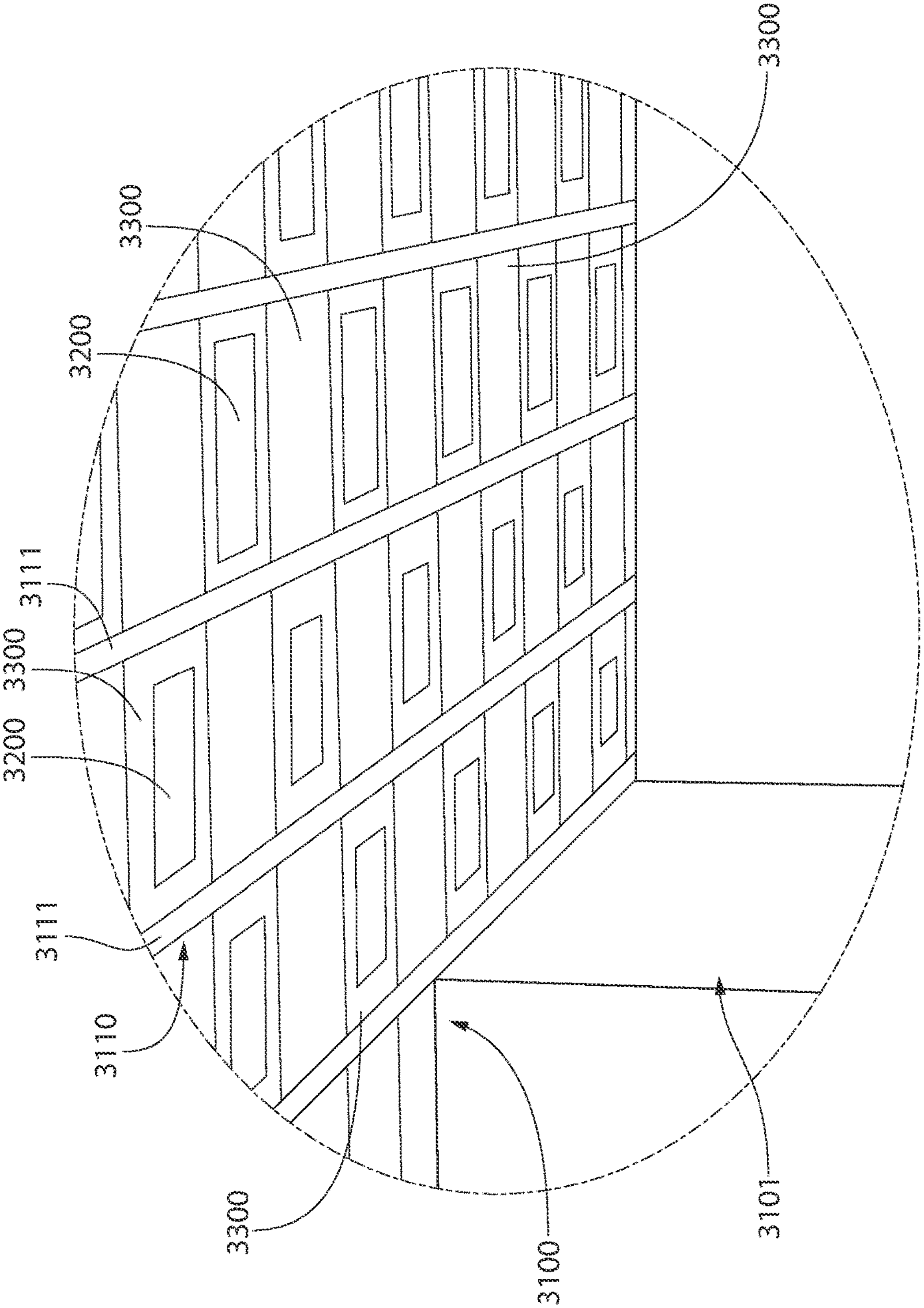
FIG. 30 is a partial view of an interior space illustrating an integrated ceiling and light system in accordance with an embodiment of the present invention.

Referring to FIG. 30, an integrated ceiling and light system 3100 is generally depicted forming a ceiling for an interior room or space 3101. The integrated ceiling and light system 3100 includes an overhead grid support system 3110 that is configured for mounting in a suspended manner from an overhead building support structure via appropriate hanger elements, such as for example without limitation fasteners, hangers, wires, cables, rods, struts, etc. In the exemplified embodiment the grid support system 3110 includes a plurality of grid support elements or grid support members 3111 that are arranged parallel to one another. In certain embodiments, the grid support system 3110 may include both longitudinal grid support elements and lateral grid support elements that intersect one another. The use of grid support systems 3110 of these types is generally well known for forming a suspended ceiling in a commercial building (or any other building or space as may be desired) and the details of the grid support systems described in the figures above are applicable to the grid support system 3110.

The spaces between the grid support members 3111 form openings within which ceiling tiles 3300 can be positioned. Only a few of the ceiling tiles 3300 are labeled in FIG. 30 to avoid clutter. The ceiling tiles 3300 close the openings to provide a desired aesthetic. Specifically, wiring and other mechanical structures may be located between the ceiling tiles 3300 and the overhead building support structure. The ceiling tiles 3300 hide the wiring and mechanical structures from view. However, the ceiling tiles 3300 can be readily removed from the grid support members 3111 to enable a person to gain access into the space between the ceiling tiles 3300 and the overhead building support structure for maintenance or the like.

Still referring to FIG. 30, a light module 3200 is illustrated coupled to several of the ceiling tiles 3300. In the exemplified embodiment, one of the light modules 3200 is illustrated coupled to every other one of the ceiling tiles 3300. However, the invention is not to be so limited in all embodiments. Rather, as many light modules 3200 as desired can be coupled to the various ceiling tiles 3300 (every ceiling tile 3300 may include one or more associated light modules 3200, every other ceiling tile 3300 may include one or more associated light modules 3200, or the like). The light module is denoted using the reference numeral 3200 in FIGS. 30-35 and reference numeral 3700 in FIG. 36, but it should be appreciated that the description above with regard to the light module 400 is fully and equally applicable to the details of the light modules 3200, 3700. Thus, the structural and functional details of the light modules 3200, 3700 will not be described herein for brevity, it being understood that the description of the light module 400 illustrated in FIG. 3 is applicable. Similar numbering will be used to describe the light modules 3200, 3700 as the light module 400 except that the 3200 and 3700 series of numbers will be used instead of the 400 series of numbers. It should be appreciated that the description of the features of the light module 400 is applicable to the similarly numbered features of the light modules 3200, 3700.

The ceiling tiles 3300, 3600 referred to in the present disclosure with specific reference to FIGS. 30-36 may be any type of ceiling tile that is conventionally used in drop ceiling applications. The specific materials that may be used to form the ceiling tiles 3300, 3600 and other structural details of the ceiling tiles 3300, 3600 are the same as that which is provided above with regard to the ceiling tile 300 and thus will not be repeated herein in the interest of brevity. Thus, the ceiling tile 3300 may be any type of ceiling tile described above with reference to the ceiling tile 300. The ceiling tile 3300 may be square or rectangular as depicted in the exemplified embodiments, although the invention is not to be so limited in all embodiments and other shapes are possible to accomplish a desired ceiling aesthetic or for acoustic reasons.

Referring to FIGS. 31A-32B concurrently, the ceiling tile 3300 will be described in accordance with one embodiment of the present disclosure. The ceiling tile 3300 comprises a front surface 3301, an opposing rear surface 3302, and a peripheral edge 3303 extending between the front and rear surfaces 3301, 3302. The ceiling tile 3300 comprises a passageway 3304 extending along an axis V-V through the ceiling tile 3200 from a front opening 3399 in the front surface 3301 of the ceiling tile 3300 to a rear opening 3398 in the rear surface 3302 of the ceiling tile 3300. Furthermore, the ceiling tile 3300 comprises a ledge 3306 extending into the passageway. The ledge 3306 is recessed relative to the rear surface 3302 of the ceiling tile 3300. More specifically, the ledge 3306 is positioned at some location between the front and rear openings 3399, 3398 and provides a surface within the passageway 3304 upon which the light module 3200 may rest as it is supported by the ceiling tile 3300.

The passageway 3304 is defined by a first sidewall 3397 extending from a first end at the front opening 3399 to a second end at the ledge 3306 and a second sidewall 3307 extending from a first end at the second opening 3398 to a second end at the ledge 3306. The ledge 3306 extends from the second end of the first sidewall 3397 to the second end of the second sidewall 3307. In the exemplified embodiment, the first and second sidewalls 3397, 3307 are vertical sidewalls that are parallel to the axis V-V of the passageway 3304 and the ledge 3306 is a horizontal surface that is perpendicular to the axis V-V of the passageway 3304 and parallel to each of the front and rear surfaces 3301, 3302 of the ceiling tile 3300. However, the invention is not to be so limited in all embodiments and the first and second sidewalls 3397, 3307 and the ledge 3306 may be positioned at other orientations relative to one another and to the axis V-V of the passageway 3304 in other embodiments. Specifically, the first and/or second sidewalls 3397, 3307 may be at oblique angles relative to the axis V-V and/or to the ledge 3306 in some embodiments.

In certain embodiments, a dimension of the front opening 3399 measured along a reference axis that is perpendicular to the axis V-V of the passageway 3304 is less than a dimension of the rear opening 3398 measured along the same reference axis. Similarly, a distance measured from the axis V-V of the passageway 3304 to the second sidewall 3307 is greater than a distance measured from the axis V-V of the passageway 3304 to the first sidewall 3397. Stated another way, the passageway 3304 has a first section 3396 extending from the rear opening 3398 of the ceiling tile 3300 to the ledge 3306 and a second section 3395 extending from the front opening 3399 of the ceiling tile 3300 to the ledge 3306. In the exemplified embodiment, the first section 3396 has a greater cross-sectional area than the second section 3395. This permits rear installation of the light module 3200 to the ceiling tile 3300 as will be discussed in more detail below.

In the exemplified embodiment, the ledge 3306 forms a continuous I-shaped surface upon which the light module 3200 may be supported for coupling the light module 3200 to the ceiling tile 3300. However, the invention is not to be so limited in all embodiments. The ledge 3306 may comprise a plurality of discontinuous and spaced apart ledge segments, tabs, protrusions, or the like that are configured to support the light module 3200 as described herein. Furthermore, the shape of the ledge 3306 may be dependent upon the shape of the ceiling tile 3300 and/or the shape of the light module 3200 and thus it is not to be limiting unless specifically recited as such. In similar fashion, in the exemplified embodiment the rear opening 3398 is I-shaped and the front opening 3399 is square or rectangular shaped. Neither of these shapes is limiting of the invention in all embodiments. The front opening 3399 may be modified as desired to accommodate a specifically shaped light module 3200, and specifically a light emitting surface thereof.

Furthermore, in still other embodiments the first and second sidewalls 3397, 3396 may be aligned with one another and the ledge 3306 may be removed. Instead of the ledge 3306, in such embodiments a protuberance, which may be integral with the ceiling tile 3300 or a separate component that is affixed to the ceiling tile 3300, may extend from the sidewalls 3397, 3396 into the passageway 3304. Thus, the ledge 3306 is used in the exemplified embodiment so that the monolithic structure of the ceiling tile 3300 itself forms the resting surface for the light module 3200. Forming the ledge 3306 in the ceiling tile 3300 to support the light module 3200 may be desirable for aesthetic reasons. In other embodiments a separate component may be affixed to the ceiling tile 3300 to form the resting surface for the light module 3200. This may be desirable to reduce the manufacturing costs of the ceiling tile 3200 in some embodiments because forming the ceiling tile 3300 with the ledge 3306 may be more time intensive and more expensive to manufacture than forming the ceiling tile 3300 without the ledge 3306.

The passageway 3304 extends through the entire thickness of the ceiling tile 3300 from the front opening 3399 in the front surface 3301 to the rear opening 3398 in the rear surface 3302 such that the passageway 3304 is formed through the ceiling tile 3300. The ledge 3306 is recessed relative to the rear surface 3302 of the ceiling tile 3300 and the first section 3396 of the passageway 3304 that is located between the ledge 3306 and the rear opening 3398 thereby forms a mounting slot for receiving the light module 3200. The mounting slot may be formed by a cutout in the ceiling tile 3300 (routered or otherwise formed) that extends from the rear surface 3302 of the ceiling tile 3300 a depth that is less than the entire thickness of the ceiling tile 3300. Thus, the first section 3396 of the passageway 3304 (i.e., the mounting slot) is defined by the ledge 3306 and the second sidewall 3307. The ledge 3306 forms a shoulder upon which the light module 3200 may rest upon installation.

In certain embodiments the passageway 3304 and/or the ledge 3306 may be formed with a router on a fully fabricated ceiling tile. Specifically, the ceiling tile may first be formed in the conventional manner without any openings or passageways. The passageway 3304 may then be formed into the ceiling tile 3300 with a router or other cutting device and may be routed specifically to include the ledge 3306. Furthermore, due to the minimal weight and effective density of the light module 3200 as discussed previously in this document, in certain embodiments the ledge 306 does not need to be reinforced to fully support the weight of the light module without the ceiling tile 3300 sagging.

Figure 31A:
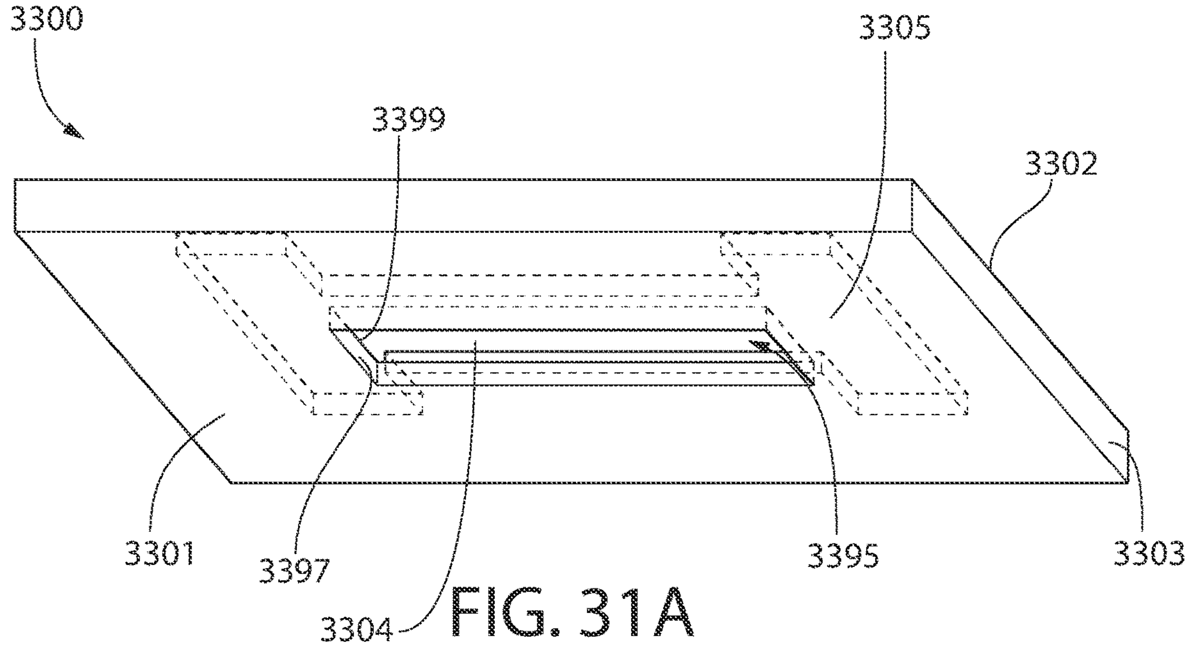
FIG. 31A is a front perspective view of a ceiling tile of the integrated ceiling and light system of FIG. 30.
Figure 31B:
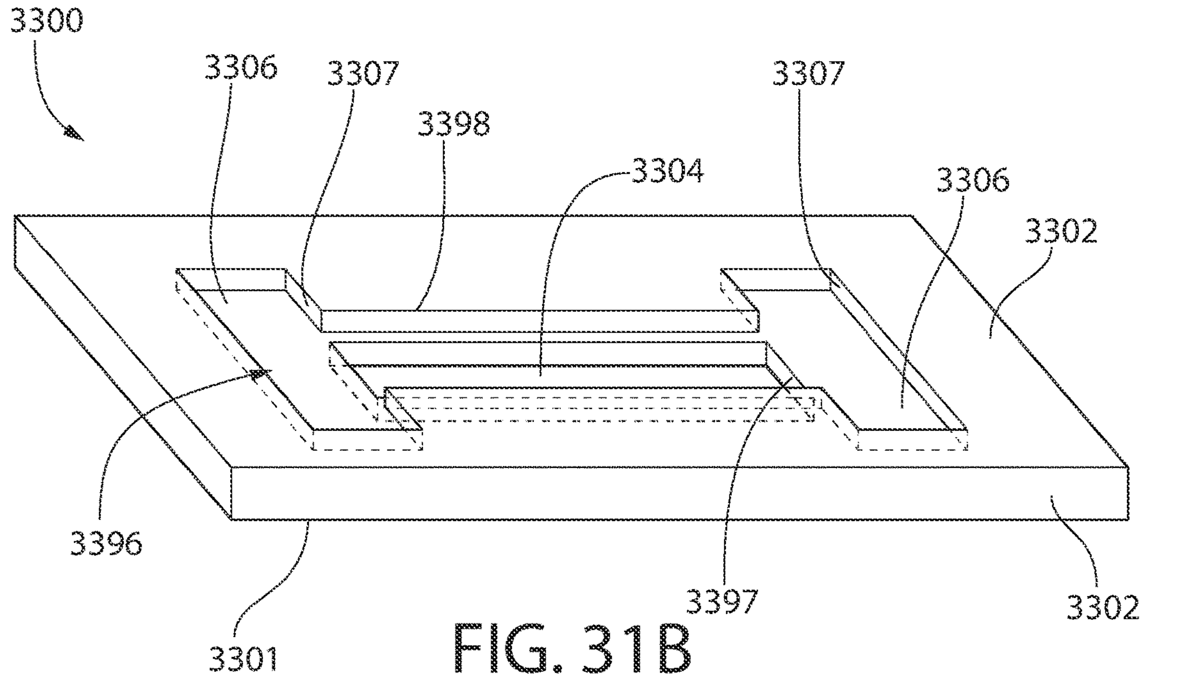
FIG. 31B is a rear perspective view of the ceiling tile of FIG. 31A.
Figure 32A:
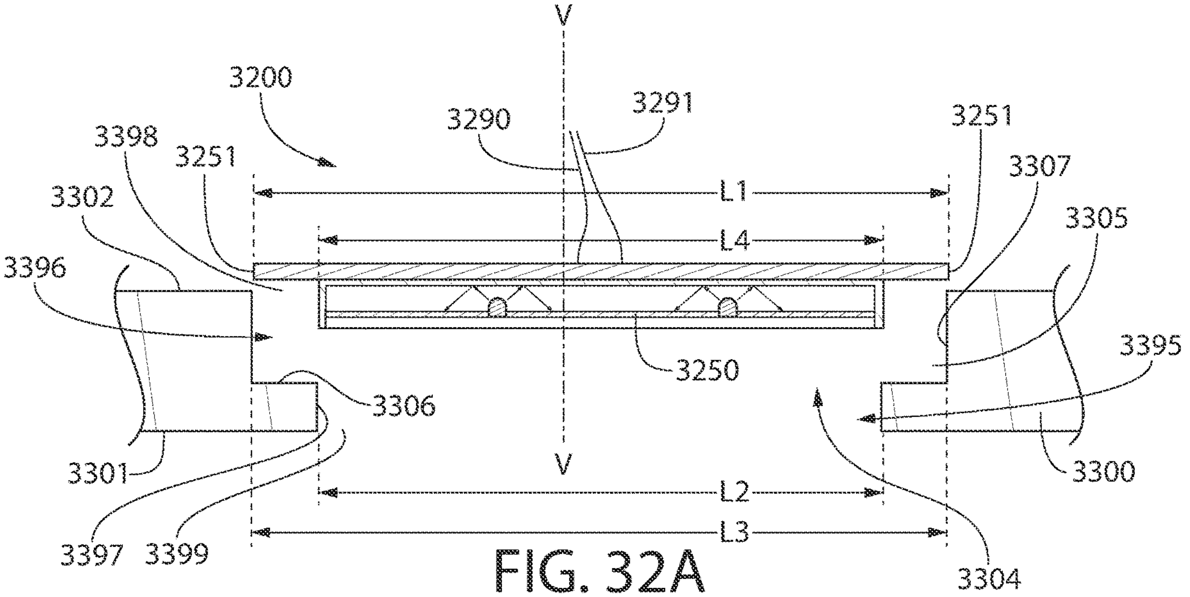
FIGS. 32A-32B are schematic views illustrating a process of coupling a light module to the ceiling tile of FIG. 31A.
Figure 32B:
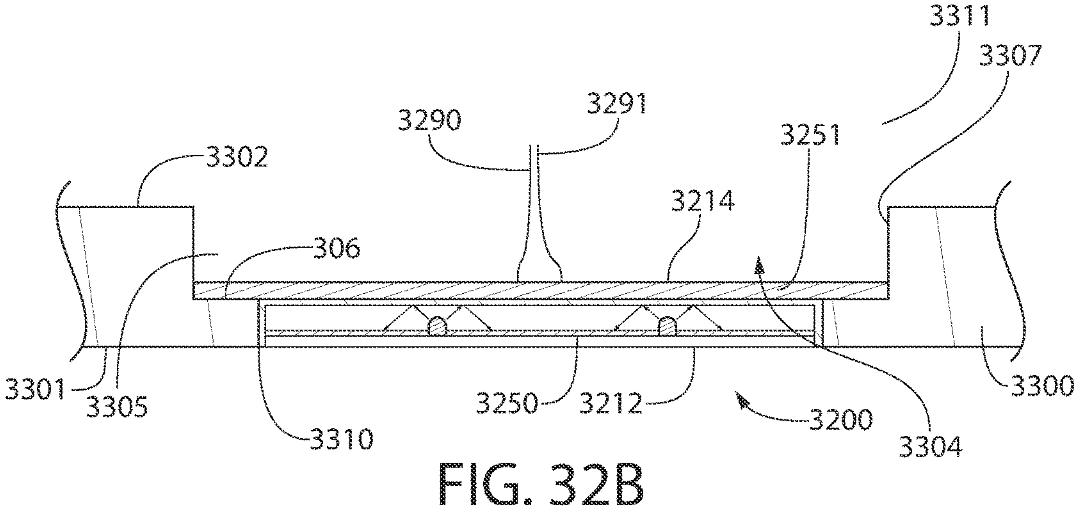

Referring to FIGS. 32A-32B, the details of the light module 3200 and the process of coupling one of the light modules 3200 to the ceiling tile 3300 of FIGS. 31A-31B and the resulting structure will be described. The light module 3200 comprises a front surface 3212 and an opposing rear surface 3214. The front surface 3212 of the light module 3200 may be a common light and heat emitting surface of the light module 3200 in some embodiments. The light module 3200 may include a portion that rests upon the ledge 3306 when the light module 3200 is coupled to or installed on the ceiling tile 3300.

In the exemplified embodiment, the light module 3200 comprises a light emitting portion 3250 and a flange portion 3251 that extends from the light emitting portion 3250 on at least two opposing ends of the light emitting portion 3250. In this embodiment, the flange portion 3251 is the portion of the light module 3200 that rests upon the ledge 3306 when the light module 3200 is coupled to the ceiling tile 3300. The flange portion 3251 has a length L1 that is greater than a length L2 of the front opening 3399 of the passageway 3304 (and also greater than the distance between opposing sides of the ledge 3306) at the front surface 3301 of the ceiling tile 3300. However, the length L1 of the flange portion 3251 is substantially equal to or less than a length L3 of the rear opening 3398 of the passageway 3304 at the rear surface 3302 of the ceiling tile 3300 to permit the flange portion 3251 to pass through the rear opening 3398 when coupling the light module 3200 to the ceiling tile 3300. Furthermore, the light emitting portion 3250 of the light module 3200 has a length L4 that is equal to or less than the length L2 of the front opening 3399 of the passageway 3304 at the front surface 3301 of the ceiling tile 3300 so that the light emitted from the light emitting portion 3250 of the light module 3200 may pass through the front opening 3399 to illuminate the interior space 3101.

Thus, in the exemplified embodiment the ceiling tile 3300 and the light module 3200 are configured so that the light module 3200 can be rear-mounted to the ceiling tile 3300. Stated another way, coupling the light module 3200 to the ceiling tile 3300 comprises inserting the light module 3200 into the passageway 3304 through the rear opening 3398 at the rear surface 3302 of the ceiling tile 3300 until the flange 3251 rests atop of the ledge 3306 as depicted in FIG. 32B. In the exemplified embodiment, when the flange 3251 of the light module 3200 is in contact with and rests upon the ledge 3306, the light emitting portion 3250 of the light module 3200 is positioned within the passageway 3304, and more specifically within the second section 3397 of the passageway, so that the front surface 3212 of the light module 3200 is flush with the front surface 3301 of the ceiling tile 3300. Of course, the invention is not to be so limited in all embodiments and in certain other embodiments the front surface 212 of the light module 3200 may protrude beyond or be recessed relative to the front surface 3301 of the ceiling tile 3300.

Furthermore, in the exemplified embodiment, when the light module 3200 is coupled to the ceiling tile 3300, the rear surface 3214 of the light module 3200 is recessed relative to the rear surface 3302 of the ceiling tile 3300. However, the invention is not to be so limited in all embodiments and the rear surface 3214 of the light module 3200 may be flush with the rear surface 3202 of the ceiling tile 300 or the rear surface 3214 of the light module 3200 may protrude beyond the rear surface 3202 of the ceiling tile 3300 in other embodiments. This can be achieved by changing the location of the ledge 3306, changing the dimensions of the passageway 3304 or the thickness of the ceiling tile 3300, and/or changing the dimensions of the light module 3200.

Because the ceiling tile 3300 is intended to be mounted on grid support elements horizontally, there are no additional components required to secure the light module 3200 within the passageway 3304 and on the ledge 3306. Rather, due to the pull of gravity, when the ceiling tile 3300 is properly positioned in a suspended ceiling system, the light module 3200 will remain positioned within the passageway 3304 due to the light module 3200 being supported by the ledge 3306. Of course, additional fastener elements may be used to secure the light module 3200 in place, including without limitation clips, fasteners, adhesives, or the like.

In the embodiment exemplified in FIGS. 32A and 32B, positive and negative electrical wires 3290, 3291 are electrically coupled to the light module 3200 to provide power to the light module 3200. Specifically, first ends of the electrical wires 3290, 3291 are coupled to the light module 3200 and second ends of the electrical wires 3290, 3291 are coupled to a power source (not shown), such as for example without limitation an AC power supply, an AC bus bar, or the like. Alternatively, the light module 3200 may include an internal power source such as batteries or the like.

Figure 33:
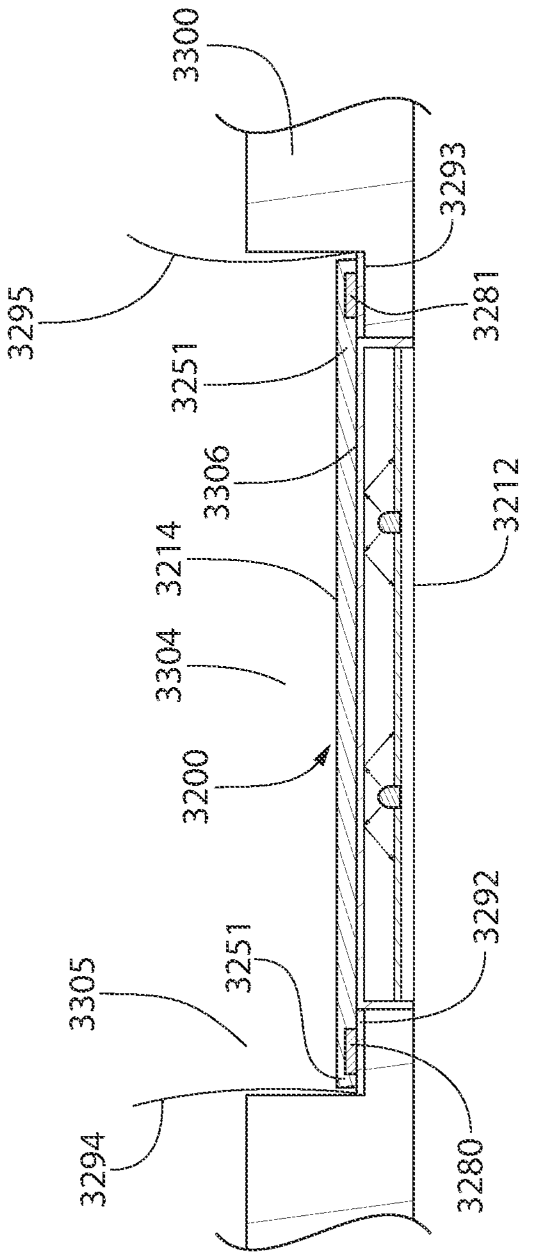
FIG. 33 is an alternative schematic view illustrating the light module coupled to the ceiling tile of FIG. 31A.

Referring now to FIG. 33, an alternative embodiment of the ceiling tile 3300 and the light module 3200 will be described. Again, the light module 3200 can be the light module of FIG. 3 or any other type of light module as described herein. FIG. 33 is identical to FIG. 32B with the exception of the means for providing power to the light module 3200. The description of the ceiling tile 3300 with regard to FIG. 32 above is applicable to FIG. 33 and the same reference numerals have been used to denote the same components or features.

In the embodiment of FIG. 33, positive and negative electrical conductor strips 3292, 3293 are positioned on the ledge 3306. Electrical wires 3294, 3295 extend from the conductor strips 3292, 3293 to a power source so that the conductor strips 3292, 3293 are electrically powered. The flange 3251 of the light module 3200 comprises electrical contacts 3280, 3281 that are positioned and arranged so that when the light module 3200 is coupled to the ceiling tile 3300 in the manner described above with reference to FIGS. 32A and 32B, the electrical contacts 3280, 3281 of the light module 3200 are in contact with and electrically coupled to the conductor strips 3292, 3293. Electrical power is transferred from the conductor strips 3292, 3293 to the light module 3200 due to the contact between the electrical contacts 3280, 3281 of the light module 3200 and the conductor strips 3292, 3293. Using this modified ceiling tile is beneficial in that the light module 3200 need not be separately coupled to a power source, but simply inserting the light module 3200 into the passageway 3304 and resting/supporting the light module 3200 on the ledge 3206 of the ceiling tile 3300 electrically powers the light module 3200.

Figure 34A:
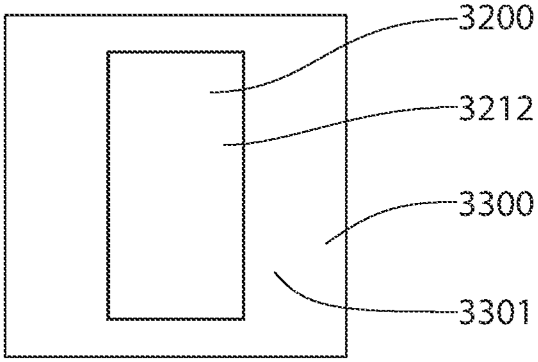
FIGS. 34A-34C are alternative front views of the ceiling tile of FIG. 31A with the light module coupled thereto.
Figure 34B:
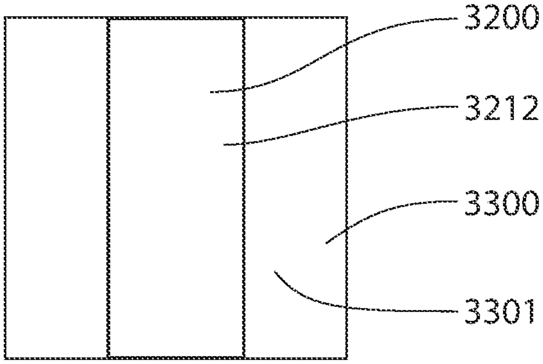
Figure 34C:
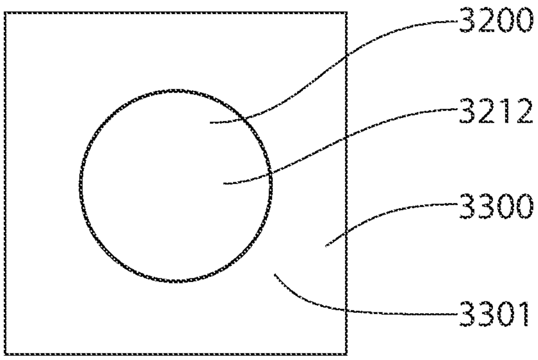

In the exemplified embodiment, the front surface 3212 of the light module 3200 is rectangular in shape. This is depicted in FIG. 34A which illustrates the front surface 3301 of the ceiling tile 3300 with the light module 3200 coupled thereto. In this embodiment the front surface 3212 of the light module 3200 is entirely surrounded by the ceiling tile 3300. In this embodiment the ledge may extend around the entire periphery of the light module 3200 or along portions thereof. FIG. 34B illustrates one alternative embodiment in which the light module 3200 is rectangular in shape and spans across the entire length of the ceiling tile 3300 from one side edge to an opposing side edge. In this embodiment the ledge will be located adjacent the long sides of the light module 3200 for supporting the light module 3200. FIG. 34C illustrates yet another alternative embodiment in which the light module 3200 is circular in shape. The light module 3200 can take on any other shapes as may be desired, including regular and irregular polygonal shapes, complex shapes, or the like. The size and shape of the passageway 3304 and the ledge 3306 will be modified depending on the size and shape of the light module 3200 to ensure that the rear mounting technique described herein above can be used to couple the light module 3200 to the ceiling tile 3300.

Figure 35:
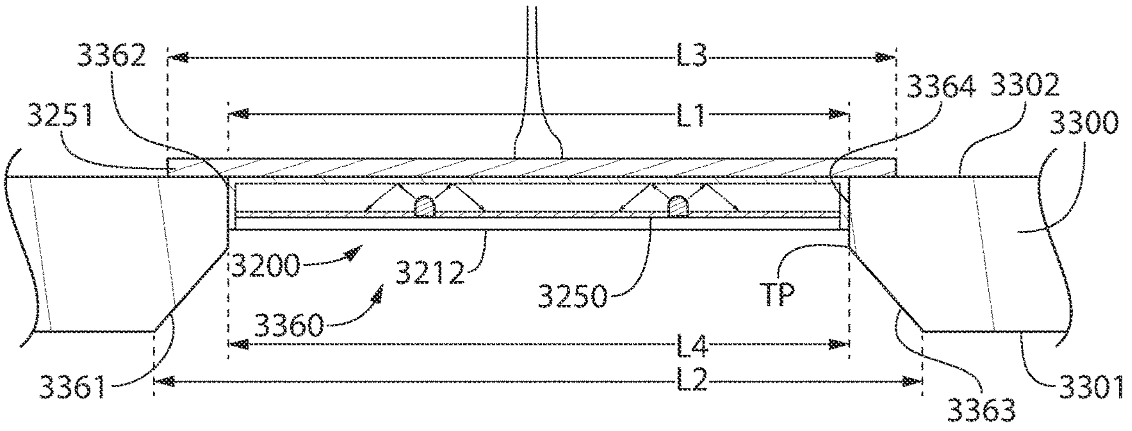
FIG. 35 is a schematic view of the light module coupled to another embodiment of a ceiling tile.

Referring to FIG. 35, another embodiment of the ceiling tile 3300 with one of the light modules 3200 coupled thereto is illustrated. The light module 3200 in this embodiment is identical to the light module 3200 of FIGS. 32A and 32B in that it includes a light emitting portion 3250 and a flange portion 3251. However, in this embodiment the ceiling tile 3300 comprises a hole 3360 that extends from a front opening 3361 on the front surface 3301 of the ceiling tile 3300 to a rear opening 3362 on the rear surface 3302 of the ceiling tile 3300. The rear opening 3362 has a first length L1, the front opening 3361 has a second length L2, the flange portion 3251 of the light module 3200 has a third length L3, and the light emitting portion 3250 of the light module 3200 has a fourth length L4. In this embodiment the second length L2 is greater than the first length L1, although the first and second lengths L1, L2 could be the same in other embodiments.

Furthermore, in this embodiment the fourth length L4 is equal to or less than the first length L1 so that the light module 3200 can be rear-mounted to the ceiling tile 3300 by inserting the light emitting portion 3250 of the light module 3200 through the rear opening 262 in the rear surface 3302 of the ceiling tile 3300. However, the third length L3 is greater than the first length L1 so that the flange portion 3251 can not be inserted through the rear opening 3362 in the rear surface 3302 of the ceiling tile 3300. Rather, rear-mounting the light module 3200 to the ceiling tile 3300 will result in the light emitting portion 3250 of the light module 3200 passing through the rear opening 3362 and into the hole 3360 until the flange portion 3251 of the light module 3200 rests against the rear surface 3302 of the ceiling tile 3300. Thus, in this embodiment the rear surface 3302 of the ceiling tile 3300 supports the light module 3200 rather than a ledge as with the embodiment of FIGS. 32A and 32B.

Furthermore, in the exemplified embodiment the ceiling tile 3300 has a beveled edge 3363 that extends from the front opening 3361 to a transition point TP and a vertical wall 3364 that extends from the transition point TP to the rear opening 3362. The beveled edge 3363 and the vertical wall 3364 collectively define the bounds of the hole 3360. When the light module 3200 is coupled to the ceiling tile 3300, the light emitting portion 3250 of the light module 3200 is located along the vertical wall 3364 (i.e., surrounded by the vertical wall) so that the front surface 3212 of the light module 3200 is recessed relative to the front surface 3301 of the ceiling tile 3300. Finally, in the exemplified embodiment electric wires are coupled to and extend from the light module 3200 for coupling to a power source. The invention is not to be limited to the manner in which electrical power is supplied to the light module 3200 in all embodiments, and any of the techniques described herein can be used to achieve this purpose.

In the embodiments described herein above with specific reference to FIGS. 30-35, the light module 3200 may be coupled to the ceiling tile 3300, and then the ceiling tile 3300 may be coupled to the grid support elements 3111 of the grid support system 3110 to form the suspended ceiling. In other embodiments, the ceiling tiles 3300 may first be coupled to the grid support elements 3111 of the grid support system 3110, and then the light modules 3200 may be rear-mounted to the ceiling tiles 3300. Regardless of the order of coupling the devices or components together to form the integrated ceiling and light system, using the rear-mounting techniques described herein renders the installation easy and user friendly even for an end user with no knowledge or experience in lighting device installation. As long as a user can install a ceiling tile onto a grid support system, the user can install the integrated ceiling and light system 3100.

Figure 36:
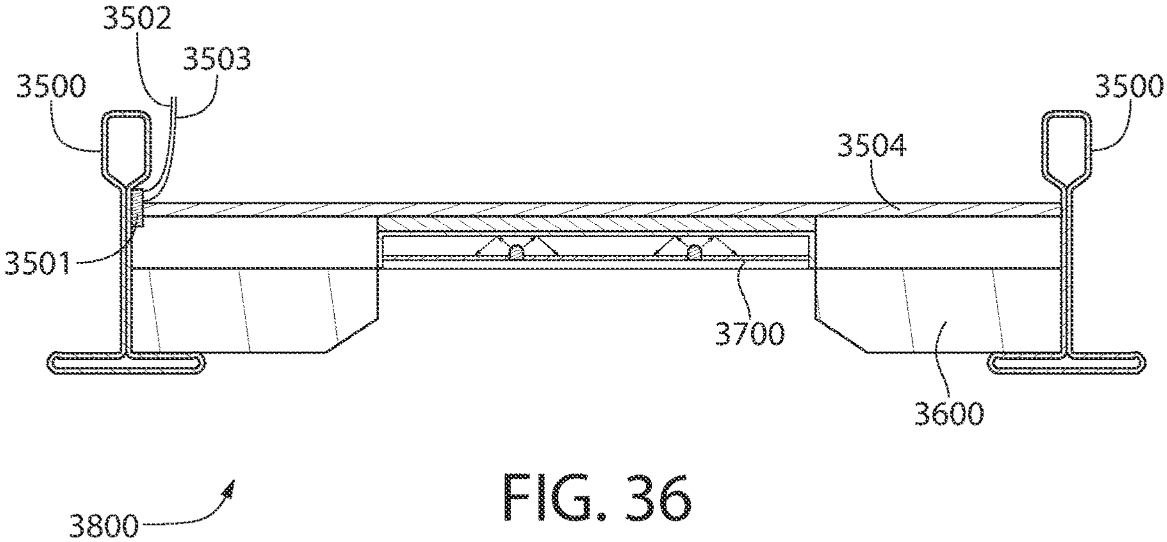
FIG. 36 is a schematic view of an integrated ceiling and light system in accordance with an embodiment of the present invention.

FIG. 36 illustrates a schematic view of an integrated ceiling and light system 3800 including grid support elements 3500, a ceiling tile 3600, and a light module 3700 in accordance with another embodiment of the present invention. The light module 3700 may be similar to the light module described above with reference to FIG. 3, but the invention is not to be so limited and other light sources may be used as the light module in accordance with the disclosure set forth herein.

In the exemplified embodiment, a conductor strip 3501 is positioned on the grid support elements 3500 and is powered by electrical wires 3502, 3503 that are coupled to a power source and to the conductor strip 3501. Moreover, a bridge member 3504 that comprises or is formed of an electrically conductive material is coupled to at least one of the grid support elements 3500 and is in contact with the conductor strip 3501 so that the bridge member 3504 is electrified or powered. In this embodiment, the bridge member 3504 is coupled to or in contact with an electrical contact of the light module 3700 so that electricity is transmitted from the bridge member 3504 to the light module 3200 for powering the light module 3700. The light module 3700 may be mechanically supported by the bridge member 3504 via clips, fasteners, adhesion, or the like, or the light module 3700 may be mechanically supported by the ceiling tile 3600 (utilizing any of the techniques described herein above or below). Regardless of the manner in which the light module 3700 is supported, the light module 3700 is powered via the bridge member 3504 in this embodiment. The bridge member 3504 may be an integral part of the light module 3700 or the bridge member 3504 may be a separate component to which the light module 3700 is coupled.

Figure 37:
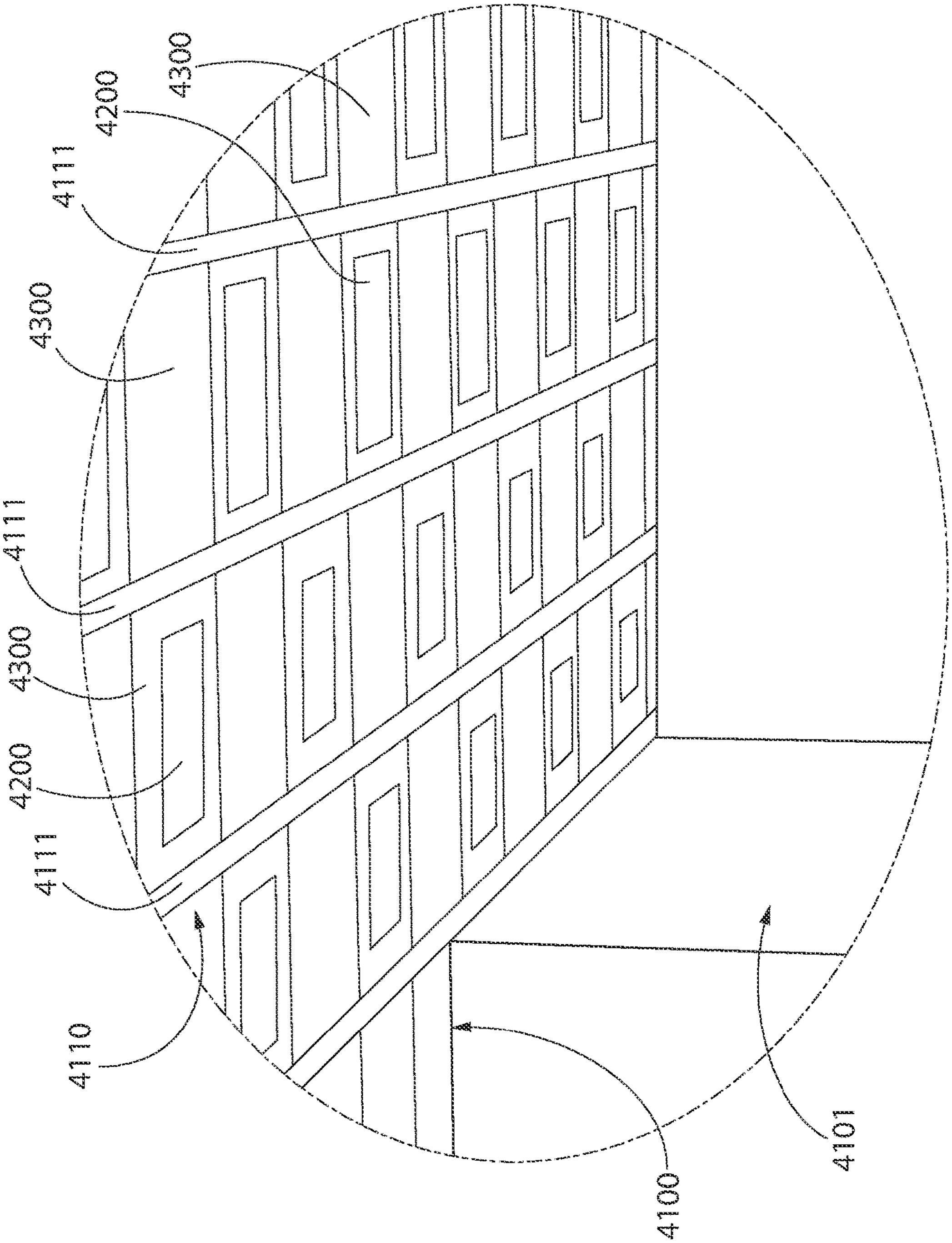
FIG. 37 is a partial view of an interior space illustrating an integrated ceiling and light system in accordance with an embodiment of the present invention.

Referring to FIG. 37, a ceiling system 4100 is generally depicted forming a ceiling for an interior room or space 4101. The ceiling system 4100 includes an overhead grid support system 4110 that is configured for mounting in a suspended manner from an overhead building support structure via appropriate hanger elements, such as for example without limitation fasteners, hangers, wires, cables, rods, struts, etc. In the exemplified embodiment the grid support system 4110 includes a plurality of grid support elements or members 4111 that are arranged parallel to one another. In certain embodiments, the grid support system 4110 may include both longitudinal grid support elements and lateral grid support elements that intersect one another. The use of grid support systems 4110 of these types is generally well known for forming a suspended ceiling in a commercial building (or any other building or space as may be desired).

The spaces between the grid support members 4111 form openings within which ceiling tiles 4300 can be positioned. Only a few of the ceiling tiles 4300 are labeled in the drawings to avoid clutter. The ceiling tiles 4300 close the openings to provide a desired aesthetic. Specifically, wiring and other mechanical structures may be located between the ceiling tiles 4300 and the overhead building support structure. The ceiling tiles 4300 hide the wiring and mechanical structures from view. However, the ceiling tiles 4300 can be readily removed from the grid support members 4111 to enable a person to gain access into the space between the ceiling tiles 4300 and the overhead building support structure for maintenance or the like.

The ceiling tiles 4300 referred to in the present disclosure with specific reference to FIGS. 37-40 may be any type of ceiling tile that is conventionally used in drop ceiling applications. The specific materials that may be used to form the ceiling tile 4300 and other structural details of the ceiling tile 4300 are the same as that which is provided above with regard to the ceiling tile 300 and thus will not be repeated herein in the interest of brevity. Thus, the ceiling tile 4300 may be any type of ceiling tile described above with reference to the ceiling tile 300 and others. The ceiling tile 4300 may be square or rectangular as depicted in the exemplified embodiments, although the invention is not to be so limited in all embodiments and other shapes are possible to accomplish a desired ceiling aesthetic or for acoustic reasons.

Still referring to FIG. 37, a light module 4200 is illustrated coupled to several of the ceiling tiles 4300. In the exemplified embodiment, one of the light modules 4200 is illustrated coupled to every other one of the ceiling tiles 4300. However, the invention is not to be so limited in all embodiments. Rather, as many light modules 4200 as desired can be coupled to the various ceiling tiles 4300 (every ceiling tile 4300 may include one or more associated light modules 4200, every other ceiling tile 4300 may include one or more associated light modules 4200, or the like). The light module is denoted using the reference numerals 4200, 4500, 4600, and 4700 in FIGS. 37-40, but it should be appreciated that the description above with regard to the light module 400 with reference to FIG. 3 is fully and equally applicable to the details of the light modules 4200, 4500, 4600, and 4700 except as otherwise described herein. Thus, certain of the structural and functional details of the light modules 4200, 4500, 4600, and 4700 will not be described herein for brevity, it being understood that the description of the similar structural and functional details of the light module 400 illustrated in FIG. 3 is applicable. Similar numbering will be used to describe the light modules 4200, 4500, 4600, and 4700 as the light module 400 except that the 4200, 4500, 4600, and 4700 series of numbers will be used instead of the 400 series of numbers. It should be appreciated that the description of the features of the light module 400 is applicable to the similarly numbered features of the light modules 4200, 4500, 4600, and 4700 unless stated otherwise herein.

Figure 38A:
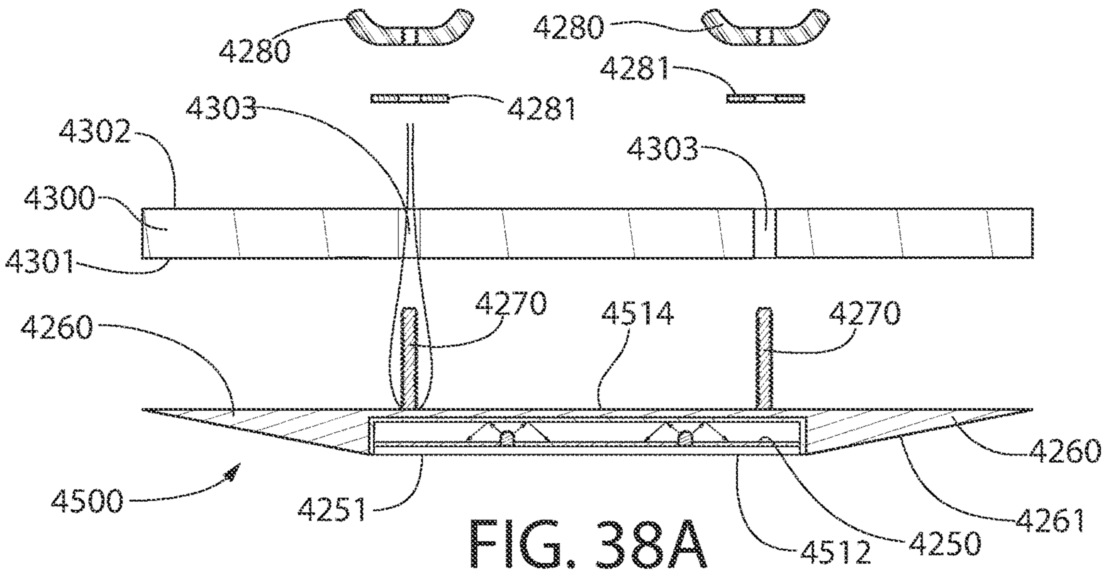
FIGS. 38A-38C are schematic views illustrating a process of coupling the light module a ceiling tile in accordance with an embodiment of the present invention.
Figure 38B:
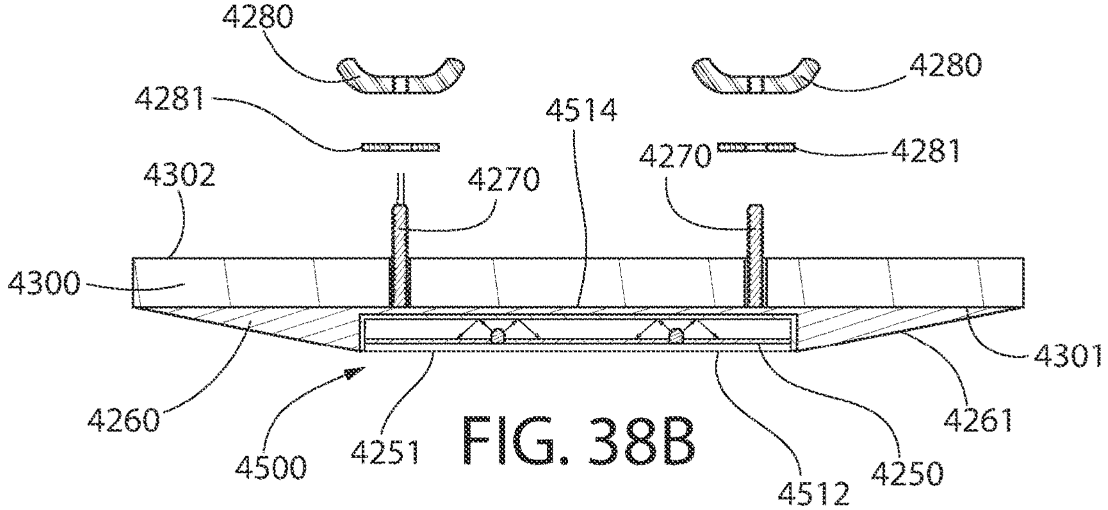
Figure 38C:
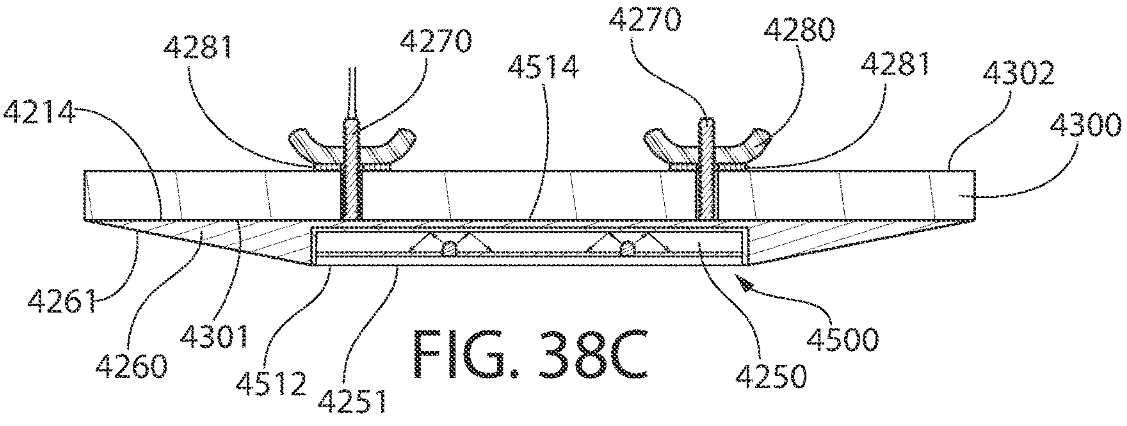

Referring to FIGS. 38A-38C, the process of coupling a light module 4500 to one of the ceiling tiles 4300 and the resulting structure will be described in accordance with an embodiment of the present disclosure. In the exemplified embodiment the light module 4500 comprises a light emitting portion 4250 and a cover portion 4260. The light emitting portion 4250 of the light module 4500 appears substantially similar to the light module 400 of FIG. 3.

The ceiling panel 4300 comprises a front surface 4301 and an opposing rear surface 4302. Furthermore, in the exemplified embodiment holes 4303 are formed through the entire thickness of the ceiling panel 4300 from the front surface 4301 to the rear surface 4302 to facilitate coupling of the light module 4500 to the ceiling panel 4300. The exemplified embodiment provides two of the holes 4303, although a single hole or more than two holes can be used in other embodiments as desired. Furthermore, in still other embodiments the holes 4303 may be omitted and the light module 4500 may be coupled to the ceiling tile 4300 using techniques that do not require the holes 4303, such as adhesive layers, hook-and-loop fasteners, or the like. In the exemplified embodiment the front and rear surfaces 4301, 4302 are flat, planar surfaces that are parallel to one another. However, the invention is not to be so limited in all embodiments and the front and rear surfaces 4301, 4302 of the ceiling panel 4300 may be wavy, undulated, uneven, textured, flat but not parallel, curved, contoured, or the like in other embodiments. Thus, the invention is not limited to the use of a flat, square or rectangular shaped ceiling tile in all embodiments.

In the exemplified embodiment the light module 4500 comprises the light emitting portion 4250 and the cover portion 4260 extending radially outward from the light emitting portion 4250. The front surface 4512 of the light module 4500 is formed collectively by the light emitting portion 4250 and the cover portion 4260. Specifically, the light emitting portion 4250 comprises a front surface 4251 and the cover portion 4260 comprises a front surface 4261, and the front surfaces 4251, 4261 collectively form the front surface 4512 of the light module 4500. In this embodiment, the light module 4500 further comprises threaded rods 4270 extending from the rear surface 4514. Each of the threaded rods 4270 has a diameter that is less than a diameter of the holes 4303 to permit the threaded rods 4270 to be inserted into the holes 4303 of the ceiling tile 4300 to facilitate coupling of the light module 4500 to the ceiling tile 4300.

When it is desired to couple the light module 4500 to the ceiling tile 4300, the threaded rods 4270 of the light module 4500 are aligned with the holes 4303 in the ceiling tile 4300 with the rear surface 4514 of the light module 4500 facing the front surface 4301 of the ceiling tile 4300 (FIG. 38A). The light module 4500 is translated towards the ceiling tile 4300 (or vice versa) until the threaded rods 4270 of the light module 4500 enter into the holes 4303 of the ceiling tile 4300. Translation continues until the rear surface 4514 of the light module 4500 is adjacent to and in contact with the front surface 4301 of the ceiling tile 4300. In the exemplified embodiment, the rear surface 4514 of the light module 4500 is a flat, planar surface so that an entirety of the rear surface 4514 of the light module 4500 is in contact with the front surface 4301 of the ceiling tile 4300. In this position a portion of the threaded rods 4270 protrudes beyond the rear surface 4302 of the ceiling tile.

Once in this position, fasteners such as a wing nut 4280 and a washer 4281 are screwed onto the portions of the threaded rods 4270 that protrude beyond the rear surface 4302 of the ceiling tile 4300 to secure the light module 4500 to the ceiling tile. Upon this action, the ceiling tile 4300 is sandwiched between the wing nut 4280/washer 4281 and the light module 4500. Although the wing nut 4280 and the washer 4281 are used in the exemplified embodiment to couple the light module 4500 to the ceiling tile 4300, the invention is not to be so limited in all embodiments. In other embodiments the light module 4500 may be coupled to the ceiling tile 4300 using other technical means, including without limitation adhesive, hook-and-loop, clips, fasteners, barbed pins, other types of nuts/bolts, interference fit, snap fit, tab and groove, or the like. Any of the techniques described with reference to FIGS. 6 and 13-29B and others can be used to couple the light module 4500 to the ceiling tile 4300.

In the exemplified embodiment the front surface 4512 of the light emitting portion 4250 of the light module 4500 is a planar surface that is parallel with the front surface 4301 of the ceiling tile 4300 (and with the rear surface 4514 of the light module 4500). However, the front surface 4261 of the cover portion 4260 of the light module 4500 is a slanted or inclined surface. Stated another way, the cover portion 4260 of the light module 4500 has a thickness measured between the front surface 4261 of the cover portion 4260 and the rear surface 4514 of the light module 4500. The thickness of the cover portion 4260 of the light module 4500 continuously decreases with radial distance from the light emitting portion 4250 of the light module 4500.

Figure 38D:
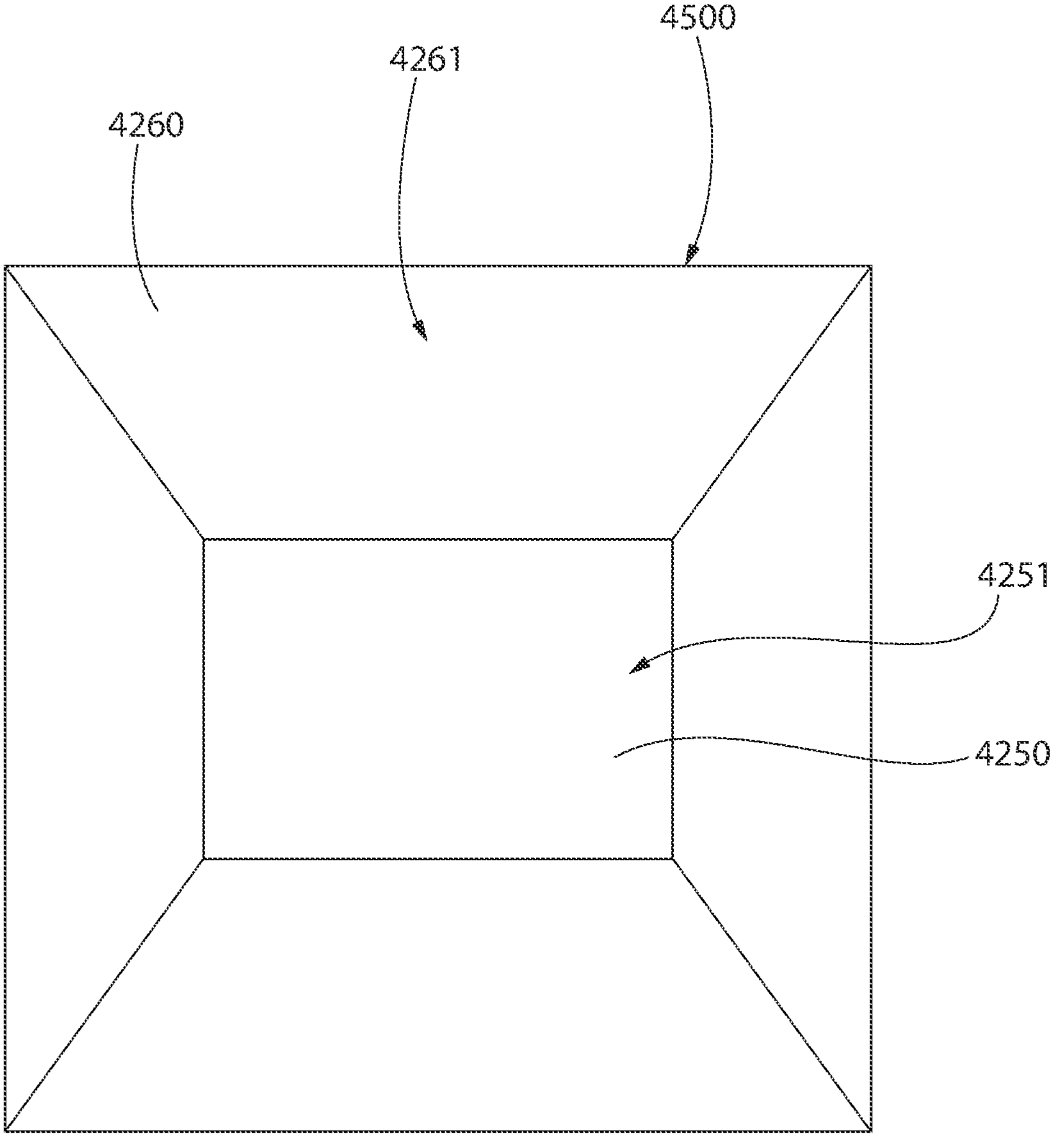
FIG. 38D is a front view of the integrated ceiling tile and light module of FIGS. 38A-38C.

Thus, when the light module 4500 is coupled to the ceiling tile 4300, the resultant structure is in the form of a truncated cone. This is depicted in FIGS. 38C and 38D, in which FIG. 38D is a front surface view of the combined light module 4500 and ceiling tile 4300. In the exemplified embodiment the overall dimensions (length and width) of the light module 4500 are the same as the dimensions (length and width) of the ceiling tile 4300. Thus, when the light module 4500 is coupled to the ceiling tile 4300 in the manner described above, no portion of the front surface 4301 of the ceiling tile 4300 is visible because the entire front surface 4301 of the ceiling tile 4300 is covered by the light module 4500. However, the invention is not to be so limited in all embodiments and in certain other embodiments portions of the front surface 4301 of the ceiling tile 4300 may remain exposed when the light module 4500 is coupled to the ceiling tile 4300.

The light module 4500 may, in certain embodiments, be a single unitary structure that comprises the cover portion 4260 and the light emitting portion 4250. In other embodiments the light emitting portion 4250 and the cover portion 4260 may be separate components that are mechanically or otherwise coupled together before installation onto the ceiling tile 4300. Furthermore, in certain embodiments the cover portion 4260 may be formed of a rigid material (i.e., wood, hard plastic, metal), a non-rigid material such as a fabric, cloth, or the like, or an elastomeric material such as rubber. In an effort at allowing the ceiling panel 4300 to operate as a sound absorber, the material of the cover portion 4260 may be perforated to enable sound to penetrate the cover portion 4260 of the light module 4500 for contact with and absorption by the ceiling tile 4300.

It should be appreciated that the cover portion 4260 extends radially from the light emitting portion 4250 and that no portion of the cover portion 4260 covers the front surface 4251 of the light emitting portion 4250. Thus, the light emitted by the light emitting portion 4250 of the light module 4500 penetrates directly through the front surface 4251 of the light emitting portion 4250 into the room and does not pass through the cover portion 4260. Stated another way, in the assembled structure, the front surface 4251 of the light emitting portion 4250 of the light module 4500 is exposed. When the ceiling tile 4300 with the light module 4500 coupled thereto is used in a suspended ceiling system, the front surface 4251 of the light emitting portion 4250 of the light module 4500 is visible to a person standing in the room.

Figure 39A:
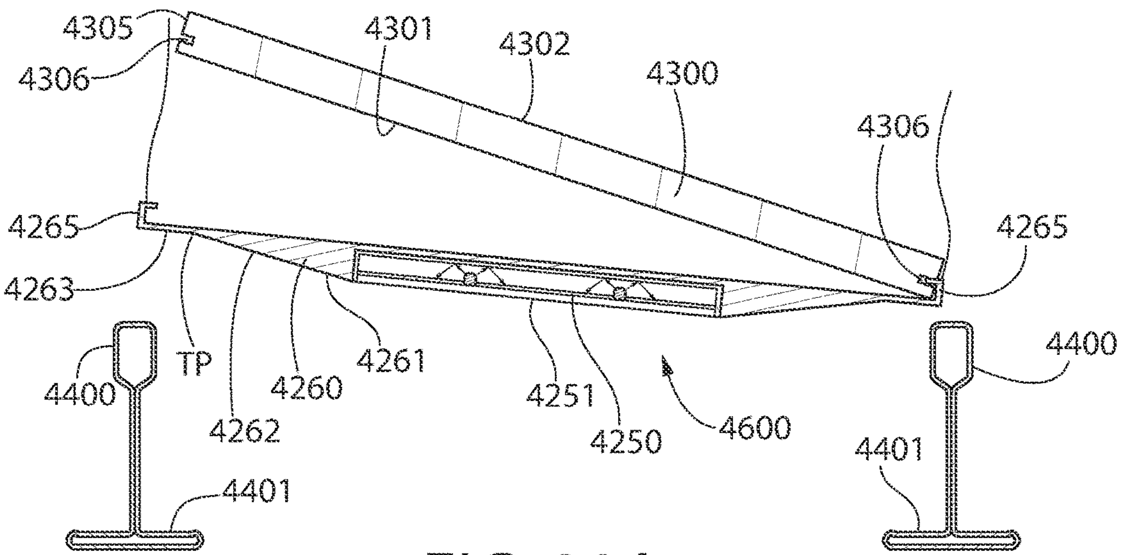
FIGS. 39A-39C are schematic views illustrating a process of coupling the light module to a ceiling tile in accordance with another embodiment of the present invention.
Figure 39B:
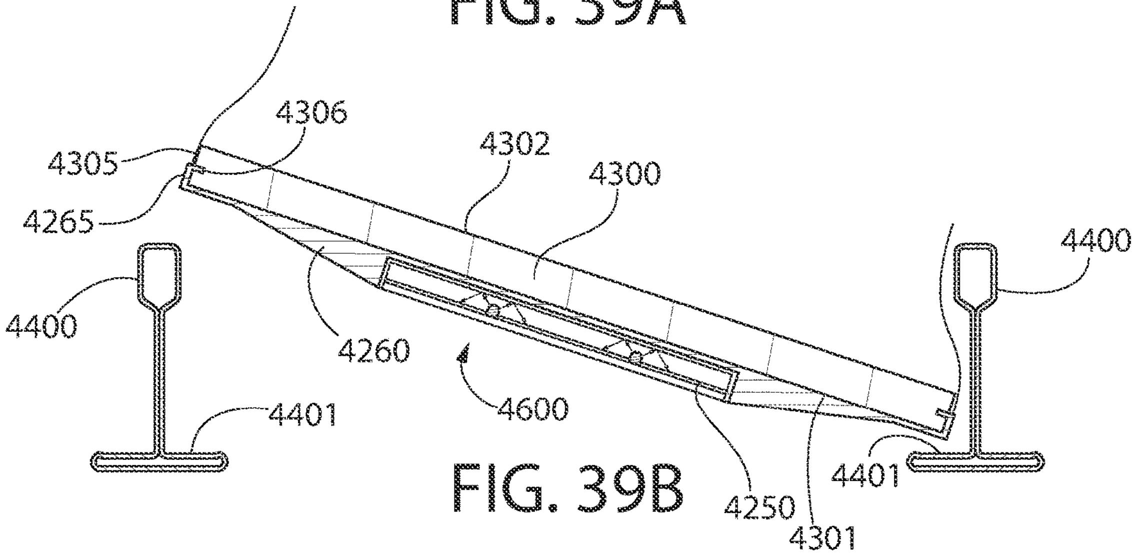
Figure 39C:
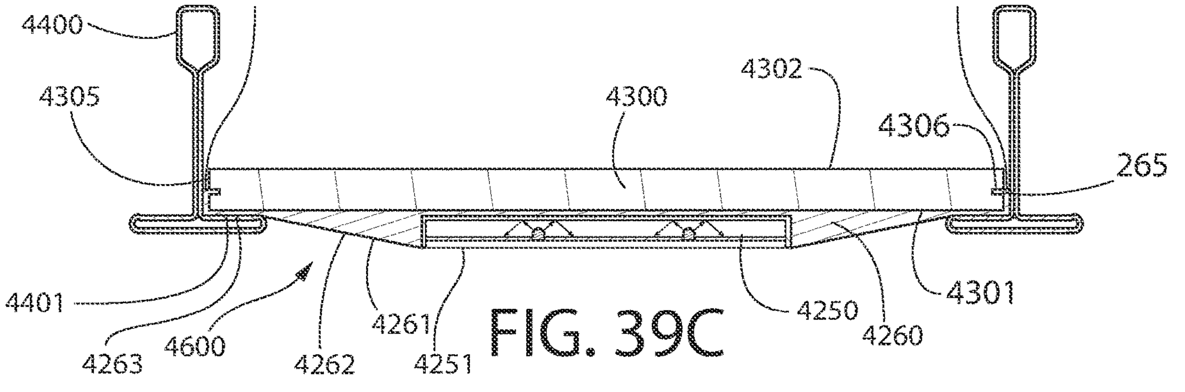

Referring to FIGS. 39A-39C, the process of coupling a light module 4600 to one of the ceiling tiles 4300 and the resulting structure will be described in accordance with another embodiment of the present disclosure. Many features of the embodiment of FIGS. 39A-39C are identical to features of the embodiment of FIGS. 38A-38C described above and such features will not be repeated below in the interest of brevity. Features in FIGS. 39A-39C will be similarly numbered to the features in FIGS. 38A-38C, it being understood that the description provided above applies.

The main difference in this embodiment is the manner in which the light module 4600 is coupled to the ceiling tile 4300. Specifically, in this embodiment the ceiling tile 4300 comprises the front surface 4301, the rear surface 4302, and a side surface 4305 extending between the front and rear surfaces 4301, 4302 and forming a periphery of the ceiling tile 4300. A slot 4306 is formed into the side surface 4305 of the ceiling tile 4300 to facilitate coupling of the light module 4600 thereto. Specifically, the light module 4600, and more specifically the cover portion 4260 of the light module 4600, comprises a hook portion 4265 that is configured to fit within the slot 4306 of the ceiling tile 4300 to couple the light module 4600 to the ceiling tile 4300.

The slot 4306 may be formed along two opposing sides of the side surface 4305 or along all four sides of the side surface 4305. Similarly, the hook portion 4265 may extend along two sides of the light module 4600 or along the entire periphery of the light module 4600. The light module 4600 is coupled to the ceiling tile 4300 by positioning the hook portion 4265 of the light module 4600 into the slot 4306 of the ceiling tile 4300. In certain embodiments the ceiling tile 4300 may include a chamfer to facilitate the insertion of the hook portion 4265 into the slot 4306. In other embodiments the hook portion 4265 may be resilient (i.e., formed of a resilient material such as an elastomer or rubber, formed of a metal that is sufficiently thin to enable it to bend and flex, or the like) so that the hook portion 4265 can be pulled outward for insertion into the slot 4306. Various techniques for facilitating coupling of the light module 4600 to the ceiling tile 4300 by utilizing the hook portion 4265 of the light module 4600 and the slot 4306 of the ceiling tile 4300 can be used as would be appreciated in the art.

As can be seen in FIGS. 39A-39C, the combined ceiling tile 4300 and light module 4600 is positioned atop of a flange 4401 of a grid support element 4400. In that regard, in the exemplified embodiment the front surface 4261 of the cover portion 4260 of the light module 4600 has an inclined portion 4262 that extends from the light emitting portion 4250 to a transition point TP and a flat, non-inclined portion 4263 that extends from the transition point TP to the peripheral edge of the light module 4600. The non-inclined portion 4263 of the front surface 4261 of the cover portion 4260 of the light module 4600 rests atop of the flange 4401 of the grid support element 4400 when the ceiling tile 4300 with the light module 4600 coupled thereto is positioned on the grid support element 4400. As can be seen in FIG. 39C, this ensures a stable resting position of the combined ceiling tile 4300 and light module 4600 when it is positioned supported by the grid support elements 4400.

In the embodiments of FIGS. 38A-38C and 39A-39C, power can be provided to the light module 4600 via wires that are coupled directly to the light module 4600 and extend to a power supply or via mating conductor contacts on the light module 4600 and the ceiling tile 4300 or on the light module 4600 and the grid support elements (i.e., electrified grid). Alternatively, the light module 4600 may be configured with an internal power source or battery. Any of various known techniques can be used to provide electrical power to the light module 4600 to power the light module 4600 for illumination.

Figure 40:
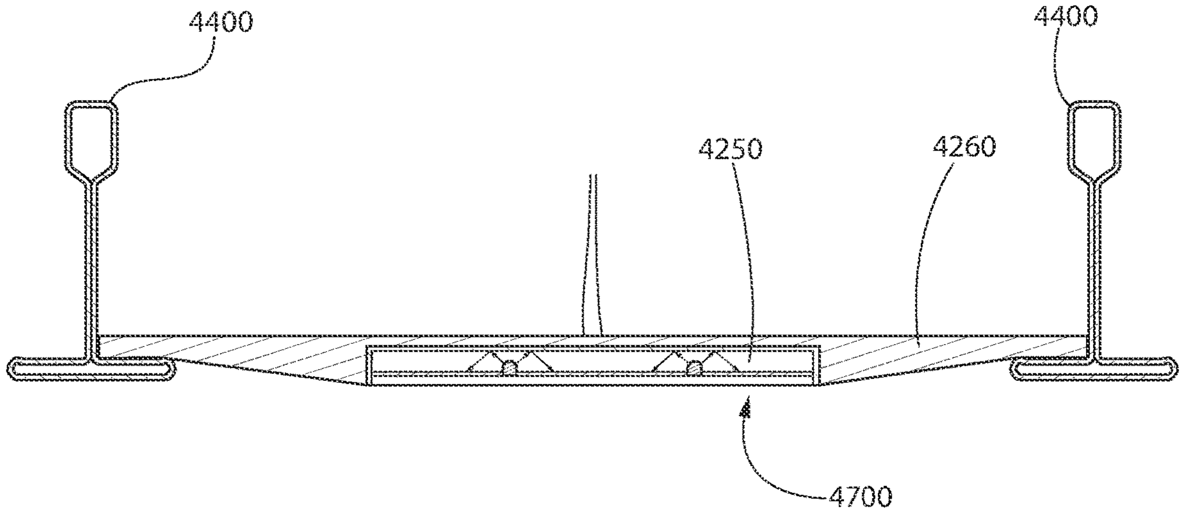
FIG. 40 is a schematic view illustrating the light module supported by grid support elements of a ceiling system.

FIG. 40 depicts another alternative embodiment for use of a light module 4700 that comprises the light emitting portion 4250 and the cover portion 4260. In this embodiment, the light module 4700 is not coupled to a ceiling tile, but rather the light module 4700 is directly supported by the grid support element 4400. Thus, in this embodiment the light module 4700 does not include any hooks or fasteners for coupling the light module 4700 to a ceiling tile. Rather, the light module 4700 is used in isolation without a ceiling tile to illuminate an interior space.

Figure 41:
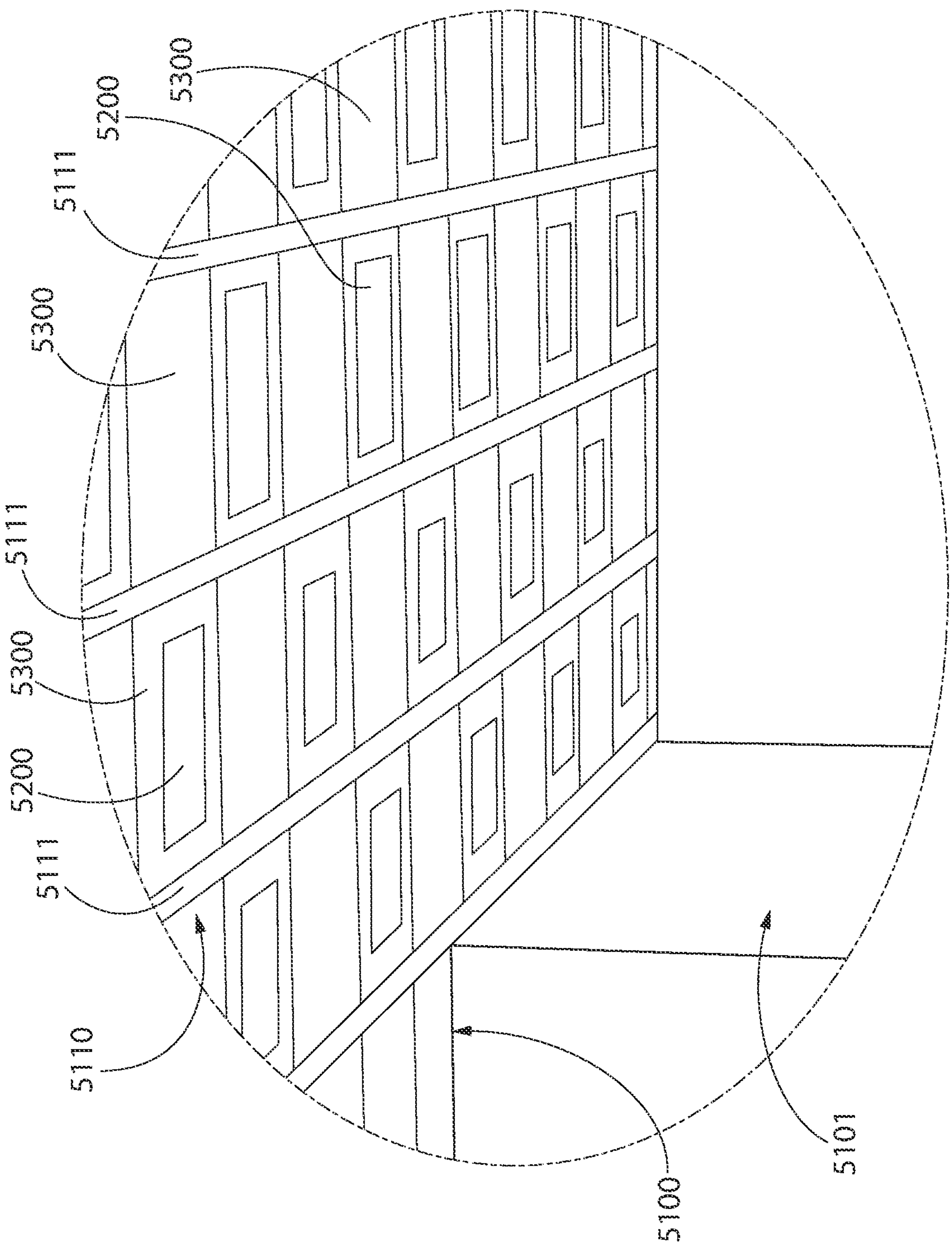
FIG. 41 is a partial view of an interior space illustrating an integrated ceiling and light system in accordance with an embodiment of the present invention.

Referring to FIG. 41, an integrated ceiling and light system 5100 is generally depicted forming a ceiling for an interior room or space 5101. The integrated ceiling and light system 5100 includes an overhead grid support system 5110 that is configured for mounting in a suspended manner from an overhead building support structure via appropriate hanger elements, such as for example without limitation fasteners, hangers, wires, cables, rods, struts, etc. In the exemplified embodiment the grid support system 5110 includes a plurality of grid support elements or members 5111 that are arranged parallel to one another. In certain embodiments, the grid support system 5110 may include both longitudinal grid support elements and lateral grid support elements that intersect one another. The use of grid support systems 5110 of these types is generally well known for forming a suspended ceiling in a commercial building (or any other building or space as may be desired).

The spaces between the grid support members 5111 form openings within which ceiling tiles 5300 can be positioned. Only a few of the ceiling tiles 5300 are labeled in the drawings to avoid clutter. The ceiling tiles 5300 close the openings to provide a desired aesthetic. Specifically, wiring and other mechanical structures may be located between the ceiling tiles 5300 and the overhead building support structure. The ceiling tiles 5300 hide the wiring and mechanical structures from view. However, the ceiling tiles 5300 can be readily removed from the grid support members 5111 to enable a person to gain access into the space between the ceiling tiles 5300 and the overhead building support structure for maintenance or the like.

The ceiling tiles 5300 referred to in the present disclosure with specific reference to FIGS. 41-50 may be any type of ceiling tile that is conventionally used in drop ceiling applications. The specific materials that may be used to form the ceiling tiles 5300 and other structural details of the ceiling tiles 5300 are the same as that which is provided above with regard to the ceiling tile 300 and thus will not be repeated herein in the interest of brevity. Thus, the ceiling tiles 5300 may be any type of ceiling tile described above with reference to the ceiling tile 300 and others. The ceiling tile 5300 may be square or rectangular as depicted in the exemplified embodiments, although the invention is not to be so limited in all embodiments and other shapes are possible to accomplish a desired ceiling aesthetic or for acoustic reasons.

Still referring to FIG. 41, a light module 5200 is illustrated coupled to several of the ceiling tiles 5300. In the exemplified embodiment, one of the light modules 5200 is illustrated coupled to every other one of the ceiling tiles 5300. However, the invention is not to be so limited in all embodiments. Rather, as many light modules 5200 as desired can be coupled to the various ceiling tiles 5300 (every ceiling tile 5300 may include one or more associated light modules 5200, every other ceiling tile 5300 may include one or more associated light modules 5200, or the like). The light module is denoted using the reference numeral 5200 in FIGS. 41-50, but it should be appreciated that the description above with regard to the light module 400 with reference to FIG. 3 is fully and equally applicable to the details of the light module 5200 except as otherwise described herein. Thus, certain of the structural and functional details of the light module 5200 will not be described herein for brevity, it being understood that the description of the similar structural and functional details of the light module 400 illustrated in FIG. 3 is applicable. Similar numbering will be used to describe the light module 5200 as the light module 400 except that the 5200 series of numbers will be used instead of the 400 series of numbers. It should be appreciated that the description of the features of the light module 400 is applicable to the similarly numbered features of the light module 5200 unless stated otherwise herein.

Referring to FIGS. 42A-42D, the process of coupling the light module 5200 to one of the ceiling tiles 5300 and the resulting structure will be described in accordance with an embodiment of the present disclosure. In this embodiment, the ceiling tile 5300 comprises a front surface 5301, an opposite rear surface 5302, and first, second, third, and fourth edges 5303*a-d* that collectively form a periphery of the ceiling tile 5300 extending between the front and rear surfaces 5301, 5302. Although the ceiling tile 5300 has four side edges 5303*a-d* in the exemplified embodiment, the disclosure is not to be so limited and the number of edges may be as the shape of the ceiling tile 5300 is changed.

The ceiling tile 5300 also comprises a nesting region 5304 that comprises a floor 5305 that is recessed relative to the front surface 5301 of the ceiling tile 5300. In the exemplified embodiment the nesting region 5304 extends from the first edge 5303*a* of the ceiling tile 5300 to a sidewall 5306 having a first edge profile. The first edge profile of the sidewall 5306 in this embodiment includes a lip portion 5307 that overhangs the floor 5305 of the nesting region 5304 by a gap thereby forming a slot 5308 between the lip portion 5307 and the floor 5305 of the nesting region 5304. The slot 5308 facilitates coupling of the light module 5200 to the ceiling tile 5300 as described in more detail below. Of course, the invention is not to be limited by this particular structure or edge profile for the sidewall 5306 in all embodiments and other edge profiles are possible so long as there is a corresponding edge profile on the light module 5200 to permit the coupling of the light module 5200 to the ceiling tile 5300, as discussed in more detail below.

In the exemplified embodiment, the nesting region 5304 of the ceiling tile 5300 extends from the first edge 5303*a* of the ceiling tile 5300 to the sidewall 5306. Furthermore, each of the first edge 5303*a* of the ceiling tile 5300 and the sidewall 5306 extends between the second edge 5303*b* of the ceiling tile 5300 and a third edge 5303*c* of the ceiling tile 5300. A width of the nesting region 5304 measured from the first edge 5303*a* of the ceiling tile 5300 to the sidewall 5306 continuously decreases from the second edge 5303*b* of the ceiling tile 5300 to the third edge 5303*c* of the ceiling tile 5300. Stated another way, in the exemplified embodiment the sidewall 5306 that bounds the nesting region 5304 of the ceiling tile 5300 extends along an axis that is non-parallel to an axis upon which the first edge 5303*a* of the ceiling tile 5300 extends. Furthermore, the axis upon which the sidewall 5306 extends intersects the axis upon which the first edge 5303*a* of the ceiling tile 5300 extends at an acute angle. Of course, the invention is not to be limited by this structure in all embodiments and the sidewall 5306 may extend parallel to the first edge 5303*a* of the ceiling tile 5300 in some other embodiments.

The light module 5200 is sized, shaped, and/or otherwise configured to be coupled to the ceiling tile 5300 within the nesting region 5304 of the ceiling tile 5300. Specifically, in the exemplified embodiment the light module 5200 comprises a first edge 5220 that has a second edge profile. The first edge profile of the sidewall 5306 of the ceiling tile 5300 and the second edge profile of the first edge 5220 of the light module 5200 have corresponding shapes such that the first edge 5220 of the light module 5200 mates with the sidewall 5306 bounding the nesting region 5304 of the ceiling tile 5300 to couple the light module 5200 to the ceiling tile 5300.

In the exemplified embodiment, the ceiling tile 5300 comprises a passageway 5310 extending from the floor 5305 of the nesting region 5304 to the rear surface 5302 of the ceiling tile 5300. The passageway 5310 provides a location for wiring of the light module 5200 to extend through the ceiling tile 5300 for coupling with a power supply upon coupling of the light module 5200 to the ceiling tile 5300.

In the exemplified embodiment, one or more clips 5250 are coupled to the ceiling tile 5300 to further facilitate coupling of the light module 5200 to the ceiling tile 5300. In the exemplified embodiment two of the clips 5250 are used for securing the light module 5200 to the ceiling tile 5300, although one clip or more than two clips may be used in other embodiments. The clips 5250 comprise a coupling portion 5251 that engages the rear surface 5302 of the ceiling tile 5300 to couple the clip 5250 to the ceiling tile 5300 and a resilient portion 5252 that engages a second edge 5225 of the light module 5200 that is opposite the first edge 5220 of the light module 5220 to secure the light module 5200 to the ceiling tile 5300 within the nesting region 5304.

In the exemplified embodiment, a plurality of teeth 5253 extend from the coupling portion 5251 to facilitate coupling of the clips 5250 to the ceiling tile 5300. Specifically, the teeth 5253 are configured to penetrate the material of the ceiling tile 5300 to facilitate coupling of the clips 5250 to the ceiling tile 5300. Of course, the invention is not to be so limited in all embodiments and the teeth 5253 may be replaced by other techniques for coupling the clips 5250 to the ceiling tile 5300, including adhesion, fasteners, hook-and-loop, or the like. The resilient portion 5252 of the clips 5250 is resilient/movable relative to the coupling portion 5251 between a retaining position (illustrated in solid lines in FIGS. 42B and 42C) in which the resilient portion 5252 of the clip 5250 contacts an edge of the light module 5200 and a flexed position (illustrated in dotted lines in FIG. 42B), in which the resilient portion 5252 of the clip 5250 is moved in a direction away from the first edge 5303*a* of the ceiling tile 5300 to permit insertion of the light module 5200 into the nesting region 5304 of the ceiling tile 5300.

The resilient portion 5252 may be biased into the retaining position so that the clip 5250 in its biased position retains the light module 5200 coupled to the ceiling tile 5300. In the exemplified embodiment, the clips 5250 are coupled to the ceiling tile 5300 by pressing the coupling portion 5251 of the clips 5250 against the rear surface 5302 of the ceiling tile 5300 so that the teeth 5253 penetrate into the rear surface 5302 of the ceiling tile 5300 and the resilient portion 5252 extends upwardly from the first edge 5303*a* to form a partial boundary of the nesting region 5304. Of course, as noted above, the invention is not to be so limited and the clips 5250 can be coupled to the ceiling tile 5300 using other techniques, including fasteners, adhesion, or the like.

Figure 42A:
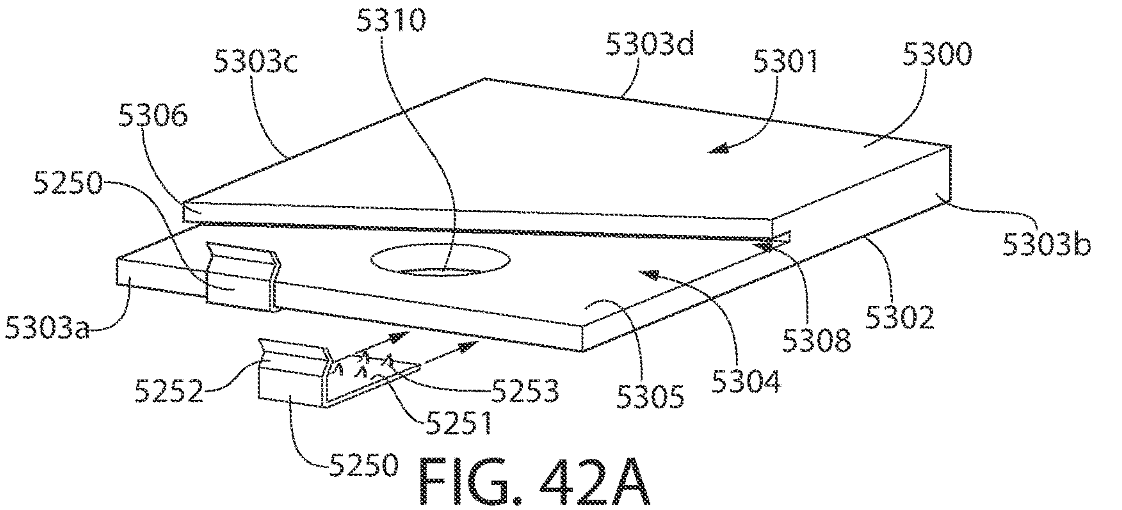
FIGS. 42A-42D are schematic views illustrating a process of coupling a light module to a ceiling tile in accordance with an embodiment of the present invention.
Figure 42B:
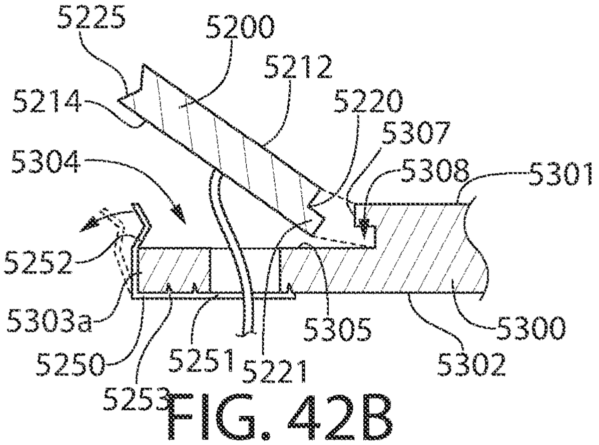
Figure 42C:
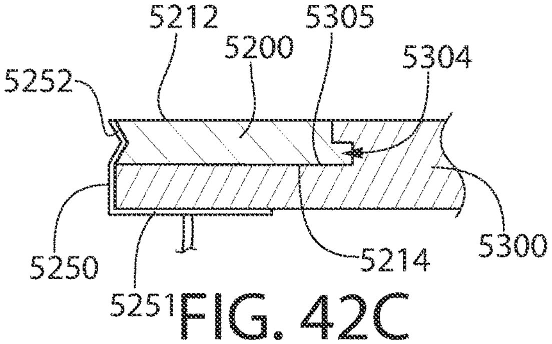
Figure 42D:
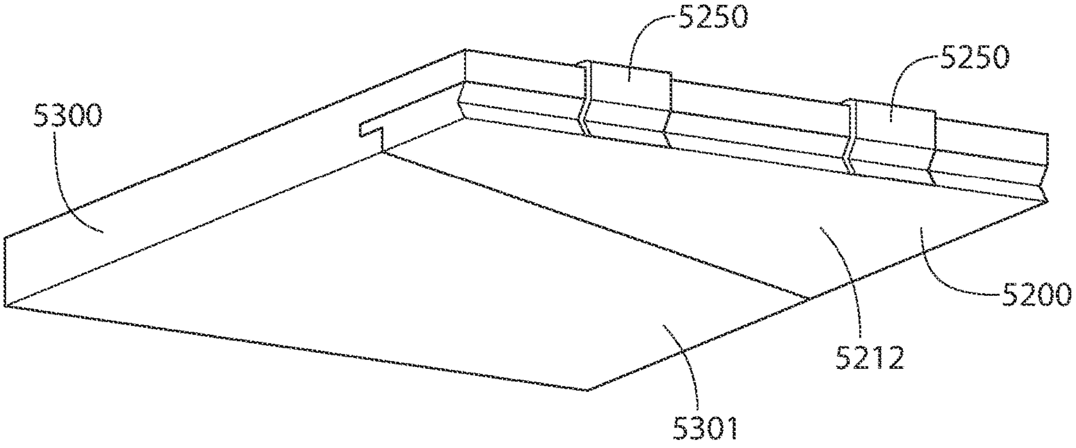

FIGS. 42B and 42C illustrate schematically the process of coupling the light module 5200 to the ceiling tile 5300. In this embodiment, the light module 5200 comprises the first edge 5220 having the second edge profile that corresponds to the first edge profile of the sidewall 5306 and a second edge 5225 that is configured for engagement with the resilient portion 5252 of the clips 5250. More specifically, the first edge 5220 of the light module 5200 comprises a flange 5221 that has a height that is equal to or less than a height of the slot 5308 so that the flange 5221 of the first edge 5220 can be inserted into the slot 5308. The flange 5221 of the light module 5200 and the slot 5308 of the sidewall 5306 may be elongated mating flanges/slots in some embodiments. The second edge 5225 of the light module 5200 has a chevron-shaped (or V-shaped) profile that corresponds with the shape of the resilient portion 5252 of the clip 5250. Of course, the second edge 5225 may have other shapes, including forming a flat, planar edge, in other embodiments.

During assembly, the clips 5250 are coupled to the ceiling tile 5300 by penetrating the rear surface 5302 of the ceiling tile 5300 with the teeth 5253 of the coupling portion 5251 of the clips 350. The resilient portion 5252 of the clips 5250 are aligned with and extend beyond the first edge 5303*a* of the ceiling tile 5300. The light module 5200 is inserted into the nesting region 5304 of the ceiling tile 5300 until the flange 5221 of the first edge 5220 of the light module 5200 is positioned within the slot 5308 of the sidewall 5306 of the ceiling tile 5300 (i.e., until the first side profile of the sidewall 5306 mates with second side profile of the light module 5200) If any wires are coupled to the light module 5200, such wires may be inserted through the passageway 5310 so that they can be coupled to a power supply. As the second edge 5225 of the light module 5200 passes over the resilient portion 5252 of the clip 5250, the clip 5250 flexes outwardly into the flexed position to accommodate the second edge 5225 of the light module 5200 as depicted in dotted lines in FIG. 42B. Upon the light module 5200 being fully inserted within the nesting region 5304, the clip 5250 snaps back into its biased, retaining position (illustrated in solid lines in FIG. 42B), thereby retaining the light module 5200 in place coupled to the ceiling tile 5300 (see FIGS. 42C and 42D).

Figure 43A:
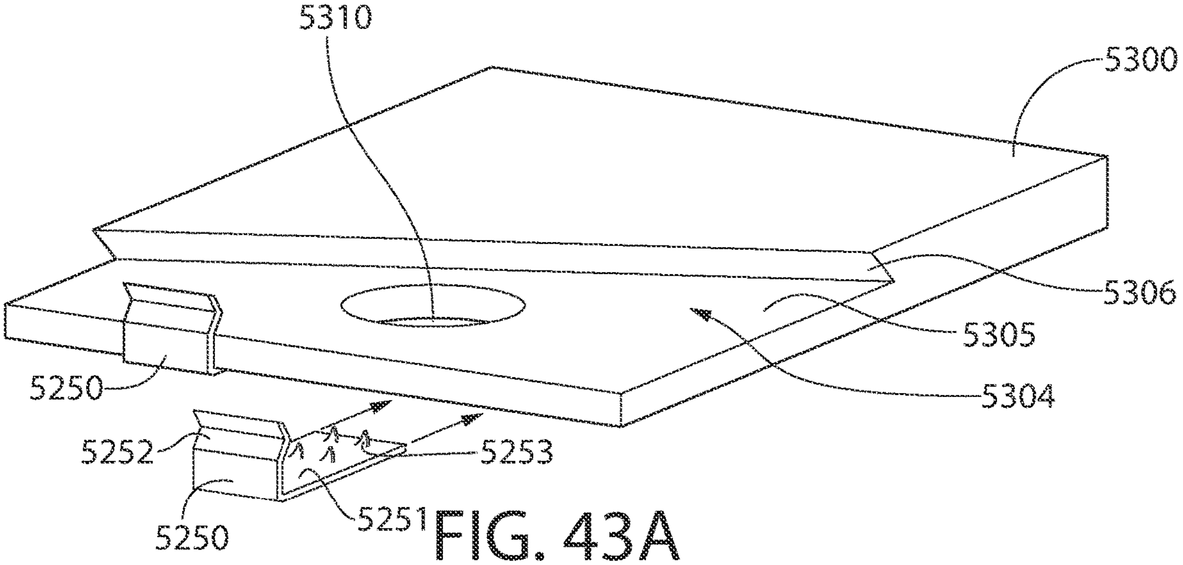
FIGS. 43A-43C are schematic views illustrating a process of coupling a light module to a ceiling tile in accordance with an embodiment of the present invention.
Figure 43B:
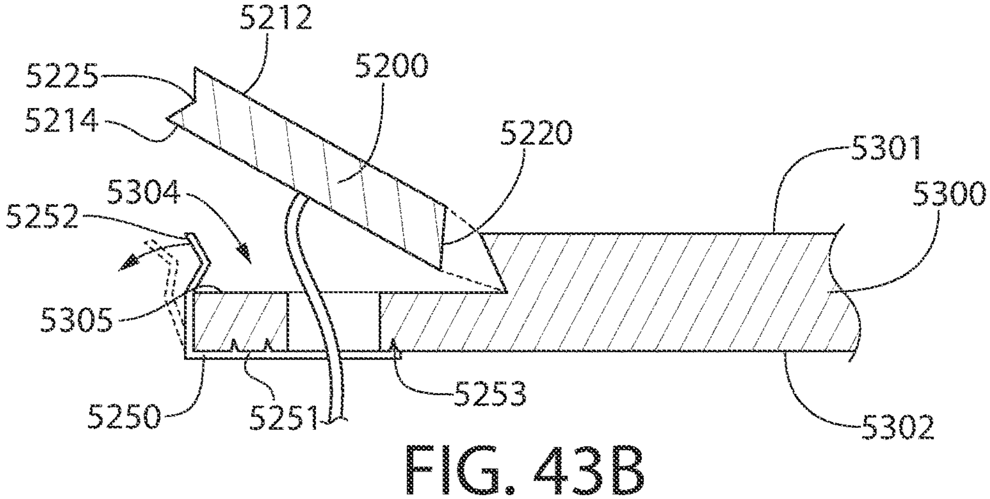
Figure 43C:
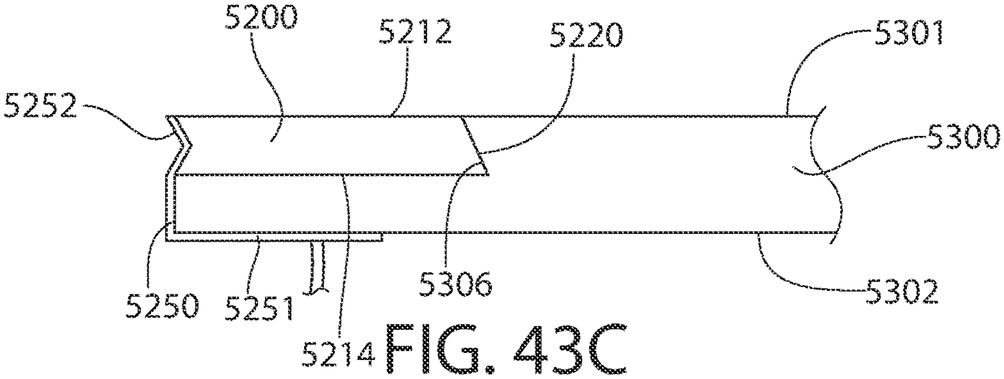

Referring briefly to FIGS. 43A-43C, the process of coupling the light module 5200 to one of the ceiling tiles 5300 and the resulting structure will be described in accordance with an embodiment of the present disclosure. The structure of the light module 5200 and the ceiling tile 5300 in FIGS. 43A-43C is substantially the same as that described above and depicted in FIGS. 42A-42D except as described specifically in detail below. Thus, the components of FIGS. 43A-43C will be similarly numbered to FIGS. 42A-42D, it being understood that the description of the components and features of FIGS. 42A-42D applies to FIGS. 43A-43C.

The difference between the embodiment of FIGS. 43A-43C and the embodiment of FIGS. 42A-42D is the shape of the sidewall 5306 that forms a part of the boundary of the nesting region 5304. Specifically, in FIGS. 43A-43C the sidewall 5306 is not a stepped surface (as it was with FIGS. 42A-42D), but rather the sidewall 5306 extends from the floor 5305 of the nesting region 5304 at an acute angle (i.e., an acute angle is formed between the floor 5305 of the nesting region 5304 and the sidewall 5306). Similarly, the first edge 5220 of the light module 5200 is a wall that extends from the rear surface 5212 of the light module 5200 at an acute angle. Thus, in this embodiment the first edge profile of the sidewall 5306 and the second edge profile of the first edge 5220 of the light module 5200 are angled surfaces. Thus, rather than having the lip 5307 and the slot 5308, it is the corresponding angles walls of the sidewall 5306 bounding the nesting region 5304 and the first edge 5220 of the light module 5200 that assist in coupling the light module 5200 to the ceiling tile 5300 along with the clips 5250.

During assembly, the light module 5200 is positioned within the nesting region 5304 so that the first edge 5220 of the light module 5200 abuts against the sidewall 5306 and the rear surface 5212 of the light module 5200 is in contact with the floor 5305 of the nesting region 5304. Similar to the discussion above, during insertion of the light module 5200 into the nesting region 5304, the clip 5250 flexes from the retaining position to the flexed position (shown in dotted lines in FIG. 43B), and then back to the retaining position once the light module 5200 is fully disposed within the nesting region 5304. Thus, this embodiment is the same as that described above with reference to FIGS. 42A-42D except with regard to the shapes/profiles of the sidewall 5306 and of the first edge 5220 of the light module 5200.

In both the embodiments of FIGS. 42A-42D and 43A-43C, when the light module 5200 is coupled to the ceiling tile 5300, the front surface 5212 of the light module 5200 is flush with the front surface 5301 of the ceiling tile 5300. Of course, the invention is not to be so limited in all embodiments and the light module 5200 may be recessed relative to or protrude beyond the front surface 5301 of the ceiling tile 5300 in some embodiments. However, the flush arrangement may be desirable for aesthetic purposes. Furthermore, in certain embodiments the front surface 5212 of the light module 5200 may face the floor 5305 of the nesting region 5304 of the ceiling tile 5300 such that the light emitted from the front surface 5212 of the light module 5200 emits through the passageway 310. In that regard, the passageway 310 may have any desired shape and size to achieve a desired amount of illumination from the light module 5200 and to create a desired aesthetic.

Furthermore, it should be appreciated that in this embodiment the light modules 5200 can be dynamically coupled to the ceiling tiles 5300 without requiring removal of the ceiling tiles 5300 if the ceiling tiles 5300 are already coupled to the support grids. The only reason to remove the ceiling tiles 5300 during installation of the light modules 5200 would be to provide power to the light modules 5200. However, in certain embodiments wiring of the light modules 5200 is not required and the light modules 5200 can be powered upon installation by providing pre-powered electrical contacts on the ceiling tile 5300 that mate with electrical contacts of the light modules 5200, by incorporating an internal power supply (i.e., batteries) into the light module, utilizing electrified grids, or the like.

Figure 44A:
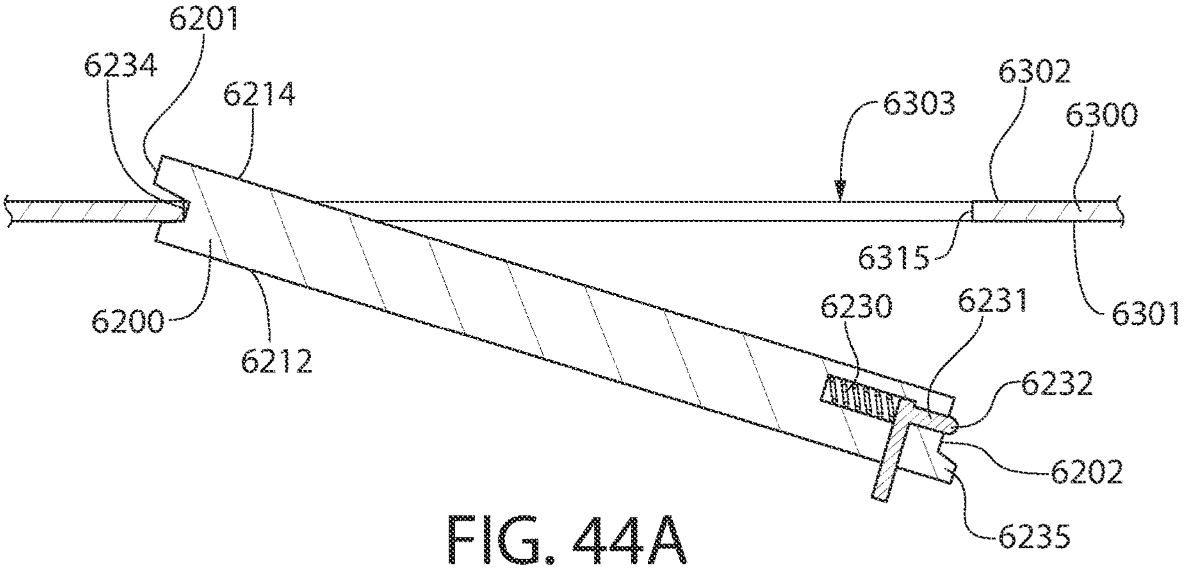
FIGS. 44A-44C are schematic views illustrating a process of coupling a light module to a ceiling tile in accordance with an embodiment of the present invention.
Figure 44B:
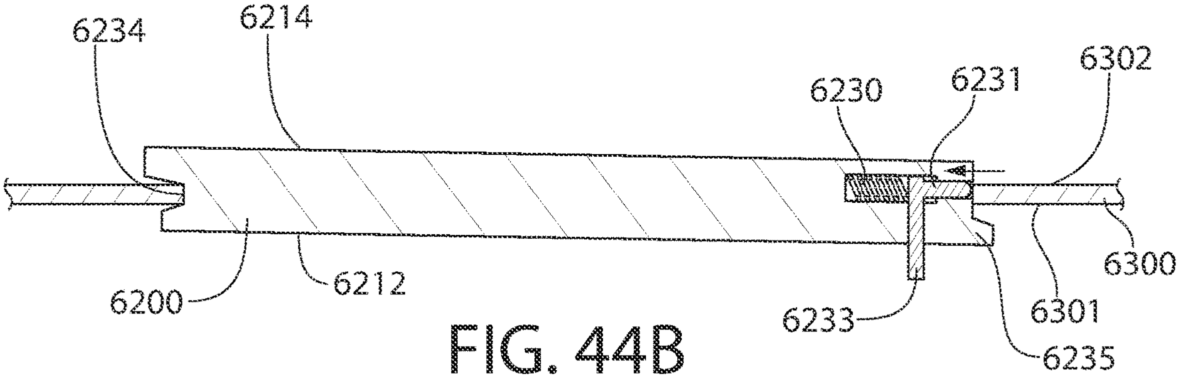
Figure 44C:
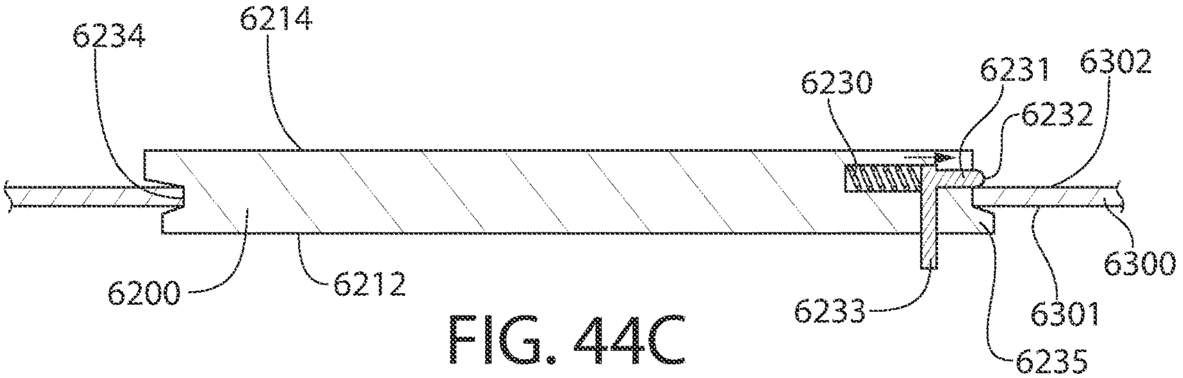

Referring to FIGS. 44A-44C, the process of coupling a light module 6200 to a ceiling tile 6300 and the resulting structure will be described in accordance with an embodiment of the present disclosure. The details of the light module 6200 and the ceiling tile 6300 with regard to material of construction, structure, and the like is the same as that which has been described above with the embodiments described previously except as otherwise stated herein. Specifically, although the light module 6200 is illustrated generically in FIGS. 44A-44C, it should be appreciated that the light module 6200 may be the light module of FIG. 3 or any of the other types of light modules described herein. Furthermore, in certain preferred aspects the ceiling tile 6300 in this embodiment is formed of metal, although this is not required and the ceiling tile 6300 may be formed of any of the materials described herein above. Numbering similar to that which was used in FIGS. 42A-43C may be used in FIGS. 44A-44C, it being understood that the description of the components in FIGS. 42A-43C are applicable to this embodiment for those similarly numbered components.

The ceiling tile 6300 comprises a front surface 6301, a rear surface 6302, and a through-hole 6303 extending through the ceiling tile 6300 from the front surface 6301 to the rear surface 6302. In this embodiment, the light module 6200 comprises a first edge 6201 having a groove 6234 formed therein and a second edge 6202 having a spring 6230 and a spring-actuated protuberance 6231 coupled thereto. The groove 6234 in the first edge 6201 of the light module 6200 is sized and configured to receive a portion of the ceiling tile 6300 during coupling of the light module 6200 to the ceiling tile 6300. The spring-actuated protuberance 6231 is configured to lock/engage and unlock/disengaged the light module 6200 from the ceiling tile 6300. In some embodiments both of the opposing first and second edges 6201, 6202 may include a spring-actuated protuberance such that the groove 6234 may be replaced by a second spring-actuated protuberance as described herein.

In the exemplified embodiment, the spring-actuated protuberance 6231 is positioned on the second edge 6202 of the light module 6200 so that when the spring 6230 is in its biased, fully extended position (FIG. 44A), a tip 6232 of the spring-actuated protuberance 6231 protrudes beyond the periphery of the light module 6200. Stated another way, the spring-actuated protuberance 6231 is movable between a biased state in which the spring 6230 is in its normal or biased state having no forces acting thereon and the protuberance 6231 protrudes from the second edge 6202 of the light module 6200 and an actuated state in which the spring 6230 is compressed and the protuberance 6231 does not protrude form the second edge 6202 of the light module 6200. In the actuated state the protuberance 6231 is retracted into the second edge 6202 of the light module 6200. Although the spring 6230 and the spring-actuated protuberance 6231 are used in the exemplified embodiment, the invention is not to be so limited in all embodiments and the spring 6230 and the spring-actuated protuberance 6231 may be replaced by, for example without limitation, a resilient protrusion or the like.

Furthermore, in the exemplified embodiment a manual actuator 6233 may be located on the front surface 6212 of the light module 6200 (although the manual actuator 6233 may be located on the rear surface 6214 of the light module 6200 in other embodiments, or altogether omitted in still other embodiments). A user can physically move the manual actuator 6233 left to right and vice versa to move the spring 6230 and the spring-actuated protuberance 6231 between a locked state (FIG. 44C) and an unlocked state (FIG. 44B). Furthermore, as discussed below, the spring-actuated protuberance 6231 will move between the locked and unlocked states automatically during insertion of the light module 6200 into the through-hole 6303 in the ceiling tile 6300.

When it is desired to couple the light module 6200 to the ceiling tile 6300, the light module 6200 is tilted and the first edge 6201 of the light module 6200 that includes the groove 6234 is raised into the through-hole 6303 until a portion of the ceiling tile 6300 is positioned within the groove 6234 of the light module 6200 as depicted in FIG. 44A. With the portion of the ceiling tile 6300 positioned within the groove 6234, the second edge 6202 is moved upwardly towards the ceiling tile 6300 until the protuberance 6231 contacts an edge 315 of the ceiling tile 6300 that defines/surrounds the through-hole 6303 (see FIG. 44B). As the light module 6200 continues to be moved upwardly into the through-hole 6303, the protuberance 6231 will slide against the force of the spring 6230 to permit the protuberance 6231 to pass over the edge 315 of the ceiling tile 6300 until the protuberance 6231 is positioned adjacent to the rear surface 6302 of the ceiling tile 6300. At this point, the biasing force of the spring 6230 causes the spring-actuated protuberance 6231 to slide into the locked state depicted in FIG. 44C. In this position, the light module 6200 is coupled to the ceiling tile 6300 and remains in such position until the light module 6200 is removed by a user. Specifically, a portion of the ceiling tile 6300 is located within the groove 6234 and the portion 6315 of the ceiling tile 6300 is trapped between the tip 6232 of the protuberance 6231 and a flange 6235 of the light module 6200. If it is desired for a user to remove the light module 6200 from the ceiling tile 6300, the user can slide the manual actuator 6233, which in turn slides the spring-actuated protuberance 6231 from the locked state of FIG. 44C into the unlocked state of FIG. 44B. In this position, the light module 6200 can be separated from the ceiling tile 6300.

Figure 45A:
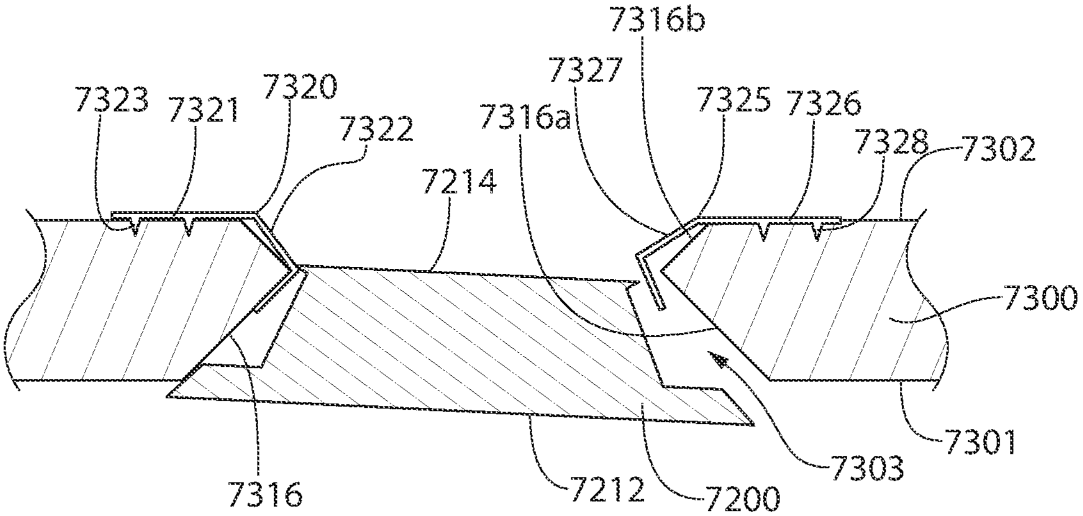
FIGS. 45A-45B are schematic views illustrating a process of coupling a light module to a ceiling tile in accordance with an embodiment of the present invention.
Figure 45B:
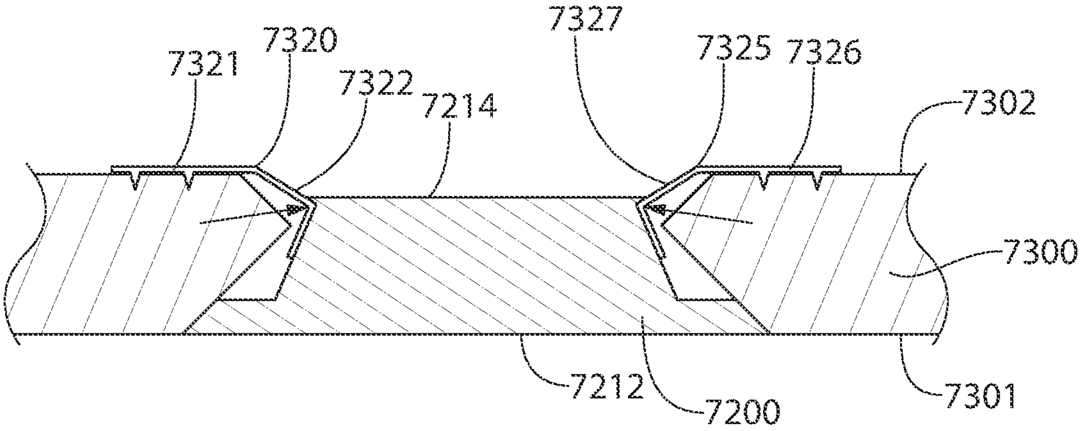

Referring to FIGS. 45A-45B, the process of coupling a light module 7200 to a ceiling tile 7300 and the resulting structure will be described in accordance with an embodiment of the present disclosure. The details of the light module 7200 and the ceiling tile 7300 with regard to material of construction, structure, and the like is the same as that which has been described above with the embodiments described previously except as otherwise stated herein. Specifically, although the light module 7200 is illustrated generically in FIGS. 45A-45B, it should be appreciated that the light module 7200 may be the light module of FIG. 3 or any of the other types of light modules described herein. Numbering similar to that which was used in FIGS. 42A-43C may be used in FIGS. 45A-45B, it being understood that the description of the components in FIGS. 42A-43C are applicable to this embodiment for those similarly numbered components.

The ceiling tile 7300 in this embodiment comprises a front surface 7301, a rear surface 7302, and a through-hole 7303 extending through the ceiling tile 7300 from the front surface 7301 to the rear surface 7302. A first clip 7320 is coupled to the ceiling tile 7300 on a first side of the through-hole 7303 and a second clip 7325 is coupled to the ceiling tile 7300 on a second side of the through-hole 7303. Although two clips 7320, 7325 are depicted in the exemplified embodiment, a single clip or more than two clips may be used in other embodiments.

In the exemplified embodiment the first clip 7320 comprises a coupling portion 7321 and a resilient portion or retaining portion 7322. A plurality of teeth 7323 extend from the coupling portion 7321 for penetrating the ceiling tile 7300 to couple the first clip 7320 to the ceiling tile 7300. The second clip 7325 comprises a coupling portion 7326 and a resilient portion or retaining portion 7327. A plurality of teeth 7328 extend from the coupling portion 7326 for penetrating the ceiling tile 7300 to couple the second clip 7325 to the ceiling tile 7300. Specifically, in the exemplified embodiment the coupling portions 7321, 7326 of the first and second clips 7320, 7325 are coupled to the rear surface 7302 of the ceiling tile 7300 by pressing the first and second clips 7320, 7325 against the rear surface 7302 of the ceiling tile 7300 so that the plurality of teeth 7323, 7328 penetrate the rear surface 7302 of the ceiling tile. When the first and second clips 7320, 7325 are properly coupled to the ceiling tile 7300, the resilient portions 7322, 7327 of the first and second clips 7320, 7325 extend into the through-hole 7303.

The first and second clips 7320, 7325 are movable between a first position in which the clips 7320, 7325 are spaced apart from a sidewall 7316 of the ceiling tile 7300 that defines the through-hole 7303 and a second position in which the clips 7320, 7325 are in contact with the sidewall 7316 of the ceiling tile 7300. The first and second clips 7320, 7325 are biased into the first position and alter from the first position to the second position during insertion of the light module 7200 through the through-hole 7303. In the exemplified embodiment the sidewall 7316 comprises a first sidewall 7316*a* that extends from the front surface 7301 of the ceiling tile 7300 at an obtuse angle and a second sidewall 7316*b* that extends from the rear surface 7302 of the ceiling tile 7300 at an obtuse angle. However, the invention is not to be limited by the shape or profile of the sidewall 7316 in all embodiments.

In this embodiment, the light module 7200 is inserted into the opening 7303 via the front surface 7301 of the ceiling tile 7300, although the invention is not to be so limited and the light module 7200 may be inserted into the opening 7303 via the rear surface 7301 of the ceiling tile 7300 in other embodiments. As the light module 7200 is inserted into the opening 7303, the light module 7200 contacts at least one of the clips 7220, 7225 and moves the clip 7220, 7225 from the biased first position to the second position. Thus, the light module 7200 contacts the clip 7220, 7225 and moves the clip inwardly towards the sidewall 7316 in order to enable the light module 7200 to pass. Upon the light module 7200 being fully inserted into the opening 7303, the first and second clips 7320, 7325 bias back into the first position, and the first and second clips 7320, 7325 retain the light module 7200 within the through-hole 7303. In the exemplified embodiment the front surface 7212 of the fully installed light module 7200 is flush with the front surface 7301 of the ceiling tile 7300 (FIG. 45B), although this is not required in all embodiments.

Figure 46A:
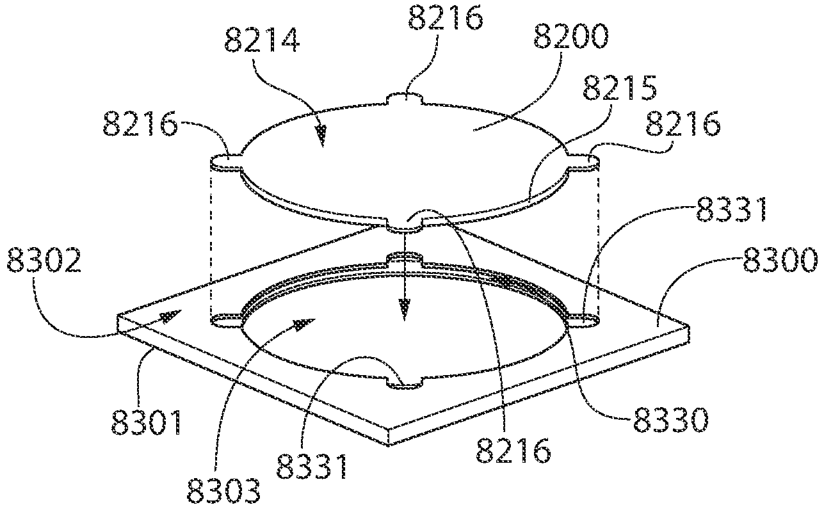
FIGS. 46A-46D are schematic views illustrating a process of coupling a light module to a ceiling tile in accordance with an embodiment of the present invention.
Figure 46B:
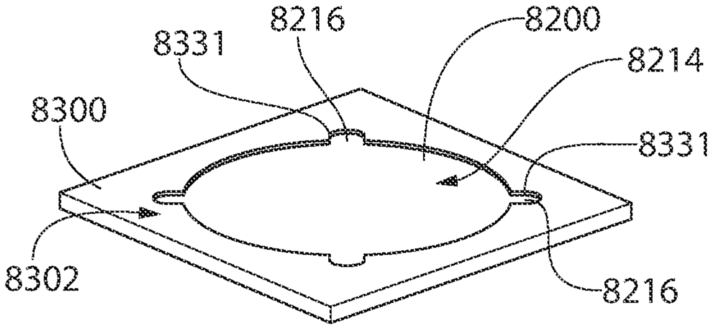
Figure 46C:
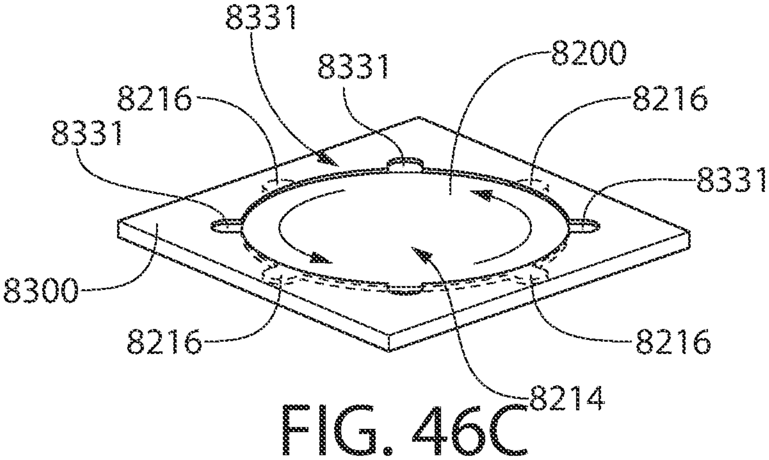

Referring to FIGS. 46A-46C, the process of coupling a light module 8200 to a ceiling tile 8300 and the resulting structure will be described in accordance with an embodiment of the present disclosure. The details of the light module 8200 and the ceiling tile 8300 with regard to material of construction, structure, and the like is the same as that which has been described above with the embodiments described previously except as otherwise stated herein. Specifically, although the light module 8200 is illustrated generically in FIGS. 46A-46C, it should be appreciated that the light module 8200 may be the light module of FIG. 3 or any of the other types of light modules described herein. Numbering similar to that which was used in FIGS. 42A-43C may be used in FIGS. 46A-46C, it being understood that the description of the components in FIGS. 42A-43C are applicable to this embodiment for those similarly numbered components.

In this embodiment, the ceiling tile 8300 has a front surface 8301, an opposing rear surface 8302, and a through-through-hole 8303 extending through the ceiling tile 8300 from the front surface 8301 to the rear surface 8302. Furthermore, a circumferential groove 8330 is formed into the ceiling tile 8300 and extends radially outwardly from the through-hole 8303. Moreover, the ceiling tile 8300 comprises a plurality of notches 8331 formed into the rear surface 8302 that are in spatial communication with the through-hole 8303 and provide a passageway from the ambient/exterior environment into the groove 8330.

The light module 8200 comprises the front surface 8212, the rear surface 8214, a peripheral surface 8215, and a plurality of tabs 8216 extending outwardly from the peripheral surface 8215 in a spaced apart manner. In the exemplified embodiment the plurality of tabs 8216 are sized and shaped to fit within the notches 8331 in the rear surface 8302 of the ceiling tile 8300.

Figure 46D:
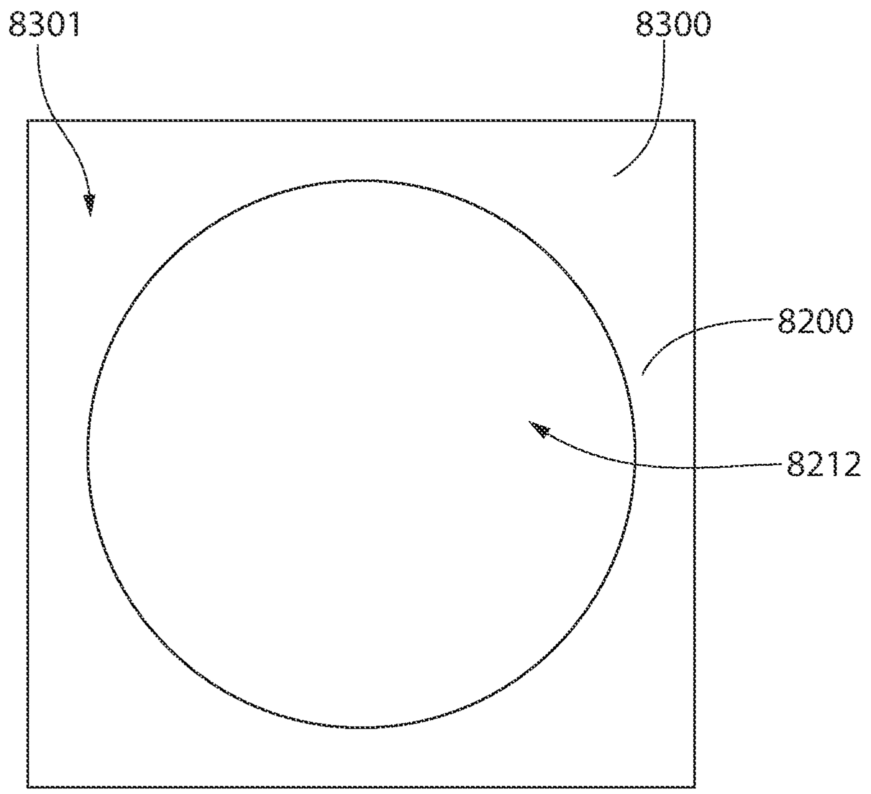

To couple the light module 8200 to the ceiling tile 8300, the light module 8200 is positioned adjacent to the rear surface 8302 of the ceiling tile 8300 with each of the tabs 8216 aligned with one of the notches 8331. The light module 8200 is translated towards the rear surface 8302 of the ceiling tile 8300 until each of the tabs 8216 passes through one of the notches 8331 and enters into the circumferential groove 8330 (FIG. 46B). In order to secure the light module 8200 in place, the light module 8200 is then turned/rotated relative to the ceiling tile 8300 a desired amount (i.e., 450 or the like) so that none of the tabs 8216 are aligned with any of the notches 8331 (FIG. 46C). In this position, the light module 8200 is securely coupled to the ceiling tile 8300. As can be seen in FIG. 46D, in this position the tabs 8216 are not visible when viewing the ceiling tile 8300 from the front surface 8301, and thus the combined ceiling tile 8300 and light module 8200 has a clean, crisp appearance. The front surface 8212 of the light module 8200 may be flush with the front surface 8301 of the ceiling tile 8300 in certain embodiments.

Although in this embodiment the light module 8200 and the through-hole 8303 are depicted as being round, the invention is not to be so limited in all embodiments and the light module 8200 and the through-hole 8303 can take on other shapes as desired. Furthermore, in certain embodiments the front surface 8212 of the light module 8200 may take on a different shape than the rear surface 8214 of the light module 8200. In some embodiments the rear surface 8214 of the light module 8200 corresponds with the shape of the through-hole 8303. Further still, although four tabs 8216 are depicted in the drawings, the invention is not to be limited by the number of tabs in all embodiments. In other embodiments, rather than tabs the peripheral surface of the light module 8200 may have an undulating appearance that achieves the same function as the tabs 8216 described herein. Finally, although this embodiment has been described such that the light module 8200 is installed through the rear surface 8302 of the ceiling tile 8300, the invention is not to be so limited in all embodiments and the same structures and techniques can be used to install the light module of FIGS. 46A-46D via the front surface 8301 of the ceiling tile 8300.

Figure 47A:
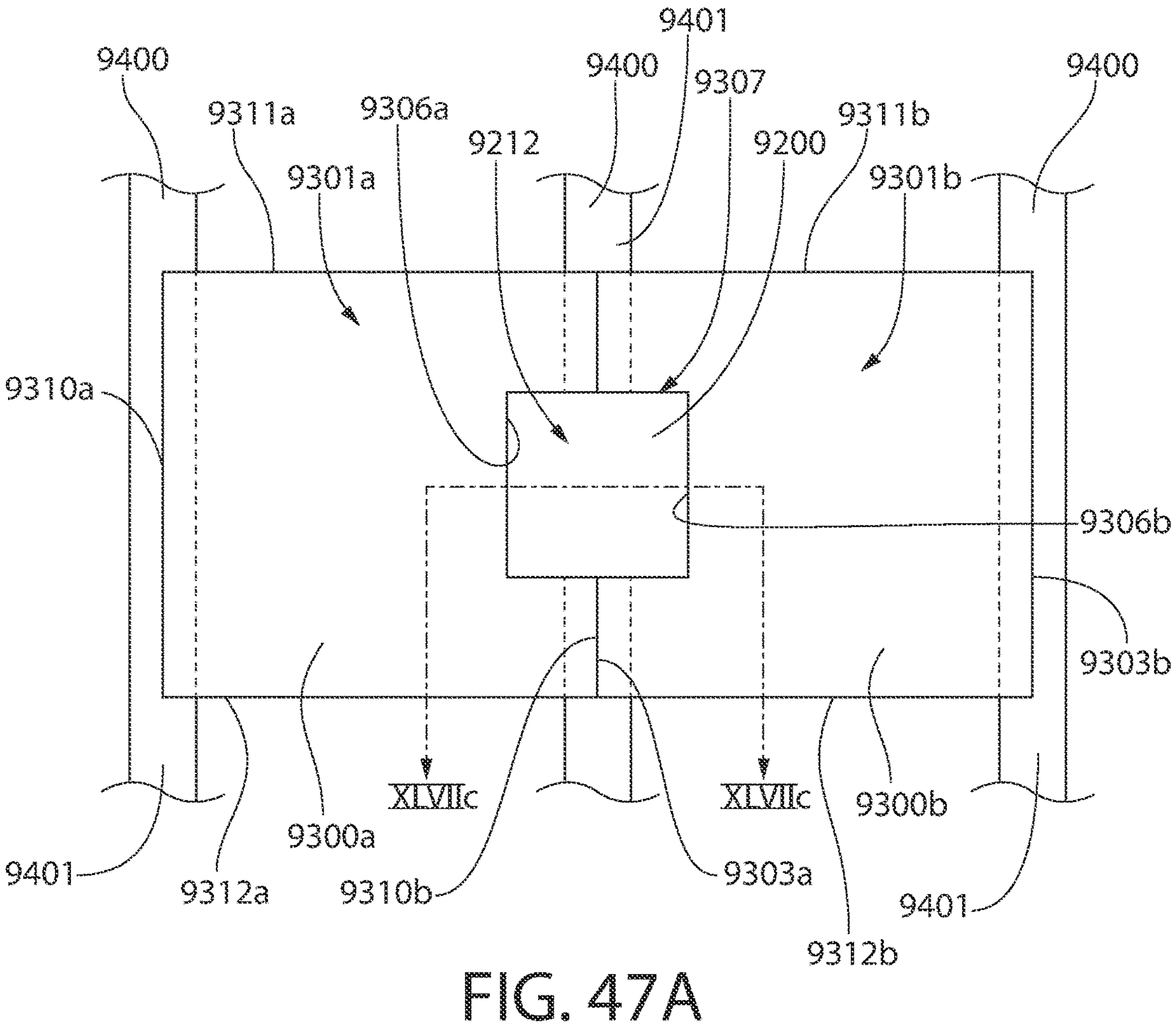
FIG. 47A is a front view of a light module coupled to ceiling tiles in accordance with an embodiment of the present invention.
Figure 47B:
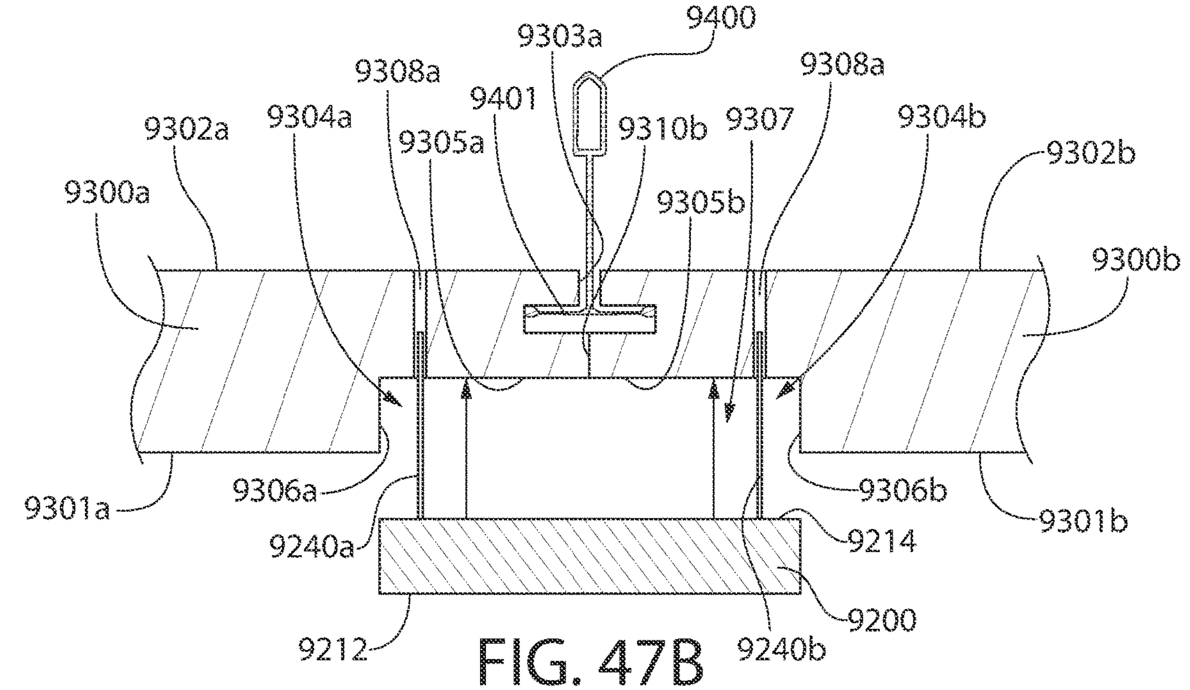
FIG. 47B is a cross-sectional view taken along line XLVIIC-XLVIIC with the light module decoupled from the ceiling tiles.
Figure 47C:
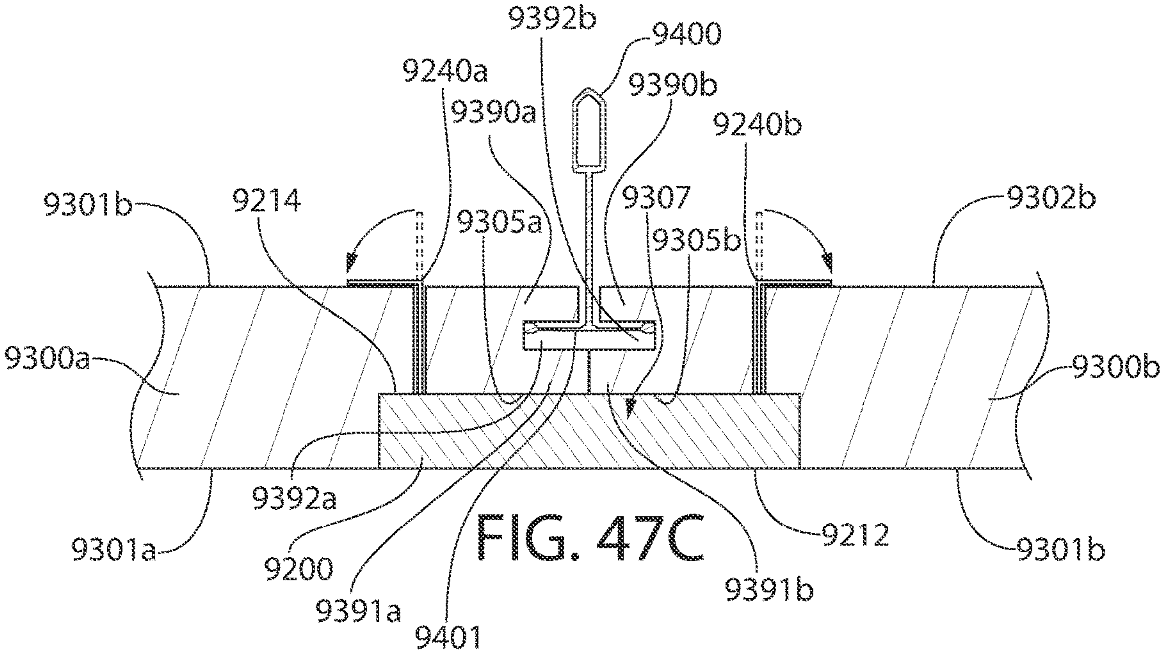
FIG. 47C is a cross-sectional view taken along line XLVIIC-XLVIIC with the light module coupled to the ceiling tiles.

Referring to FIGS. 47A-47C, the process of coupling a light module 9200 to a ceiling tile 9300 and the resulting structure will be described in accordance with an embodiment of the present disclosure. The details of the light module 9200 and the ceiling tile 9300 with regard to material of construction, structure, and the like is the same as that which has been described above with the embodiments described previously except as otherwise stated herein. Specifically, although the light module 9200 is illustrated generically in FIGS. 47A-47C, it should be appreciated that the light module 9200 may be the light module of FIG. 3 or any of the other types of light modules described herein. Numbering similar to that which was used in FIGS. 42A-43C may be used in FIGS. 47A-47C, it being understood that the description of the components in FIGS. 42A-43C are applicable to this embodiment for those similarly numbered components.

In the exemplified embodiment, a first ceiling tile 9300*a* and a second ceiling tile 9300*b* are illustrated resting atop of flanges 9401 of a grid support element 9400. The grid support element 9400 may be one that has an inverted T shape with the flanges 9401 as illustrated. The grid support element 9400 may be one of several grid support elements (see FIG. 47A) of a grid support system that is suspended from an overhead support structure as has been described previously in this document. In the exemplified embodiment, the grid support element 9400 alone or together with other grid support elements not illustrated herein may support the first and second ceiling tiles 9300*a*, 9300*b* so that they form a part of a suspended ceiling.

The first ceiling tile 9300*a* comprises a front surface 9301*a*, a rear surface 9302*a*, and peripheral edge extending between the front and rear surfaces 9301*a*, 9302*a*. The peripheral edge includes a first edge 9303*a*, a second edge 9310*a*, a third edge 9311*a*, and a fourth edge 9312*a*. The first edge 9303*a* of the first ceiling tile 9300 is positioned adjacent to the second ceiling tile 9300*b*. The second ceiling tile 9300*b* comprises a front surface 9301*b*, a rear surface 9302*b*, and a peripheral edge extending between the front and rear surfaces 9301*b*, 9302*b*. The peripheral edge of the second ceiling tile 9300*b* includes a first edge 9303*b*, a second edge 9310*b*, a third edge 9311*b*, and a fourth edge 9323*b*. The second edge 9310*b* of the second ceiling tile 9300*b* is adjacent to the first ceiling tile 9300*a*. More specifically, the first edge 9303*a* of the first ceiling tile 9300*a* is adjacent to and facing the second edge 9310*b* of the second ceiling tile 9300*b*.

More specifically, in the exemplified embodiment the first edge 9303*a* of the first ceiling tile 9300*a* and the second edge 9310*b* of the second ceiling tile 9300*b* are adjacent to one another in such a manner that they conceal the grid support element 9400. Thus, a person looking up at the first and second ceiling tiles 9300*a*, 9300*b* will not be able to see the grid support element 9400 because it is entirely concealed by the first and second ceiling tiles 9300*a*, 9300*b*. Of course, the invention is not to be so limited in all embodiments and in other embodiments the first edge 9303*a* of the first ceiling tile 9300*a* may be spaced apart from the second edge 9303*b* of the second ceiling tile 9300*b* so that the grid support element 9400 is at least partially visible.

In the exemplified embodiment, the grid is concealed due to the edge profiles of the first and second ceiling tiles 9300*a*, 9300*b*. Specifically, the first edge 9303*a* of the first ceiling tile 9300*a* and the second edge 9310*b* of the second ceiling tile 9300*b* each has an edge profile having a top portion 9390*a*, 9390*b* and a bottom portion 9391*a*, 9391*b* that are spaced apart by a gap 9392*a*, 9392*b* that receives the flange 9401 of the grid support element 9400. Of course, although one particular embodiment and ceiling tile structure is illustrated for concealing the grid support element 9400, the invention is not to be so limited in all embodiments and other concealed grid ceiling tile profiles may be used within the scope of the present disclosure, including the grid profiles disclosed in U.S. Pat. Nos. 6,108,994 and 6,230,463, the entireties of which are incorporated herein by reference.

The first and second ceiling tiles 9300*a*, 9300*b* collectively form a nesting cavity 9307 having a substantially closed perimeter or a substantially closed geometry that is formed entirely by the first and second ceiling tiles 9300*a*, 9300*b* collectively. More specifically, the first ceiling tile 9300*a* comprises a first recess 9304*a* formed into the front surface 9301*a* of the first ceiling tile 9300*a* that extends to the first edge 9303*a*. The first recess 9304*a* extends along the first edge 9303*a* of the first ceiling tile 9300*a*, and more specifically is located centrally along the first edge 9303*a* of the first ceiling tile 9300*a* between the third and fourth edges 9311*a*, 9312*a* of the first ceiling tile 9300*a*. Furthermore, in the exemplified embodiment the first recess 9304*a* is spaced apart from each of the corners of the first ceiling tile 9300*a*. The first recess 9304*a* is defined by a floor 9305*a* and a sidewall 9306*a* that extends from the floor 9305*a* to the front surface 9301*a* of the first ceiling tile 9300*a*. The first recess 9304*a* is bounded on one side by the sidewall 9306*a*, but it is not bounded on its opposite side because it extends to the first edge 9303*a* of the first ceiling tile 9300*a*. Specifically, in the exemplified embodiment the sidewall 9306*a* bounds the first recess 9304*a* on three sides while leaving the first recess 9304*a* open at the first edge 9303*a* of the first ceiling tile 9300*a*.

Similarly, the second ceiling tile 9300*b* comprises a second recess 9304*a* formed into the front surface 9301*b* of the second ceiling tile 9300*b* that extends to the second edge 9310*b*. The second recess 9304*b* extends along the second edge 9310*b* of the second ceiling tile 9300*b*, and more specifically is located centrally along the second edge 9310*b* of the second ceiling tile 9300*b* between the third and fourth edges 9311*b*, 9312*b* of the second ceiling tile 9300*b*. Furthermore, in the exemplified embodiment the second recess 9304*b* is spaced apart from each of the corners of the second ceiling tile 9300*b*. The second recess 9304*a* is defined by a floor 9305*b* and a sidewall 9306*b* that extends from the floor 9305*b* to the front surface 9301*a* of the second ceiling tile 9300*b*. The second recess 9304*a* is bounded on one side by the sidewall 9306*b*, but it is not bounded on its opposite side because it extends to the second edge 9310*b* of the second ceiling tile 9300*b*. Specifically, in the exemplified embodiment the sidewall 9306*b* bounds the second recess 9304*a* on three sides while leaving the second recess 9304*a* open at the second edge 9310*b* of the second ceiling tile 9300*b*.

Because the first and second ceiling tiles 9300*a*, 9300*b* are positioned on the grid support element 400 so that the first edge 9303*a* of the first ceiling tile 9300*a* faces the second edge 9310*b* of the second ceiling tile 9300*b*, the first and second recesses 9304*a*, 9304*b* of the first and second ceiling tiles 9300*a*, 9300*b* are aligned with one another to collectively form the nesting cavity 9307. Specifically, the first and second ceiling tiles 9300*a*, 9300*b* are supported by the grid support element 9400 with the edges 9303*a*, 9310*b* facing one another so that the recesses 9304*a*, 9304*b* are in spatial communication with one another, thereby forming the nesting cavity 9307. Thus, the recesses 9304*a*, 9304*b* collectively define the nesting cavity 9307 that is bounded by the floors 9305*a*, 9305*b* and the sidewalls 9306*a*, 9306*b* of the recesses 9304*a*, 9304*b*. The nesting cavity 9307 is sized and shaped to receive the light module 9200 as will be described in greater detail below.

In the exemplified embodiment, the nesting cavity 9307 is spaced apart from each of the corners of the first and second ceiling tiles 9300*a*, 9300*b*. The closed perimeter of the nesting cavity 9307 is formed collectively by the sidewall 9306*a* of the first ceiling tile 9300*a* that partially surrounds the first recess 9303*a* and the sidewall 9306*b* of the second ceiling tile 9300*b* that partially surrounds the second recess 9303*b*. In the exemplified embodiment each of the sidewalls 9306*a*, 9306*b* is formed by three walls arranged in a U-shape, but these sidewalls 9306*a*, 9306*b* may take on other shapes including being a single arcuate wall or the like. It is merely desirable, in certain embodiments, that the shape of the sidewalls 9306*a*, 9306*b* collectively corresponds with the shape of the light module 9200 to enable the light module 9200 to be disposed within the nesting cavity 9307 without large gaps between the outer edge of the light module 9200 and the sidewalls 9306*a*, 9306*b*. In certain embodiments the nesting cavity 9307, and hence also the light module 9200 when it is disposed within the nesting cavity 9307, is located within a portion of the first and second ceiling tiles 9300*a*, 9300*b* that conceals the grid support element 9400.

In the exemplified embodiment, a first through-hole or passageway 9308*a* is formed into the first ceiling tile 9300*a* and extends from the rear surface 9302*a* of the first ceiling tile 9300*a* to the floor 9305*a* of the first recess 9304*a* of the first ceiling tile 9300*a*. Similarly, a second through-hole or passageway 9308*b* is formed into the second ceiling tile 9300*b* and extends from the rear surface 9302*b* of the second ceiling tile 9300*b* to the floor 9305*b* of the second recess 9304*a* of the second ceiling tile 9300*b*. These first and second through-holes or passageways 9308*a*, 9308*b* facilitate coupling the light module 9200 to the first and second ceiling tiles 9300*a*, 9300*b* as described below.

The light module 9200 comprises the front surface 9212 and the rear surface 9214. Furthermore, in this embodiment a first tab member 9240*a* and a second tab member 9240*b* extend from the rear surface 9214 of the light module 9200. The first and second tab members 9240*a*, 9240*b* may be formed of a metal, such as steel or the like. However, in certain embodiments the first and second tab members 9240*a*, 9240*b* should be sufficiently thin that the metal can be bent to lock or otherwise fix the light module 9200 to the ceiling tiles 9300*a*, 9300*b*. A person skilled in the art would be capable of selecting a proper gauge or thickness of the first and second tab members 9240*a*, 9240*b* to achieve the necessary bending described herein while permitting the first and second tab members 9240*a*, 9240*b* sufficient rigidity to pierce the ceiling tile 9300 during installation as described herein below. Alternatively, the first and second tab members 9240*a*, 9240*b* may include a hinge to facilitate the necessary bending. The tab members 9240*a*, 9240*b* are not limited to being formed of metal but can be formed of any other material so long as the functionality described herein below can be achieved. In the exemplified embodiment, each of the first and second tab members 9240*a*, 9240*b* terminates in a distal end that is a flat and dull edge. However, the invention is not to be so limited in all embodiments and the distal ends of the tab members 9240*a*, 9240*b* may be pointed or otherwise sharp edges to facilitate the coupling of the light module 9200 to the ceiling tiles 9300*a*, 9300*b* as described herein below.

To couple the light module 9200 to the ceiling tiles 9300, the first and second tab members 9240*a*, 9240*b* are aligned with the first and second through-holes 9308*a*, 9308*b*. Next, the light module 9200 is translated towards the ceiling tiles 9300*a*, 9300*b* until the first and second tab members 9240*a*, 9240*b* are positioned within and extend through the first and second through-holes 9308*a*, 9308*b*. Specifically, when the rear surface 9214 of the light module 9200 is adjacent to and in contact with the floors 9305*a*, 9305*b* of the recesses 9304*a*, 9304*b* (which collectively forms the floor of the nesting cavity 9307), a portion of the first and second tab members 9240*a*, 9240*b* are positioned within the first and second through-holes 9308*a*, 9308*b* and a portion of the first and second tab members 9240*a*, 9240*b* protrude from the rear surfaces 9301*a*, 9301*b* of the first and second ceiling tiles 9300*a*, 9300*b*. The first and second tab members 9240*a*, 9240*b* can then be bent as illustrated in FIG. 47C to secure the light module 9200 within the cavity 9307 that is formed jointly by the pockets 9304*a*, 9304*b* of the first and second ceiling tiles 9300*a*, 9300*b*. Although the tab members 9240*a*, 9240*b* are used in this embodiment as the coupling feature, the invention is not to be so limited and other techniques can be used including threaded rod and bolt/nut, tab/groove, adhesive, hook-and-loop, interference, snap fit, or any of the other techniques discussed in this document or otherwise known and available as a coupling technique for the purposes described herein. Regardless of the specific technique used for coupling the light module 9200 to the first and second ceiling tiles 9300*a*, 9300*b*, in certain embodiments the light module 9200 is coupled directly to the first and second ceiling tiles 9300*a*, 9300*b* such that no portion of the light module 9200 is in contact with or coupled directly to the grid support element 9400. The light module 9200 is only indirectly coupled to the grid support element 9400 due to the light module 9200 being coupled to the first and second ceiling tiles 9300*a*, 9300*b* and the first and second ceiling tiles 9300*a*, 9300*b* being supported by the grid support element 9400.

In the exemplified embodiment, when fully installed the rear surface 9414 is in contact with the floor 9305*a*, 9305*b* of the nesting cavity 9307 and the front surface 9212 of the light module 9200 is flush with the front surfaces 9301*a*, 9301*b* of the first and second ceiling tiles 9300*a*, 9300*b*. The front surface 9212 of the light module 9200 may be a common light and heat emitting surface in certain embodiments as described herein. The flush mounting of the light module 9200 can be achieved with the use of spacers or other elements positioned between the light module 9200 and the ceiling tiles 9300*a*, 9300*b* where necessary. Of course, the invention is not to be limited to a flush mounting and other mounting appearances are possible within the scope of the present disclosure.

In the exemplified embodiment, the front surfaces 9301*a*, 9301*b* of the first and second ceiling tiles 9300*a*, 9300*b* form a ceiling plane. In certain embodiments such a ceiling plane may be parallel to a floor of an interior space within which the first and second ceiling tiles 9300*a*, 9300*b* are suspended, although in other embodiments the ceiling plane may be non-parallel to the floor of the interior space. In the exemplified embodiment, there is an axis that is perpendicular to the ceiling plane that intersects both the grid support element 9400 and the nesting cavity 9307 or the light module 9200 when the light module 9200 is disposed within the nesting cavity 9307.

Figure 48:
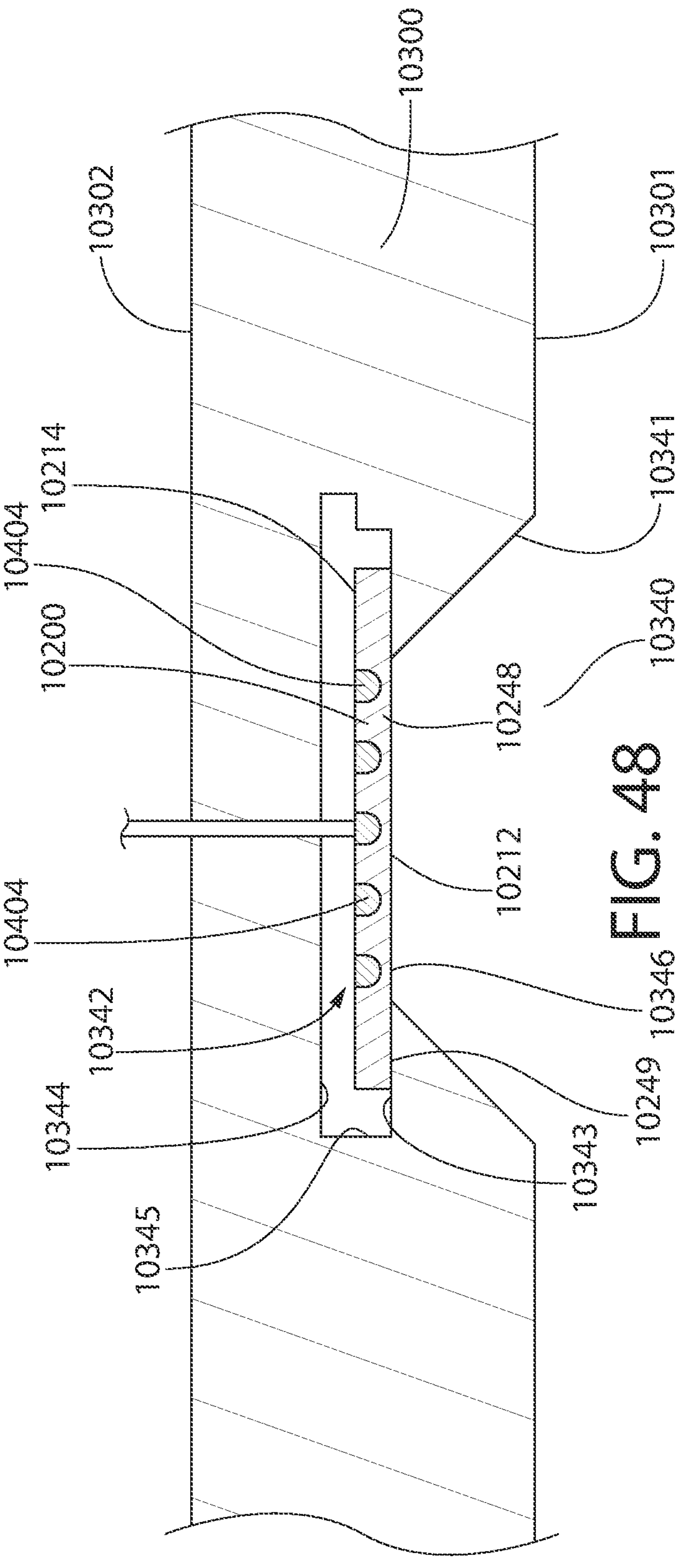
FIG. 48 is a schematic view of a light module coupled to a ceiling tile in accordance with an embodiment of the present invention.

Referring to FIG. 48, another embodiment of a light module 10200 coupled to a ceiling tile 10300 will be described. The details of the light module 10200 and the ceiling tile 10300 with regard to material of construction, structure, and the like is the same as that which has been described above with the embodiments described previously except as otherwise stated herein. Specifically, although the light module 10200 is illustrated generically in FIG. 48, it should be appreciated that the light module 10200 may be the light module of FIG. 3 or any of the other types of light modules described herein. Numbering similar to that which was used in FIGS. 42A-43C may be used in FIG. 48, it being understood that the description of the components in FIGS. 42A-43C are applicable to this embodiment for those similarly numbered components.

In the exemplified embodiment, the ceiling tile 10300 comprises a front surface 10301 and an opposite rear surface 10302. A first opening 10340 is formed into the front surface of the ceiling tile 10300 and is bounded by a beveled wall 10341. The ceiling tile 10300 comprises an internal cavity 10342 that is bounded by a platform surface 10343, a roof 10344, and a sidewall 10345 extending between the platform surface 10343 and the roof 10344. The beveled wall 10341 terminates at a second opening 10346 that provides a passageway into the internal cavity 10342.

The light module 10200 is positioned within the internal cavity 10342. More specifically, the light module 10200 rests atop of the platform surface 10343. In this position, a first portion 10248 of the front surface 10212 of the light module 10200 is exposed through the first and second openings 10340, 10346. However, a second portion 10249 of the front surface 10212 of the light module 10200 is not exposed because the second portion 10249 of the front surface 10212 of the light module 10200 rests in contact with the platform surface 10343. In certain embodiments, light sources such as the LEDs 10404 are positioned along the first portion 10248 of the light module 10200 but not along the second portion 10249 of the light module 10200. Thus, the LEDs 10404 are only located along portions of the light module 10200 that are visible through the first and second openings 10340, 10346. Finally, in this embodiment one or more electrical wires may extend through the ceiling tile 10300 for coupling with a power source. Alternatively, the light module 10200 may include an internal power source (i.e. batteries), or the light module 10200 may be powered via electrified conductive strips located within the ceiling tile 10300.

Referring to FIGS. 49A-49E, another embodiment of the light module 11200 coupled to one of the ceiling tiles 11300 will be described. The details of the light module 11200 and the ceiling tile 11300 with regard to material of construction, structure, and the like is the same as that which has been described above with the embodiments described previously except as otherwise stated herein. Specifically, although the light module 11200 is illustrated generically in FIGS. 49A-49E, it should be appreciated that the light module 11200 may be the light module of FIG. 3 or any of the other types of light modules described herein. Numbering similar to that which was used in FIGS. 42A-43C may be used in FIGS. 49A-49E, it being understood that the description of the components in FIGS. 42A-43C are applicable to this embodiment for those similarly numbered components.

In the embodiment of FIGS. 49A-49E, the ceiling tile 11300 comprises a front surface 11301, a rear surface 11302, and a perimetric edge extending between the front and rear surfaces 11301, 11302. The perimetric edge comprises a first edge 11303*a*, a second edge 11303*b*, a third edge 11303*c* opposite the first edge 11303*a*, and a fourth edge 11303*d* opposite the second edge 11303*b*. An elongated nesting channel 11360 is formed through the ceiling tile 11300 and extends from the first edge 11303*a* of the ceiling tile 11300 to the third edge 11303*b* of the ceiling tile 11300. The elongated nesting channel 11360 is defined by a floor 11361 that is recessed relative to the front surface of the ceiling tile 11300, a first sidewall 11362 extending from the floor 11361 of the elongated nesting channel 11360 to the front surface 11301 of the ceiling tile 11300 and a second sidewall 11363 extending from the floor 11361 of the elongated nesting channel 11360 to the front surface 11301 of the ceiling tile 11300.

Each of the first and second sidewalls extends from the first edge 11303*a* of the ceiling tile 11300 to the third edge 11303*b* of the ceiling tile 11300. Furthermore, the second sidewall 11363 is positioned on an opposite side of the elongated nesting channel 11360 from the first sidewall 11362 such that the first and second sidewalls 11362, 11363 form opposing boundaries for the elongated nesting channel 11360. In the exemplified embodiment, the first sidewall 11362 is parallel to the second edge 11303*b* of the ceiling tile 11300 and the second sidewall 11363 is parallel to the fourth edge 11303*d* of the ceiling tile 11300. Furthermore, in the exemplified embodiment the floor 11361 of the elongated nesting channel 11360 is a flat, planar surface, and each of the first and second sidewalls 11362, 11363 extends upwardly from the floor 11361 at an acute angle so that the first and second sidewalls 11362, 11363 converge towards one another. Stated another way, the elongated nesting channel 11360 is a dovetail channel.

The ceiling tile 11300 also comprises a passageway 11310 extending through the ceiling tile 11300 from the floor 11361 of the channel 11360 to the rear surface 11302 of the ceiling tile 11300. The passageway 11310 provides a space for wires to extend for coupling to the light module 11200 and to a power source to provide power to the light module 11200. Furthermore, in the exemplified embodiment an elongated groove 11364 is formed into the floor 11361 of the channel 11360 and extends from the first edge 11303*a* of the ceiling tile 11300 to the passageway 11310. Thus, wires that are connected to the light module 11200 can nest within the groove 11364 as the light module 11200 is slidably coupled to the ceiling tile 11300 as described herein below.

The light module 11200 in this embodiment has the shape of a dovetail tongue. Specifically, the light module 11200 comprises opposing edges 11299, 11298 that are oriented at an obtuse angle relative to the front surface 11212 of the light module 11200. Thus, coupling of the light module 11200 to the ceiling tile 11300 is achieved in the manner of a sliding dovetail joint. Specifically, the light module 11200 has the opposing edges 11299, 11298 that are angled to match the angle of the first and second sidewalls 11362, 11363 of the elongated nesting channel 11360. Stated another way, the light module 11200 may be positioned within the elongated nesting channel 11360 and coupled to the ceiling tile 11300 via interaction between the opposing edges 11299, 11298 of the light module 11200 and the first and second sidewalls 11362, 11363 of the elongated nesting channel 11360.

Thus, coupling the light module 11200 to the ceiling tile 11300 is achieved by slidably inserting the light module 11200 into the elongated nesting channel 11360 and continuing to slide the light module 11200 within the elongated nesting channel 11360 until the light module 11200 is fully disposed within the elongated nesting channel 11360. Interaction between the opposing edges 11299, 11298 of the light module 11200 and the first and second sidewalls 11362, 11363 of the elongated nesting channel 11360 is that of a dovetail joint. In the exemplified embodiment a power wire 11259 is coupled to and extends from the light module 11200. In this embodiment, before the light module 11200 begins to be slidably coupled to the ceiling tile 11300, the power wire 11259 may be positioned within the groove 11364 and extend through the passageway 11310 for coupling to an AC power supply or the like. Thus, the groove 11364 enables the sliding dovetail fit between the light module 11200 and the ceiling tile 11300 without interference by the power wire 11259.

In the exemplified embodiment, when the light module 11200 is coupled to the ceiling tile 11300, the front surface 11212 of the light module 11200 is flush with the front surface 11301 of the ceiling tile 11300. Of course, the invention is not to be so limited in all embodiments and the front surface 11212 of the light module 11200 need not be flush with the front surface 11301 of the ceiling tile 11300 in all embodiments. Rather, in other embodiments the front surface 11212 of the light module 11200 may be recessed relative to or may extend beyond the front surface 11301 of the ceiling tile 11300. Furthermore, in this embodiment when the light module 11200 is coupled to the ceiling tile 11300, ends of the light module 11200 are exposed at the first and third edges 11303*a*, 11303*c* of the ceiling tile 11300.

Figure 49A:
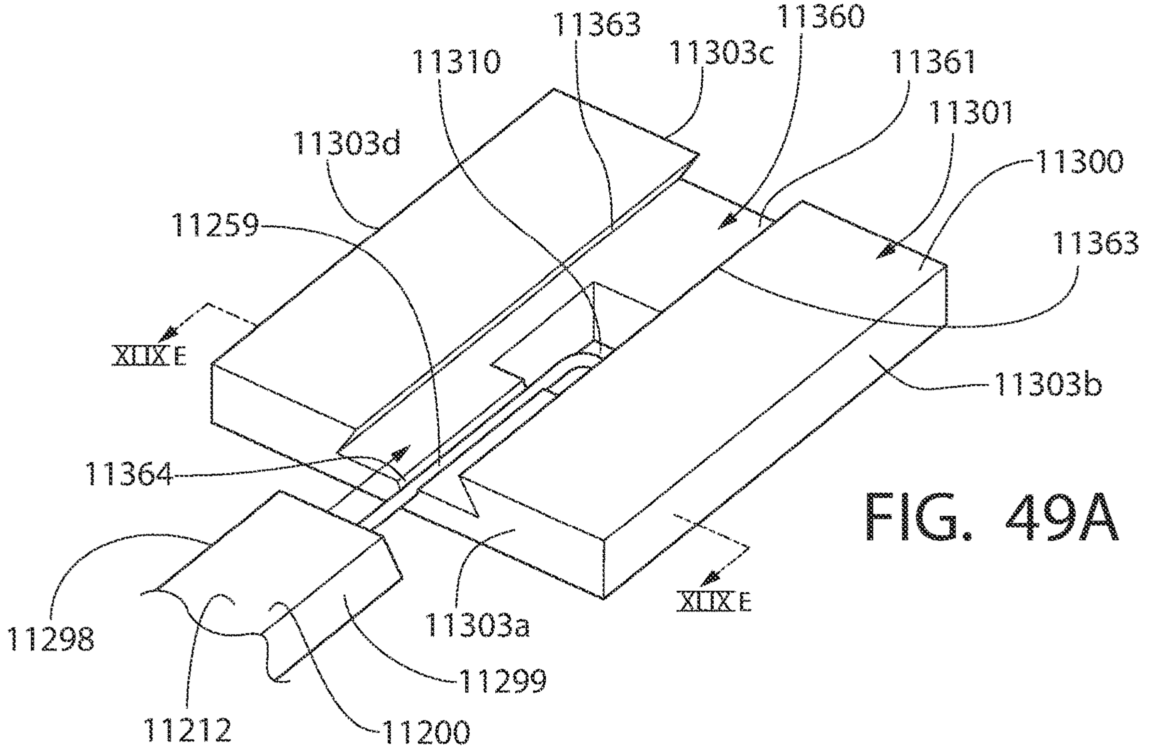
FIGS. 49A-49C are schematic views illustrating a process of coupling a light module to a ceiling tile in accordance with an embodiment of the present invention.
Figure 49B:
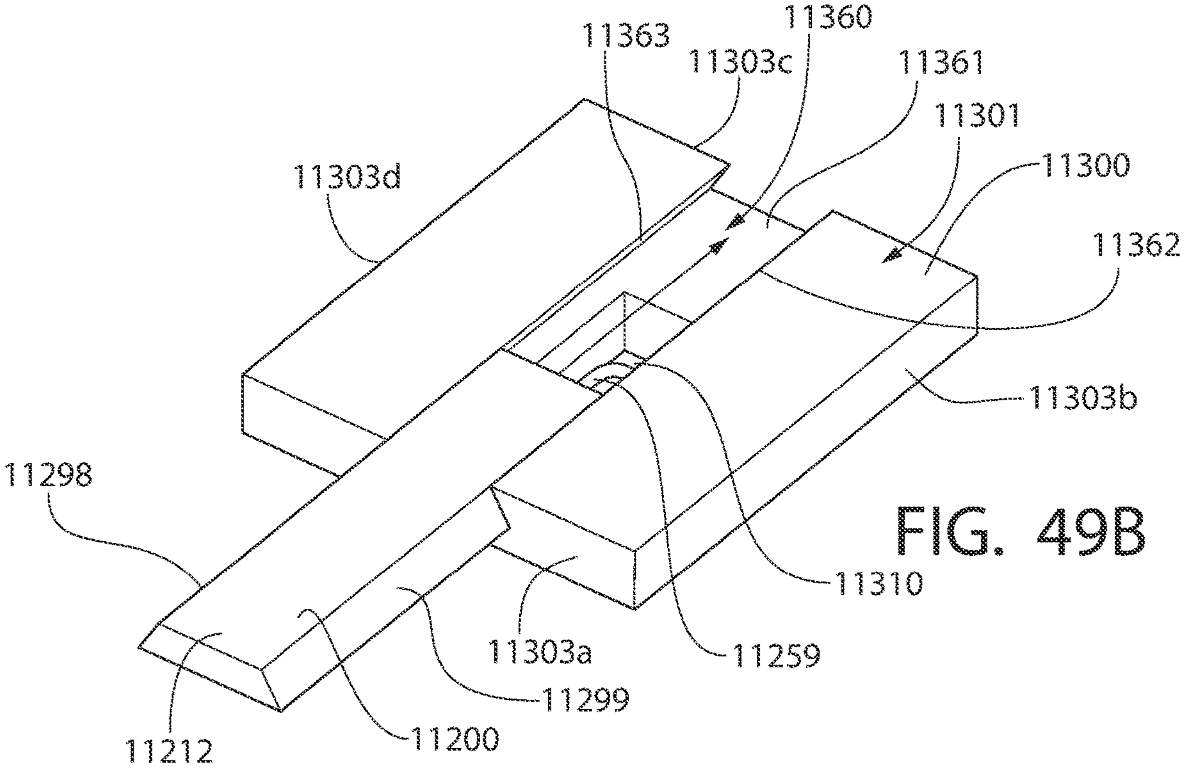
Figure 49C:
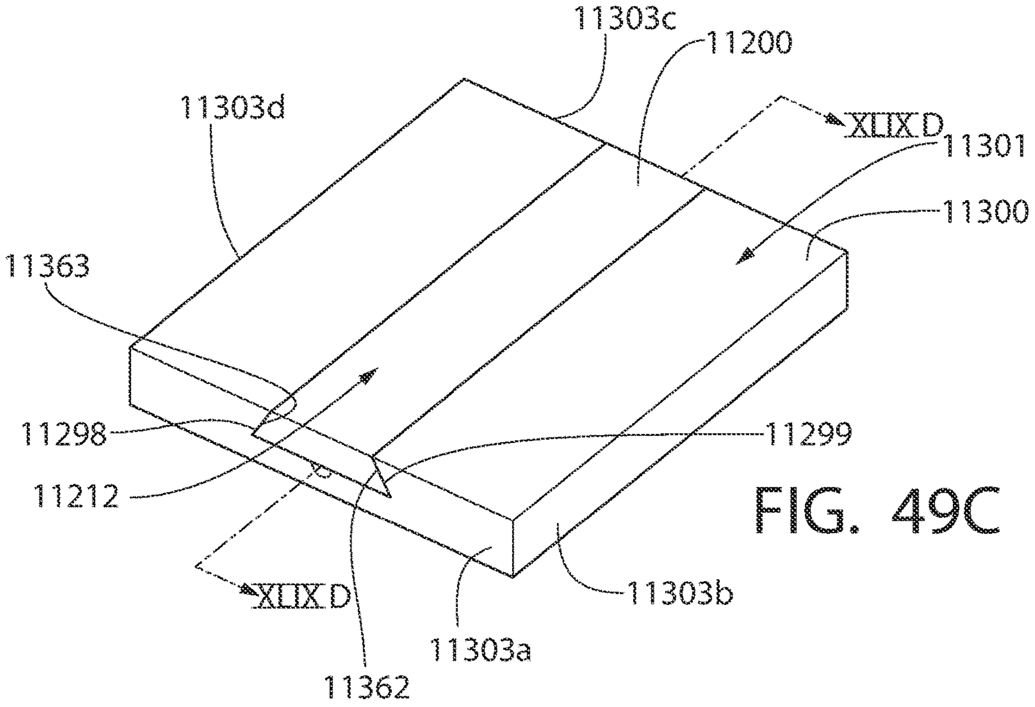
Figure 49D:
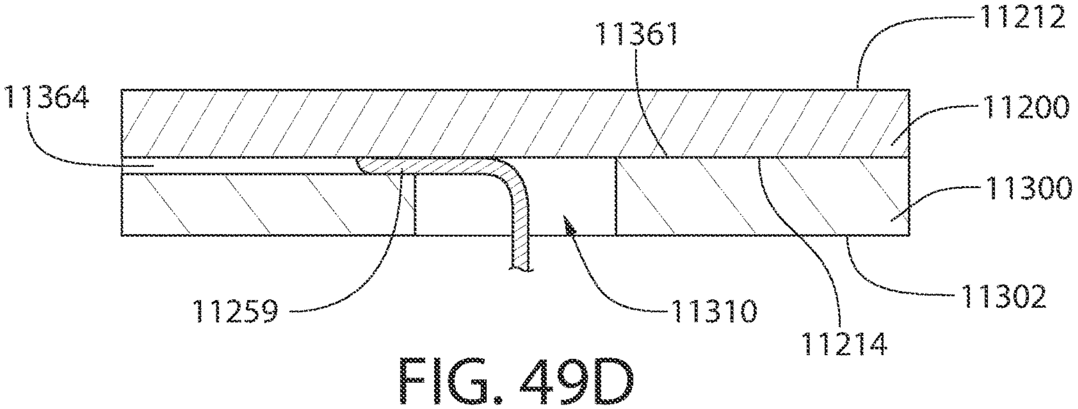
FIG. 49D is a cross-sectional view taken along line XLIXD-XLIXD in FIG. 49C.
Figure 49E:
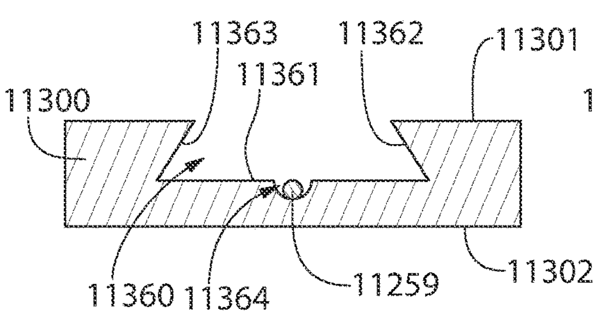
FIG. 49E is a cross-sectional view taken along line XLIXE-XLIXE in FIG. 49A.
Figure 49F:
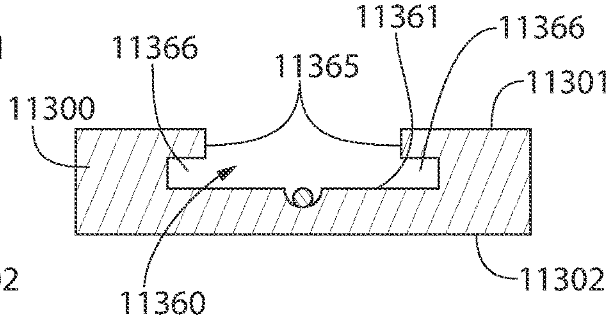
FIG. 49F is an alternative cross-sectional view taken along line XLIXE-XLXIE in FIG. 49A.

FIG. 49F is one alternative embodiment of the shape of the elongated nesting channel 11360. Specifically, rather than the conventional dovetail shape, in this embodiment the ceiling tile 11300 comprises a lip 11365 that overhangs a portion of the elongated nesting channel 11360 such that a groove 11366 is formed between the lip 11365 and the floor 11361 of the elongated nesting channel 11360. In such embodiment, the opposing edges of the light module 11200 will have shapes configured to mate and correspond with the lip 11365 and groove 11366. The lip 11365 provides a structure for preventing the light module 11200 from becoming separated from the ceiling tile 11300 in any manner other than sliding the light module 11200 along the length of the elongated nesting channel 11360.

Figure 50A:
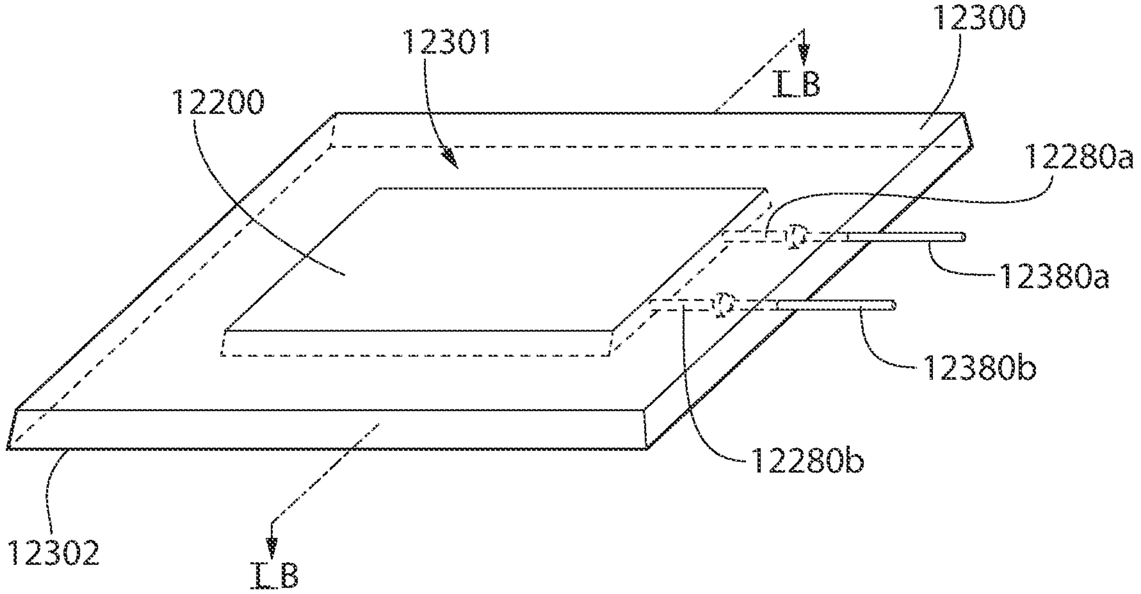
FIG. 50A is a schematic views of a light module coupled to a ceiling tile in accordance with an embodiment of the present invention.
Figure 50B:
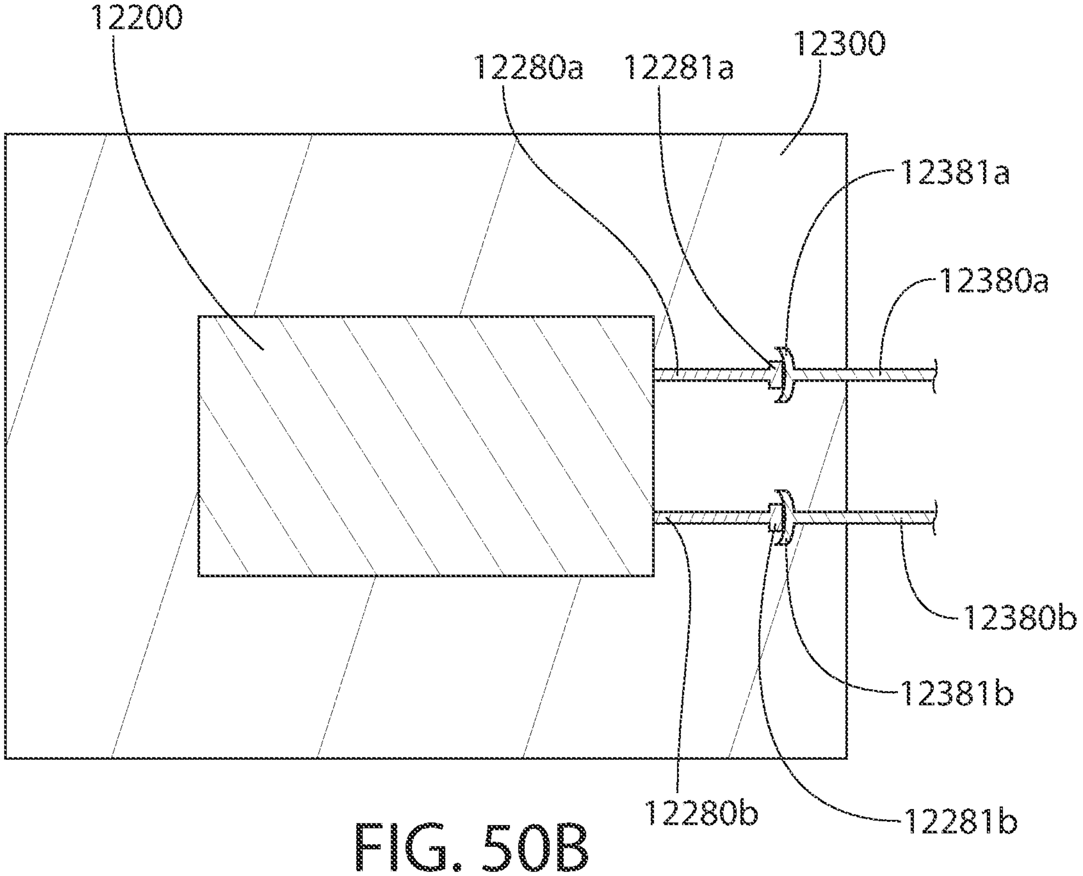
FIG. 50B is a cross-sectional view taken along line LB-LB in FIG. 50A.

Referring to FIGS. 50A-50B, another embodiment of a light module 12200 coupled to a ceiling tile 12300 will be described. The details of the light module 12200 and the ceiling tile 12300 with regard to material of construction, structure, and the like is the same as that which has been described above with the embodiments described previously except as otherwise stated herein. Specifically, although the light module 12200 is illustrated generically in FIGS. 50A-50B, it should be appreciated that the light module 12200 may be the light module of FIG. 3 or any of the other types of light modules described herein. Numbering similar to that which was used in FIGS. 42A-43C may be used in FIGS. 50A-50B, it being understood that the description of the components in FIGS. 42A-43C are applicable to this embodiment for those similarly numbered components.

In this embodiment, the light module 12200 may be coupled to the ceiling tile 12300 using any of the techniques described herein above, or other techniques including those that would be readily appreciated by persons skilled in the art. In this embodiment first and second wires 12380*a*, 12380*b* (i.e., positive and negative charge) extend from a power supply (such as an AC power source or the like) and are embedded within the ceiling tile 12300. In the exemplified embodiment the first and second wires 12380*a*, 12380*b* are embedded within passageways that are formed into the ceiling tile 12300. However, in other embodiments the first and second wires 12380*a*, 12380*b* may be positioned within grooves or channels formed into one of the front and/or rear surfaces 12302, 12302 of the ceiling tile 12300. The first wire 12380*a* terminates at a first contact member 12381*a* and the second wire 12380*b* terminates at a second contact member 12381*b*. Each of the first and second contact members 12381*a*, 12381*b* is positioned on or within the ceiling tile 12300.

Furthermore, in this embodiment the light module 12200 comprises a first connector 12280*a* and a second connector 12280*b* extending therefrom. The first connector 12280*a* terminates in a first contact member 12281*a* and the second connector 12280*b* terminates in a second contact member 12281*b*. The light module 12200 is coupled to the ceiling tile 12300 so that the first contact member 12281*a* of the first connector 12280*a* is in contact with the first contact member 12381*a* of the first wire 12380*a* and the second contact member 12281*b* of the second connector 12280*b* is in contact with the second contact member 12381*b* of the second wire 12380*b*. In certain embodiments, the first and second contact members 12381*a*, 12381*b* may be embedded in the ceiling tile 12300 between the front and rear surfaces 12301, 12302 of the ceiling tile 12300 such that no portion of the first and second contact members 12381*a*, 1238*ab* is exposed.

Thus, the mere act of coupling the light module 12200 to the ceiling tile 12300 will result in power being supplied to the light module 12200 (as long as the first and second wires 12380*a*, 12380*b* are coupled to a power source). Depending on the manner of coupling between the light module 12200 and the ceiling tile 12300, the locations of the first and second contact members 12381*a*, 12381*b* of the first and second wires 12380*a*, 12380*b*, the lengths of the first and second connectors 12280*a*, 12280*b*, and the like may be modified to ensure proper electrical coupling as set forth herein. Embedding the wires 12380*a*, 12380*b* within the ceiling tile 12300 enables the light module 12200 to be coupled to the ceiling tile 12300 and electrically powered without removing the ceiling tile 12300 from the ceiling system to achieve such coupling or powering of the light module 12200.

The description above describes many different embodiments in which a light module is coupled to a ceiling tile or to a vertical panel or baffle. Some of the teachings described above may be combined such that a certain teaching that is described above with regard to one embodiment but not another embodiment may be applicable to that other embodiment. For example, any of the teachings above with regard to powering the light module may be applied to any of the different embodiments even if some powering methods are not specifically described with regard to all of the different embodiments. Thus, combinations of the teachings set forth herein are within the scope of the present disclosure.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. An integrated ceiling and light system comprising:

a vertical panel suspended from a support structure, the vertical panel having a bottom edge that faces an interior space, a top edge opposite the bottom edge, first and second side edges extending between the top and bottom edges that form the outermost periphery of the vertical panel, a front surface, and a rear surface opposite the front surface; and a light module mounted to the vertical panel such that the light module is positioned at or adjacent to one of the top or bottom edges of the vertical panel so that a light emitting surface of the light module faces towards the vertical panel such that light emitted by the light module is directed towards and reflects off of at least one of the front and rear surfaces of the vertical panel.

2. The integrated ceiling and light system of claim 1 wherein the light module is mounted to the bottom edge of the vertical panel.

3. The integrated ceiling and light system of claim 1 wherein the vertical panel has a thickness measured between the front and rear surfaces of the vertical panel and wherein the light module has a width that is greater than the thickness of the vertical panel so that portions of the light module extend beyond the front and rear surfaces of the vertical panel.

4. The integrated ceiling and light system of claim 1 further comprising a passageway extending through the vertical panel, electrical wires extending through the passageway and operably coupled to the light module and to a power source.

5. The integrated ceiling and light system of claim 1 wherein the light module is mounted to the top edge of the vertical panel.

6. The integrated ceiling and light system of claim 1 further comprising a plurality of the vertical panels suspended from the support structure, each of the vertical panels having at least one of the light modules mounted directly thereto.

7. The integrated ceiling and light system of claim 6 wherein a first one of the light modules is mounted to the bottom edge of a first one of the vertical panels and wherein a second one of the light modules is mounted to the top edge of a second one of the vertical panels.

8. The integrated ceiling and light system of claim 7 wherein a first one of the light modules is mounted to the bottom edge of a first one of the vertical panels so that a light emitting surface of the first one of the light modules faces the first one of the vertical panels, and wherein a second one of the light modules is mounted to the bottom edge of a second one of the vertical panels so that a light emitting surface of the second one of the light modules faces the interior space.

9. The integrated ceiling and light system of claim 1 wherein the vertical panel is a substantially solid unhollowed acoustic panel.

* * * * *